US006982181B2

(12) United States Patent
Hideo

(10) Patent No.: US 6,982,181 B2
(45) Date of Patent: Jan. 3, 2006

(54) MANUFACTURING PROCESS FOR ULTRA SLIM ELECTROOPTIC DISPLAY DEVICE UNIT

(75) Inventor: Yamanaka Hideo, Kumamoto (JP)

(73) Assignee: Sony Corporation, Tokyo (JP)

( * ) Notice: Subject to any disclaimer, the term of this patent is extended or adjusted under 35 U.S.C. 154(b) by 77 days.

(21) Appl. No.: 10/807,958

(22) Filed: Mar. 24, 2004

(65) Prior Publication Data

US 2004/0259326 A1 Dec. 23, 2004

(30) Foreign Application Priority Data

Mar. 25, 2003 (JP) .............................. 2003-083056
Jan. 30, 2004 (JP) .............................. 2004-024897

(51) Int. Cl.
  *H01L 21/00* (2006.01)
  *H01L 21/30* (2006.01)
(52) U.S. Cl. ........................... 438/30; 438/458; 438/57
(58) Field of Classification Search ................. 438/30, 438/106–127, 57–99, 455–465
See application file for complete search history.

(56) References Cited

U.S. PATENT DOCUMENTS

| 6,891,578 | B2 * | 5/2005 | Yonehara et al. ............ 349/43 |
| 2001/0019371 | A1 * | 9/2001 | Zavracky et al. ............ 349/5 |
| 2003/0008437 | A1 * | 1/2003 | Inoue et al. ................ 438/149 |
| 2003/0087503 | A1 * | 5/2003 | Sakaguchi et al. .......... 438/406 |
| 2003/0136966 | A1 * | 7/2003 | Inoue et al. ................ 257/79 |
| 2004/0219762 | A1 * | 11/2004 | Shimoda et al. ............ 438/455 |
| 2005/0059219 | A1 * | 3/2005 | Tayanaka .................... 438/458 |
| 2005/0095810 | A1 * | 5/2005 | Nakata et al. ............... 438/455 |

FOREIGN PATENT DOCUMENTS

JP 09-312349 * 2/1997

* cited by examiner

*Primary Examiner*—Savitri Mulpuri
(74) *Attorney, Agent, or Firm*—Robert J. Depke; Trexler, Bushnell, Giangiorgi, Blackstone & Marr

(57) ABSTRACT

To obtain a high intensity, high definition and sophisticated electrooptic display device unit such as transmissive type LCD, a semi-transmissive type LCD, a reflective type LCD, a surface emitter type organic EL, or an underside emitter type organic EL, etc. which has high electron and positive hole mobility and low leak electric current qualities.

Figure 1:
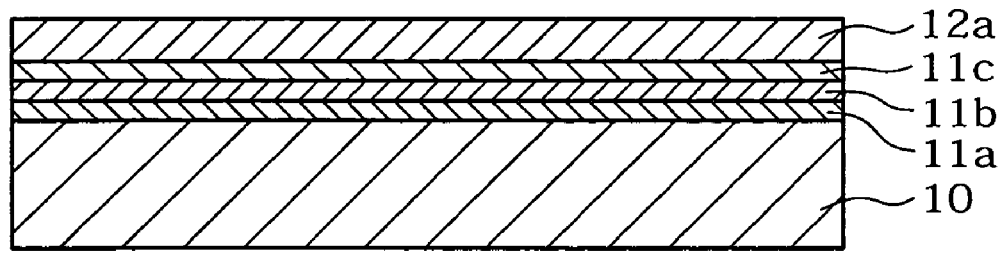

A porous semiconductor layer (low porous Si layer 11a/high porous Si layer 11b/low porous Si layer 11c), a monocrystalline Si layer 12a, and the Si $O_2$ layer 13a are formed on a monocrystalline Si substrate 10. The Si $O_2$ layer 13a of the peripheral circuit area is removed, leaving the Si $O_2$ layer 13a in the display area. The poly Si layer 14a is formed in the display area by semiconductor epitaxial growth, and a monocrystalline Si layer 12b is formed in the peripheral circuit area. Then, the display element section is formed in the poly Si layer 14 of the display area and the peripheral circuitry section is formed in the monocrystalline Si layer 12b of the peripheral circuit area. The assembly is divided into each ultra slim electrooptic display device unit after separation from the backing, and after the process of separating the Si substrate 10 from the porous Si layer 11b and by attaching the backing to the ultra slim electrooptic display element substrate after its separation. Each ultra slim electrooptic display device unit is divided after attaching the backing.

21 Claims, 47 Drawing Sheets

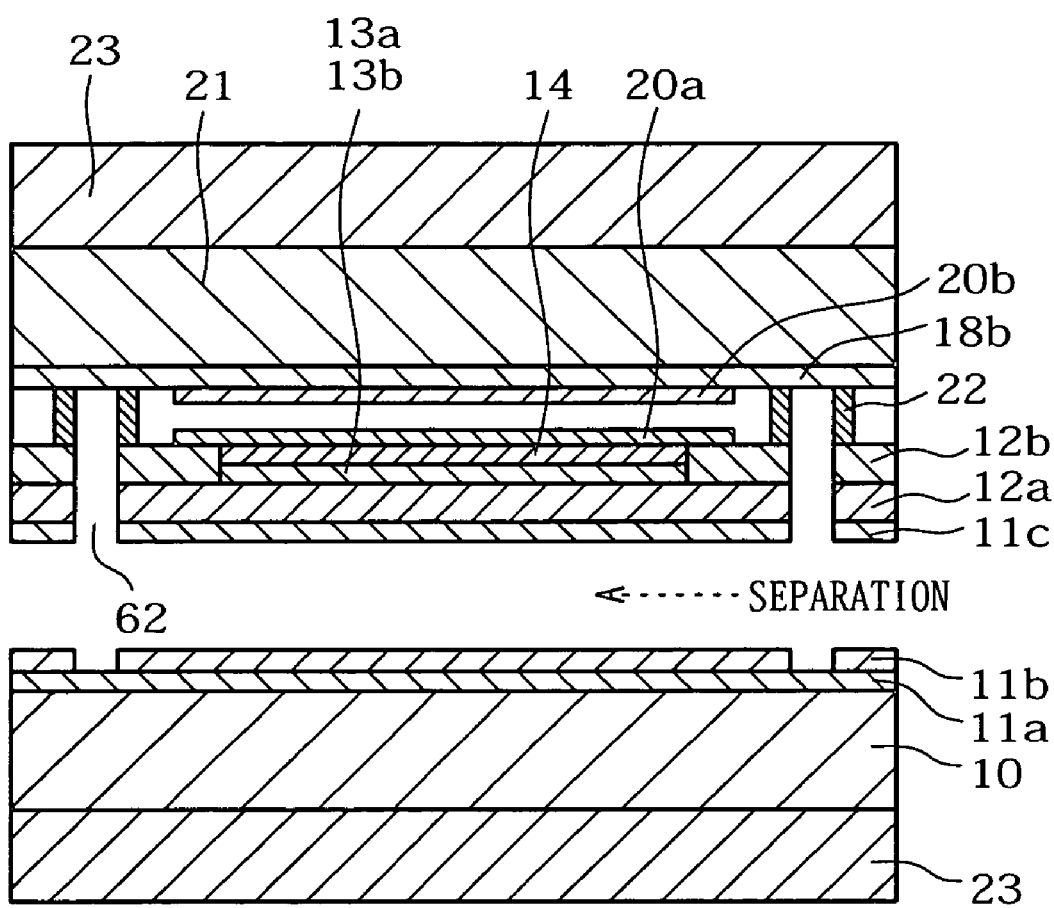

(a) WITHOUT A LIGHT-SHIELDING FILM (a) WITH A LIGHT-SHIELDING FILM

FIG. 17
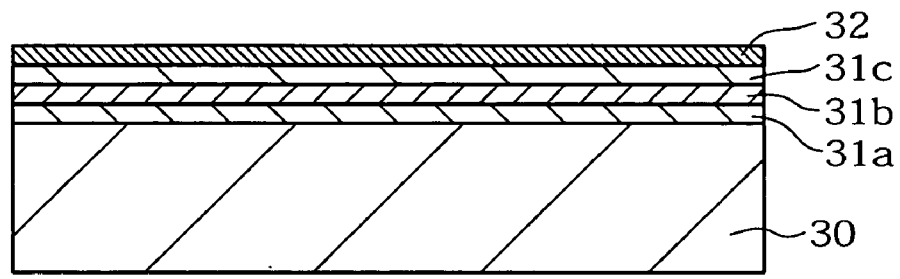
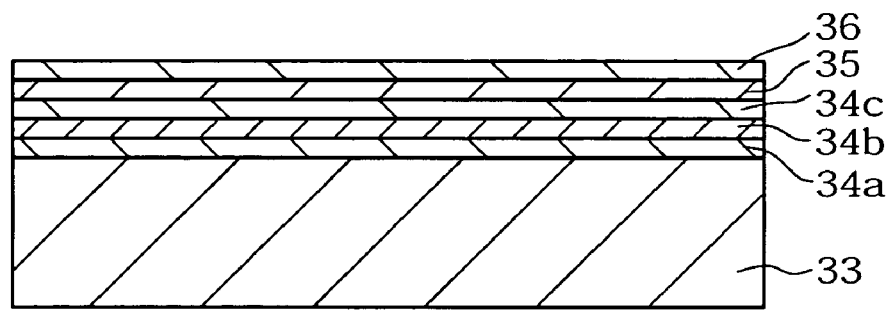
FIG. 18
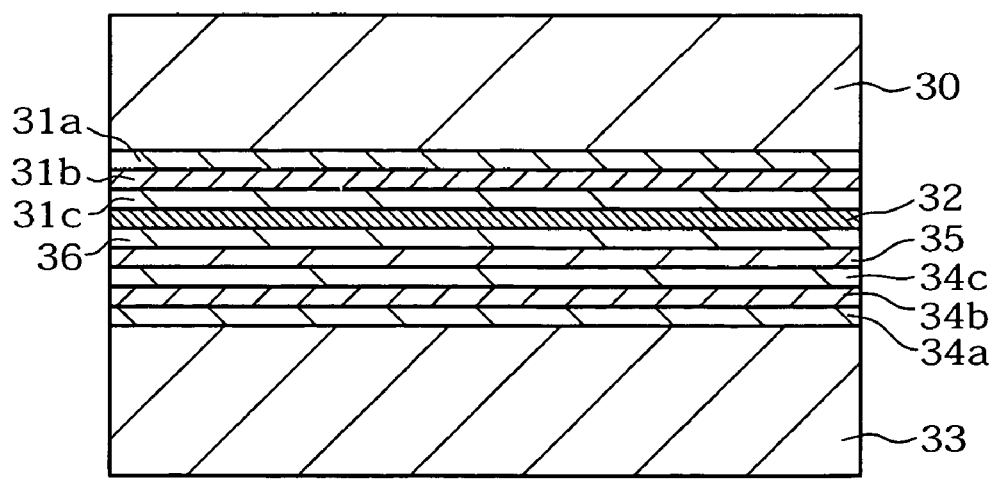

F I G. 1 9
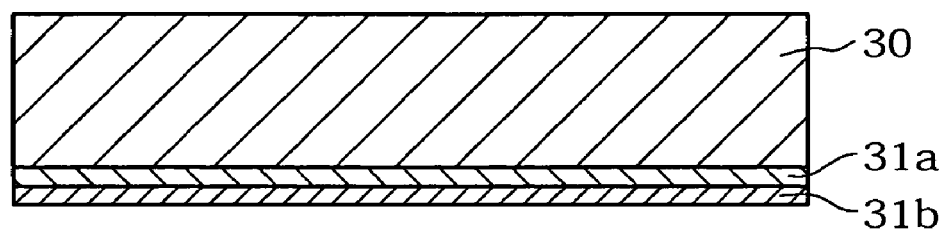
·······> SEPARATION
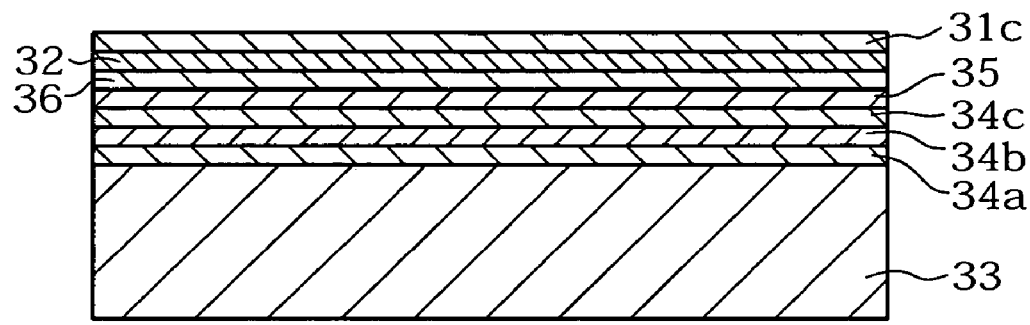

---> SEPARATION

FIG. 41A
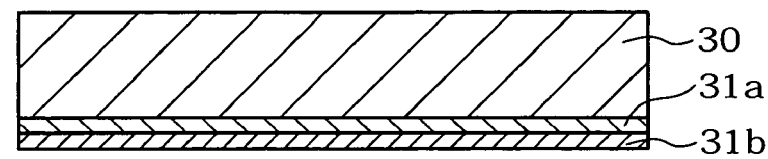
SEPARATION ---->
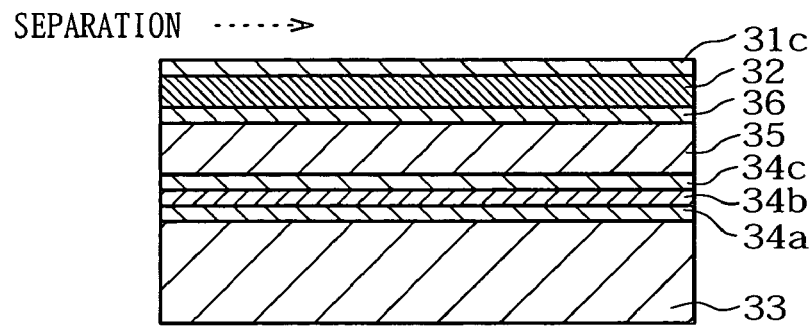
FIG. 41B
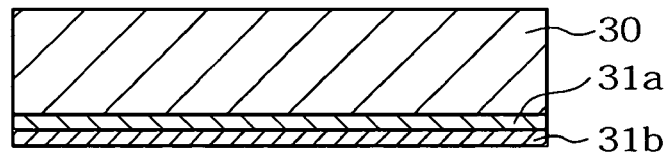
SEPARATION ---->
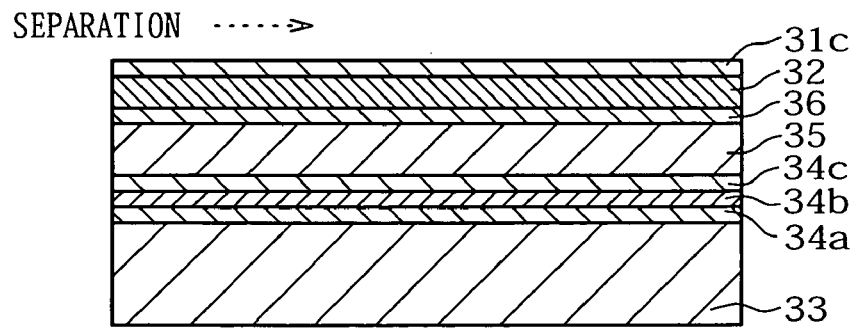

EMISSION

EMISSION

FIG. 47
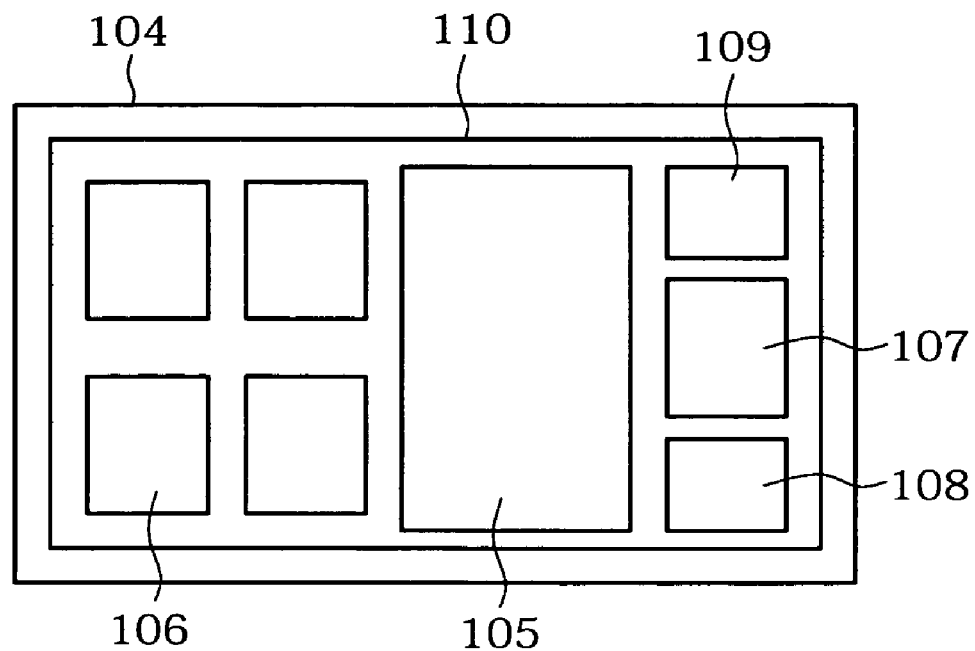
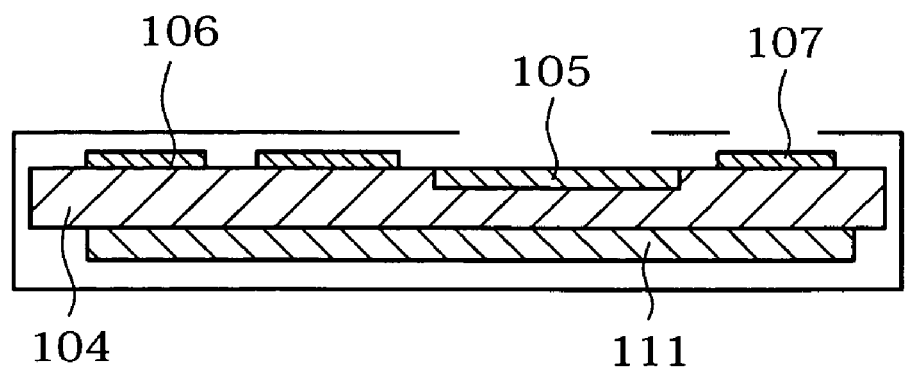

FIG. 48A

| KINDS OF ELECTROOPTIC DISPLAYS | METHOD OF LAMINATION WITH FACING SUBSTRATE | GROOVE | METHOD OF BONDING WITH A SUPPORT | CUT SECTION |
|---|---|---|---|---|
| REFLECTIVE LCD | FACE-TO-FACE ASSEMBLY | NONE | FACE-TO-FACE ASSEMBLY OF SUPPORT | FACING/SUPPORT |
| | ↑ | ↑ | SINGLE FACE ASSEMBLY OF SUPPORT CHIPS | FACING SUBSTRATE/TFT SUBSTRATE LAYER |
| | SINGLE FACE ASSEMBLY | ↑ | FACE-TO-FACE ASSEMBLY OF SUPPORT | SUPPORT |
| | ↑ | ↑ | SINGLE FACE ASSEMBLY OF SUPPORT CHIPS | TFT SUBSTRATE LAYER |
| | FACE-TO-FACE ASSEMBLY | YES | FACE-TO-FACE ASSEMBLY OF SUPPORT | FACING/SUPPORT |
| | ↑ | ↑ | SINGLE FACE ASSEMBLY OF SUPPORT CHIPS | FACING SUBSTRATE |
| | SINGLE FACE ASSEMBLY | ↑ | FACE-TO-FACE ASSEMBLY OF SUPPORT | SUPPORT |
| | ↑ | ↑ | SINGLE FACE ASSEMBLY OF SUPPORT CHIPS | – |
| UPPER FACE EMISSION TYPE ORGANIC EL | – | NONE | FACE-TO-FACE ASSEMBLY OF SUPPORT | ORGANIC EL/SUPPORT SUBSTRATE |
| | – | ↑ | SINGLE FACE ASSEMBLY OF SUPPORT CHIPS | ORGANIC EL SUBSTRATE LAYER |
| | – | YES | FACE-TO-FACE ASSEMBLY OF SUPPORT | ORGANIC EL/SUPPORT SUBSTRATE |
| | – | ↑ | SINGLE FACE ASSEMBLY OF SUPPORT CHIPS | ORGANIC EL SUBSTRATE LAYER |
| TRANSMISSIVE/ | FACE-TO-FACE ASSEMBLY | NONE | FACE-TO-FACE ASSEMBLY OF TRANSPARENT SUPPORT | FACING/TRANSPARENT SUPPORT |

FIG. 48B

| | | | | |
|---|---|---|---|---|
| SEMI-TRANSMISSIVE LCD | ↑ | | SINGLE FACE ASSEMBLY OF TRANSPARENT SUPPORT CHIPS | FACING SUBSTRATE/TFT SUBSTRATE LAYER |
| | SINGLE FACE ASSEMBLY | | FACE-TO-FACE ASSEMBLY OF TRANSPARENT SUPPORT CHIPS | TRANSPARENT SUPPORT |
| | ↑ | | SINGLE FACE ASSEMBLY OF TRANSPARENT SUPPORT CHIPS | TFT SUBSTRATE LAYER |
| | FACE-TO-FACE ASSEMBLY | YES | FACE-TO-FACE ASSEMBLY OF TRANSPARENT SUPPORT CHIPS | FACING/TRANSPARENT SUPPORT |
| | ↑ | | SINGLE FACE ASSEMBLY OF TRANSPARENT SUPPORT CHIPS | FACING SUBSTRATE |
| | SINGLE FACE ASSEMBLY | | FACE-TO-FACE ASSEMBLY OF TRANSPARENT SUPPORT CHIPS | TRANSPARENT SUPPORT |
| | ↑ | | SINGLE FACE ASSEMBLY OF TRANSPARENT SUPPORT CHIPS | — |
| LOWER FACE EMISSION TYPE ORGANIC EL | — | NONE | FACE-TO-FACE ASSEMBLY OF TRANSPARENT SUPPORT | ORGANIC EL/TRANSPARENT SUPPORT SUBSTRATE |
| | — | ↑ | SINGLE FACE ASSEMBLY OF TRANSPARENT SUPPORT CHIPS | ORGANIC EL SUBSTRATE LAYER |
| | — | YES | FACE-TO-FACE ASSEMBLY OF TRANSPARENT SUPPORT | ORGANIC EL/TRANSPARENT SUPPORT SUBSTRATE |
| | — | ↑ | SINGLE FACE ASSEMBLY OF TRANSPARENT SUPPORT CHIPS | ORGANIC EL SUBSTRATE LAYER |

FIG. 49A

| KINDS OF ELECTROOPTIC DISPLAYS | METHOD OF LAMINATION WITH A FACING SUBSTRATE | GROOVE | METHOD OF BONDING WITH A SUPPORT | CUT SECTION |
|---|---|---|---|---|
| REFLECTIVE LCD | FACE-TO-FACE ASSEMBLY | NONE | FACE-TO-FACE ASSEMBLY OF SUPPORT | FACING/SUPPORT |
| | ↑ | ↑ | SINGLE FACE ASSEMBLY OF SUPPORT CHIPS | FACING SUBSTRATE/TFT SUBSTRATE LAYER |
| | SINGLE FACE ASSEMBLY | ↑ | FACE-TO-FACE ASSEMBLY OF SUPPORT | SUPPORT |
| | ↑ | ↑ | SINGLE FACE ASSEMBLY OF SUPPORT CHIPS | TFT SUBSTRATE LAYER |
| | FACE-TO-FACE ASSEMBLY | YES | FACE-TO-FACE ASSEMBLY OF SUPPORT | FACING/SUPPORT |
| | ↑ | ↑ | SINGLE FACE ASSEMBLY OF SUPPORT CHIPS | FACING SUBSTRATE |
| | SINGLE FACE ASSEMBLY | ↑ | FACE-TO-FACE ASSEMBLY OF SUPPORT | SUPPORT |
| | ↑ | ↑ | SINGLE FACE ASSEMBLY OF SUPPORT CHIPS | — |
| UPPER FACE EMISSION TYPE ORGANIC EL | — | NONE | FACE-TO-FACE ASSEMBLY OF SUPPORT | ORGANIC EL/SUPPORT SUBSTRATE |
| | — | ↑ | SINGLE FACE ASSEMBLY OF SUPPORT CHIPS | ORGANIC EL SUBSTRATE LAYER |
| | — | YES | FACE-TO-FACE ASSEMBLY OF SUPPORT | ORGANIC EL/SUPPORT SUBSTRATE |
| | — | ↑ | SINGLE FACE ASSEMBLY OF SUPPORT CHIPS | ORGANIC EL SUBSTRATE LAYER |
| TRANSMISSIVE/ | FACE-TO-FACE ASSEMBLY | NONE | FACE-TO-FACE ASSEMBLY OF TRANSPARENT SUPPORT | FACING/TRANSPARENT SUPPORT |

FIG. 49B

| | | | | |
|---|---|---|---|---|
| SEMI-TRANSMISSIVE LCD | ↑ | ↑ | SINGLE FACE ASSEMBLY OF TRANSPARENT SUPPORT CHIPS | FACING SUBSTRATE |
| | SINGLE FACE ASSEMBLY | ↑ | FACE-TO-FACE ASSEMBLY OF TRANSPARENT SUPPORT | TRANSPARENT SUPPORT |
| | ↑ | ↑ | SINGLE FACE ASSEMBLY OF TRANSPARENT SUPPORT CHIPS | TFT SUBSTRATE LAYER |
| | FACE-TO-FACE ASSEMBLY | YES | FACE-TO-FACE ASSEMBLY OF TRANSPARENT SUPPORT | FACING/TRANSPARENT SUPPORT |
| | ↑ | ↑ | SINGLE FACE ASSEMBLY OF TRANSPARENT SUPPORT CHIPS | FACING SUBSTRATE |
| | SINGLE FACE ASSEMBLY | ↑ | FACE-TO-FACE ASSEMBLY OF TRANSPARENT SUPPORT | TRANSPARENT SUPPORT |
| | ↑ | ↑ | SINGLE FACE ASSEMBLY OF TRANSPARENT SUPPORT CHIPS | — |
| LOWER FACE EMISSION TYPE ORGANIC EL | — | NONE | FACE-TO-FACE ASSEMBLY OF TRANSPARENT SUPPORT | ORGANIC EL/TRANSPARENT SUPPORT SUBSTRATE |
| | — | ↑ | SINGLE FACE ASSEMBLY OF TRANSPARENT SUPPORT CHIPS | ORGANIC EL SUBSTRATE LAYER |
| | — | YES | FACE-TO-FACE ASSEMBLY OF TRANSPARENT SUPPORT | ORGANIC EL/TRANSPARENT SUPPORT SUBSTRATE |
| | — | ↑ | SINGLE FACE ASSEMBLY OF TRANSPARENT SUPPORT CHIPS | ORGANIC EL SUBSTRATE LAYER |

FIG. 50A

| KINDS OF ELECTROOPTIC DISPLAYS | METHOD OF LAMINATION WITH A FACING SUBSTRATE | GROOVE | METHOD OF BONDING WITH A SUPPORT | CUT SECTION |
|---|---|---|---|---|
| REFLECTIVE LCD | FACE-TO-FACE ASSEMBLY | NONE | FACE-TO-FACE ASSEMBLY OF SUPPORT | FACING/SUPPORT |
| | ← | ← | SINGLE FACE ASSEMBLY OF SUPPORT CHIPS | FACING SUBSTRATE/TFT SUBSTRATE LAYER |
| | SINGLE FACE ASSEMBLY | ← | FACE-TO-FACE ASSEMBLY OF SUPPORT | SUPPORT |
| | ← | YES | SINGLE FACE ASSEMBLY OF SUPPORT CHIPS | TFT SUBSTRATE LAYER |
| | FACE-TO-FACE ASSEMBLY | ← | FACE-TO-FACE ASSEMBLY OF SUPPORT | FACING/SUPPORT |
| | ← | ← | SINGLE FACE ASSEMBLY OF SUPPORT CHIPS | FACING SUBSTRATE |
| | SINGLE FACE ASSEMBLY | ← | FACE-TO-FACE ASSEMBLY OF SUPPORT | SUPPORT |
| | ← | ← | SINGLE FACE ASSEMBLY OF SUPPORT CHIPS | — |
| UPPER FACE EMISSION TYPE ORGANIC EL | — | NONE | FACE-TO-FACE ASSEMBLY OF SUPPORT | ORGANIC EL/SUPPORT SUBSTRATE |
| | — | ← | SINGLE FACE ASSEMBLY OF SUPPORT CHIPS | ORGANIC EL SUBSTRATE LAYER |
| | — | YES | FACE-TO-FACE ASSEMBLY OF SUPPORT | ORGANIC EL/SUPPORT SUBSTRATE |
| | — | ← | SINGLE FACE ASSEMBLY OF SUPPORT CHIPS | ORGANIC EL SUBSTRATE LAYER |
| TRANSMISSIVE/ | FACE-TO-FACE ASSEMBLY | NONE | FACE-TO-FACE ASSEMBLY OF TRANSPARENT SUPPORT | FACING/TRANSPARENT SUPPORT |

FIG. 50B

| | | | | | |
|---|---|---|---|---|---|
| SEMI-TRANSMISSIVE LCD | ← | SINGLE FACE ASSEMBLY | ← | SINGLE FACE ASSEMBLY OF TRANSPARENT SUPPORT CHIPS | FACING SUBSTRATE/TFT SUBSTRATE LAYER |
| | ← | ← | ← | FACE-TO-FACE ASSEMBLY OF TRANSPARENT SUPPORT CHIPS | TRANSPARENT SUPPORT |
| | ← | ← | ← | SINGLE FACE ASSEMBLY OF TRANSPARENT SUPPORT CHIPS | TFT SUBSTRATE LAYER |
| | ← | FACE-TO-FACE ASSEMBLY | YES | FACE-TO-FACE ASSEMBLY OF TRANSPARENT SUPPORT CHIPS | FACING/TRANSPARENT SUPPORT |
| | ← | ← | ← | SINGLE FACE ASSEMBLY OF TRANSPARENT SUPPORT CHIPS | FACING SUBSTRATE |
| | ← | SINGLE FACE ASSEMBLY | ← | FACE-TO-FACE ASSEMBLY OF TRANSPARENT SUPPORT CHIPS | TRANSPARENT SUPPORT |
| | ← | ← | ← | SINGLE FACE ASSEMBLY OF TRANSPARENT SUPPORT CHIPS | — |
| LOWER FACE EMISSION TYPE ORGANIC EL | | — | NONE | FACE-TO-FACE ASSEMBLY OF TRANSPARENT SUPPORT CHIPS | ORGANIC EL/TRANSPARENT SUPPORT SUBSTRATE |
| | | — | ← | SINGLE FACE ASSEMBLY OF TRANSPARENT SUPPORT CHIPS | ORGANIC EL SUBSTRATE LAYER |
| | | — | YES | FACE-TO-FACE ASSEMBLY OF TRANSPARENT SUPPORT CHIPS | ORGANIC EL/TRANSPARENT SUPPORT SUBSTRATE |
| | | — | ← | SINGLE FACE ASSEMBLY OF TRANSPARENT SUPPORT CHIPS | ORGANIC EL SUBSTRATE LAYER |

FIG. 51A

| KINDS OF ELECTROOPTIC DISPLAYS | METHOD OF LAMINATION WITH A FACING SUBSTRATE | GROOVE | METHOD OF BONDING WITH A SUPPORT | CUT SECTION |
|---|---|---|---|---|
| REFLECTIVE LCD | FACE-TO-FACE ASSEMBLY | NONE | FACE-TO-FACE ASSEMBLY OF SUPPORT | FACING/SUPPORT |
| | ↑ | ↑ | SINGLE FACE ASSEMBLY OF SUPPORT CHIPS | FACING SUBSTRATE/TFT SUBSTRATE LAYER |
| | SINGLE FACE ASSEMBLY | ↑ | FACE-TO-FACE ASSEMBLY OF SUPPORT | TFT SUBSTRATE LAYER SUPPORT |
| | ↑ | ↑ | SINGLE FACE ASSEMBLY OF SUPPORT CHIPS | |
| | FACE-TO-FACE ASSEMBLY | YES | FACE-TO-FACE ASSEMBLY OF SUPPORT | FACING/SUPPORT |
| | ↑ | ↑ | SINGLE FACE ASSEMBLY OF SUPPORT CHIPS | FACING SUBSTRATE SUPPORT |
| | SINGLE FACE ASSEMBLY | ↑ | FACE-TO-FACE ASSEMBLY OF SUPPORT | |
| | ↑ | ↑ | SINGLE FACE ASSEMBLY OF SUPPORT CHIPS | — |
| UPPER FACE EMISSION TYPE ORGANIC EL | — | NONE | FACE-TO-FACE ASSEMBLY OF SUPPORT | ORGANIC EL/SUPPORT SUBSTRATE |
| | — | ↑ | SINGLE FACE ASSEMBLY OF SUPPORT CHIPS | ORGANIC EL SUBSTRATE LAYER |
| | — | YES | FACE-TO-FACE ASSEMBLY OF SUPPORT | ORGANIC EL/SUPPORT SUBSTRATE |
| | — | ↑ | SINGLE FACE ASSEMBLY OF SUPPORT CHIPS | ORGANIC EL SUBSTRATE LAYER |
| TRANSMISSIVE/ | FACE-TO-FACE ASSEMBLY | NONE | FACE-TO-FACE ASSEMBLY OF TRANSPARENT SUPPORT | FACING/TRANSPARENT SUPPORT |

FIG. 51B

| | | | | |
|---|---|---|---|---|
| SEMI-TRANSMISSIVE LCD | ↑ | ↑ | SINGLE FACE ASSEMBLY OF TRANSPARENT SUPPORT CHIPS | FACING SUBSTRATE/TFT SUBSTRATE LAYER |
| | SINGLE FACE ASSEMBLY | ↑ | FACE-TO-FACE ASSEMBLY OF TRANSPARENT SUPPORT CHIPS | TRANSPARENT SUPPORT |
| | ↑ | ↑ | SINGLE FACE ASSEMBLY OF TRANSPARENT SUPPORT CHIPS | TFT SUBSTRATE LAYER |
| | FACE-TO-FACE ASSEMBLY | YES | FACE-TO-FACE ASSEMBLY OF TRANSPARENT SUPPORT CHIPS | FACING/TRANSPARENT SUPPORT |
| | ↑ | ↑ | SINGLE FACE ASSEMBLY OF TRANSPARENT SUPPORT CHIPS | FACING SUBSTRATE |
| | SINGLE FACE ASSEMBLY | ↑ | FACE-TO-FACE ASSEMBLY OF TRANSPARENT SUPPORT CHIPS | TRANSPARENT SUPPORT |
| | ↑ | ↑ | SINGLE FACE ASSEMBLY OF TRANSPARENT SUPPORT CHIPS | — |
| LOWER FACE EMISSION TYPE ORGANIC EL | — | NONE | FACE-TO-FACE ASSEMBLY OF TRANSPARENT SUPPORT CHIPS | ORGANIC EL/TRANSPARENT SUPPORT SUBSTRATE |
| | — | ↑ | SINGLE FACE ASSEMBLY OF TRANSPARENT SUPPORT CHIPS | ORGANIC EL SUBSTRATE LAYER |
| | — | YES | FACE-TO-FACE ASSEMBLY OF TRANSPARENT SUPPORT CHIPS | ORGANIC EL/TRANSPARENT SUPPORT SUBSTRATE |

FIG. 52A

| KINDS OF ELECTROOPTIC DISPLAYS | METHOD OF LAMINATION WITH A FACING SUBSTRATE | GROOVE | METHOD OF BONDING WITH A SUPPORT | CUT SECTION |
|---|---|---|---|---|
| REFLECTIVE LCD | FACE-TO-FACE ASSEMBLY | NONE | FACE-TO-FACE ASSEMBLY OF SUPPORT | FACING/SUPPORT |
| | ↑ | ↑ | SINGLE FACE ASSEMBLY OF SUPPORT CHIPS | FACING SUBSTRATE/TFT SUBSTRATE LAYER |
| | SINGLE FACE ASSEMBLY | ↑ | FACE-TO-FACE ASSEMBLY OF SUPPORT | SUPPORT |
| | ↑ | ↑ | SINGLE FACE ASSEMBLY OF SUPPORT CHIPS | TFT SUBSTRATE LAYER |
| | FACE-TO-FACE ASSEMBLY | YES | FACE-TO-FACE ASSEMBLY OF SUPPORT | FACING/SUPPORT |
| | ↑ | ↑ | SINGLE FACE ASSEMBLY OF SUPPORT CHIPS | FACING SUBSTRATE/TFT SUBSTRATE LAYER |
| | SINGLE FACE ASSEMBLY | ↑ | FACE-TO-FACE ASSEMBLY OF SUPPORT | SUPPORT |
| | ↑ | ↑ | SINGLE FACE ASSEMBLY OF SUPPORT CHIPS | – |
| UPPER FACE EMISSION TYPE ORGANIC EL | — | NONE | FACE-TO-FACE ASSEMBLY OF SUPPORT | ORGANIC EL/SUPPORT SUBSTRATE |
| | — | ↑ | SINGLE FACE ASSEMBLY OF SUPPORT CHIPS | ORGANIC EL SUBSTRATE LAYER |
| | — | YES | FACE-TO-FACE ASSEMBLY OF SUPPORT | ORGANIC EL/SUPPORT SUBSTRATE |
| | — | ↑ | SINGLE FACE ASSEMBLY OF SUPPORT CHIPS | ORGANIC EL SUBSTRATE LAYER |
| TRANSMISSIVE/ | FACE-TO-FACE ASSEMBLY | NONE | FACE-TO-FACE ASSEMBLY OF TRANSPARENT SUPPORT | FACING/TRANSPARENT SUPPORT |

FIG. 52B

| | | | | |
|---|---|---|---|---|
| SEMI-TRANSMISSIVE LCD | — | ← | SINGLE FACE ASSEMBLY OF TRANSPARENT SUPPORT CHIPS | FACING SUBSTRATE/TFT SUBSTRATE LAYER |
| | SINGLE FACE ASSEMBLY | ← | FACE-TO-FACE ASSEMBLY OF TRANSPARENT SUPPORT CHIPS | TRANSPARENT SUPPORT |
| | ← | ← | SINGLE FACE ASSEMBLY OF TRANSPARENT SUPPORT CHIPS | TFT SUBSTRATE LAYER |
| | FACE-TO-FACE ASSEMBLY | YES | FACE-TO-FACE ASSEMBLY OF TRANSPARENT SUPPORT CHIPS | FACING/TRANSPARENT SUPPORT |
| | ← | ← | SINGLE FACE ASSEMBLY OF TRANSPARENT SUPPORT CHIPS | FACING SUBSTRATE/TFT SUBSTRATE LAYER |
| | SINGLE FACE ASSEMBLY | ← | FACE-TO-FACE ASSEMBLY OF TRANSPARENT SUPPORT CHIPS | TRANSPARENT SUPPORT |
| | ← | NONE | SINGLE FACE ASSEMBLY OF TRANSPARENT SUPPORT CHIPS | — |
| LOWER FACE EMISSION TYPE ORGANIC EL | — | ← | FACE-TO-FACE ASSEMBLY OF TRANSPARENT SUPPORT CHIPS | ORGANIC EL/TRANSPARENT SUPPORT SUBSTRATE |
| | — | ← | SINGLE FACE ASSEMBLY OF TRANSPARENT SUPPORT CHIPS | ORGANIC EL SUBSTRATE LAYER |
| | — | YES | FACE-TO-FACE ASSEMBLY OF TRANSPARENT SUPPORT CHIPS | ORGANIC EL/TRANSPARENT SUPPORT SUBSTRATE |
| | — | ← | SINGLE FACE ASSEMBLY OF TRANSPARENT SUPPORT CHIPS | ORGANIC EL SUBSTRATE LAYER |

MANUFACTURING PROCESS FOR ULTRA SLIM ELECTROOPTIC DISPLAY DEVICE UNIT

The present application claims priority to Japanese Patent Application JP2003-083056, filed in the Japanese Patent Office on Mar. 25, 2003; and Japanese Patent Application JP2004-024897, filed in the Japanese Patent Office on Jan. 30, 2004, the entire contents of which are incorporated herein by reference.

BACKGROUND OF THE INVENTION

1. Field of the Invention

This invention relates to the manufacturing process for ultra slim electrooptic display device units such as high intensity, high definition and sophisticated transmissive liquid crystal display device units (LCD; Liquid Crystal Display), semi-transmissive liquid crystal display device units, highly reflective liquid crystal display device units, top surface luminous organic EL (Electro Luminescence) display device units and under surface luminous organic EL display device units.

2. Description of Related Art

In the case of a transmissive, high temperature polycrystalline silicon (which we will call "Poly-Si" from here on) TFT (thin Film Transistor) LCD, a micro crystal Si thin film is formed by decreased pressure CVD (Chemical Vapor Deposition), etc. on quartz glass. After converting to amorphic Si, a large particle diameter poly Si thin film is formed by ion implantation using the solid phase deposition method, for example at a temperature of 620° C. for 12 hours and the LCD peripheral circuitry and the display element, etc. will be formed on the film.

In the case of transmitted or reflective low temperature Poly-SiTFT LCD or organic EL (Electro Luminescence) displays (which we will call "Organic EL" from here on), an amorphous Si thin film is formed on a low strain point glass such as borosilicate glass or aluminosilicate glass by plasma CVD, etc. Then a large particle diameter Poly-Si thin film will be formed via crystallization by excimer laser anneal (ELA) and the LCD peripheral circuitry and display element, or the organic EL peripheral circuitry and the display elements, etc. are formed on the film.

However, in the case of the high temperature Poly-SiTFT LCD, the low temperature Poly-SiTFT LCD or the organic EL, the LCD or organic EL peripheral circuitry is formed on the Poly-Si thin film where the high electron and positive hole mobility is not high in comparison with monocrystalline Si. Because of this, the device quality and especially high speed operational characteristics become a problem.

In recent years, a LCOS (Liquid Crystal On Silicon) also called reflective LCD has been adopted for projectors, etc. This is a result of utilizing the high electron and positive hole mobility of monocrystalline Si. The LCOS which utilizes general purpose MOSLSI technology, works with not only the peripheral circuitry and the display element on a monocrystalline Si substrate surface but also with functions such as video signal process circuitry and memory circuitry, etc. It has characteristics such as high intensity, high definition and advanced functionality.

However, with LCOS, it is easy to have problems with picture quality and with reliability resulting from TFT leak electric current due to strong incident light. As a result, there is an increase in manufacturing man-hours, and a yield and production decrease due to the light leakage issue. Although we can think of adopting a SOI (Silicon on Insulator) substrate (for instance, please see the patent document 1~6) a monocrystalline Si substrate does not achieve optical transparency in this case. It is limited to a reflective LCD and an upper surface luminous organic EL.

This inventor has proposed a method of producing a transmissive LCD using a monocrystalline Si substrate in patent document 7. In this case, the transmissive LCD is formed by embedding the image display elements which have internal peripheral circuitry and a reflective film on a monocrystalline Si substrate surface in a transparent resin. By grinding and polishing the other side, a monocrystalline Si thin film matrix array is formed, to which a color filter substrate is attached with transparent resin.

(Patent Document 1) U.S. Pat. No. 2,608,351 Official Bulletin (Patent Document 2) Open Patent Tokukaihei #11-195562 Official Bulletin (Patent Document 3) U.S. Pat. No. 3,048,201 Official Bulletin (Patent Document 4) Open Patent Tokukai #2000-196047 Official Bulletin (Patent Document 5) Open Patent Tokukai #2001-77044 Official Bulletin (Patent Document 6) Open Patent Tokukaihei #5-211128 Official Bulletin (Patent Document 7) U.S. Pat. No. 3,218,861 Official Bulletin (Open Disclosure for the Patent)

However, in case where a transmissive LCD which is composed of the peripheral circuitry and the image element display on the surface of a monocrystalline Si substrate such as described in the patent document 7 is used in a unit such as a projector that reflects strong light, the monocrystalline Si substrate has high electron and positive hole mobility and very high sensitivity which causes a problem with TFT current leakage when exposed to strong incident light.

Even with a high intensity reflective LCD such as recent LCOS types, a problem with TFT current leakage of the display caused by strong incident radiation can be a problem. In the future, it is still possible to have a problem with TFT current leakage as a result of internally generated light as the intensity strengthens even with an under surface luminous organic EL.

SUMMARY OF THE INVENTION

The purpose of this invention is to create a high intensity, high definition and sophisticated electrooptic display device unit such as a transmissive LCD, a reflective LCD, a semi-transmissive LCD, an upper surface luminous organic EL or an upper surface luminous organic EL that has a low current leakage attribute and high electron and positive hole mobility.

The manufacturing process for the first ultra slim electrooptic display device unit in this invention includes the following: a process to form a porous semiconductor layer on a supporting substrate which consists of a monocrystalline semiconductor, a process to form a monocrystalline semiconductor layer via a porous semiconductor layer on a supporting substrate, processes to form a polycrystalline semiconductor layer in the display area by semiconductor epitaxial growth and a monocrystalline semiconductor layer in the peripheral circuitry area by forming an insulating layer on the surface of the monocrystalline semiconductor layer and removing an insulating layer in the peripheral circuitry and leaving an insulating layer in a display area, processes to form the display elements in a polycrystalline semiconductor layer in the display area and the peripheral circuitry in a monocrystalline semiconductor layer in the peripheral circuitry area, a process to separate the supporting substrate from the porous semiconductor layer, a process to attach a backing to an ultra slim electrooptic display element substrate after the separation and a process to divide each ultra slim electrooptic display device unit after attaching the backings.

In this manufacturing method, a porous semiconductor layer and a monocrystalline semiconductor layer are formed on a supporting substrate which consists of a monocrystalline semiconductor. An insulating layer is formed on this monocrystalline semiconductor layer. An insulating layer in the peripheral circuitry area is removed while an insulating layer is left in a display area. This forms a polycrystalline semiconductor layer in the display area and a monocrystalline semiconductor layer in the peripheral circuitry. Using semiconductor epitaxial growth, display elements are formed on a polycrystalline semiconductor layer in the display area and peripheral circuitry is formed on a monocrystalline semiconductor layer in the peripheral circuitry area. As a result, a polycrystalline semiconductor TFT display element that has comparatively low high electron and positive hole mobility and low current leakage attributes, and monocrystalline semiconductor TFT peripheral circuitry that has high electron and positive hole mobility and high drivability can be formed on the same supporting substrate. And by dividing the assembly into each individual ultra slim electrooptic display device units after separating the supporting substrate from the porous semiconductor layer by attaching the backing, you can obtain a high intensity, high definition and sophisticated ultra slim electrooptic display device unit that has high electron and positive hole mobility and low current leakage attributes.

The manufacturing process for the second ultra slim electrooptic display device unit in this invention includes as follows: a process to form a porous semiconductor layer on both a seed substrate and a support substrate where each is comprised of monocrystalline semiconductor, a process to form a monocrystalline semiconductor layer through a porous semiconductor layer on both a seed substrate and a support substrate, a process to form an insulating layer through a monocrystalline semiconductor layer on either the seed substrate or a supporting substrate, a process to attach a seed substrate to a supporting substrate to form a surface insulating layer, a process to separate a seed substrate from a porous semiconductor layer of a seed substrate, a planarization process on a monocrystalline semiconductor layer surface that was exposed by separation of a seed substrate by etching it with a minimum hydrogen anneal treatment, a process to form both a monocrystalline semiconductor layer in the peripheral circuitry area and polycrystalline semiconductor layer in the display area by semiconductor epitaxial growth via forming an insulating layer on a monocrystalline semiconductor layer surface and removing the insulating layer in the peripheral circuitry area which is done by etching while leaving the insulating layer in the display area, a process to form both display elements on a polycrystalline semiconductor layer in the display area and peripheral circuitry on a monocrystalline semiconductor layer in the peripheral circuitry area, a process to separate a support substrate from a porous semiconductor layer of the same supporting substrate, a process to attach a backing to an ultra slim electrooptic display element substrate after they have been separated and a process to divide assembly into each ultra slim electrooptic display device unit after attaching the backings.

In this manufacturing process, an ultra slim SOI layer is formed on a porous layer of a support substrate by forming a porous semiconductor layer and a monocrystalline semiconductor layer on both a seed substrate and on a supporting substrate and by attaching both substrates together via an insulating layer and the by separating a seed substrate from the porous semiconductor layer of the seed substrate. After this process, this monocrystalline semiconductor layer of the support substrate needs to be etched, exfoliating the remainder of the porous semiconductor layer with hydrofluoric acid etchant if necessary, and an insulating layer is formed by hydrogen anneal treatment after planarization with etching. The insulating layer of the peripheral circuitry needs to be removed, while leaving the insulating layer in the display area. A polycrystalline semiconductor layer is formed in the display area and a monocrystalline semiconductor layer is formed in the peripheral circuitry by semiconductor epitaxial growth, and the display element are formed on a polycrystalline semiconductor layer in the display area and the peripheral circuitry is formed on a monocrystalline semiconductor layer in the peripheral circuitry area. As a result, a polycrystalline semiconductor TFT display element with low current leakage attributes with comparatively low high electron and positive hole mobility and a polycrystalline semiconductor TFT display element with high drivability that has high electron and positive hole mobility can be formed on an ultra slim SOI layer on a porous layer of the same supporting substrate. By removing the support substrate from the porous semiconductor layer and attaching a backing, then separating each of the ultra slim electrooptic display device units, you can gain a high intensity, high definition and sophisticated ultra slim electrooptic display device unit that has high electron and positive hole mobility and low current leakage attributes.

The manufacturing process for the third ultra slim electrooptic display device unit in this invention includes as follows: processes to form both a polycrystalline semiconductor layer in the display area and a monocrystalline semiconductor layer in the peripheral area with semiconductor epitaxial growth by forming an insulating layer on the support substrate surface comprised of monocrystalline semiconductor while removing an insulating layer in the peripheral circuitry area and leaving an insulating layer in a display area, a process to form both display elements on a polycrystalline semiconductor layer in the display area and peripheral circuitry on a monocrystalline semiconductor layer in the peripheral circuitry area, a process to form an ion implantation layer to the specified depth in a supporting substrate, a process to do an anneal treatment for exfoliation, a process to separate a support substrate at the deformative area of the ion implantation layer, a process to attach a backing to an ultra slim electrooptic display element substrate after its separation and a process to divide each ultra slim electrooptic display device unit after attaching the backings.

In the manufacturing process an insulating layer is formed on the surface of a support substrate. The insulating layer is then removed in the peripheral circuitry area while the insulating layer remains in the display area. Then, a polycrystalline semiconductor layer is formed in the display area and a monocrystalline semiconductor layer is formed in the peripheral circuitry via semiconductor epitaxial growth. Because they both are formed, a polycrystalline semiconductor TFT display element which has comparatively low high electron and positive hole mobility and low electric current leakage qualities and a monocrystalline semiconductor TFT peripheral circuitry which offers high electron and positive hole mobility and high drivability can be formed on the same support substrate. By separating the support substrate at the deformative part of ion implantation layer and attaching a backing, and then dividing the assembly into each ultra slim electrooptic display device units, you can gain a high intensity, high definition and sophisticated ultra slim electrooptic display device unit that has high electron and positive hole mobility and low current leakage attributes.

The manufacturing process for the fourth ultra slim electrooptic display device unit includes as follows; a process to form an ion implantation layer on a seed substrate which is comprised of monocrystalline semiconductor, a process to form an insulating layer on the support substrate which consists of monocrystalline semiconductor, a process to form a monocrystalline semiconductor layer by covalent bonding to the insulating layer of the support substrate and an ion implantation layer by heat treatment after attaching the ion implantation layer of the support substrate and an insulating layer of the support substrate, a process to separate a seed substrate at the deformative area of the ion implantation after an annealing treatment for exfoliation, a process for planarizing a monocrystalline semiconductor layer surface by etching and with a minimum a hydrogen anneal treatment, a process to form both a polycrystalline semiconductor layer in the display area and a monocrystalline semiconductor layer in the peripheral circuitry area by semiconductor epitaxial growth by forming an insulating layer on a monocrystalline semiconductor layer surface where the insulating layer is removed by etching in the peripheral circuitry area while leaving the insulating layer in the display area, a process to form both display elements on a polycrystalline semiconductor layer in the display area and the peripheral circuitry on a monocrystalline semiconductor layer in the peripheral circuitry area, a process to form an ion implantation layer to a certain depth in a support substrate, a process to do anneal treatment for exfoliation, a process to separate a support substrate at the deformative area of an ion implantation layer, a process to attach a backing to an ultra slim electrooptic display element substrate after it's separation, and a process to divide the assembly into each ultra slim electrooptic display device unit after attaching the backing.

With this manufacturing method, a monocrystalline semiconductor layer is formed by covalent bonding with an ion implantation layer of a seed substrate and an insulating layer of a support substrate with heat treatment after attaching the support substrate consisting of an insulating layer onto a seed substrate which consists of an ion implantation layer. Then, an ultra slim SOI layer is formed on a support substrate by separating the seed substrate at an ion implantation layer after anneal treatment for exfoliation and etching the surface of a monocrystalline semiconductor layer with a hydrofluoric acid etchant as required, and then, etching and planarizing the surface of a monocrystalline semiconductor layer with a hydrogen anneal treatment. An insulating layer is formed on a monocrystalline semiconductor layer of this support substrate, and the insulating layer of the peripheral circuitry area is removed while an insulating layer is left in the display area. A polycrystalline semiconductor layer is formed in the display area by semiconductor epitaxial growth and a monocrystalline semiconductor layer is formed in a peripheral circuitry area. This forms display elements in a polycrystalline semiconductor TFT layer in the display area and the peripheral circuitry in a monocrystalline semiconductor layer in the peripheral circuitry area. Because of this formation, it is possible to form a polycrystalline semiconductor TFT display element which has comparatively low high electron and positive hole mobility and low electric current leakage qualities and a monocrystalline semiconductor TFT peripheral circuitry which has high electron and positive hole mobility and high drivability on the same support substrate. With this, we can obtain a high intensity, high definition and sophisticated ultra slim electron-optic display device unit which has high electron and positive hole mobility and low electric current leakage qualities by separating the support substrate at the deformative area of an ion implantation layer and attaching a backing, and then dividing the assembly into each ultra slim electrooptic display device unit.

The manufacturing process for the fifth ultra slim electrooptic display device unit includes the following; a process where an ion implementation layer is applied to a seed substrate comprised of a monocrystalline semiconductor, a process to form a porous semiconductor layer on a support substrate which consists of monocrystalline semiconductor, a process to form a monocrystalline semiconductor layer on a support substrate via a porous semiconductor layer, a process to form an insulating layer on a monocrystalline semiconductor layer, a process to form a monocrystalline semiconductor layer by covalent bonding with heat treatment to an ion implementation layer of a seed substrate and an insulating layer on a support substrate by attaching an ion implementation layer of a seed substrate and an insulating layer of a support substrate, a process to separate a seed substrate from a deformative area of an ion implementation layer via anneal treatment for exfoliation, a process to planarize and etch the surface of a monocrystalline semiconductor layer with a minimum hydrogen anneal treatment, a process to form both a monocrystalline semiconductor layer for the peripheral circuitry and a polycrystalline semiconductor layer for the display area via semiconductor epitaxial growth by forming an insulating layer on the surface of a monocrystalline semiconductor layer and by removing by etching an insulating layer form the peripheral circuitry while leaving an insulating layer in the display area, a process to form both display elements in a polycrystalline semiconductor layer in the display area and peripheral circuitry in a monocrystalline semiconductor layer in the peripheral circuitry area, a process to separate a support substrate from a porous semiconductor layer, a process to attach backings to an ultra slim electrooptic display element substrate after its separation, a process to divide the assembly into each ultra slim electrooptic display device unit after attaching backings.

With this manufacturing method, a monocrystalline semiconductor layer is formed by covalent bonding with heat treatment of an ion implantation layer on the seed substrate and an insulating layer of the support substrate and then by attaching the support substrate which forms a porous semiconductor layer, a monocrystalline semiconductor layer and an insulating layer as an ion implantation layer forms on the seed substrate. The ultra slim SOI layer is formed on the support substrate by separating the seed substrate at an ion implantation layer after the anneal processing for exfoliation and by etching the surface of the monocrystalline semiconductor layer with hydrofluoric acid etchant if needed and by etching and planarizing the surface of the monocrystalline semiconductor layer by a hydrogen anneal processing. After that, an insulating layer is formed in the monocrystalline semiconductor layer of this support substrate and the insulating layer of the peripheral circuit area is removed while leaving the insulating layer in the display area. A polycrystalline semiconductor layer is formed in the display area and a monocrystalline semiconductor layer is formed in the peripheral circuit area by semiconductor epitaxial growth. Because the display elements are formed in the polycrystalline of the display area and the peripheral circuit components are formed in the monocrystalline semiconductor layer of the peripheral circuit area, it is possible to form the polycrystalline semiconductor TFT display elements which have relatively low high electron and positive hole mobility and low electric current leakage qualities, and a monocrystalline semiconductor TFT peripheral circuit with high electronic hole mobility and high drivability on the same support substrate. By separating the support substrate from the porous semiconductor layer and attaching the backing, you can obtain a high intensity, high definition and sophisticated ultra slim electrooptic display device unit which has high electron and positive hole mobility and low electric current leakage qualities by dividing the assembly into each ultra slim electrooptic display device units.

The manufacturing processes for the sixth ultra slim electrooptic display device unit of this invention are as follows; a process to form a porous semiconductor layer in the support substrate which is comprised of monocrystalline semiconductor, a process to form a monocrystalline semiconductor layer on the support substrate via a porous semiconductor layer, a process to form an insulating layer on the surface of the monocrystalline semiconductor layer and furthermore, to form an amorphous semiconductor layer, an amorphous and a polycrystalline mixture semiconductor layer or a polycrystalline semiconductor layer, a process to remove the amorphous semiconductor layer, the amorphous and polycrystalline mixture semiconductor layer or the polycrystalline semiconductor layer of the peripheral circuit area while leaving the insulating layer, the amorphous semiconductor layer, the amorphous and polycrystalline mixture semiconductor layer, or the polycrystalline semiconductor layer in the display area, a process to form the display elements in the amorphous semiconductor layer, the amorphous and polycrystalline mixture semiconductor layer, and the polycrystalline semiconductor layer of the display area, and the peripherals in the monocrystalline semiconductor layer of the peripheral circuit area, a process to separate the support substrate from the porous semiconductor layer, a process to attach the backing to the ultra slim electrooptic display element substrate after its separation, a process to divide the assembly into each ultra slim electrooptic display element unit after attaching the backing.

With this manufacturing method, a porous semiconductor layer and monocrystalline semiconductor layer are formed in the support substrate which consists of monocrystalline semiconductor. An insulating layer and an amorphous semiconductor layer, or the amorphous and polycrystalline mixture semiconductor layer, and the polycrystalline semiconductor layer are formed on the monocrystalline semiconductor layer. The insulating layer and amorphous semiconductor layer, or the amorphous and polycrystalline mixture semiconductor or the polycrystalline semiconductor is left in the display area. At least the amorphous semiconductor layer or the amorphous and polycrystalline mixture semiconductor layer or the polycrystalline semiconductor layer is removed in the peripheral circuit area. The display elements are formed in the amorphous semiconductor layer of the display area or the amorphous and polycrystalline mixture semiconductor layer or the polycrystalline semiconductor layer. The peripheral circuit is formed in monocrystalline semiconductor layer of the peripheral circuit area. It is possible to form amorphous semiconductor TFT or amorphous and polycrystalline mixture semiconductor TFT or polycrystalline semiconductor TFT display elements which have relatively low high electron and positive hole mobility and low electric current leakage qualities and also a monocrystalline semiconductor TFT peripheral circuit which will have high electron and positive hole mobility and high drivability on the same support substrate. By separating the support substrate from the porous semiconductor layer, attaching the backing, and dividing the assembly into each into separate ultra slim electrooptic display device units, you can obtain high intensity, high definition and sophisticated ultra slim electrooptic display device units that have high electron and positive hole mobility and low electric current leakage qualities.

The manufacturing process for the seventh ultra slim electrooptic display device unit of this invention includes the following; a process to form a porous semiconductor layer on the seed substrate and the support substrate which consists of monocrystalline semiconductor, a process to form a monocrystalline semiconductor layer via a porous semiconductor layer on the seed substrate or support substrate, a process to form an insulating layer via a monocrystalline semiconductor layer on both the seed substrate and the support substrate, a process to attach the seed substrate and the support substrate and an insulating layer at the surface, a process to separate the seed substrate from the porous semiconductor layer of the seed substrate, a process to etch and planarize with a minimum hydrogen anneal processing the surface of the monocrystalline semiconductor layer which was exposed due to the separation of the seed substrate, a process to form an amorphous semiconductor layer or an amorphous and polycrystalline mixture semiconductor layer or a polycrystalline semiconductor after forming an insulating layer on the surface of monocrystalline semiconductor layer, a process to remove the insulating layer and the amorphous semiconductor layer or the amorphous and polycrystalline mixture semiconductor layer or the polycrystalline semiconductor layer in the display area and leave the amorphous semiconductor layer or the amorphous and polycrystalline mixture semiconductor layer or the polycrystalline semiconductor layer in the peripheral circuit area, a process to form the display elements on the amorphous semiconductor layer or the amorphous and polycrystalline mixture semiconductor layer or the polycrystalline semiconductor layer of the display area, and the peripheral circuitry on the monocrystalline semiconductor layer of the peripheral circuit area, a process to separate the support substrate from the porous semiconductor layer of the same support substrate, a process to attach the backing to the ultra slim electrooptic display element substrate after its separation, a process to divide the assembly into each ultra slim electrooptic display device unit after attaching the backing.

This manufacturing method forms an ultra slim SOI layer on the porous layer of the support substrate by forming a porous semiconductor layer and a monocrystalline semiconductor layer on both the seed substrate and support substrate, attaching both these substrates via an insulating layer, and then by separating the seed substrate from the porous semiconductor layer of the seed substrate. After that, an amorphous semiconductor layer or amorphous and polycrystalline mixture semiconductor layer or polycrystalline semiconductor layer is formed after etching the monocrystalline semiconductor layer of this support substrate with hydrofluoric acid etchant as required and the remainder of the porous semiconductor layer is treated for exfoliation after etching and planarizing with a hydrogen anneal processing and an insulating layer is formed on the surface of the monocrystalline semiconductor layer.

At least the amorphous semiconductor layer or the amorphous and polycrystalline mixture semiconductor layer or the polycrystalline semiconductor layer are removed in the peripheral circuit area leaving the insulating layer and the amorphous semiconductor layer or the amorphous and polycrystalline mixture semiconductor layer or the polycrystalline semiconductor layer in the display area. You can make an amorphous semiconductor TFT or an amorphous and polycrystalline mixture semiconductor TFT or a polycrystalline semiconductor TFT display element which will have relatively low high electron and positive hole mobility and low electric current leakage quality, and a monocrystalline semiconductor TFT peripheral circuit which has high electron and positive hole mobility and high drivability on the ultra slim SOI layer of the porous layer in the same support substrate because it forms the display elements on the amorphous semiconductor layer or the amorphous and polycrystalline mixture semiconductor layer or the polycrystalline semiconductor layer in the display area, and the peripheral circuitry on the monocrystalline semiconductor layer of the peripheral circuit area. You can obtain a high intensity, high definition and sophisticated ultra slim electrooptic display device unit which has high electron and positive hole mobility and low electric current leakage qualities by separating the support substrate from the porous semiconductor layer, attaching the backing and dividing the assembly into each ultra slim electrooptic display device unit.

The manufacturing method for the eighth ultra slim electrooptic display device unit for this invention includes as follows; a process to form an insulating layer on the surface of the support substrate which consists of monocrystalline semiconductor, furthermore it forms an amorphous semiconductor layer or an amorphous and polycrystalline mixture semiconductor layer or a polycrystalline semiconductor layer, a process to remove at a minimum, the amorphous semiconductor layer or the amorphous and polycrystalline mixture semiconductor layer or polycrystalline semiconductor layer of the peripheral circuit area while leaving the insulating layer and the amorphous semiconductor layer or the amorphous and polycrystalline mixture semiconductor layer or the polycrystalline semiconductor layer of the display area, a process to form the display elements on the amorphous semiconductor layer or an amorphous and polycrystalline mixture semiconductor layer or polycrystalline semiconductor of the display area, and form the peripheral circuitry on the monocrystalline semiconductor layer of the peripheral circuit area, a process to form the ion implantation layer to a specified depth on the support substrate, a process to do the anneal processing for exfoliation, a process to separate the support substrate from a deformative area of the ion implantation layer, a process to attach the backing to the ultra slim electrooptic display element substrate after its separation, a process to divide the assembly into each ultra slim electrooptic display device unit after attaching the backing.

With this manufacturing method, an insulating layer and an amorphous semiconductor layer or an amorphous and polycrystalline mixture semiconductor layer or a polycrystalline semiconductor layer is formed on the surface of the support substrate. Then at a least the amorphous semiconductor layer or the amorphous and polycrystalline mixture semiconductor layer or the polycrystalline semiconductor layer is removed in the peripheral circuit area leaving the insulating layer or the amorphous semiconductor layer or the amorphous and polycrystalline mixture semiconductor layer or the polycrystalline semiconductor layer in the display area. It also forms both an amorphous semiconductor layer or an amorphous and polycrystalline mixture semiconductor layer or a polycrystalline semiconductor layer in the display area, and a monocrystalline semiconductor layer in the peripheral circuit area. It is possible to form an amorphous semiconductor TFT or an amorphous and polycrystalline mixture semiconductor TFT or a polycrystalline semiconductor TFT display element which has relatively low high electron and positive hole mobility and low electric current leakage quality, and a monocrystalline semiconductor TFT peripheral circuit which has high electron and positive hole mobility and high drivability on the same support substrate because the display elements are formed in the amorphous semiconductor layer or the amorphous and polycrystalline mixture semiconductor layer or the polycrystalline semiconductor layer of the display area and the peripheral circuitry in the monocrystalline semiconductor layer of the peripheral circuit area. You can obtain a high intensity, high definition and sophisticated ultra slim electrooptic display device unit by attaching the backing after separating the support substrate from the deformative area of the ion implantation layer and dividing the assembly into each ultra slim electrooptic display device unit.

The manufacturing method for the ninth ultra slim electrooptic display device unit for this invention includes as follows; a process to form the ion implantation layer on the seed substrate which consists of monocrystalline semiconductor, a process to form the insulating layer of support substrate which consists of monocrystalline semiconductor, a process to form a monocrystalline semiconductor layer by covalent bonding to the ion implantation layer and an insulating layer on the support substrate with heat treatment after attaching to the ion implantation layer of the seed substrate and an insulating layer of the support substrate, a process to separate the seed substrate from a deformative area of ion implantation layer of the same seed substrate after the anneal processing for exfoliation, a process to etch and planarize the surface of monocrystalline semiconductor layer with a minimum hydrogen anneal processing, a process to form an amorphous semiconductor layer or an amorphous and polycrystalline mixture semiconductor layer or a polycrystalline semiconductor layer after forming an insulating layer on the surface of the support substrate which consists of monocrystalline semiconductor, a process to remove at least the amorphous semiconductor layer or the amorphous and polycrystalline mixture semiconductor layer or the polycrystalline semiconductor layer of the peripheral circuit area while leaving the insulating layer and the amorphous semiconductor layer or the amorphous and polycrystalline mixture semiconductor layer or the polycrystalline semiconductor layer in the display area, a process to form display elements in the amorphous semiconductor layer or the amorphous and polycrystalline mixture semiconductor layer or the polycrystalline semiconductor of the display area, and the peripheral circuitry in the monocrystalline semiconductor layer of the peripheral circuit area, a process to form an ion implantation layer of a specified depth on the support substrate, a process to do the annealing process for exfoliation, a process to separate the support substrate from a deformative area of ion implantation layer, a process to attach a backing to the ultra slim electrooptic display device unit after its separation, and a process to divide each ultra slim electrooptic display device unit after attaching the backing.

With this manufacturing method a monocrystalline semiconductor layer is formed by covalent bonding of the ion implantation layer of the seed substrate with heat treatment and the insulating layer of the support substrate by attaching the supporting substrate which consists of the insulating layer to the seed substrate which consists of the ion implantation layer. It separates the seed substrate from the ion implantation layer after the anneal processing for exfoliation. Furthermore, it forms the ultra slim SOI layer on the support substrate by etching and planarizing the surface of the monocrystalline semiconductor layer with hydrogen anneal processing and by etching the surface of the monocrystalline semiconductor layer with hydrofluoric acid etchant as required. After that, it forms an insulating layer and an amorphous semiconductor layer or an amorphous and polycrystalline mixture semiconductor layer or a polycrystalline semiconductor layer. It removes at least a minimum the amorphous semiconductor layer or the amorphous and polycrystalline mixture semiconductor layer or the polycrystalline semiconductor layer of the peripheral circuit area leaving the insulating layer and the amorphous semiconductor layer or the amorphous and polycrystalline mixture semiconductor layer or the polycrystalline semiconductor layer in display area. This forms the amorphous semiconductor layer or the amorphous and the polycrystalline semiconductor layer or the polycrystalline semiconductor layer in the display area, and the monocrystalline semiconductor layer in the peripheral circuit area. An amorphous semiconductor TFT or an amorphous and polycrystalline mixture semiconductor TFT or a polycrystalline semiconductor TFT display element which has relatively low high electron and positive hole mobility and low electric current leakage qualities and a monocrystalline semiconductor TFT peripheral circuit which has high electron and positive hole mobility and high drivability can be formed on the same support substrate because each display element is formed in the amorphous semiconductor layer or the amorphous and polycrystalline mixture semiconductor or the polycrystalline semiconductor layer in the display area, and the peripheral circuitry is formed in the monocrystalline semiconductor layer in the peripheral circuit area. You can obtain a high intensity, high definition and sophisticated ultra slim electrooptic display device unit which has high electron and positive hole mobility and low electric current leakage qualities by separating the support substrate from the deformative area of the ion implantation after attaching the backing, and dividing the assembly into each ultra slim electrooptic display device unit.

The manufacturing method for the tenth ultra slim electrooptic display device unit in this invention includes as follows; a process to form an ion implantation layer on the seed substrate which consists of monocrystalline semiconductor, a process to form a porous semiconductor layer on the support substrate which consists of monocrystalline semiconductor, a process to form a monocrystalline semiconductor layer via a polycrystalline semiconductor layer on the support substrate, a process to form an insulating layer on the monocrystalline semiconductor layer, a process to form a monocrystalline semiconductor layer by covalent bonding the ion implantation layer and the insulating layer of the support substrate with heat treatment after attaching the ion implantation layer of the seed substrate and the insulating layer of the support substrate, a process to separate the seed substrate from the deformative area from ion implantation after the anneal processing for exfoliation, a process to etch and planarize the surface of the monocrystalline semiconductor layer with a minimum hydrogen anneal processing, a process to form an amorphous semiconductor layer or an amorphous and polycrystalline mixture semiconductor layer or a polycrystalline semiconductor layer after forming an insulating layer on the surface of the support substrate which consists of monocrystalline semiconductor, a process to remove at a minimum the amorphous semiconductor layer or the amorphous and polycrystalline mixture semiconductor layer and the polycrystalline semiconductor layer of the peripheral circuit area leaving the insulating layer and the amorphous semiconductor layer or the amorphous and polycrystalline mixture semiconductor layer or the polycrystalline semiconductor layer in the display area, a process to form display elements in the amorphous semiconductor layer or the amorphous and polycrystalline mixture semiconductor layer or the polycrystalline semiconductor layer of the display area, and the peripheral circuitry on the monocrystalline semiconductor layer of the peripheral circuit area, a process to separate the support substrate from the porous semiconductor layer, a process to attach a backing to the ultra slim electrooptic display device unit after its separation, a process to divide the assembly into each ultra slim electrooptic display device unit after attaching the backing.

With this manufacturing method, the seed substrate on which an ion implantation layer is formed is attached to the support substrate which forms a porous semiconductor layer, a monocrystalline semiconductor layer and an insulating layer. It separates the seed substrate in the ion implantation layer after the anneal processing for exfoliation, by forming a monocrystalline semiconductor layer and a covalent bonding ion implantation layer on the seed substrate by heat treatment and an insulating layer on the support substrate. It forms an ultra slim SOI layer on the support substrate by etching the surface of monocrystalline semiconductor layer with hydrofluoric acid etchant as required, and by etching and planarizing the surface of monocrystalline semiconductor layer with hydrogen anneal processing. Then an insulating layer and an amorphous semiconductor layer or an amorphous and polycrystalline mixture semiconductor layer or a polycrystalline semiconductor layer is formed. At a minimum, the amorphous semiconductor layer or amorphous and the polycrystalline mixture semiconductor layer or the polycrystalline semiconductor layer is removed in the peripheral circuit area leaving an insulating layer and an amorphous semiconductor layer or an amorphous and polycrystalline mixture semiconductor layer or a polycrystalline semiconductor layer in the display area. Both an amorphous semiconductor layer or an amorphous and polycrystalline mixture semiconductor layer or a polycrystalline semiconductor layer is formed in the display area, and a monocrystalline semiconductor layer is formed in the peripheral circuit area. This forms an amorphous semiconductor TFT or an amorphous and polycrystalline mixture semiconductor TFT or a polycrystalline semiconductor TFT display element which has relatively low high electron and positive hole mobility and low electric current leakage qualities, and a monocrystalline semiconductor TFT peripheral circuit which has high electron and positive hole mobility and high drivability because the display elements are formed on an amorphous semiconductor layer or an amorphous and polycrystalline mixture semiconductor layer or a polycrystalline semiconductor layer in the display area and the peripheral circuitry is formed in a monocrystalline semiconductor layer in the peripheral circuit area. With this, you can obtain a high intensity, high definition and sophisticated ultra slim electrooptic display device unit which has high electron and positive hole mobility and low electric current leakage qualities by separating the support substrate from the porous semiconductor layer, attaching the backings and then dividing the assembly into each ultra slim electrooptic display device unit.

The manufacturing method for the eleventh ultra slim electrooptic display device unit for this invention includes the following; a process to form a porous semiconductor layer on the seed substrate and support substrate which consists of monocrystalline semiconductor, a process to form a monocrystalline semiconductor layer via the porous semiconductor layer on the seed substrate and support substrate, a process to form an insulating layer via the monocrystalline semiconductor layer on either the seed substrate or the support substrate, a process to attach the seed substrate and support substrate at the surface of the insulating layer, a process to separate the seed substrate from the porous semiconductor layer formed on the seed substrate, a process to etch and planarize the surface of the monocrystalline semiconductor layer which is exposed by separating the seed substrate with a minimum hydrogen anneal processing, a process to expose the insulating layer by etching the display area of the monocrystalline semiconductor layer, a process to form a polycrystalline semiconductor layer in the display area and a monocrystalline semiconductor layer in the peripheral circuit area with semiconductor epitaxial growth, a process to form display elements in a polycrystalline semiconductor layer in the display area and the peripheral circuitry in the monocrystalline semiconductor layer in the peripheral circuit area, a process to separate the support substrate from the porous semiconductor layer of the same support substrate, a process to attach a backing to an ultra slim electrooptic display element substrate after its separation, and a process to divide each ultra slim electrooptic display device unit after attaching the backing.

With this manufacturing method, an ultra slim SOI layer is formed on a porous layer of the support substrate by forming a porous semiconductor layer and a monocrystalline semiconductor layer on both seed substrate and the support substrate, attaching both substrates together via an insulating layer, separating the seed substrate from the porous semiconductor layer of the seed substrate. After that, a polycrystalline semiconductor layer is formed in the display area, and a monocrystalline semiconductor layer is formed in the peripheral circuit by semiconductor epitaxial growth after etching and planarizing the monocrystalline semiconductor layer of this support substrate with hydrogen anneal processing and exposing an insulating layer by etching the display area of a monocrystalline semiconductor layer. It is possible to form a polycrystalline semiconductor TFT display element which has relatively low high electron and positive hole mobility and low electric current leakage qualities and a monocrystalline semiconductor TFT peripheral circuit which has high electron and positive hole mobility and high drivability on an ultra slim SOI layer of a porous layer on the same support substrate because the display element are formed in the polycrystalline semiconductor layer in the display area while a monocrystalline semiconductor layer is formed in peripheral circuit area. With this, you can obtain a high intensity, high definition and sophisticated ultra slim electrooptical display device unit which has high electron and positive hole mobility and low electric current leakage qualities, by attaching the backings after separating the support substrate from the porous semiconductor layer and dividing the assembly into each ultra slim electrooptic display device unit.

The manufacturing method for the twelfth ultra slim electrooptic display device unit for this invention includes as follows; a process to form an ion implantation layer on the seed substrate which consists of monocrystalline semiconductor, a process to from an insulating layer on the support substrate which consists of a monocrystalline semiconductor, a process to form monocrystalline semiconductor layer by covalent bonding with the ion implantation layer and insulating layer with heat treatment after attaching the ion implantation layer of seed substrate and the insulating layer of the support substrate, a process to separate the seed substrate from a deformative area of the ion implantation layer on the same seed substrate after the anneal processing for exfoliation, a process to etch and planarize the surface of the monocrystalline semiconductor layer with a minimum the hydrogen annealing process, a process to expose the insulating layer by etching the display area of the monocrystalline semiconductor layer, a process to form a monocrystalline semiconductor layer in the peripheral circuit area and a polycrystalline semiconductor layer in the display area with semiconductor epitaxial growth, a process to form display elements in the polycrystalline semiconductor layer of the display area and the peripheral circuitry in the monocrystalline semiconductor layer of peripheral circuit area, a process to form an ion implantation layer to the specified depth on the support substrate, a process to do the anneal processing for exfoliation, a process to separate the support substrate from the deformative area of the ionic implantation layer, a process to attach a backing to the ultra slim electrooptic display element substrate after its separation, a process to divide the assembly into each ultra slim electrooptic display device unit after attaching the backing.

With this manufacturing method, a monocrystalline semiconductor layer is formed by covalent bonding of the ion implantation layer of the seed substrate with heat treatment and the insulating layer of support substrate after attaching the support substrate which forms an insulating layer onto the seed substrate on which is formed the ion implantation layer. The ultra slim SOI layer is formed on the support substrate by etching and planarizing the surface of the monocrystalline semiconductor layer with hydrogen anneal processing by separating the seed substrate from the ion implantation layer after the anneal processing for exfoliation. After that, a polycrystalline semiconductor layer is formed in the display area and a monocrystalline semiconductor layer is formed in the peripheral circuit area by semiconductor epitaxial growth after exposing the insulating layer by etching the display area of the monocrystalline semiconductor layer. A polycrystalline semiconductor TFT display element is formed, which has relatively low high electron and positive hole mobility and low electric current leakage qualities, and a monocrystalline semiconductor TFT peripheral circuit which has high electron and positive hole mobility and high drivability on the same substrate because it forms a display area in polycrystalline semiconductor layer of the display area and peripheral circuitry in a monocrystalline semiconductor layer of the peripheral circuit area. With this, you can obtain a high intensity, high definition and sophisticated ultra slim electrooptic display device unit that has high electron and positive hole mobility and low electric current leakage qualities by attaching the backing after separating the support substrate from a deformative area of the ion implantation layer and dividing the assembly into each ultra slim electrooptic display device unit.

The manufacturing method for the thirteenth ultra slim electrooptic display device unit in this invention includes as follows; a process to form an ion implantation layer on the seed substrate which consists of monocrystalline semiconductor, a process to form a porous semiconductor layer on the support substrate which consists of monocrystalline semiconductor, a process to form a monocrystalline semiconductor layer on the support substrate via a porous semiconductor, a process to form an insulating layer on the monocrystalline semiconductor layer, a process to form a monocrystalline semiconductor layer by covalent bonging with the ion implantation layer of seed substrate with heat treatment and insulating layer of support substrate after attaching the ion implantation layer of the seed substrate and the insulating layer of the support substrate, a process to separate the seed substrate from the deformative area of the ion implantation layer after the anneal processing for exfoliation, a process to etch and planarize the surface of the monocrystalline semiconductor layer with a minimum hydrogen anneal processing, a process to expose the insulating layer by etching the display area of monocrystalline semiconductor layer, a process to form polycrystalline semiconductor layer in the display area, and monocrystalline semiconductor layer in peripheral circuit area with semiconductor epitaxial growth, a process to form display elements in the monocrystalline semiconductor layer of the display area and peripheral circuitry in the monocrystalline semiconductor layer of the peripheral circuit, a process to separate the support substrate from the porous semiconductor layer, a process to attach a backing to the ultra slim electrooptic display element substrate after its separation, a process to divide the assembly into each ultra slim electrooptic display device unit after attaching the backing.

With this manufacturing method, a monocrystalline semiconductor layer is formed by covalent bonding ion implantation of the seed substrate with heat treatment and the insulating layer of the support substrate after attaching the support substrate which forms a porous semiconductor layer, monocrystalline semiconductor and insulating layer to the seed substrate on which is formed an ion implantation layer. The support substrate is separated at the ion implantation layer after anneal processing for exfoliation, an ultra slim SOI layer is formed on the support substrate by etching and planarizing the surface of the monocrystalline semiconductor layer with hydrogen anneal processing for exfoliation. After that, the polycrystalline semiconductor layer in the display area and monocrystalline semiconductor layer in the peripheral circuit are formed with semiconductor epitaxial growth by etching the display area of the monocrystalline semiconductor layer and by exposing the insulating layer. The polycrystalline semiconductor TFT display element which exhibits relatively low high electron and positive hole mobility and low electric current leakage qualities and a monocrystalline semiconductor TFT peripheral circuit which exhibits high electron and positive hole mobility and high drivability can be formed on the same support substrate because it forms the display elements are formed in the polycrystalline semiconductor layer of the display area and the peripheral circuitry is formed in the monocrystalline semiconductor layer in the peripheral circuit area. You can obtain a high intensity, high definition and sophisticated ultra slim electrooptic display device unit that has high electron and positive hole mobility and low electric current leakage qualities by dividing the assembly into each ultra slim electrooptic display device unit after separating the support substrate from the porous semiconductor layer after attaching the backing.

The manufacturing method for the fourteenth ultra slim electrooptic display device unit in this invention includes as follows; a process to form a porous semiconductor layer on the support substrate which consists of monocrystalline semiconductor, a process to form a monocrystalline semiconductor on the seed substrate and the support substrate via a porous semiconductor layer, a process to form an insulating layer via monocrystalline semiconductor layer on either the seed substrate or the support substrate, a process to attach the seed substrate and support substrate at the surface where the insulating layer was formed, a process to separate the seed substrate from the porous semiconductor layer of the seed substrate, a process to etch and planarize the surface of monocrystalline semiconductor layer which is exposed by the separation of the seed substrate with a minimum hydrogen anneal processing, a process to expose the insulating layer by etching the display area of the monocrystalline semiconductor layer, a process to form an insulating film and amorphous semiconductor layer or an amorphous and polycrystalline mixture semiconductor layer or a polycrystalline semiconductor layer, a process to form display elements in an amorphous semiconductor layer or an amorphous and polycrystalline mixture semiconductor layer or a polycrystalline mixture semiconductor layer or polycrystalline semiconductor layer in the display area and peripheral circuitry in the monocrystalline semiconductor layer in the peripheral circuit area in which at least the amorphous semiconductor layer or the amorphous and polycrystalline mixture semiconductor layer or the polycrystalline semiconductor layer is etched, a process to separate the support substrate from the porous semiconductor layer of the same support substrate, a process to attach a backing to the ultra slim electrooptic display element substrate after its separation, a process to divide the assembly into each ultra slim electrooptic display device unit after attaching the backing.

With this manufacturing method, an ultra slim SOI layer is formed on a porous layer of the support substrate by separating the seed substrate in the porous semiconductor layer of the seed substrate via the insulating layer after forming the porous semiconductor layer and monocrystalline semiconductor layer on both of the seed substrate and support substrate and by attaching an insulating layer via these substrates. After that, the insulating film and the amorphous semiconductor layer or the amorphous and polycrystalline semiconductor layer or the polycrystalline semiconductor layer are formed on the entire area after etching and planarizing the monocrystalline semiconductor layer of this support substrate with hydrogen anneal processing and by etching the display area of the monocrystalline semiconductor layer after exposing the insulating layer. It is possible to form an amorphous semiconductor TFT or an amorphous and polycrystalline mixture semiconductor TFT or a polycrystalline semiconductor TFT display element which has relatively low high electron and positive hole mobility and low electric current leakage qualities and a monocrystalline semiconductor TFT peripheral circuit which has high electron and positive hole mobility and high drivability on the ultra slim SOI layer of the porous layer in the same support substrate because the display element is formed in the amorphous semiconductor layer or the amorphous and the polycrystalline mixture semiconductor layer or the polycrystalline semiconductor layer of the display area and the peripheral circuitry is formed in the monocrystalline semiconductor layer of the peripheral circuit area which is etched by a minimum the amorphous semiconductor layer or the amorphous and the polycrystalline mixture semiconductor layer or the polycrystalline semiconductor layer. With this, you can obtain a high intensity, high definition and sophisticated ultra slim electrooptic display device unit which has high electron and positive hole mobility and low electric current leakage qualities by attaching the backings after separating the support substrate from the porous semiconductor layer and dividing the assembly into each ultra slim electrooptic display device unit.

The manufacturing process for the fifteenth ultra slim electrooptic display device unit in this invention includes as follows; a process to form an ion implantation layer in the seed substrate which is comprised of monocrystalline semiconductor, a process to form an insulating layer on the support substrate which is comprised of a monocrystalline semiconductor layer, a process to form a monocrystalline semiconductor layer by covalent bonding ion implantation layer and an insulating layer with heat treatment after attaching an ion implantation layer to the seed substrate and an insulating layer of the support substrate, a process to separate the seed substrate from deformative part of the ion implantation layer of the same seed substrate after the anneal processing for exfoliation, a process to etch and planarize the surface of the monocrystalline semiconductor layer with a minimum hydrogen anneal processing, a process to expose the insulating layer after etching in the display area of the monocrystalline semiconductor layer, a process to form an insulating film and an amorphous semiconductor layer or an amorphous and polycrystalline mixture semiconductor layer or a polycrystalline semiconductor layer, a process to form display elements in the amorphous semiconductor layer or the amorphous and polycrystalline semiconductor layer or the polycrystalline semiconductor layer of the display area, and peripheral circuitry in the monocrystalline semiconductor layer of peripheral circuit area on which was etched at least the amorphous semiconductor layer or the amorphous and polycrystalline mixture semiconductor layer or the polycrystalline semiconductor layer, a process to form an ion implantation layer of a specified depth on the support substrate, a process to do anneal processing for exfoliation, a process to separate the support substrate from the deformative area of the ion implantation layer, a process to attach a backing to the ultra slim electrooptic display element substrate after its separation, a process to divide the assembly into each ultra slim electrooptic display device unit after attaching the backing.

With this manufacturing method, the support substrate on which an insulating layer is formed and the seed substrate on which an ion implantation layer is formed, are attached, and a monocrystalline semiconductor layer is formed by covalent bonding of the ion implantation layer of the seed substrate and insulating layer of the support substrate with heat treatment, then the seed substrate is separated at the ion implantation layer after the anneal processing for exfoliation, and an ultra slim SOI layer is formed on the support substrate by etching and planarizing the surface of the monocrystalline semiconductor layer with the hydrogen anneal processing. After that, the insulating layer is exposed by etching the display area of the monocrystalline semiconductor layer. It is possible to form an amorphous semiconductor TFT or an amorphous and a polycrystalline mixture semiconductor TFT or a polycrystalline semiconductor TFT display element which has relatively low high electron and positive hole mobility and low electric current leakage quality, and a monocrystalline semiconductor TFT peripheral circuit which has high electron and positive hole mobility and high drivability on the same support substrate because an amorphous semiconductor layer or an amorphous and polycrystalline mixture semiconductor or a polycrystalline semiconductor layer is formed in the display area, and peripheral circuitry in a monocrystalline semiconductor layer of the peripheral circuit area which has had at least the amorphous semiconductor layer or the amorphous and polycrystalline mixture semiconductor layer or the polycrystalline semiconductor layer etched and by having a process to form an insulating film and an amorphous semiconductor layer or an amorphous and polycrystalline mixture semiconductor layer or a polycrystalline semiconductor layer in the entire area with plasma CVD, heat CVD, sputtering and evaporation. You can obtain a high intensity, high definition and sophisticated ultra slim electrooptic display device unit that has high electron and positive hole mobility and low electric current leakage qualities by dividing the assembly into each ultra slim electrooptic display device unit after separating the support substrate from the porous semiconductor layer after attaching the backing.

The manufacturing process for the sixteenth ultra slim electrooptic display device unit in this invention includes as follows; a process to form an ion implantation layer on the seed substrate which consists of the monocrystalline semiconductor, a process to from a porous semiconductor layer on the support substrate which consists of monocrystalline semiconductor, a process to form a monocrystalline semiconductor layer on the support substrate via a porous semiconductor layer, a process to form an insulating layer on the monocrystalline semiconductor layer, a process to form a monocrystalline semiconductor layer by covalent bonding of the ion implantation layer of the seed substrate and the insulating layer of the support substrate with heat treatment after attaching ion implantation layer of the seed substrate and insulating layer of the support substrate, a process to separate the seed substrate from the deformative area of the ion implantation layer after the anneal processing for exfoliation, a process to etch and planarize the surface of the monocrystalline semiconductor layer with a minimum hydrogen annealing process, a process to expose the insulating layer by etching the display area of the monocrystalline semiconductor layer, a process to form an insulating film and an amorphous semiconductor layer or an amorphous and polycrystalline mixture semiconductor layer or a polycrystalline semiconductor layer in the entire area, a process to form display elements on an amorphous semiconductor layer or an amorphous and polycrystalline mixture semiconductor layer or a polycrystalline semiconductor layer of the display area, and peripheral circuitry in a monocrystalline semiconductor layer of the peripheral circuit area of which at least an amorphous semiconductor layer or an amorphous and polycrystalline mixture semiconductor layer or a polycrystalline semiconductor layer is etched, a process to separate the support substrate from the porous semiconductor layer, a process to attach a backing to the ultra slim electrooptic display element substrate after its separation, a process to divide the assembly into each ultra slim electrooptic display device unit after attaching the backing.

With this manufacturing method, a monocrystalline semiconductor layer is formed by covalent bonding of the ion implantation layer of the seed substrate and the insulating layer of support substrate with heat treatment after attaching the support substrate which forms a porous semiconductor layer, a monocrystalline semiconductor layer and an insulating layer on the seed substrate which is formed by ion implantation. The ultra slim SOI layers is formed on the support substrate by separating the seed substrate at the ion implantation layer, by anneal processing for exfoliation and by etching and planarizing the surface of monocrystalline semiconductor layer with hydrogen anneal processing for exfoliation. Then the insulating layer is exposed, and the display area of monocrystalline semiconductor layer is etched and the insulating film and amorphous semiconductor layer or amorphous and polycrystalline mixture semiconductor or polycrystalline semiconductor are formed in the entire area. It is possible to form an amorphous semiconductor TFT or an amorphous and polycrystalline mixture semiconductor TFT or a polycrystalline semiconductor TFT display element which has relatively low high electron and positive hole mobility and low electric current leakage qualities and a monocrystalline semiconductor TFT peripheral circuit which has high electron and positive hole mobility and high drivability are formed on the same support substrate because the display element is formed in the amorphous semiconductor layer or the amorphous and the polycrystalline mixture semiconductor layer or the polycrystalline semiconductor layer of the display area and the peripheral circuitry is formed in the monocrystalline semiconductor layer of the peripheral circuit area which is etched by a minimum the amorphous semiconductor layer or the amorphous and the polycrystalline mixture semiconductor layer or the polycrystalline semiconductor layer. With this, you can obtain a high intensity, high definition and sophisticated ultra slim electrooptic display device unit which has high electron and positive hole mobility and low electric current leakage qualities by attaching the backings after separating the support substrate from the porous semiconductor layer and dividing the assembly into each ultra slim electrooptic display device unit.

The manufacturing process for the seventeenth ultra slim electrooptic display device unit in this invention includes as follows; a process to form a porous semiconductor layer on the seed substrate and the support substrate which consists of monocrystalline semiconductor, a process to form a monocrystalline semiconductor layer on the seed substrate and the support substrate via a porous semiconductor layer, a process to form an insulating layer either on the seed substrate or the support substrate via a monocrystalline semiconductor layer, a process to attach the seed substrate and the support substrate with an insulating layer formed at the surface, a process to separate the seed substrate from the porous semiconductor layer of the same seed substrate, a process to etch and planarize the surface of the monocrystalline semiconductor layer which was exposed by separating the seed substrate with a minimum hydrogen annealing process, a process to expose the insulating layer by etching the display area of the monocrystalline semiconductor layer, a process to form the light shielding metallic layer on the polycrystalline semiconductor display element formation area inside the display area, a process to cover the insulating layer, a process to form a polycrystalline semiconductor layer in the display area and monocrystalline semiconductor layer in the peripheral circuit area with semiconductor epitaxial growth, a process to form display elements in the polycrystalline semiconductor layer of the display area and the peripheral circuitry in the monocrystalline semiconductor layer of the peripheral circuit area, a process to separate the support substrate from the porous semiconductor layer of the same support substrate, a process to attach a backing to the ultra slim electrooptic display element substrate after its separation, a process to divide the assembly into each ultra slim electrooptic display device unit after attaching the backing.

With this manufacturing method, an ultra slim SOI layer is formed on the porous layer of the support substrate by forming a porous semiconductor layer and a monocrystalline semiconductor layer on both the seed substrate and the support substrate and by attaching both these substrates via an insulating layer and by separating the seed substrate at the porous semiconductor layer of the seed substrate. Then the insulating layer is exposed by etching the display area of the monocrystalline semiconductor layer after etching and planarizing the monocrystalline semiconductor layer of the support substrate with hydrogen anneal processing. The light-shielding metallic film is formed by patterning and forming the light-shielding metallic film of a transitional metallic silicide such as $WSi_2$ (Tungsten silicide), $TiSi_2$ (Titanium silicide) $MoSi_2$ (Molybdenum silicide), etc. with CVD and sputtering, etc. in the monocrystalline semiconductor display element forming area inside the display area. The insulating layer is formed on top of that. The polycrystalline semiconductor layer in the display area and monocrystalline semiconductor layer in the peripheral circuit are formed with semiconductor epitaxial growth.

It possible to form a polycrystalline semiconductor TFT display element on the light-shielding metallic film which has relatively low high electron and positive hole mobility and low electric current leakage qualities and a monocrystalline semiconductor layer which has high electron and positive hole mobility and increased drivability, and a monocrystalline semiconductor TFT peripheral circuit which is in the higher monocrystalline half in the peripheral circuit area of the ultra slim SOI layer of the porous layer of the same support substrate because the peripheral circuit is formed in the monocrystalline semiconductor layer of the peripheral circuit area and display element is formed in the polycrystalline semiconductor layer of the display area.

With this, you can obtain a high intensity, high definition and sophisticated ultra slim electrooptic display device unit which has high electron and positive hole mobility and low electric current leakage qualities by attaching the backings after separating the support substrate from the porous semiconductor layer and dividing the assembly into each ultra slim electrooptic display device unit.

The manufacturing process for the eighteenth ultra slim electrooptic display device unit in this invention includes as follows; a process to form an ion implantation layer on the seed substrate which consists of a monocrystalline semiconductor layer, a process to form an insulating layer on the support substrate which consists of monocrystalline semiconductor, a process to form a monocrystalline semiconductor layer by attaching the ion implantation layer of the seed substrate and the insulating layer of the support substrate and by covalent bonding the ion implantation layer and the insulating layer with heat treatment, a process to separate the seed substrate from the deformative area of the ion implantation layer in the same seed substrate by the annealing process for exfoliation, a process to etch and planarize the surface of the monocrystalline semiconductor layer with a minimum hydrogen anneal processing, a process to expose the insulating layer by etching the display area of the monocrystalline semiconductor layer, a process to form an light shielding metallic layer in the polycrystalline semiconductor display element formation area in the display area, a process to cover this with an insulating layer, a process to form a polycrystalline semiconductor layer in the display area and monocrystalline semiconductor layer in the peripheral circuit area with semiconductor epitaxial growth, a process to form the peripheral circuit in the monocrystalline semiconductor layer of the peripheral circuit and display elements in the polycrystalline semiconductor layer of the display area, a process to form an ion implantation layer at the specified depth of the support substrate, a process to do anneal processing for exfoliation, a process to separate the support substrate from the deformative area of the ion implantation layer, a process to attach the backing to the ultra slim electrooptic display element substrate after its separation, a process to divide the assembly into each ultra slim electrooptic display device unit after attaching the backing.

The support substrate on which the insulating layer is formed is attached to the seed substrate on which the ion implantation layer is formed, the monocrystalline semiconductor layer is formed by covalent bonding the ion implantation layer of the seed substrate and insulating layer of the support substrate with heat treatment, the seed substrate is separated at the ion implantation layer after the anneal processing for exfoliation. Furthermore, the ultra slim SOI layer is formed on the support substrate by etching and planarizing the surface of the monocrystalline semiconductor layer with hydrogen anneal processing. Then, the display area of the monocrystalline semiconductor layer is etched, exposing the insulating layer, the light shielding metallic layer is formed by patterning and forming with CVD, sputtering, etc. of light-shielding metallic film of a transitional metallic silicide such as $WSi_2$ (Tungsten silicide), $TiSi_2$ (Titanium silicide) $MoSi_2$ (Molybdenum silicide), etc. in the polycrystalline semiconductor display element formation area inside the display area. The insulating layer is formed on top of the polycrystalline semiconductor layer in the display area and a monocrystalline semiconductor layer is formed in the peripheral circuit with semiconductor epitaxial growth. Because the display element in the polycrystalline semiconductor layer of the display area and the peripheral circuit in the monocrystalline semiconductor layer of the peripheral circuit are formed, it is possible to form a polycrystalline semiconductor TFT display element which has relatively low high electron and positive hole mobility and low electric current leakage qualities which forms on the light shielding metallic layer and a monocrystalline semiconductor TFT peripheral circuit which has high electron and positive hole mobility and high drivability on the ultra slim SOI layer of the top of a porous layer of the same support substrate. With this, you can obtain a high intensity, high definition and sophisticated ultra slim electrooptic display device unit which has high electron and positive hole mobility and low electric current leakage qualities by attaching the backings after separating the support substrate from the porous semiconductor layer and dividing the assembly into each ultra slim electrooptic display device unit.

The manufacturing process for the nineteenth ultra slim electrooptic display device unit in this invention includes as follows; a process to form an ion implantation layer on the seed substrate which consists of monocrystalline semiconductor, a process to form a porous semiconductor layer on the support substrate which consists of monocrystalline semiconductor, a process to form a monocrystalline semiconductor layer on the support substrate via the porous semiconductor layer, a process to form an insulating layer on the monocrystalline semiconductor layer, a process to form a monocrystalline semiconductor layer by attaching the ion implantation layer of the seed substrate and the insulating layer of the support substrate and by covalent bonding the ion implantation layer and the insulating layer with heat treatment, a process to separate the seed substrate from the deformative area of the ion implantation layer after the annealing process for exfoliation, a process to etch and planarize the surface of the monocrystalline semiconductor layer with a minimum hydrogen anneal processing, a process to expose the insulating layer after etching the display area of the monocrystalline semiconductor layer, a process to form the light shielding metallic layer in the polycrystalline semiconductor display element formation area inside the display area, a process to cover the insulating layer, a process to cover on top of the insulating area with the insulating layer, a process to form a polycrystalline semiconductor layer in the display area and monocrystalline semiconductor in the peripheral circuit area with semiconductor epitaxial growth, a process to form the display element in the polycrystalline semiconductor layer of the display area and the peripheral circuitry in the monocrystalline semiconductor layer of the peripheral circuit area, a process to separate the support substrate from the porous semiconductor layer, a process to attach a backing to the ultra slim electrooptic display element substrate after its separation, a process to divide the assembly into each ultra slim electrooptic display device unit after attaching the backing.

With this manufacturing method, the support substrate which forms the porous semiconductor layer, the monocrystalline semiconductor layer and the insulating layer which is formed by ion implantation is attached to the seed substrate. The monocrystalline semiconductor layer is formed by covalent bonding the ion implantation layer of the seed substrate and the insulating layer of the support substrate with heat treatment, the seed substrate is separated at the ion implantation layer after the annealing process for exfoliation. Furthermore, an ultra slim SOI layer is formed on the support substrate by etching and planarizing the surface of the monocrystalline semiconductor layer with the hydrogen annealing process. Then the insulating layer is exposed by etching the display area of the monocrystalline semiconductor layer. The light shielding metallic layer is formed by patterning the light-shielding metallic film of a transitional metallic silicide such as $WSi_2$ (Tungsten silicide), $TiSi_2$ (Titanium silicide) $MoSi_2$ (Molybdenum silicide), etc. with CVD and sputtering, etc. in the polycrystalline semiconductor display element formation area of the display area. The insulating layer is formed on top of the light shielding metallic layer. The polycrystalline semiconductor layer is formed in the display area and the monocrystalline semiconductor layer is formed in the peripheral area by semiconductor epitaxial growth. The polycrystalline mixture semiconductor TFT or a polycrystalline semiconductor TFT display element which has relatively low high electron and positive hole mobility and low electric current leakage qualities and a monocrystalline semiconductor TFT peripheral circuit which has high electron and positive hole mobility and high drivability on the ultra slim SOI layer of the porous layer in the same support substrate because the display element is formed in the display area and the peripheral circuitry is formed in the monocrystalline-semiconductor layer of the peripheral circuit area which is etched by a minimum the amorphous semiconductor layer or the amorphous and the polycrystalline mixture semiconductor layer or the polycrystalline semiconductor layer. With this, you can obtain a high intensity, high definition and sophisticated ultra slim electrooptic display device unit which has high electron and positive hole mobility and low electric current leakage qualities by attaching the backings after separating the support substrate from the porous semiconductor layer and dividing the assembly into each ultra slim electrooptic display device unit.

The manufacturing process for the twentieth ultra slim electrooptic display device unit in this invention includes as follows; a process to form the porous semiconductor layer on the support substrate and seed substrate which consists of a monocrystalline semiconductor, a process to form the monocrystalline semiconductor layer on the seed substrate and the support substrate via the porous semiconductor layer, a process to form the insulating layer via the monocrystalline semiconductor either on the seed substrate or the support substrate, a process to attach the seed substrate and the support substrate together at the insulating layer formation surface, a process to separate the seed substrate from the porous semiconductor layer of the same seed substrate, a process to etch and planarize the surface of the monocrystalline semiconductor layer, which is exposed by the separation of the seed substrate with a minimum of the hydrogen annealing process, a process to expose the insulating layer after etching the display area of the monocrystalline semiconductor layer, a process to form the light shielding metallic layer in the amorphous semiconductor or amorphous and polycrystalline mixture semiconductor or polycrystalline semiconductor display element formation area inside the display area, a process to form an insulating layer and the amorphous semiconductor layer over the entire area or an amorphous and polycrystalline semiconductor layer or a polycrystalline semiconductor layer, a process to form the display elements in the amorphous semiconductor layer, the amorphous and polycrystalline mixture semiconductor layer or the polycrystalline semiconductor layer of the display area, and the peripheral circuit area of which at least the amorphous semiconductor layer or the amorphous and the polycrystalline mixture semiconductor layer or the polycrystalline semiconductor layer is etched, a process to separate the support substrate from the porous semiconductor layer of the same support substrate, a process to attach a backing to the ultra slim electrooptic display element substrate after its separation, a process to divide the assembly into each ultra slim electrooptic display device unit after attaching the backing.

With this manufacturing process, the porous semiconductor layer and monocrystalline semiconductor layer are formed on both of the seed substrate and the support substrate. These substrates are attached via the insulating layer. The ultra slim SOI layer is formed on the porous layer of the support substrate by separating the seed substrate at the porous semiconductor layer of the seed substrate. Then the insulating layer is exposed by etching the display area of the monocrystalline semiconductor layer after etching and planarizing the monocrystalline semiconductor layer of the support substrate with a hydrogen annealing treatment. An light-shielding metallic film is created by forming and patterning the light-shielding metallic film of a transitional metallic silicide such as $WSi_2$ (Tungsten silicide), $TiSi_2$ (Titanium silicide) $MoSi_2$ (Molybdenum silicide), etc. by CVD and sputtering, etc. in an amorphous semiconductor layer or an amorphous and polycrystalline mixture semiconductor or the polycrystalline semiconductor display element formation area of the display area. It is possible to form an amorphous semiconductor TFT or an amorphous and polycrystalline mixture semiconductor TFT or a polycrystalline semiconductor TFT display element which has relatively low high electron and positive hole mobility and low electric current leakage qualities on the light shielding metallic layer, and a monocrystalline semiconductor TFT peripheral circuit which has high electron and positive hole mobility and high drivability in the peripheral circuit area on the ultra slim SOI layer of the porous layer of the same support substrate because the display element in the amorphous semiconductor layer or the amorphous and polycrystalline mixture semiconductor layer or the polycrystalline semiconductor layer of the display area and the peripheral circuit in the monocrystalline semiconductor layer of the peripheral circuit area where at least the amorphous semiconductor layer or the amorphous and the polycrystalline mixture semiconductor layer or the polycrystalline semiconductor layer are etched and are formed on the ultra slim SOI layer on the porous layer of the same support substrate. With this, you can obtain a high intensity, high definition and sophisticated ultra slim electrooptic display device unit which has high electron and positive hole mobility and low electric current leakage qualities by attaching the backings after separating the support substrate from the porous semiconductor layer and dividing the assembly into each ultra slim electrooptic display device unit.

The manufacturing process for the twenty first ultra slim electrooptic display device unit in this invention includes as follows; a process to form an ion implantation layer on the seed substrate which consists of the monocrystalline semiconductor, a process to form an insulating layer on the support substrate which consists of a monocrystalline semiconductor, a process to form a monocrystalline semiconductor layer by attaching the ion implantation layer of the seed substrate and the insulating layer of the support substrate and by covalent bonding the ion implantation layer and the insulating layer with heat treatment, a process to separate the seed substrate from the deformative area of the ion implantation layer after the annealing process for exfoliation, a process to etch and planarize the surface of the monocrystalline semiconductor layer with a minimum of hydrogen anneal processing, a process to expose the insulating layer after etching the display area of the monocrystalline semiconductor layer, a process to form the light shielding metallic layer on the amorphous semiconductor in the display area or an amorphous and polycrystalline mixture semiconductor or the polycrystalline semiconductor display element formation area, a process to form the insulating layer in the entire area and the amorphous semiconductor layer or the amorphous and polycrystalline mixture semiconductor layer or the polycrystalline semiconductor layer, a process to form the display element on the amorphous semiconductor layer or the amorphous and the polycrystalline mixture semiconductor layer or the polycrystalline semiconductor layer of the display area and the peripheral circuit on the monocrystalline semiconductor layer in the peripheral circuit area of which was etched at least the amorphous semiconductor layer or the amorphous and the polycrystalline mixture semiconductor layer or the polycrystalline semiconductor layer, a process to form the ion implantation layer at the specified depth of the support substrate, a process to do the anneal processing for exfoliation, a process to separate the support substrate from the deformative area of the ion implantation layer, a process to attach a backing to the ultra slim electrooptic display element substrate after its separation, a process to divide the assembly into each ultra slim electrooptic display device unit after attaching the backing.

With this manufacturing method, the support substrate which forms the insulating layer is attached onto the seed substrate on which the ion implantation is formed. A monocrystalline semiconductor layer is formed by covalent bonding of the ion implantation of the seed substrate and the insulating layer of the support substrate with heat treatment, the seed substrate is separated at the ion implantation layer after the anneal processing for exfoliation, then an ultra slim SOI layer is formed on the support substrate by etching and planarizing the surface of the monocrystalline semiconductor layer with hydrogen anneal processing. After that, the insulating layer is exposed by etching the display area of the monocrystalline semiconductor layer. The light-shielding metallic film is formed by forming and patterning a transitional metallic silicide of light-shielding metallic film such as $WSi_2$ (Tungsten silicide), $TiSi_2$ (Titanium silicide) $MoSi_2$ (Molybdenum silicide) with CVD and sputtering, etc. on the amorphous semiconductor of the display area or the amorphous and polycrystalline mixture semiconductor layer or the polycrystalline semiconductor display element formation area. The insulating layer and the amorphous semiconductor layer or the amorphous and the polycrystalline mixture semiconductor layer or the polycrystalline semiconductor layer is formed. The amorphous semiconductor TFT or the amorphous and the polycrystalline mixture semiconductor TFT or the polycrystalline semiconductor TFT display element which are formed on the light shielding metallic layer, have relatively low high electron and positive hole mobility and low electric current leakage qualities and the polycrystalline semiconductor TFT peripheral circuit which has high electric positive holy mobility and high drivability are formed on the ultra slim SOI layer on the porous layer of the same support substrate because the display element is formed on the amorphous semiconductor layer in the display area or the amorphous and the polycrystalline mixture semiconductor layer or the polycrystalline semiconductor layer, and the peripheral circuit is formed on the monocrystalline semiconductor layer of the peripheral circuit area which has etched at least the amorphous semiconductor layer or the amorphous and the polycrystalline mixture semiconductor or the polycrystalline semiconductor layer are formed on the porous layer of the same support substrate. With this, you can obtain a high intensity, high definition and sophisticated ultra slim electrooptic display device unit which has high electron and positive hole mobility and low electric current leakage qualities by attaching the backings after separating the support substrate from the porous semiconductor layer and dividing the assembly into each ultra slim electrooptic display device unit.

The manufacturing process for the twenty second ultra slim electrooptic display device unit in this invention includes as follows; a process to form an ion implantation layer on the seed substrate which consists of a monocrystalline semiconductor, a process to form a porous semiconductor layer on the support substrate which consists of the monocrystalline semiconductor layer, a process to form the monocrystalline semiconductor layer through the porous semiconductor layer on the support substrate, a process to form the insulating layer on the monocrystalline semiconductor layer, a process to form a monocrystalline semiconductor layer by attaching the ion implantation layer of the seed substrate and the insulating layer of the support substrate and by covalent bonding the ion implantation layer and the insulating layer with heat treatment, a process to separate the seed substrate from the deformative area of the ion implantation layer after anneal processing for exfoliation, a process to etch and planarize the surface of the monocrystalline semiconductor layer with a minimum hydrogen anneal processing, a process to expose the insulating layer after etching the display area of the monocrystalline semiconductor layer, a process to form the light shielding metallic layer of the amorphous semiconductor inside the display area or the amorphous and polycrystalline mixture semiconductor inside the display area or the polycrystalline semiconductor display element formation area, a process to form the insulating layer and the amorphous semiconductor in the entire area and the amorphous and the polycrystalline mixture semiconductor layer or the polycrystalline semiconductor layer, a process to form the display element on the amorphous semiconductor layer or the amorphous and the polycrystalline mixture semiconductor layer or the polycrystalline semiconductor layer of the display area and the peripheral circuit on the monocrystalline semiconductor layer in the peripheral circuit area of which was etched at least the amorphous semiconductor layer or the amorphous and the polycrystalline mixture semiconductor layer or the polycrystalline semiconductor layer, a process to attach a backing to the ultra slim electrooptic display element substrate after its separation, a process to divide the assembly into each ultra slim electrooptic display device unit after attaching the backing.

With this manufacturing method, the support substrate on which the porous semiconductor layer, the monocrystalline semiconductor layer and the insulating layer are formed is attached to the seed substrate on which the ion implantation layer forms. The monocrystalline semiconductor layer is formed by covalent bonding the ion implantation layer of the seed substrate and the insulating layer of the support substrate with heat treatment, the seed substrate is separated at the ion implantation layer after anneal processing for exfoliation, the ultra slim SOI layer on the support substrate is formed by etching and planarizing the surface of the monocrystalline semiconductor layer with hydrogen anneal processing. The insulating layer is exposed by etching the monocrystalline semiconductor layer of the display area. Then the light-shielding metallic film is formed by forming and patterning the light-shielding metallic film of a transitional metallic silicide such as $WSi_2$ (Tungsten silicide), $TiSi_2$ (Titanium silicide), $MoSi_2$ (Molybdenum silicide), etc. with CVD and sputtering, etc. in the amorphous semiconductor inside the display area or the amorphous and polycrystalline mixture semiconductor or the polycrystalline semiconductor display element formation area. The insulating layer and the amorphous semiconductor layer extensively or the amorphous and the polycrystalline mixture semiconductor layer or the polycrystalline semiconductor layer is formed. The amorphous semiconductor TFT or the amorphous and the polycrystalline mixture semiconductor TFT or the polycrystalline semiconductor TFT display element which are formed on the light shielding metallic layer, have relatively low high electron and positive hole mobility and low electric current leakage qualities and the polycrystalline semiconductor TFT peripheral circuit which has high electric positive holy mobility and high drivability are formed on the ultra slim SOI layer on the porous layer of the same support substrate because the display element is formed on the amorphous semiconductor layer in the display area or the amorphous and the polycrystalline mixture semiconductor layer or the polycrystalline semiconductor layer, and the peripheral circuit is formed on the monocrystalline semiconductor layer of the peripheral circuit area which has etched at least the amorphous semiconductor layer or the amorphous and the polycrystalline mixture semiconductor or the polycrystalline semiconductor layer are formed on the porous layer of the same support substrate. With this, you can obtain a high intensity, high definition and sophisticated ultra slim electrooptic display device unit which has high electron and positive hole mobility and low electric current leakage qualities by attaching the backings after separating the support substrate from the porous semiconductor layer and dividing the assembly into each ultra slim electrooptic display device unit.

The manufacturing process for the twenty third ultra slim electrooptic display device unit in this invention includes as follows; a process to form the a polycrystalline semiconductor layer where the crystal grain size is controlled by solid phase deposition after stratifying the amorphous semiconductor layer with selectively ion implantation or with ion doping of at least one kind of four families of elements (Si, Ge, tin and lead, etc.) in the polycrystalline semiconductor layer of the display area, in the aforementioned claim, sections 1~5, 11~13 and 17~19, a process to form the display elements on the polycrystalline semiconductor layer of the display area where the crystal grain size is controlled and the peripheral circuit area on the monocrystalline semiconductor layer of the peripheral circuit area.

With this manufacturing method, the monocrystalline semiconductor layer in the peripheral circuit area and the polycrystalline semiconductor layer in the display area are formed by semiconductor epitaxial growth in the aforementioned claim, sections 1~5, 11~13, and 11~17. The polycrystalline semiconductor TFT display element which has relatively controlled high electron and positive hole mobility and low electric current leakage qualities and the monocrystalline semiconductor TFT peripheral circuit which has high electron and positive hole mobility and high drivability are formed on the same support substrate. The crystal grain size (high electron and positive hole mobility) is controlled in the polycrystalline semiconductor layer with solid phase deposition at 600~650° C. for 10~15 hours, and is formed in the display element after forming the amorphous semiconductor layer, stratifying the polycrystalline semiconductor layer by ion implantation or by ion doping the polycrystalline semiconductor layers of the display area with selectively with one of group IV elements (Si, Ge, tin and the lead etc.) for Si with polycrystalline constitution elements, in the example of $1\times10^{21}$ atoms/cc or more (for example, filling the dose quantity, etc. of $SiF_4$ etc. 30 KeV, $1\times10^{15}$ Atoms/cm$^2$). With this, you can obtain a high intensity, high definition and sophisticated ultra slim electrooptic display device unit which has high electron and positive hole mobility and low electric current leakage qualities by attaching the backings after separating the support substrate from the porous semiconductor layer and dividing the assembly into each ultra slim electrooptic display device unit. Furthermore, you can obtain a polycrystalline SiTFT of high quality with high carrier mobility because, for example, when the polycrystalline Si layer with controls crystal grain size, contains at least a total of one of group IV elements such as Ge, tin and lead in the proper quantity (for example $1\times10^{18}$~$1\times10^{20}$ atoms/cc) with this solid phase growth, it decreases the irregularity which exists in the grain boundary of the polycrystalline Si layers and also decreases that film stress.

The manufacturing process for the twenty fourth ultra slim electrooptic display device unit in this invention includes as follows; in the aforementioned claim 6~10, 14~16 and 20~22, a process to form the polycrystalline semiconductor layer where the crystal grain size is controlled by solid phase deposition after selective ion implantation or ion doping with at least one kind of group IV elements such as silicon, tin, germanium and lead to the amorphous semiconductor layer or the amorphous and the polycrystalline mixture semiconductor layer or the polycrystalline semiconductor layer in the display area, a process to form the display element on the polycrystalline semiconductor layer of the display area where the crystal grain size is controlled, and the peripheral circuit on the monocrystalline semiconductor layer of the peripheral circuit area.

With this manufacturing method, in the aforementioned claim 6~10, 14~16 and 20~22, the amorphous semiconductor layer or the amorphous and the polycrystalline mixture semiconductor layer or the polycrystalline semiconductor layer is formed in the display area, and the monocrystalline semiconductor layer is formed in the peripheral circuit area with plasma CVD, heat CVD, sputtering and evaporation. The polycrystalline semiconductor TFT display element which has relatively controlled high electron and positive hole mobility and low electric current leakage qualities and the monocrystalline semiconductor TFT peripheral circuit which has high electron and positive hole mobility and high drivability are formed on the same support substrate because the polycrystalline semiconductor layer on which the crystal grain size (high electron and positive hole mobility) is controlled by the solid phase deposition of 600~650° C. for 10~15 hours, is formed in the display element after ion implantation or ion doping the amorphous semiconductor layer or the amorphous or the polycrystalline mixture semiconductor layer or the polycrystalline semiconductor layer of the display area selectively with group IV elements (Si, Ge, tin and the lead etc.) for Si with polycrystalline constitution elements, in the example of $1\times10^{21}$ atoms/cc or more (for example, filling the dose quantity, etc. of $SiF_4$ etc. 30 KeV, $1\times10^{15}$ Atoms/cm$^2$). With this, you can obtain a high intensity, high definition and sophisticated ultra slim electrooptic display device unit which has high electron and positive hole mobility and low electric current leakage qualities by attaching the backings after separating the support substrate from the porous semiconductor layer and dividing the assembly into each ultra slim electrooptic display device unit. Furthermore, you can obtain a polycrystalline SiTFT of high quality with high carrier mobility because, for example, when the polycrystalline Si layer with controls crystal grain size, contains at least a total of one of group IV elements such as Ge, tin and lead in the proper quantity (for example $1\times10^{18}$~$1\times10^{20}$ atoms/cc) with this solid phase growth, it decreases the irregularity which exists in the grain boundary of the polycrystalline Si layers and also decreases that film stress.

The manufacturing process for the twenty fifth ultra slim electrooptic display device unit in this invention includes as follows; in the aforementioned claim 1~5 and 11~13 and 17~ In 19, a process to form the polycrystalline semiconductor layers, which controls the crystal grain size by re-crystallizing the polycrystalline semiconductor layer of the display area, and processes to form the display element in the polycrystalline semiconductor layer where the crystal grain size is controlled in the display area and to form a peripheral circuit area in the monocrystalline semiconductor layer of the peripheral circuit area.

With to this production method, in the aforementioned claim 1~5, 11~13 and 17~19, the monocrystalline semiconductor layer is formed in the peripheral circuit area and polycrystalline semiconductor layer is formed in the display area with semiconductor epitaxial growth. Exposing to the polycrystalline-semiconductor layer in the display area selectively, Xe flash lamp annealing or pulse condition or Continuous wave laser annealing with for example the excimer laser, the optical harmonic irregularity with the nonlinear optics effect or/and the near ultraviolet radiation laser, the visible optical laser or the infrared ray laser etc., or by condensing lamp annealing for example irradiating via an ultraviolet lamp, the visual optical lamp and the infrared ray lamp, etc. and by re-crystallizing with melting, semi-melting or heating and cooling of the non-melted circumstance, it forms a polycrystalline semiconductor layer which has controlled crystal grain size, in the display element. It is possible to form a polycrystalline semiconductor TFT display element which has arbitrarily controlled low high electron and positive hole mobility and low electric current leakage qualities, and the monocrystalline semiconductor TFT peripheral circuit with high drivability with high electron and positive hole mobility on the same support substrate. With this, you can obtain a high intensity, high definition and sophisticated ultra slim electrooptic display device unit which has high electron and positive hole mobility and low electric current leakage qualities by attaching the backings after separating the support substrate from the porous semiconductor layer and dividing the assembly into each ultra slim electrooptic display device unit.

Meanwhile, it is possible to see improvements to the polycrystalline semiconductor layer of the display area due to flash lamp annealing, laser annealing or condensing lamp annealing of the semiconductor active layer for example, from the surface to a depth of 50~200 nm (depending on the type of fill ion and fill depth, laser type selection, etc.).

The manufacturing process for the twenty sixth ultra slim electrooptic display device unit in this invention includes as follows; in the aforementioned claim 6~10 and 14~16 and 20~22, a process to form polycrystalline semiconductor layers which control the crystal grain size by re-crystallizing the amorphous semiconductor layer of the display area or the amorphous and polycrystalline mixture semiconductor layers or the polycrystalline semiconductor layers, and a process to form the peripheral circuitry in the monocrystalline semiconductor layer of the peripheral circuit area and the display element in the polycrystalline semiconductor layer which controls crystal grain size, in the display area.

With this production method, the aforementioned claim 1~5, 11~13 and 17~19, the amorphous semiconductor layer or the amorphous and the polycrystalline mixture semiconductor layers or polycrystalline semiconductor layer in the display area and the monocrystalline semiconductor layer in the peripheral circuit area are formed. The amorphous semiconductor layer or the amorphous and the polycrystalline mixture semiconductor layer or the polycrystalline semiconductor layer in the display area are selectively exposed with Xe flash lamp annealing or pulse conditioning or Continuous wave laser annealing, for example with excimer laser, the optical harmonic irregularity with the nonlinear optics effect or/and the near ultraviolet radiation laser, the visible optical laser and the infrared ray laser etc., or by condensing lamp annealing for example irradiating with an ultraviolet lamp, the visual optical lamp and the infrared ray lamp, etc. and by re-crystallizing with melting, semi-melting or heating and cooling of the non-melted circumstance, it forms a polycrystalline semiconductor layer in which the crystal grain size is controlled in the display element. It is possible to form a polycrystalline semiconductor TFT display element which has arbitrarily controlled low high electron and positive hole mobility and low electric current leakage qualities, and the monocrystalline semiconductor TFT peripheral circuit with high drivability with high electron and positive hole mobility on the same support substrate. With this, you can obtain a high intensity, high definition and sophisticated ultra slim electrooptic display device unit which has high electron and positive hole mobility and low electric current leakage qualities by attaching the backings after separating the support substrate from the porous semiconductor layer and dividing the assembly into each ultra slim electrooptic display device unit.

Meanwhile, it is possible to see improvements to the polycrystalline semiconductor layer of the display area due to flash lamp annealing, laser annealing or condensing lamp annealing of the semiconductor active layer for example, from the surface to a depth of 50~200 nm (depending on the type of fill ion and fill depth, laser type selection, etc.).

The manufacturing process for the twenty seventh ultra slim electrooptic display device unit in this invention includes as follows; in the aforementioned claim 1~5, 11~13 and 17~19, a process to form the polycrystalline semiconductor layer which controls crystal grain size by re-crystallizing the display area after ion implantation or the ion doping selectively with a minimum of one kind of group IV elements such as silicon, tin, germanium and lead to the polycrystalline semiconductor layers of the display area, and a process to form the peripheral circuitry in monocrystalline semiconductor layer of the peripheral circuit area and the display element in the polycrystalline semiconductor layer of the peripheral circuit area.

With this manufacturing method, the aforementioned claim 1~5, 11~13 and 17~19, the polycrystalline semiconductor layer is formed in the display area by semiconductor epitaxial growth and the monocrystalline semiconductor layer is formed in the peripheral area. After ion implantation on or ion doping selectively with at least one kind of group IV elements such as silicon, tin, germanium and lead, for example with Si ion $1\times10^{21}$ atoms/cc or more, (for example $SiF_4$ etc. 30 KeV, $1\times10^{15}$ atoms/cm$^2$) to the polycrystalline semiconductor in the display area and by selectively exposing to the polycrystalline semiconductor layer in the display area mentioned before by Xe flash lamp annealing, or pulse conditioning or Continuous wave laser annealing, for example with excimer laser, the optical harmonic irregularity with the nonlinear optics effect or/and the near ultraviolet radiation laser, the visible optical laser or the infrared ray laser etc., or by condensing lamp annealing for example irradiating via an ultraviolet lamp, the visual optical lamp and the infrared ray lamp, etc. and by re-crystallizing with melting, semi-melting or heating and cooling of the non-melted circumstance, it forms a polycrystalline semiconductor layer which has controlled crystal grain size, in the display element. It is possible to form a polycrystalline semiconductor TFT display element which has arbitrarily controlled low high electron and positive hole mobility and low electric current leakage qualities, and the monocrystalline semiconductor TFT peripheral circuit with high drivability with high electron and positive hole mobility on the same support substrate. With this, you can obtain a high intensity, high definition and sophisticated ultra slim electrooptic display device unit which has high electron and positive hole mobility and low electric current leakage qualities by attaching the backings after separating the support substrate from the porous semiconductor layer and dividing the assembly into each ultra slim electrooptic display device unit.

Meanwhile, it is possible to see improvements to the polycrystalline semiconductor layer of the display area due to flash lamp annealing, laser annealing or condensing lamp annealing of the semiconductor active layer for example, from the surface to a depth of 50~200 nm (depending on the type of fill ion and fill depth, laser type selection, etc.).

And if the polycrystalline Si film on which the crystal grain size is controlled by flash lamp annealing, laser annealing or condensing lamp annealing, contains the proper quantity ($1\times10^{18}$~$1\times10^{20}$ atoms/cc) at a minimum of the total of one kind of group IV elements such as Ge, tin and lead, you can obtain a polycrystalline SiTFT of high quality with high carrier mobility because it decreases the irregularity which exists in the grain boundary of Polycrystalline Si layers and also decreases the film stress.

The manufacturing process for the twenty eighth ultra slim electrooptic display device unit in this invention includes as follows;

in the aforementioned claim 6~10, 14~16 and 20~22, which controls crystal grain size by re-crystallizing the display area after ion implantation or the ion doping selectively with a minimum of one kind of group IV elements such as silicon, tin, germanium and lead to the polycrystalline semiconductor layers of the display area, and a process to form the peripheral circuitry in monocrystalline semiconductor layer of the peripheral circuit area and the display element in the polycrystalline semiconductor layer of the peripheral With this manufacturing method, the aforementioned claim 6~10, 14~16 and 20~22, the amorphous semiconductor layer or the amorphous and the polycrystalline mixture semiconductor layer or the polycrystalline semiconductor layer are formed in the display area and the monocrystalline semiconductor layer is formed in the peripheral area. After ion implantation and ion doping selectively with at least one kind of group IV elements such as silicon, tin, germanium and lead, for example the Si ion $1\times10^{21}$ atoms/cc or more, (for example $SiF_4$, etc. 30 KeV, $1\times10^{15}$ atoms/cm$^2$) to the amorphous semiconductor layer or the amorphous and the polycrystalline mixture semiconductor layer or the polycrystalline semiconductor in the display area, and by exposing the amorphous semiconductor layer or the amorphous and the polycrystalline mixture semiconductor layer or the polycrystalline semiconductor layer in the display area mentioned before selectively with Xe flash lamp annealing or pulse conditioning or Continuous wave laser annealing, for example with excimer laser the optical harmonic irregularity with the nonlinear optics effect or/and the near ultraviolet radiation laser, the visible optical laser or the infrared ray laser etc., or by condensing lamp annealing for example irradiating via an ultraviolet lamp, the visual optical lamp and the infrared ray lamp, etc. and by re-crystallizing with melting, semi-melting or heating and cooling of the non-melted circumstance, it forms a polycrystalline semiconductor layer which has controlled crystal grain size, in the display element. It is possible to form a polycrystalline semiconductor TFT display element which has arbitrarily controlled low high electron and positive hole mobility and low electric current leakage qualities, and the monocrystalline semiconductor TFT peripheral circuit with high drivability with high electron and positive hole mobility on the same support substrate. With this, you can obtain a high intensity, high definition and sophisticated ultra slim electrooptic display device unit which has high electron and positive hole mobility and low electric current leakage qualities by attaching the backings after separating the support substrate from the porous semiconductor layer and dividing the assembly into each ultra slim electrooptic display device unit.

Meanwhile, it is possible to see improvements to the polycrystalline semiconductor layer of the display area due to flash lamp annealing, laser annealing or condensing lamp annealing of the semiconductor active layer for example, from the surface to a depth of 50~200 nm (depending on the type of fill ion and fill depth, laser type selection, etc.).

And if the polycrystalline Si film on which the crystal grain size is controlled by flash lamp annealing, laser annealing or condensing lamp annealing, contains the proper quantity ($1\times10^{18}$~$1\times10^{20}$ atoms/cc) at a minimum of the total of one kind of group IV elements such as Ge, tin and lead, you can obtain a polycrystalline SiTFT of high quality with high carrier mobility because it decreases the irregularity which exists in the grain boundary of Polycrystalline Si layers and also decreases the film stress.

The manufacturing process for the twenty ninth ultra slim electrooptic display device unit in this invention includes as follows; in the aforementioned claim 1~5, 11~13 and 17~19, a process to form both the polycrystalline semiconductor layers, which contains at least one kind of group IV elements such as tin, germanium and lead with semiconductor epitaxial growth in the display area, and the monocrystalline semiconductor layer which does not include the group IV elements, in the peripheral circuit area, a process to form the polycrystalline semiconductor layers which control the crystal grain size with the solid phase growing the polycrystalline semiconductor layer of the display area, a process to both form the display elements on the polycrystalline semiconductor layer, with controlled crystal grain size in the display area and the peripheral circuitry on the monocrystalline semiconductor layer of the display area.

According to this manufacturing method, the aforementioned claim 1~5, 11~13 and 17~19, the polycrystalline semiconductor layer which contains at least one kind of group IV elements such as tin, germanium and lead is formed in the display area with semiconductor epitaxial growth, and a monocrystalline semiconductor layer which does not include group IV elements if formed in the aforementioned peripheral circuit area. It is possible to form a polycrystalline semiconductor TFT display element which has arbitrarily controlled low high electron and positive hole mobility and low electric current leakage qualities, and the monocrystalline semiconductor TFT peripheral circuit with high drivability with high electron and positive hole mobility on the same support substrate, because the display element is formed on the polycrystalline semiconductor layer, which controls crystal grain size in the display area, and the peripheral circuit in the monocrystalline semiconductor layer of the peripheral area. And by separating the support substrate from the deformative area of the porous semiconductor layer and the ion implantation layer and attaching the backing together and then by dividing the assembly into each ultra slim electrooptic display device unit, With this, you can obtain a high intensity, high definition and sophisticated ultra slim electrooptic display device unit which has high electron and positive hole mobility and low electric current leakage qualities.

And if the polycrystalline Si film on which the crystal grain size is controlled by flash lamp annealing, laser annealing or condensing lamp annealing, contains the proper quantity ($1\times10^{18}$~$1\times10^{20}$ atoms/cc) at a minimum of the total of one kind of group IV elements such as Ge, tin and lead, you can obtain a polycrystalline SiTFT of high quality with high carrier mobility because it decreases the irregularity which exists in the grain boundary of Polycrystalline Si layers and also decreases the film stress.

The manufacturing process for the thirtieth ultra slim electrooptic display device unit in this invention includes as follows; in the aforementioned claim 1~5, 11~13 and 17~19, a process to form the polycrystalline semiconductor layers which contains at least 1 kind of the group IV elements such as tin, germanium and lead with semiconductor epitaxial growth in the display area and the monocrystalline semiconductor layer which does not contain group IV elements in the peripheral circuitry, a process to form a polycrystalline semiconductor layer where the crystal grain size is controlled by re-crystallizing the polycrystalline semiconductor layer in the display area, a process to form the display area in the polycrystalline semiconductor layers which control crystal grain size of the display area and the peripheral circuit area in the monocrystalline semiconductor layer of the peripheral circuit area.

With this production method, the aforementioned claim 1~5, 11~13 and 17~19, the polycrystalline semiconductor layer which contains at least one kind of the group IV elements such as tin, germanium and lead with the semiconductor epitaxial growth, is formed and the monocrystalline semiconductor layer which does not contain group IV elements in the peripheral circuit area. In the display area of the polycrystalline semiconductor layer where the crystal grain size is controlled and by re-crystallizing with melting, semi-melting or heating and cooling of the non-melted circumstance, by exposing with Xe flash lamp annealing or pulse conditioning or continuous wave laser annealing, for example, with excimer laser, the optical harmonic irregularity with the nonlinear optics effect or/and the near ultraviolet radiation laser, the visible optical laser or the infrared ray laser etc., or by condensing lamp annealing for example irradiating via an ultraviolet lamp, the visual optical lamp and the infrared ray lamp, etc. selectively, to the polycrystalline semiconductor layer in the display area It is possible to form a polycrystalline semiconductor TFT display element which has arbitrarily controlled low high electron and positive hole mobility and low electric current leakage qualities, and the monocrystalline semiconductor TFT peripheral circuit with high drivability with high electron and positive hole mobility on the same support substrate because the peripheral circuit is formed on the monocrystalline semiconductor layer of the peripheral area. With this, you can obtain a high intensity, high definition and sophisticated ultra slim electrooptic display device unit which has high electron and positive hole mobility and low electric current leakage qualities by attaching the backings after separating the support substrate from the porous semiconductor layer and dividing the assembly into each ultra slim electrooptic display device unit.

Meanwhile, it is possible to see improvements to the polycrystalline semiconductor layer of the display area due to flash lamp annealing, laser annealing or condensing lamp annealing of the semiconductor active layer for example, from the surface to a depth of 50~200 nm (depending on the type of fill ion and fill depth, laser type selection, etc.).

And if the polycrystalline Si film on which the crystal grain size is controlled by flash lamp annealing, laser annealing or condensing lamp annealing, contains the proper quantity ($1\times10^{18}$~$1\times10^{20}$ atoms/cc) at a minimum of the total of one kind of group IV elements such as Ge, tin and lead, you can obtain a polycrystalline SiTFT of high quality with high carrier mobility because it decreases the irregularity which exists in the grain boundary of Polycrystalline Si layers and also decreases the film stress.

The manufacturing process for the thirty first ultra slim electrooptic display device unit in this invention includes as follows; in the aforementioned claim 6~10, 14~16 and 20~22, a process to form the amorphous semiconductor layer which contains at least one kind of group IV elements such as tin, germanium and lead, or the amorphous and polycrystalline mixture semiconductor layers or the polycrystalline semiconductor layers in the display area, and the monocrystalline semiconductor layer in the peripheral circuit area, a process to form a polycrystalline semiconductor layer where the crystal grain size is controlled which is done with selective solid phase deposition on the amorphous semiconductor layer in the display area or the amorphous and the polycrystalline mixture semiconductor layer or the polycrystalline semiconductor layer, and a process to form the display element in the polycrystalline semiconductor layer of the display area where the crystal grain size is controlled and the peripheral circuitry in the monocrystalline semiconductor layer of the peripheral circuit area.

With this manufacturing method, the aforementioned claim 6~10, 14~16 and 20~22, the amorphous semiconductor layer or the amorphous and the polycrystalline mixture semiconductor layer or the polycrystalline semiconductor layer which contains at least one kind of the group IV elements such as tin, germanium and lead, etc., is formed in the display area, and the monocrystalline semiconductor layer is formed in the peripheral circuit area. The polycrystalline semiconductor layer, where the crystal grain size is controlled by the solid phase growth, the amorphous semiconductor layer of the display area or the amorphous and the polycrystalline mixture semiconductor layer or the polycrystalline semiconductor layer are formed. It is possible to form a polycrystalline semiconductor TFT display element which has arbitrarily controlled low high electron and positive hole mobility and low electric current leakage qualities, and the monocrystalline semiconductor TFT peripheral circuit with high drivability with high electron and positive hole mobility on the same support substrate because the peripheral circuit is formed on the monocrystalline semiconductor layer of the peripheral area because the display element is formed in the polycrystalline semiconductor layer of the display area where the crystal grain size is controlled and the peripheral circuitry in the monocrystalline semiconductor layer of the peripheral circuit area. With this, you can obtain a high intensity, high definition and sophisticated ultra slim electrooptic display device unit which has high electron and positive hole mobility and low electric current leakage qualities by attaching the backings after separating the support substrate from the porous semiconductor layer and dividing the assembly into each ultra slim electrooptic display device unit.

And if the polycrystalline Si film on which the crystal grain size is controlled by flash lamp annealing, laser annealing or condensing lamp annealing, contains the proper quantity ($1\times10^{18}$~$1\times10^{20}$ atoms/cc) at a minimum of the total of one kind of group IV elements such as Ge, tin and lead, you can obtain a polycrystalline SiTFT of high quality with high carrier mobility because it decreases the irregularity which exists in the grain boundary of Polycrystalline Si layers and also decreases the film stress.

The manufacturing process for the thirty second ultra slim electrooptic display device unit in this invention includes as follows; in the aforementioned claim 6~10, 14~16 and 20~22, a process to form the amorphous semiconductor layer which contains at least one kind of group IV elements such as tin, germanium and lead, or the amorphous and the polycrystalline mixture semiconductor layers or the polycrystalline semiconductor layers in the display area, and the monocrystalline semiconductor layer in the peripheral circuit area, a process to form a polycrystalline semiconductor layer where the crystal grain size is controlled by selectively re-crystallizing the amorphous semiconductor layer or the amorphous and the polycrystalline mixture semiconductor layer or polycrystalline semiconductor layer in the display area, and a process to form display elements in the polycrystalline semiconductor layer where the crystal grain size is controlled and the peripheral circuitry is formed in the monocrystalline semiconductor layer of the peripheral circuit area of the display area.

According to this manufacturing method, the aforementioned claim 6~10, 14~16 and 20~22, the amorphous semiconductor layer, which contains at lease one kind of group IV elements such as tin, germanium and lead, or the amorphous and the polycrystalline mixture semiconductor layer or the polycrystalline semiconductor layer are formed in the aforementioned display area, and the monocrystalline semiconductor layer is formed in the aforementioned peripheral circuit area. In the display area of the polycrystalline semiconductor layer where the crystal grain size is controlled and by re-crystallizing with melting, semi-melting or heating and cooling of the non-melted circumstance, by exposing with Xe flash lamp annealing or pulse conditioning or continuous wave laser annealing, for example, with excimer laser, the optical harmonic modulated with the nonlinear optics effect or/and the near ultraviolet radiation laser, the visible optical laser or the infrared ray laser etc., or by condensing lamp annealing for example irradiating via an ultraviolet lamp, the visual optical lamp and the infrared ray lamp, etc. relative to the amorphous semiconductor layer or the amorphous and the polycrystalline mixture semiconductor layer of the display area. It is possible to form a polycrystalline semiconductor TFT display element which has arbitrarily controlled low high electron and positive hole mobility and low electric current leakage qualities, and the monocrystalline semiconductor TFT peripheral circuit with high drivability with high electron and positive hole mobility on the same support substrate because the peripheral circuit is formed on the monocrystalline semiconductor layer of the peripheral area. With this, you can obtain a high intensity, high definition and sophisticated ultra slim electrooptic display device unit which has high electron and positive hole mobility and low electric current leakage qualities by attaching the backings after separating the support substrate from the porous semiconductor layer and dividing the assembly into each ultra slim electrooptic display device unit.

Meanwhile, it is possible to see improvements to the polycrystalline semiconductor layer of the display area due to flash lamp annealing, laser annealing or condensing lamp annealing of the semiconductor active layer for example, from the surface to a depth of 50~200 nm (depending on the type of fill ion and fill depth, laser type selection, etc.).

And if the polycrystalline Si film on which the crystal grain size is controlled by flash lamp annealing, laser annealing or condensing lamp annealing, contains the proper quantity ($1\times10^{18}$~$1\times10^{20}$ atoms/cc) at a minimum of the total of one kind of group IV elements such as Ge, tin and lead, you can obtain a polycrystalline SiTFT of high quality with high carrier mobility because it decreases the irregularity which exists in the grain boundary of Polycrystalline Si layers and also decreases the film stress.

In the $1^{st}$ through the $32^{nd}$ manufacturing methods for the electrooptical display device unit invention mentioned above, it is desirable to separate the support substrate from the monocrystalline semiconductor layer after forming a groove at least to the porous semiconductor layer or to the ion implantation layer along the division line that is the division boundary within the scribe line, when dividing the assembly into each ultra slim electrooptic display device unit.

The separation of the support substrate becomes easy for the ultra slim type or the electrooptical display element substrate layer of the ultra slim type SOI structure because of this process. Furthermore, the cracking, chipping and occurrence of cracks at the time of channel forming are prevented because the electrooptical display element substrate layer of ultra slim type or ultra slim type SOI is supported by the support substrate during the channel formation.

The separation of the porous semiconductor layer or ion implantation layer from the deformative area after the annealing process for exfoliation can be accomplished with the injection of a high pressure jet of fluid, vapor, liquid or a mixture of vapor and liquid into the deformative area of the ion implantation while turning the porous semiconductor layer or after the annealing process for exfoliation. It is very possible to separate effectively with the injection of a high pressure fluid jet of a mixture of liquid and vapor, due to the impact force of the bubbles of vapor that develop in the fluid in a mixture of vapor and fluid.

Now, if the high pressure fluid jet injection happens to add minute amounts of solid matter, it is possible to effectively directly separate the minute solid matter that collides with the porous semiconductor layer or the deformative area of the ion implantation layer after the annealing process for exfoliation. In addition, if the high pressure fluid jet injection takes the form of ultrasonic waves, the ultrasonic vibration operates in the deformative area of ion implantation layer or the porous semiconductor layer after the annealing process for exfoliation. Then, it is possible to more effectively separate at the deformative area of porous semiconductor layer or ion implantation layer after the annealing process for exfoliation.

Also, the separation from the porous semiconductor layer or the ion implantation layer can be done with laser processing or laser water jet processing to the porous semiconductor layer or the ion implantation layer while it is turning. Especially, in case where the groove is formed before the separation, it can be separated by the laser processing or the laser water jet processing to the porous semiconductor layer or the ion implantation layer while it is turning, or by the high pressure fluid jet injection to the deformative area of porous semiconductor layer or the ion implantation layer after the anneal processing for exfoliation which is in the midst of the turning.

With the manufacturing method for the ultra slim electrooptic display device unit in this invention mentioned above, an ultra slim and reflective LCD as an ultra slim electrooptic display device unit can be obtained by separating the support substrate after sealing and laminating the facing substrate and by injecting the liquid crystal though the specified liquid crystal gap which is formed by the display element and the peripheral circuit on the support substrate, and by attaching the backing to the ultra slim electrooptic display element substrate after its separation and then after dividing the assembly into each ultra slim electrooptic display device unit.

The ultra slim reflective LCD is separated from the support substrate after sealing and laminating the facing substrate through the specified liquid crystal gap on the support substrate which forms the display element and the peripheral circuit. The LCD is obtained by attaching the non-defective chip of the backing to the non-defective chip inside the ultra slim electrooptic display element substrate after its separation and then, dividing the assembly into each ultra slim electrooptic display device unit after injecting the liquid crystal.

In addition, in the production method of the ultra slim electrooptical display of this invention as described above, the backings are attached with sealant to an ultra slim electrooptic display element substrate after its separation, a facing substrate which has had the alignment film formed on it or had alignment treatment through transparent electrode formation, and an electrooptic display element substrate, which had the alignment treatment or alignment film formation. These are sealed and laminated through the specified liquid crystal gap. An ultra slim reflective LCD can be obtained by injecting the liquid crystal to each ultra slim electrooptic display device unit after its division.

The ultra slim reflective LCD can be obtained with following process. The backing is attached with sealant to the ultra slim electrooptic display element substrate after its separation, the non-defective chip of the facing substrate which has had the alignment film formed on it or had alignment treatment through transparent electrode formation, is sealed and laminated on to the non-defective chip inside the electrooptic display element substrate, which has had alignment film formation and alignment treatment, through the specified liquid crystal gap. The LCD is filled and sealed with the liquid crystal for each ultra slim electrooptic display device unit after its separation, or the LCD can be obtained by dividing the assembly into each ultra slim electrooptic display device unit after it is injected with the liquid crystal.

Or, the ultra slim reflective LCD can be obtained with the following process. The backing is attached with sealant to the ultra slim electrooptic display element substrate after its separation, the non-defective chip of the facing substrate, which has had the alignment film formed on it or had alignment treatment through transparent electrode formation, and which is cut, sealed and laminated to the non-defective chip inside the electrooptic display element substrate, which has had alignment film formation and alignment treatment through the specified liquid crystal gap. The LCD can be obtained by dividing the assembly into each ultra slim electrooptic display device unit after it is injected with the liquid crystal.

And, the ultra slim reflective LCD can be obtained with following process. The non-defective chip of the facing substrate is sealed through the specified liquid crystal gap to the non-defective chip inside the electrooptic display element substrate of monocrystalline semiconductor layer. After injecting the liquid crystal, the support substrate is separated. Then, the backing is attached with sealant to the inside of the ultra slim electrooptic display element substrate after its separation. The LCD can be obtained by dividing the assembly into each ultra slim electrooptic display device unit.

Or, the ultra slim reflective LCD can be obtained with following process. The non-defective chip of the facing substrate is sealed to the non-defective chip inside the electrooptic display element substrate of monocrystalline semiconductor layer through specified liquid crystal gap. After injecting the liquid crystal, the support substrate is separated. Then, the backing of non-defective chip is attached with sealant to the non-defective chip inside the ultra slim electrooptic display element substrate after its separation. The LCD can be obtained by dividing the assembly into each ultra slim electrooptic display device unit.

On the other hand, with the manufacturing method mentioned above for ultra slim electrooptic display device unit of this invention, the ultra slim reflective LCD as an ultra slim electrooptic display device unit can be obtained by removing the equivalent area to the pixel opening section of the display area in the electrooptic display element substrate by etching, and then, by planarizing the surface of this removed area with an optically transparent material. The transparent electrode which connects to the pixel display element is formed on top of this. The electrooptic display element substrate, which has had alignment layer formation and orientation treatment, is laminated and sealed to the facing substrate which has had the alignment layer formation and orientation treatment forming the transparent electrode, through the specified liquid crystal gap. The support substrate is separated and the transparent backing is attached to the ultra slim electrooptic display element with transparent sealant unit after its separation. The LCD is obtained by injecting the liquid crystal after dividing the assembly into each ultra slim electrooptic display device unit.

With the manufacturing method mentioned above of ultra slim electrooptic display device unit in this invention, the ultra slim reflective TYPE LCD as an ultra slim electrooptic display device unit can be obtained by removing the equivalent area to the pixel opening section of the display area in the electrooptic display element substrate by etching, and then, planarizing the surface of this removed area with an optically transparent material. The transparent electrode which connects to the pixel display element is formed on top of this. The electrooptic display element substrate, which has had alignment layer formation and orientation treatment, is laminated and sealed to the facing substrate, which has had the alignment layer formation and orientation treatment forming the transparent electrode, through the specified liquid crystal gap. The support substrate is separated, and the non-defective transparent backing chip is attached with transparent sealant to the non-defective chip of the ultra slim electrooptic display element unit after its separation. The LCD is obtained by injecting the liquid crystal after dividing the assembly into each ultra slim electrooptic display device unit.

Or, the ultra slim reflective TYPE LCD can be obtained with the following process. The equivalent part to the pixel opening section of the display area in the electrooptic display element substrate is removed by etching, and the surface of this removed area is planarized with an optically transparent material. The transparent electrode which connects to the pixel display element is formed on top of this, the non-deformative chip of the facing substrate, which has had alignment layer formation and orientation treatment by forming the transparent electrode which connects to the pixel display element on top of it, to the non-deformative chip inside the electrooptic display element substrate, which has had alignment layer formation and orientation treatment, are laminated and sealed through the specified liquid crystal gap. After that, the liquid crystal is injected and then, the support substrate is separated. A minimum optical of the transparent material of the pixel opening section of the display area is exposed and the transparent support s attached with transparent sealant to the ultra slim electrooptic display device unit after its separation. The LCD is obtained by injecting the liquid crystal after dividing the assembly into each ultra slim electrooptic display device unit.

Or, the ultra slim reflective TYPE LCD can be obtained with the following process. The equivalent area to the pixel opening section of the display area in the electrooptic display element substrate is removed by etching, and the surface of this removed area is planarized with an optically transparent material. The transparent electrode which connects to the pixel display element is formed on top of this. The non-defective chip of the facing substrate which has had alignment layer formation and alignment treatment by forming transparent electrode is sealed to the non-deformative chip inside the electrooptic display element substrate which is has had alignment layer formation and alignment treatment through the specified liquid crystal gap. After that, the LCD is injected with liquid crystal and then, separated from the support substrate. A minimum of the optical transparency material of the pixel opening section of the display area is exposed and it attaches with transparent sealant to the non-defective chip of transparent support to the non-defective chip which is inside the ultra slim electrooptic display device unit after its separation. Then, the LCD can be obtained by dividing the assembly into each ultra slim electrooptic display device unit.

And the ultra slim transmissive type LCD can be obtained as follows. By sealing and laminating the non-defective chip inside the electrooptic display element substrate that has had alignment layer formation and orientation treatment, to the non-defective chip of the facing substrate which has had alignment layer formation and orientation treatment by transparent electrode formation. It is injected with the liquid crystal through the specified liquid crystal gap, and the support substrate is separated. The transparent backing is attached with transparent sealant inside the ultra slim electrooptic display element substrate after its separation by dividing the assembly into each ultra slim electrooptic display device unit.

Or, the ultra slim transmissive type LCD can be obtained as follows. By sealing and laminating the non-defective chip inside the electrooptical display element substrate that has had alignment layer formation and orientation treatment, to the non-defective chip of the facing substrate which has had alignment layer formation and orientation treatment by transparent electrode formation. It is injected with the liquid crystal through the specified liquid crystal gap, and the support substrate is separated. The transparent backing is attached with transparent sealant inside the ultra slim electrooptic display element substrate after its separation by dividing the assembly into each ultra slim electrooptic display device unit.

Also, ultra slim transmissive type LCD of this invention mentioned above can be obtained with the manufacturing method for ultra slim electrooptic display device unit as follows. After attaching the transparent backing with transparent sealant to the ultra slim electrooptic display element substrate after its separation, the equivalent area to the pixel opening section of display area of electrooptic display element substrate is removed by etching. The surface of the removed area is planarized with an optically transparent material, forming the clear electrode which is connected to pixel display element. The electrooptic display element substrate which has had alignment layer formation and orientation treatment, and the facing substrate which has had alignment layer formation and orientation treatment, are laminated and sealed through the specified liquid crystal gap. Then, the LCD can be obtained by dividing the assembly into each ultra slim electrooptic display device unit.

Also, ultra slim transmissive type LCD can be obtained as follow. After attaching a transparent backing with transparent sealant to the ultra slim electrooptic display element substrate after its separation, the equivalent area to the pixel opening section of the display area of the electrooptic display element substrate is removed by etching. The surface of the removed area is planarized with an optically transparent material, forming the clear electrode which is connected to the pixel display element, the non-defective chip inside the electrooptic display element substrate which has had alignment layer formation and orientation treatment, and the non-defective chip of the facing substrate which has had alignment layer formation and orientation treatment. It is then cut, are laminated and sealed through the specified liquid crystal gap. Then, the LCD can be obtained by injecting the liquid crystal into each ultra slim electrooptic display device unit after dividing or by dividing the assembly into each ultra slim electrooptic display device unit after injecting the liquid crystal.

Or, ultra slim transmissive type LCD can be obtained as follows. After attaching a transparent backing with transparent sealant to the ultra slim electrooptic display element substrate after its separation, the equivalent area to the pixel opening section of the display area of the electrooptic display element substrate is removed by etching. The surface of the removed area is planarized with an optically transparent material, forming the clear electrode which is connected to the pixel display element, the non-defective chip of the electrooptic display element substrate which has had alignment layer formation and orientation treatment, and the non-defective chip of the facing substrate which has had alignment layer formation and orientation treatment. This is cut, laminated and sealed through the specified liquid crystal gap. Then, the LCD can be obtained by injecting the liquid crystal.

Also, for super thin transmissive type LCD, by attaching with a light-resistant transparent sealant to the separated super thin electrooptical display element substrate and the transparent substrate, for example, glass without an antireflective film with an optical quality of rectilinear transmissivity of 80% or more and with at least 1 (W/m*K) of thermal conductivity, for instance, quartz glass and transparent crystallized glass (neoceram, CLEARCERAM, Zerodur, etc.) etc., furthermore, glass without an antireflective film, and with an optical quality of rectilinear transmissivity of 80% or more and with at least 10 (W/m*K) of thermal conductivity, for example highly transmissive ceramic polycrystalline substances {crystalline oxides created by electromelting or sintering of MgO (magnesia), $Y_2O_3$(yttrium), CaO (Calcium Oxide), $AL_2O_3$(Monocrystalline sapphire), BeO (beryllia), polycrystalline sapphires, etc., monocrystalline or polycrystalline of double oxide crystalline YAG (Yttrium Aluminum Garnet), monocrystalline or polycrystalline $MgAl_2O_4$(Spinel), $3Al_2O_3 2SiO_2 Al_2O_3 SiO_2$ and so on}, a fluoride monocrystalline body (calcium fluoride, magnesium fluoride and barium fluoride etc.), vapor phase synthetic diamond film coated highly transmissive ceramic polycrystalline substances, or a fluoride monocrystalline body or transparent crystallized glass, or the crystal etc., this transmissive type LCD for projectors achieves increased quality and reliability exhibiting high intensity, high definition and long product life and showing the high emission scattering effects vis-à-vis strong incident light.

In the meantime, you need to use the aforementioned thermally conductive glass (film highly thermal conductivity) even with the facing substrate (including the micro lens substrate, the black mask substrate, etc.), a dustproof glass with antireflective film formation for the incident side, or a dustproof glass with antireflective formation for the output side. For example, you can expect an even higher thermal radiation effect by attaching as a structure of the monocrystalline sapphire dustproof glass of antireflective film formation with incident side, the facing substrate of monocrystalline sapphire, liquid crystal layer, ultra slim electrooptic display element substrate, support substrate of monocrystalline sapphire, and monocrystalline sapphire dustproof glass with antireflective film formation with light-resistant transparent sealant.

Furthermore, in case of a reflective type LCD for projectors, by attaching with a light-resistant transparent sealant to the transparent substrate, as a facing substrate material and a dustproof glass material with antireflective film formation on the incident side as mentioned above, for example glass without an antireflective film with an optical quality of rectilinear transmissivity of 80% or more and with at least 1 (W/m*K) of thermal conductivity, for instance, quartz glass and transparent crystallized glass (neoceram, CLEARCERAM, Zerodur, etc.) etc., furthermore glass without an antireflective film, and with an optical quality of rectilinear transmissivity of 80% or more and with at least 10 (W/m*K) of thermal conductivity, for example highly transmissive ceramic polycrystalline substances {crystalline oxides created by electromelting or sintering of MgO (magnesia), $Y_2O_3$(yttrium), CaO (Calcium Oxide), $AL_2O_3$ (Monocrystalline sapphire), BeO (beryllia), polycrystalline sapphires, etc., monocrystalline or polycrystalline of double oxide crystalline YAG (Yttrium Aluminum Garnet), monocrystalline or polycrystalline $MgAl_2O_4$(Spinel), $3Al_2O_3 2SiO_2$ $Al_2O_3 SiO_2$ and so on}, a fluoride monocrystalline body (calcium fluoride, magnesium fluoride and barium fluoride etc.), vapor phase synthetic diamond film coated highly transmissive ceramic polycrystalline substances, or a fluoride monocrystalline body or transparent crystallized glass, or the crystal etc., This LCD achieves increased quality and reliability exhibiting high intensity, high definition and long product life and showing the high emission scattering effects vis-à-vis strong incident light.

Furthermore, for example, as a structure of the double refraction free monocrystalline which forms an antireflective film on the incoming radiation side or YAG polycrystalline or dustproof glass of spinel, monocrystalline or polycrystalline YAG and the facing substrate of spinel, liquid crystal layer, ultra slim electrooptic display element substrate, metallic support substrate, it is expected to have high heat diffusion effect by attaching the monocrystalline or polycrystalline which formed the antireflective film, and the dust proof glass of spinel and monocrystalline or polycrystalline YAG and the facing substrate of spinel, and attaching the ultra slim electrooptic display element substrate and metallic support substrate with the high thermal conductivity and conductivity sealant.

By the way, after injecting the liquid crystal and sealing by laminating the facing substrate with the micro lens array formation which functions as the condenser lens and has a transparent electrode and has had the alignment layer formation and the alignment process, and the ultra slim electrooptic display element substrate, which has the transparent electrode which connects to the display element and alignment layer forming and orientation treatment by etching the pixel opening section of the display area and by embedding and planarizing the surface with an optically transparent material, the support substrate is separated from the deformative area of the porous semiconductor layer and the ion implantation layer. The reminder of the exfoliation is etched as required and an optically transparent material is exposed. The ultra slim electrooptic display element substrate, which has an optically transparent material exposed through the insulating layer, and the transparent support substrate, is attached with transparent sealant, forming a micro lens array, which functions as a field lens, and makes a dual micro lens structure. With this, you can obtain a transmissive type LCD for the projector with higher intensity, high definition and long life because this dual micro lens structure can raise the effective numerical aperture of the pixel to the highest degree by raising the utilization efficiently of available light and by condensing the double micro lens function which gives a higher accuracy when compared to the former dual micro lens structure.

Furthermore, after the injecting the liquid crystal and sealing by laminating the facing substrate with the micro lens array formation, which has the reflective film formed around each micro lens and which functions as the condenser lens which has had the transparent electrode and the alignment layer formation and alignment processing, and the ultra slim electrooptic display element substrate, which has the transparent electrode, which connects to the display element, and has had the alignment layer forming and orientation treatment by etching the pixel opening section of the display area and by embedding and planarizing the surface with an optically transparent material, the support substrate is separated from the deformative area of the porous semiconductor layer and the ion implantation layer. The reminder of the exfoliation is etched as required and an optically transparent material is exposed. The ultra slim electrooptic display element substrate, which has an optically transparent material exposed through the insulating layer, and the transparent support substrate, is attached with transparent sealant, forming a micro lens array, which functions as a field lens, and makes a dual micro lens structure. With this, you can obtain a transmissive type LCD for the projector with higher intensity, high definition and long life because this dual micro lens structure can raise the effective numerical aperture of the pixel to the highest degree by raising the utilization efficiently of available light and by condensing the double micro lens function which gives a higher accuracy when compared to the former dual micro lens structure.

By the way, it is possible to improve the picture quality by removing the monocrystalline semiconductor layer of the pixel opening section of the display area by forming both the insulating film and the light-shielding metallic film in order and by embedding and planarizing the surface with an optically transparent material, and depending on the light shielding action of the opaque metal film because it can prevent a leak light to the display element due to the strong incident light, especially in case of black type metallic film with low reflective characteristics.

You can have a transmissive type LCD for the projector which is high intensity, high definition and sophisticated by preventing the electric current leak of TFT by placing the light-shielding metallic film by each pixel opening medial wall to ground the electric potential at this time and prevent the charge build up in each section as a result of strong incident light.

On the other hand, with the ultra slim semi-transmissive type TCD as an ultra slim electrooptic display device unit, with the manufacturing method for the ultra slim electrooptic display device unit in this invention mentioned above, the suitable area of the pixel opening section of the display area of the electrooptic display element substrate is removed by etching, and the surface of the removed area is embedded and planarized with an optically transparent material. Furthermore, the two areas of the pixel electrode the reflective and the transmissive, which connect to the pixel display element, is formed there and the electrooptic display element substrate which has had alignment layer formation and alignment processing, and the facing substrate which has had alignment layer formation and alignment processing and transparent electrode formation, are laminated and sealed through the specified liquid crystal gap. After that, the support substrate is separated, making an optically transparent material of the pixel opening section expose the display area. The transparent backing is attached with transparent sealant to the ultra slim electrooptic display element substrate after its separation. The LCD can be obtained by injecting the liquid crystal after dividing the assembly into each ultra slim electrooptic display device unit. With this process, you can obtain the ultra slim semi-transparent LCD which is formed with the pixel opening section of the display part of ultra slim electrooptic display element substrate where the light transmittance is low and it is difficult to transmit sufficient light with an optically transparent material.

Or, with the ultra slim semi-transmissive type LCD, the suitable area to the pixel opening section of display area of electrooptic display element substrate is removed by etching, and the surface of the removed area is embedded and planarized with an optically transparent material. Furthermore, the pixel electrode of the two areas of reflective and transmissive, which connect to the pixel display element is formed there, and the electrooptic display element substrate which has had alignment layer formation and the alignment process, and the facing substrate which has had alignment layer formation and the alignment process and transparent electrode formation, are laminated and sealed through the specified liquid crystal gap. After that, the support substrate is separated, exposing an optically transparent material of the pixel opening section of the display area. The non-defective chip of the transparent backing is attached to the non-defective chip of the ultra slim electrooptic display element substrate after its separation with transparent sealant. The LCD is obtained by injecting the liquid crystal after dividing the assembly into each ultra slim electrooptic display device unit.

Or, with the ultra slim semi-transmissive type LCD, the suitable area to the pixel opening section of display area of electrooptic display element substrate is removed by etching, and the surface of the removed area is embedded and planarized with an optically transparent material. The pixel electrode of the two areas of reflective and transmissive, which connect to the pixel display element is formed there, and the non-defective chip inside the electrooptic display element substrate which has had alignment layer formation and the alignment process, and the non-defective chip of the facing substrate which has had alignment layer formation and the alignment process and transparent electrode formation, are laminated and sealed through the specified liquid crystal gap. Then the liquid crystal is injected. After that, the support substrate is separated exposing an optically transparent material of the pixel opening section of the display area. The transparent backing is attached to the ultra slim electrooptic display element substrate after its separation with transparent sealant. The LCD is obtained by injecting the liquid crystal after dividing the assembly into each ultra slim electrooptic display device unit.

Or, with the ultra slim semi-transmissive TCD, the suitable area to the pixel opening section of the display area of the electrooptic display element substrate is removed by etching, and the surface of the removed area is embedded and planarized with an optically transparent material. The two areas of the pixel electrode the reflective and the transmissive, which connect to the pixel display element is formed there, and the non-defective chip inside the electrooptic display element substrate, which has had alignment layer formation and the alignment process, and the non-defective chip of the facing substrate which has had alignment layer formation and the alignment process and transparent electrode formation, are laminated and sealed through the specified liquid crystal gap. Then the liquid crystal is injected. After that, the support substrate is separated exposing an optically transparent material of the pixel opening section of the display area. The non-defective chip of the transparent backing is attached with transparent sealant to the non-defective chip inside the ultra slim electrooptic display element substrate after its separation. The LCD is obtained by injecting the liquid crystal after dividing the assembly into each ultra slim electrooptic display device unit.

Or, with the ultra slim semi-transmissive TCD, the two areas of the pixel electrode the reflective and the transmissive, which connect to the pixel display element is formed, and the non-defective chip inside the electrooptic display element substrate which has had alignment layer formation and the alignment process, and the non-defective chip of the facing substrate which has had alignment layer formation and the alignment process and transparent electrode formation are laminated and sealed through the specified liquid crystal gap. Then the liquid crystal is injected and the support substrate is separated. The transparent backing is attached with transparent sealant inside the ultra slim electrooptic display element substrate after its separation. The LCD is obtained by dividing the assembly into each ultra slim electrooptic display device unit.

Or, with the ultra slim semi-transmissive TCD, the two areas of the pixel electrode the reflective and the transmissive, which connect to the pixel display element is formed, and the non-defective chip inside the electrooptic display element substrate which has had alignment layer formation and the alignment process, and the non-defective chip of the facing substrate which has had alignment layer formation and the alignment process and transparent electrode formation are laminated and sealed through the specified liquid crystal gap. Then the liquid crystal is injected and the support substrate is separated. The non-defective chip of the transparent backing is attached with transparent sealant to the non-defective chip inside the ultra slim electrooptic display element substrate after its separation. The LCD is obtained by dividing the assembly into each ultra slim electrooptic display device unit.

Or, with the manufacturing method for the ultra slim electrooptic display device unit in this invention mentioned above, the transparent backing is attached with transparent sealant to the ultra slim electrooptic display element substrate after its separation. Then the suitable area to the pixel opening section of display area of electrooptic display element substrate is removed by etching and the surface of the removed area is embedded and planarized with an optically transparent material. Furthermore, the two areas of the pixel electrode the reflective and the transmissive, which connect to the pixel display element is formed there and the electrooptic display element substrate which has had alignment layer formation and the alignment process, and the facing substrate which has had alignment layer formation and the alignment process and transparent electrode formation are laminated and sealed through the specified liquid crystal gap. The ultra slim semi-transparent type LCD can be obtained by injecting the liquid crystal after dividing the assembly into each ultra slim electrooptic display device unit. With this process, you can obtain the ultra slim semi-transparent LCD which is formed with the pixel opening section of the display part of the ultra slim electrooptic display element substrate where the light transmittance is low and it is difficult for light to transmit sufficiently with an optically transparent material.

Or, with ultra slim semi-transmissive LCD, the transparent backing is attached with transparent sealant to the ultra slim electrooptic display element substrate after its separation. Then the suitable area to the pixel opening section of display area of electrooptic display element substrate is removed by etching and the surface of the removed area is embedded and planarized with an optically transparent material. Furthermore, the two areas of the pixel electrode the reflective and the transmissive, which connect to the pixel display element, are formed there and the non-defective chip of the electrooptic display element substrate which has had alignment layer formation and the alignment process, and the non-defective chip of the facing substrate which has had alignment layer formation and the alignment process and transparent electrode formation and is cut, laminated, and sealed through the specified liquid crystal gap. The ultra slim semi-transparent LCD can be obtained by injecting the liquid crystal after dividing the assembly into each ultra slim electrooptic display device unit or by dividing the assembly into each ultra slim electrooptic display device unit after injecting the liquid crystal.

Or, with the ultra slim semi-transmissive type LCD, the transparent backing is attached with transparent sealant to the ultra slim electrooptic display element substrate after its separation. Then the suitable area to the pixel opening section of display area of electrooptic display element substrate is removed by etching, the surface of the removed area is embedded and planarized with an optically transparent material. Furthermore, the two areas of the pixel electrode the reflective and the transmissive, which connect to the pixel display element, is formed there and the non-defective chip of the electrooptic display element substrate which has had alignment layer formation and the alignment process and cut, and the non-defective chip of the facing substrate which has had alignment layer formation and the alignment process and transparent electrode formation is cut, laminated and sealed through the specified liquid crystal gap. The ultra slim semi-transparent LCD can be obtained by injecting the liquid crystal.

Furthermore, with the ultra slim transmissive or semi-transmissive LCD, if the polycrystalline semiconductor layer of the display area of the ultra slim electrooptic display element substrate is thin, for example when it is less than 50 nm, it is not always necessary to embed with the optically transparent material by etching the pixel opening section depending on the purpose of usage. It is possible to lower the cost by attaching the transparent support substrate like it is, with the transparent sealant.

With the manufacturing method of the ultra slim electrooptic display device unit of this invention mentioned above, the cathode, the organic El emission layer and the anode, which are connected to the pixel display element of the support substrate which forms the display element and the peripheral circuit are formed and the support substrate is separated after sealing with a moisture proof resin. The backing is attached with a transparent sealant to the ultra slim electrooptic display element substrate after its separation. Then, you can obtain the ultra slim surface luminous organic EL as an ultra slim electrooptic display device unit by dividing the assembly into each ultra slim electrooptic display device unit.

Or, with the ultra slim surface luminous organic EL, the cathode, the organic El emission layer and the anode which are connected to the pixel display element of the support substrate which forms the display element and the peripheral circuit, are formed and the support substrate is separated after sealing with a moisture proof resin. The non-defective chip of the backing is attached with transparent sealant to the non-defective chip inside the ultra slim electrooptic display element substrate after its separation. Then, you can obtain the display by dividing the assembly into each ultra slim electrooptic display device unit.

With the manufacturing method of the ultra slim electrooptic display device unit of this invention mentioned above, the cathode, the organic El emission layer and the anode, which are connected to the pixel display element, are formed after attaching the backing with the sealant to the ultra slim electrooptic display element substrate after its separation. Then, you can obtain the ultra slim surface luminous organic EL as an ultra slim electrooptic display device unit by sealing with a moisture proof resin and by dividing the assembly into each ultra slim electrooptic display device unit.

On the other hand, with manufacturing method for the ultra slim electrooptic display device unit mentioned above in this invention, or an ultra slim underside emission organic EL as an ultra slim electrooptic display device unit, the area which is suitable to the pixel opening section of the display area of the electrooptic display element substrate is removed by etching. The surface of the removed area is embedded with an optically transparent material and planarized. The anode, the organic EL emission layer and the cathode, which are connected to the pixel display elements are formed on the support substrate which is separated after sealing with a moisture proof resin. The transparent backing is attached with sealant to the ultra slim electrooptic display element substrate after its separation. Then, the display can be obtained by dividing each ultra slim electrooptic display device unit.

Or, with the ultra slim underside emission organic EL, the area which is suitable to the pixel opening section of the display area of the electrooptic display element substrate is removed by etching. The surface of the removed area is embedded with an optically transparent material and planarized. The anode, the organic EL emission layer and the cathode, which are connected to the pixel display elements are formed on the support substrate which is separated after sealing with a moisture proof resin. The non-defective chip of the transparent backing is attached with sealant to the non-defective chip inside the ultra slim electrooptic display element substrate after its separation. Then, the display can be obtained by dividing each ultra slim electrooptic display device unit.

On the other hand, in the manufacturing method for ultra slim electrooptic display device unit in this invention mentioned above, with the ultra slim underside emission organic EL, the transparent backing is attached with transparent sealant to the ultra slim electrooptic display element substrate after its separation, the area which is suitable to the pixel opening section of the display area of the electrooptic display element substrate is removed by etching. The surface of the removed area is embedded with an optically transparent material and planarized. The anode, the organic EL emission layer and the cathode, which are connected to the pixel display elements, are formed on that, Then, the display can be obtained by sealing with a moisture proof resin and by dividing the assembly into each ultra slim electrooptic display device unit.

With the ultra slim reflective LCD and the surface luminous organic El you can achieve an ultra slim electrooptic display device unit which has high intensity, high definition, is sophisticated and highly affordable by forming a part of the peripheral circuitry including the memory circuit, etc. other than the display circuit in the monocrystalline semiconductor layer under the reflective electrode of the pixel display.

In addition, you can achieve the ultra slim electrooptic display device unit which has high intensity, high definition, is sophisticated and highly affordable by forming the peripheral circuitry and the display circuit or the peripheral circuits of the multi layer wiring structure in the monocrystalline semiconductor layer.

Furthermore, you can achieve lower cost by increasing the good quantity per wafer due to the shrinking of the LCD panel by forming the peripheral circuit in the monocrystalline semiconductor layer of the sealing area.

By the way, unlike the grating constant of the monocrystalline Si layer, for example, the silicon germanium mixture crystalline layer (called SiGe layer from now on) of the distortion impression semiconductor which impresses the distortion in the aforementioned monocrystalline Si layer is formed on the porous Si layer. It creates an insulating layer on the display area after forming the insulating layer in the entire area. Then, the poly Si layer is formed on the display area with semiconductor epitaxial growth after etching the insulating layer in the peripheral circuit area. The distortion impression semiconductor SiGe layer in the peripheral circuit area and the distortion channel layer of the monocrystalline Si layer (called the distortion Si layer from now on) in the seed are formed, or the SiGe layer of the distortion impression semiconductor is formed on the monocrystalline Si substrate with semiconductor epitaxial growth. The insulating layer is formed in the entire area and the insulating layer is left in the display area. The poly Si layer is formed in the display area with semiconductor epitaxial growth after etching the insulating layer in the peripheral area. The SiGe layer of the distortion impression semiconductor is formed in the peripheral circuit area, the distortion Si layer of the distortion channel layer in the seed or the SiGe layer of the distortion impression semiconductor on the insulating layer. The poly Si layer is formed in the display area with Si epitaxial growth, the SiGe layer of the distortion impression semiconductor in the peripheral circuit area and the distortion Si layer of the distortion channel layer in the seed. With these processes, the band structure is changed by distorting the distortion channel semiconductor layer. As a result, because the degeneracy is alleviated and the electron scattering is controlled, the electron mobility is raised. Because of this, it becomes possible to have a an ultra slim electrooptic display device unit which exhibits high performance, high definition and high quality which consists of the display part or the peripheral circuit of MOSTFT which has high electron and positive hole mobility and high drivability. For example, compared to the monocrystalline Si layer of a non-distortion channel layer, the electron hole mobility is approximately 1.76 times greater.

At this time, the germanium density in the distortion impression semiconductor layer increases from the contact surface of the porous Si layer, or from the contact surface of the monocrystalline Si substrate, or from the contact surface of the insulating layer gradually, and when the desired density is achieved, for example, when the Ge density equals to 20~30% of the gradient constitution of the distortion Si layer, the electron mobility which is desired is substantially higher with the SiGe layer surface of the distortion impression semiconductor layer.

In the meantime, with the manufacturing method for the ultra slim electrooptic display device unit in this invention, it is desirable to maintain the circumstance where ultraviolet ray light hardening tape. The circumstance of the firm retention and the surface protection by this ultraviolet ray light hardening type tape makes it possible to separate because the ultraviolet ray lighting hardening tape has strong adhesion. Especially, when the channel forms alongside the divided line inside the divided area, it is possible to prevent etching unevenness, breaking, and cracking etc. of the ultra slim electrooptic display element substrate peripheral due to the stress when separating from separated layer because the inside of the groove fills up and keeps it with the ultraviolet ray lighting hardening sealant of the ultraviolet ray light hardening tape. In addition, the tape operates as a protective layer even when etching the unnecessary porous semiconductor layers and the like. Due to this process, it is possible to prevent unevenness such as etching unevenness, breaking, cracking, etc. of the ultra slim electrooptic display element substrate periphery. Furthermore, because the tape adhesion of the ultraviolet ray light hardening tape becomes easy to weaken and exfoliate by the light of the ultraviolet rays, it is easy to remove the paste without leaving anything after the separation. Moreover, it is possible to receive the static electricity damage when separating or exfoliating because the ultraviolet ray lighting hardening tape helps to protect and prevent this damage due to electrification.

Furthermore, it is also possible to prevent electrification through the transfer of thermal expansion tape of exfoliation type which does not have sealant.

By the way, it is desirable to have at least one kind of the silicon oxide film as the insulating layer which forms the SOI structure, the silicon nitride film, the laminating film which of silicon oxide and silicon oxy-nitride, the silicon nitride film, the laminating film which laminates with the silicon oxide and the silicon nitride and the silicon oxide in order, and aluminum nitride film, but its especially desirable to include the silicon nitride film. Because of this reason, it is possible to prevent the permeation of the unnecessary elements, for example the halogen chemical element, to the monocrystalline semiconductor layer from the support substrate side during the formation process of this display element or the peripheral circuit to the monocrystalline semiconductor layer. And it is possible to prevent the monocrystalline semiconductor layer from receive the bad influences, for example curvature strain, of thermal expansion in the porous semiconductor layer which forms in the support substrate during the formation process of this display element and the peripheral circuit.

Moreover, when the monocrystalline semiconductor layer and the porous semiconductor layer under the insulating layer in the SOI structure after the separation is etched, you can obtain an ultra slim electrooptic display element substrate of the ultra slim SOI structure which does not have unevenness upon etching because the unevenness acts as a etching stopper.

With the manufacturing process of the ultra slim electrooptic display device unit in this invention, after removing the polycrystalline semiconductor layer of the pixel opening section in the display area or the amorphous semiconductor layer or the amorphous and the polycrystalline mixture semiconductor layer, the embedded surface is leveled with an optically transparent material after forming a minimum of the insulating layer and the light shielding metallic film. By coving the side section or the top and the side of the polycrystalline semiconductor layer or the amorphous semiconductor layer or the amorphous and the polycrystalline mixture semiconductor layer which forms the display element area with the light-shielding metallic film through the insulating film, the image quality is improved. Because it prevents a light leakage to the display element by the strong incident light by the light shielding action of the light-shielding metallic film and by the low reflective characteristics, especially in case of the black metallic film.

Moreover, it is possible to prevent the build up of charge in each section due to strong incident light by channeling the electric potential to the grounding light-shielding metallic film through the insulating film and to the side or the top and the side of the polycrystalline semiconductor which forms the display element of the display area. With that, you can achieve an ultra slim transmissive type LCD for the projector which exhibits high intensity, high definition and is sophisticated by preventing the electric current leakage in the TFT.

Furthermore, at this time, the transmissive LCD is obtained by embedding the optically transparent material after removing the light-shielding metallic film from the underneath of the pixel opening section in the display area because the bottom of the pixel opening section of the display area is transmissive.

By the way, the white reflective film is formed on the liquid crystal side of the facing substrate, which corresponds to the whole peripheral circuit area and the corresponding area other than the pixel opening section inside the display area of the ultra slim electrooptic display element substrate, and the black low reflective light-shielding film is formed on the surface of the transparent support substrate, which corresponds to the whole peripheral circuit area and the corresponding area other than the pixel opening section of inside the display area of the ultra slim electrooptic display element substrate. The life of the LCD panel is extended because this raises the contrast by reflecting the unnecessary part of the strong incident light and decreases the rise in liquid crystal temperature.

Furthermore, the image quality is increased by preventing the electric current leakage of the TFT and by preventing the leakage of the reflected light from the back with the black low reflective light-shielding film.

At this time, with the separation method for the double porous semiconductor layer, it is desirable to make the diameter of the seed substrate which forms the monocrystalline semiconductor layer through the porous semiconductor layer slightly smaller or larger than the diameter of the support substrate which forms the monocrystalline semiconductor layer through the porous semiconductor layer. Because of this, the seed substrate is separated by applying high pressure fluid jet injection or the laser water jet injection, etc to the porous semiconductor layer from the immediate side direction or a diagonal direction. At the same time, the support substrate will not be separated from the porous semiconductor layer of the support substrate because it weakens the impact of the high pressure fluid jet injection or the injection or the laser water jet injection, etc., to the porous semiconductor layer of the support substrate.

Also, with the manufacturing method of separation for the double porous semiconductor layer, it is desirable that the porous semiconductor layer which forms in the seed substrate has a higher porosity rate than the porous semiconductor layer which forms in the support substrate. And it is desirable that the porous semiconductor layer which forms in the seed substrate is thicker than the porous semiconductor layer which forms in the support substrate.

Because of these reasons, the separation of the seed substrate can be done securely, and we are able to ease the porosity rate and thickness adjustment of the porous semiconductor layer of the seed substrate and the support substrate. During the process of forming the display element and the peripheral circuit, we can prevent damage, for example, curve distortion or temperature expansion of the porous semiconductor layer, when the monocrystalline semiconductor layer forms on the support substrate.

Etching unevenness, breaking and cracking of the ultra slim SOI layer in the peripheral part can be prevented by doing C molding in the peripheral area in the surface of the support substrate which includes the ultra slim SOI layer after separating the seed substrate, and, not only for the aforementioned separation method for the double porous semiconductor layer, but also for the separation method of the double ion implantation layer and the separation method of the porous/ion implantation layer.

You can arbitrarily set the angle and the width of C molding, and it is desirable to do this with the grindstone, the diamond wheel and the laser, etc. Furthermore, it is possible to do the light etching with the hydrofluoric acid etchant to remove the Si dust and the micro cracks as required.

(Effect of Invention)

The effect below can be seen with this invention.

(1) The insulating layer is formed on the surface of the crystal semiconductor layer and the insulating layer of the peripheral circuit area is removed by leaving the insulating layer of the display area. The polycrystalline semiconductor layer is formed on the display area and the monocrystalline semiconductor layer is formed on the peripheral circuit area with semiconductor epitaxial growth. By forming the display element on the polycrystalline semiconductor layer of the display area where the crystal grain size is arbitrarily controlled (high electron and positive hole mobility) with the flash lamp annealing method or the solid phase deposition method or the laser annealing method, etc. as required, and forming the peripheral circuit on the monocrystalline semiconductor layer in the peripheral area, it is possible to form the polycrystalline semiconductor layer TFT display element which has relatively low high electron and positive hole mobility that is arbitrarily controlled and exhibits low electric current leakage qualities, and the monocrystalline semiconductor TFT peripheral circuit, which has high electric positive hole mobility and high drivability, inside the same substrate. By this, the ultra slim electrooptic display device unit such as the transmissive type LCD, the reflective type LCD, the semi-transmissive type LCD, the surface luminous organic EL and the undersurface luminous organic EL, etc. can be obtained. Those units are high intensity, high definition, and sophisticated, have high electron and positive hole mobility and low electric current leakage qualities and are suitable for a device that emits a strong light such as the light from a projector, etc.

(2) The display area of the monocrystalline semiconductor layer is removed and the insulating layer is exposed. The polycrystalline semiconductor layer is formed on the display area and the monocrystalline semiconductor layer is formed on the peripheral circuit area with semiconductor epitaxial growth. By forming the display element on the polycrystalline semiconductor layer of the display area where the crystal grain size is arbitrarily controlled (high electron and positive hole mobility) with the flash lamp annealing method or the solid phase deposition method or the laser annealing method, etc. as required, and forming the peripheral circuit on the monocrystalline semiconductor layer in the peripheral area, it is possible to form the polycrystalline semiconductor layer TFT display element which has relatively low high electron and positive hole mobility that is arbitrarily controlled and exhibits low electric current leakage qualities, and the monocrystalline semiconductor TFT peripheral circuit, which has high electric positive hole mobility and high drivability, inside the same substrate. By this, the ultra slim electrooptic display device unit such as the transmissive type LCD, the reflective type LCD, the semi-transmissive type LCD, the surface luminous organic EL and the undersurface luminous organic EL, etc. can be obtained. Those units are high intensity, high definition, and sophisticated, have high electron and positive hole mobility and low electric current leakage qualities and are suitable for a device that emits a strong light such as the light from a projector, etc.

(3) The display area of the monocrystalline semiconductor layer is removed and the insulating layer is exposed. And the metallic opaque layer is formed in the TFT display element formation area inside the display area and is covered with an insulating layer on top of it. The polycrystalline semiconductor layer is formed on the display area and the monocrystalline semiconductor layer is formed on the peripheral circuit area with semiconductor epitaxial growth. By forming the display element on the polycrystalline semiconductor layer of the display area where the crystal grain size is arbitrarily controlled (high electron and positive hole mobility) with the flash lamp annealing method or the solid phase deposition method or the laser annealing method, etc. as required, and forming the peripheral circuit on the monocrystalline semiconductor layer in the peripheral area, it is possible to form the polycrystalline semiconductor layer TFT display element which has relatively low high electron and positive hole mobility that is arbitrarily controlled and exhibits low electric current leakage qualities, and the monocrystalline semiconductor TFT peripheral circuit, which has high electric positive hole mobility and high drivability, inside the same substrate. By this, the ultra slim electrooptic display device unit such as the transmissive type LCD, the reflective type LCD, the semi-transmissive type LCD, the surface luminous organic EL and the undersurface luminous organic EL, etc. can be obtained. Those units are high intensity, high definition, and sophisticated, have high electron and positive hole mobility and low electric current leakage qualities and are suitable for a device that emits a strong light such as the light from a projector, etc.

(4) With aforementioned (5)~(7), after de-crystallizing the polycrystalline semiconductor layer by injecting with one of group IV elements (Si, Ge, tin and the lead, etc.), for example, injecting Ge selectively only in the polycrystalline semiconductor layer in the aforementioned display area, the polycrystalline semiconductor layer which is has controlled crystal grain size (high electron and positive hole mobility) is formed in the display element with the solid phase deposition method. The polycrystalline semiconductor TFT display element, which has arbitrarily controlled high electron and positive hole mobility and low electric current leakage qualities, and the monocrystalline semiconductor TFT peripheral circuit, which has high electron and positive hole mobility and high drivability are formed on the same support substrate. The display element of the polycrystalline semiconductor layer with high carrier mobility and high quality can be obtained because the irregularity which exists in the crystal grain boundary of the polycrystalline semiconductor layer with the process mentioned above, and the film stress is decreased. And with this, the ultra slim electrooptic display device unit such as the transmissive type LCD, the reflective type LCD, the semi-transmissive type LCD, the surface luminous type organic EL and the undersurface luminous type organic EL, etc. can be obtained by attaching the backing after separating the support substrate and dividing the assembly into each ultra slim electrooptic display device unit. Those units are high intensity, high definition, and sophisticated, have high electron and positive hole mobility and low electric current leakage qualities and are suitable for a device which emits a strong light such as a light from a projector, etc.

(5) The insulating layer and the amorphous semiconductor layer or the amorphous and the polycrystalline mixture semiconductor layer or the polycrystalline semiconductor layer are formed on the surface of the monocrystalline semiconductor layer with plasma CVD, heat CVD, sputtering, evaporation, etc. At a minimum, the amorphous semiconductor layer of the peripheral circuit area or the amorphous and the polycrystalline mixture semiconductor layer or the polycrystalline semiconductor layer are removed and the amorphous semiconductor layer in the display area or the amorphous and the polycrystalline mixture semiconductor layer or the polycrystalline semiconductor layer, and the monocrystalline semiconductor layer in the peripheral area are each formed. By forming the display element in the polycrystalline semiconductor layer or the amorphous semiconductor layer or the amorphous and the polycrystalline mixture semiconductor layer where the crystal grain size is arbitrarily controlled (high electron and positive hole mobility) with the flash lamp annealing method or the solid phase deposition method or the laser annealing method, etc. as required, and forming the peripheral circuit in the monocrystalline semiconductor layer in the peripheral area, it is possible to form the polycrystalline semiconductor layer TFT display element which has relatively low high electron and positive hole mobility that is arbitrarily controlled and exhibits low electric current leakage qualities, and the monocrystalline semiconductor TFT peripheral circuit, which has high electric positive hole mobility and high drivability, inside the same substrate. By this, the ultra slim electrooptic display device unit such as the transmissive type LCD, the reflective type LCD, the semi-transmissive type LCD, the surface luminous organic EL and the undersurface luminous organic EL, etc. can be obtained. Those units are high intensity, high definition, and sophisticated, have high electron and positive hole mobility and low electric current leakage qualities and are suitable for a device that emits a strong light such as the light from a projector, etc.

(6) The display area of the monocrystalline semiconductor layer is removed and the insulating layer is exposed. And the insulating layer and the amorphous semiconductor layer or the amorphous and the polycrystalline mixture semiconductor layer or the polycrystalline semiconductor layer is formed with plasma CVD, heat CVD, sputtering, evaporation, etc. At a minimum, the amorphous semiconductor layer of the peripheral circuit area or the amorphous and the polycrystalline mixture semiconductor layer or the polycrystalline semiconductor layer are removed and the amorphous semiconductor layer in the display area or the amorphous and the polycrystalline mixture semiconductor layer or the polycrystalline semiconductor layer, and the monocrystalline semiconductor layer in the peripheral area are each formed. By forming the display element in the polycrystalline semiconductor layer or the amorphous semiconductor layer or the amorphous and the polycrystalline mixture semiconductor layer where the crystal grain size is arbitrarily controlled (high electron and positive hole mobility) with the flash lamp annealing method or the solid phase deposition method or the laser annealing method, etc. as required, and forming the peripheral circuit in the monocrystalline semiconductor layer in the peripheral area, it is possible to form the polycrystalline semiconductor layer TFT display element which has relatively low high electron and positive hole mobility that is arbitrarily controlled and exhibits low electric current leakage qualities, and the monocrystalline semiconductor TFT peripheral circuit, which has high electric positive hole mobility and high drivability, inside the same substrate. By this, the ultra slim electrooptic display device unit such as the transmissive type LCD, the reflective type LCD, the semi-transmissive type LCD, the surface luminous organic EL and the undersurface luminous organic EL, etc. can be obtained. Those units are high intensity, high definition, and sophisticated, have high electron and positive hole mobility and low electric current leakage qualities and are suitable for a device that emits a strong light such as the light from a projector, etc.

(7) The display area of the monocrystalline semiconductor layer is removed and the insulating layer is exposed. The light shielding metallic layer in the pixel display element formation area inside the display area is formed. And the insulating layer and the amorphous semiconductor layer or the amorphous and the polycrystalline mixture semiconductor layer or the polycrystalline semiconductor layer are formed in the entire area with plasma CVD, heat CVD, sputtering, evaporation, etc. At a minimum, the amorphous semiconductor layer of the peripheral circuit area or the amorphous and the polycrystalline mixture semiconductor layer or the polycrystalline semiconductor layer are removed and the amorphous semiconductor layer in the display area or the amorphous and the polycrystalline mixture semiconductor layer or the polycrystalline semiconductor layer, and the monocrystalline semiconductor layer in the peripheral area are each formed. By forming the display element in the polycrystalline semiconductor layer or the amorphous semiconductor layer or the amorphous and the polycrystalline mixture semiconductor layer where the crystal grain size is arbitrarily controlled (high electron and positive hole mobility) with the flash lamp annealing method or the solid phase deposition method or the laser annealing method, etc. as required, and forming the peripheral circuit in the monocrystalline semiconductor layer in the peripheral area, it is possible to form the polycrystalline semiconductor layer TFT display element which has relatively low high electron and positive hole mobility that is arbitrarily controlled and exhibits low electric current leakage qualities, and the monocrystalline semiconductor TFT peripheral circuit, which has high electric positive hole mobility and high drivability, inside the same substrate. By this, the ultra slim electrooptic display device unit such as the transmissive type LCD, the reflective type LCD, the semi-transmissive type LCD, the surface luminous organic EL and the undersurface luminous organic EL, etc. can be obtained. Those units are high intensity, high definition, and sophisticated, have high electron and positive hole mobility and low electric current leakage qualities and are suitable for a device that emits a strong light such as the light from a projector, etc.

(8) With aforementioned (5)~(7), after ion filling or ion doping with at least one kind of the group IV elements (Si, Ge, tin and the lead, etc.) selectively only to the amorphous semiconductor layer of the aforementioned display area or the amorphous and the polycrystalline semiconductor layer or the polycrystalline semiconductor layer, the display element is formed in the polycrystalline semiconductor layer or the amorphous semiconductor layer or the amorphous and the polycrystalline semiconductor layer which is arbitrarily controlled with the flash lamp annealing method or the or the laser annealing method, etc. according to the needs, and the peripheral circuit is formed in the monocrystalline semiconductor layer in the peripheral area. With these processes, the polycrystalline semiconductor layer TFT or the amorphous semiconductor TFT or the amorphous and the polycrystalline mixture semiconductor TFT display element which has relatively low high electron and positive hole mobility that is arbitrarily controlled and low electric current leakage qualities, and the monocrystalline semiconductor TFT peripheral circuit, which has high electric positive hole mobility and high drivability are formed on the same substrate.

Then, the polycrystalline semiconductor TFT with high carrier mobility and high quality is obtained because the irregularity which exists in the crystal grain boundary of the polycrystalline semiconductor is decreased, and the film stress is decreased. And, the backings are attached after separating the support substrate and each ultra slim electrooptic display device units are divided form the assembly. With this, the ultra slim electrooptic display device unit such as the transmissive type LCD, the reflective type LCD, the semi-transmissive type LCD, the surface luminous type organic EL and the undersurface luminous type organic EL, etc. can be obtained. Those units are high intensity, high definition, and sophisticated, have high electron and positive hole mobility and low electric current leakage qualities and are suitable for a device which emits a strong light such as a light from a projector, etc.

(9) The peripheral circuit, which includes the memory circuit, is formed on the monocrystalline semiconductor layer, which is under the reflective electrode of the pixel display part, or the peripheral circuit is formed on the monocrystalline semiconductor layer of the seal area. Furthermore, the degree of location of the peripheral circuit inside the LCD panel is raised by forming the peripheral circuit of the multiple layer wiring structure in the monocrystalline semiconductor layer. And, by taking the external peripheral IC function in, increased functionality and reduced costs are achieved.

(10) Differing from the grating constant of the monocrystalline Si layer described above, the SiGe layer of the distortion impression semiconductor, which impresses the distortion in the aforementioned monocrystalline Si layer is formed on the porous Si layer, an insulating layer is formed in the entire area while leaving the insulating layer in the display area. Then, the poly Si layer is formed on the display area with semiconductor epitaxial growth after etching the insulating layer in the peripheral circuit area. The distortion impression semiconductor SiGe layer in the peripheral circuit area and the distortion channel layer of the monocrystalline Si layer (called the distortion Si layer from now on) in the seed are formed, or the SiGe layer of the distortion impression semiconductor is formed on the monocrystalline Si substrate with semiconductor epitaxial growth. The insulating layer is formed in the entire area and the insulating layer is left in the display area. A poly-Si layer is formed in the display area with semiconductor epitaxial growth. The SiGe layer of the distortion impression semiconductor in the peripheral circuit area and the distortion Si layer of the distortion channel layer in the seed are formed, and after etching the SiGe layer of the display area, the insulating layer is exposed. The poly Si layer is formed in the display area with Si epitaxial growth, the SiGe layer of the distortion impression semiconductor in the peripheral circuit area and the distortion Si layer of the distortion channel layer in the seed. With these processes, the band structure is changed by distorting the distortion channel semiconductor layer. As a result, because the degeneracy is alleviated and the electron scattering is controlled, the electron mobility is raised. Because of this, it becomes possible to have a an ultra slim electrooptic display device unit which exhibits high performance, high definition and high quality which consists of the display part or the peripheral circuit of MOSTFT which has high electron and positive hole mobility and high drivability. For example, compared to the monocrystalline Si layer of a non-distortion channel layer, the electron hole mobility is approximately 1.76 times greater.

At this time, the germanium density in the distortion impression semiconductor layer increases from the contact surface of the porous Si layer, or from the contact surface of the monocrystalline Si substrate, or from the contact surface of the insulating layer gradually, and when the desired density is achieved, for example, when the Ge density equals to 20~30% of the gradient constitution of the distortion Si layer, the electron mobility which is desired is substantially higher with the SiGe layer surface of the distortion impression semiconductor layer.

(11) By separating the support substrate where the circumstance of the facing substrate and the support substrate are maintained by the ultraviolet ray light hardening type tape which does not have any sealant left and which is antistatic, the facing substrate and the support substrate are kept strong. Also, the surface circumstance of the facing substrate and the support substrate are protected while they are separated. It is possible to increase the yield and the productivity because the ultraviolet ray lighting hardening type tape can be removed easily by UV light hardening with no paste remaining after the separation. In addition, it is possible to prevent the special deformative occurrence with static electricity damage of the polycrystalline semiconductor TFT circuit and the monocrystalline semiconductor TFT circuit on the support substrate when separating, because the ultraviolet ray lighting hardening type tape has the function of preventing electrification. In addition, the tape operates as a protective layer even when etching the unnecessary porous semiconductor layers and the like. Due to this process, it is possible to prevent unevenness such as etching unevenness, breaking, cracking, etc. of the ultra slim electrooptic display element substrate periphery.

(12) In each manufacturing method, the separation of the support substrate becomes easier because the TFT substrate layer which is separated from the support substrate, is already divided by doing the separation of the support substrate after forming the groove along with the dividing line, when each electrooptic display device unit is divided, from the monocrystalline semiconductor layer at least to the porous semiconductor layer or the ion implantation layer. Because of this, it is possible to prevent the occurrence etching unevenness, breaking, cracking, when each ultra slim electrooptic display device unit is divided. Especially, because the inside the groove is filled with the ultraviolet ray lighting hardening type sealant when the groove is formed, it is possible to prevent the etching unevenness, breaking, cracking, etc. of the ultra slim electrooptic display element substrate periphery because of stress when separating from the separation layer.

Or, when we divide each ultra slim electrooptic display device unit, etching unevenness, breaking, cracking can be prevented at the time of division, because this can be done with the circumstance of being attached to the substrate.

(13) After removing the polycrystalline semiconductor layer or the amorphous semiconductor or the amorphous and the polycrystalline mixture semiconductor, the insulating film and the light-shielding metallic film are formed in order and the optically transparent material is embedded. The picture quality is improved because light leakage from the display element TFT due to the strong incident light can be prevented due to the low reflectivity with the black type metallic film, especially with the light-shielding action of the light-shielding metallic film.

At that time, you can obtain an electrooptical display which is high intensity, high definition and sophisticated by preventing TFT electric current leakage of the display element because charge build up in each section due to strong incident light can be prevented by leaving the light block metallic film inside each pixel opening section and on the top of the TFT, etc. to ground the electric potential.

(14) The transmissive type LCD with high transmissive factors can be obtained because the optically transparent material, which has high translucency such as transparent resin, glass, $SiO_2$, etc., is embedded to the pixel opening section of the monocrystalline semiconductor layer in the display area with the optically transparent material, which is the ultraviolet light proof.

(15) When the monocrystalline semiconductor layer and the porous semiconductor layer are etched and where the insulating film and the light-shielding metallic film are set in the lower part of the embedded section with the optically transparent material, the light transmittance rate can be kept high by not decreasing the translucency of this material because the optically transparent material is not damaged by the etching liquid.

(16) Decreased cost is possible because the seed substrate and the support substrate which is separated can be used again.

(17) By including the silicon nitride film in the insulation layer, unevenness caused by etching is prevented because this silicon nitride film functions as a stopper when it is etching after separation of the substrate. Also, during the time of LCD assembly and semiconductor device processing, the permeation of element that would cause deterioration in quality, for example halogen elements, in the semiconductor layer (polycrystalline semiconductor layer and monocrystalline semiconductor layer) forming on the support substrate side can be prevented. Furthermore, during semiconductor device processing, distortion with curvature of the semiconductor layer can be decreased or prevented due to the influence received from the expansion of the porous layer which was formed on the support substrate. This can lead to yield and quality.

Also, when there is an insulating layer of the silicon nitride film in the ultra slim SOI structure after the separation, the etching unevenness, cracking, or breaking, etc. of the ultra slim electrooptic display element substrate layer can be prevented due to the high rigidity.

(18) With each of the manufacturing methods, by separating the support substrate after forming the groove along with the dividing line inside the dividing area when each ultra slim electrooptic display device units area divided from monocrystalline semiconductor layer to a minimum of the distortion area of the porous semiconductor layer or the ion implantation layer, it becomes easy to separate the support substrate with such as high pressure fluid jet injection exfoliation method or laser processing exfoliation method or laser water jet processing exfoliation method, etc., because the electrooptic display element substrate layer of ultra slim SOI layer structure or ultra slim monocrystalline semiconductor layer which is separated from support substrate is already divided. For these reasons, it is possible to prevent the occurrence of etching unevenness, cracking, or breaking in each ultra slim-shaped electrooptic display device unit. This leads to yield and quality improve and lowering of the cost.

Especially, when the groove is formed, the ultraviolet ray lighting hardening type sealant fills up the inside, etching unevenness, cracking, or breaking, of the ultra slim electrooptic display element substrate peripheral caused by the stress when separating from the separated layer can be prevented.

(19) With the separation method for the double porous semiconductor layer, by making the diameter of the seed substrate which forms monocrystalline semiconductor layer via the porous semiconductor layer slightly smaller or larger than the diameter of support substrate which forms the monocrystalline semiconductor layer through the porous semiconductor layer, the support substrate does not separate because the high pressure fluid jet injection does not hit the porous semiconductor layer of the support substrate directly when the seed substrate is separated by the high pressure fluid jet injection hitting the porous semiconductor layer of the seed substrate from immediate side direction or from a slanted direction.

Furthermore, with the manufacturing method of separation for the double porous semiconductor layer, it is desirable to have the porous semiconductor layer which forms on the seed substrate have a higher porosity rate than the porous semiconductor layer which forms on the support substrate. Also, it is desirable to have the porous semiconductor layer which forms on the seed substrate thicker than the porous semiconductor layer which forms on the support substrate.

Because of this process, separation of the seed substrate can be done more surely and the porosity rate and thickness adjustment of the porous semiconductor layer of the support substrate can be modified. During the formation process of the display area and the peripheral circuit, adverse effects such as receiving the strain on the curve, or thermal expansion of the porous semiconductor layer which forms on the monocrystalline semiconductor layer of the support substrate can be prevented.

(20) The transmissive type LCD for the projector with the ultra slim electrooptic display element substrate which is ultraviolet light proof, which has high light transmittance, can be achieved because the optically transparent material that is ultraviolet light proof is embedded in a material with high light transmittance rate such as transparent resin, glass, $SiO_2$, etc. onto the pixel opening section of the polycrystalline semiconductor layer or the display area or the amorphous semiconductor layer or the amorphous and the polycrystalline mixture semiconductor layer.

(21) By attaching with a light-resistant transparent sealant to the separated super thin electrooptical display element substrate and the transparent substrate, for example, glass without an antireflective film with an optical quality of rectilinear transmissivity of 80% or more and with at least 1 (W/m*K) of thermal conductivity, for instance, quartz glass and transparent crystallized glass (neoceram, CLEARCE-RAM, Zerodur, etc.) etc., furthermore, glass without an antireflective film, and with an optical quality of rectilinear transmissivity of 80% or more and with at least 10 (W/m*K) of thermal conductivity, for example highly transmissive ceramic polycrystalline substances {crystalline oxides created by electromelting or sintering of MgO (magnesia), $Y_2O_3$ (yttrium), CaO (Calcium Oxide), $AL_2O_3$ (Monocrystalline sapphire), BeO (beryllia), polycrystalline sapphires, etc., monocrystalline or polycrystalline of double oxide crystalline YAG (Yttrium Aluminum Garnet), monocrystalline or polycrystalline $MgAl_2O_4$(Spinel), $3Al_2O_3 2SiO_2$ $Al_2O_3SiO_2$ and so on}, a fluoride monocrystalline body (calcium fluoride, magnesium fluoride and barium fluoride etc.), vapor phase synthetic diamond film coated highly transmissive ceramic polycrystalline substances, or a fluoride monocrystalline body or transparent crystallized glass, or the crystal etc., this transmissive type LCD for projectors achieves increased quality and reliability exhibiting high intensity, high definition and long product life and showing the high emission scattering effects vis-à-vis strong incident light.

In the meantime, you need to use the aforementioned thermally conductive glass (film highly thermal conductivity) even with the facing substrate (including the micro lens substrate, the black mask substrate, etc.), a dustproof glass with antireflective film formation for the incident side, or a dustproof glass with antireflective formation for the output side. For example, you can expect an even higher thermal radiation effect by attaching as a structure of the monocrystalline sapphire dustproof glass of antireflective film formation with incident side, the facing substrate(including the micro lens substrate, the black mask substrate, etc.) of monocrystalline sapphire, liquid crystal layer, ultra slim electrooptic display element substrate, support substrate of monocrystalline sapphire, and monocrystalline sapphire dustproof glass with antireflective film formation with light-resistant transparent sealant.

Furthermore, in case of a reflective type LCD for projectors, by attaching with a light-resistant transparent sealant to the transparent substrate, as a facing substrate material and a dustproof glass material with antireflective film formation on the incident side as mentioned above, for example glass without an antireflective film with an optical quality of rectilinear transmissivity of 80% or more and with at least 1 (W/m*K) of thermal conductivity, for instance, quartz glass and transparent crystallized glass (neoceram, CLEARCE-RAM, Zerodur, etc.) etc., furthermore glass without an antireflective film, and with an optical quality of rectilinear transmissivity of 80% or more and with at least 10 (W/m*K) of thermal conductivity, for example highly transmissive ceramic polycrystalline substances {crystalline oxides created by electromelting or sintering of MgO (magnesia), $Y_2O_3$(yttrium), CaO (Calcium Oxide), $AL_2O_3$ (Monocrystalline sapphire), BeO (beryllia), polycrystalline sapphires, etc., monocrystalline or polycrystalline of double oxide crystalline YAG (Yttrium Aluminum Garnet), monocrystalline or polycrystalline $MgAl_2O_4$ (Spinel), $3Al_2O_3 2SiO_2$ $Al_2O_3SiO_2$ and so on}, a fluoride monocrystalline body (calcium fluoride, magnesium fluoride and barium fluoride etc.), vapor phase synthetic diamond film coated highly transmissive ceramic polycrystalline substances, or a fluoride monocrystalline body or transparent crystallized glass, or the crystal etc., This LCD achieves increased quality and reliability exhibiting high intensity, high definition and long product life and showing the high emission scattering effects vis-à-vis strong incident light.

Furthermore, for example, as a structure of the double refraction free monocrystalline which forms an antireflective film on the incoming radiation side or YAG polycrystalline or dustproof glass of spinel, monocrystalline or polycrystalline YAG and the facing substrate of spinel, liquid crystal layer, ultra slim electrooptic display element substrate, metallic support substrate, it is expected to have high heat diffusion effect by attaching the monocrystalline or polycrystalline which formed the antireflective film, and the dust proof glass of spinel and monocrystalline or polycrystalline YAG and the facing substrate of spinel, and attaching the ultra slim electrooptic display element substrate and metallic support substrate with the high thermal conductivity and conductivity sealant.

(22) The dual micro lens structure is attached to the transparent support substrate which forms the micro lens array which functions as a field lens, and to the ultra slim electrooptic display element substrate which has high accuracy and thick film and which layers the facing substrate with the formed micro lens array which functions as a condensing lens, and has three functions; a function to condense light with the double micro lens function which has a higher accuracy than the dual micro lens structures in the past, a function to raise the utilization efficiency of illuminant light and a function to raise the effective aperture rate of the pixel to the highest degree. For these reasons, the transmitted type LCD for the projector which has high intensity, high definition and is sophisticated, can be achieved with the ultra slim electrooptic display element substrate.

(23) The dual micro lens structure is attached to the transparent support substrate, which forms the micro lens array forming the low reflective light-shielding film with a black mask function around each micro lens which functions as a field lens, and to the ultra slim electrooptic display element substrate which has high accuracy and thick film and which layers the facing substrate with the formed micro lens array which functions as a condensing lens, and has three functions; a function to condense light with the double micro lens function which has a higher accuracy than the dual micro lens structures in the past, a function to raise the utilization efficiency of illuminant light and a function to raise the effective aperture rate of the pixel to the highest degree. For these reasons, the transmissive type LCD for the projector which has high intensity, high definition and is sophisticated, can be achieved with the ultra slim electrooptic display element substrate.

(24) The ultra slim electrooptic display device unit such as ultra slim LCD (transmissive type, semi-transmissive type and reflective type) and surface luminous type organic EL or underside luminous type organic EL, etc. can be achieved because the display element of the ultra slim polycrystalline semiconductor TFT or the amorphous semiconductor TFT or the amorphous and the polycrystalline mixture semiconductor TFT, and the ultra slim monocrystalline semiconductor TFT peripheral circuit can be formed inside the same substrate as an ultra slim electrooptic display element substrate by laminating the facing substrate such as the transparent glass and the resin film for example 100 μm, furthermore by attaching the support substrate such as the transparent glass and the resin film for example 100 μm.

(25) A head mount type ultra slim electrooptic display device unit which is like a watch, a business card, a card, a glass and stamp can be obtained by using the transmissive type LCD reflective type LCD, the semi-transmissive type LCD, the surface luminous type organic EL, the underside luminous type organic EL, etc. which has direct vision type and ultra slim type that is mentioned above, for instance, the ultra slim electronics product, ultra small and ultra light weight devices such as ultra slim digital still camera, ultra slim digital movie camera, ultra slim acoustic equipment (CD, MD, etc.), ultra slim cellular phone, ultra slim portable television, ultra slim television monitor, etc. Furthermore, you can achieve a product for data or for the AV (Audio Visual) for a projector LCD product which is ultra slim, micro miniature and ultra light weight with transmissive type or reflective LCD which has high intensity, high definition and is sophisticated.

BRIEF DESCRIPTION OF THE DRAWINGS (FIG. 1)
This cross section diagram shows the manufacturing process for a transmissive type LCD with the porous Si layer method of separation.

Figure 2:
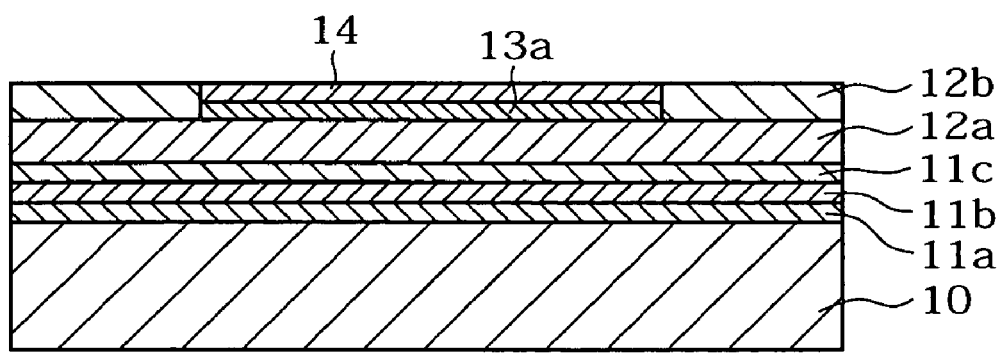

(FIG. 2)
This cross section diagram shows the manufacturing process for a transmissive type LCD with the porous Si layer method of separation.

(FIG. 3)
This cross section diagram shows the manufacturing process for a transmissive type LCD with the porous Si layer method of separation.
(a) This diagram shows the display area.
(b) This diagram shows the peripheral circuit area.

Figure 4:
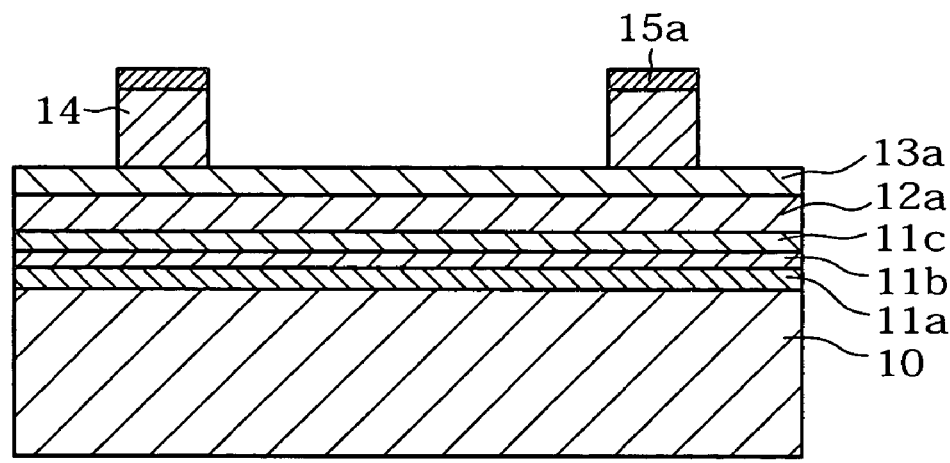

(FIG. 4)
This cross section diagram of the display area shows the manufacturing process for a transmissive type LCD with the porous Si layer method of separation.

(FIG. 5)
This cross section diagram of the display area shows the manufacturing process for a transmissive type LCD with the porous Si layer method of separation.

(FIG. 6)
This cross section diagram of the display area shows the manufacturing process for a transmissive type LCD with the porous Si layer method of separation.

(FIG. 7)
This cross section diagram of the display area shows the manufacturing process for a transmissive type LCD with the porous Si layer method of separation.

(FIG. 8)
This cross section diagram shows the manufacturing process for a transmissive type LCD with the porous Si layer method of separation.
(a) This diagram shows the entire substrate.
(b) This diagram shows the display area.

(FIG. 9)
This cross section diagram shows the manufacturing process for a transmissive type LCD with the porous Si layer method of separation.
(a) This diagram shows the entire substrate.
(b) This diagram shows the display area.

(FIG. 10)
This cross section diagram shows the transmissive type LCD which is produced by the porous Si layer method of separation.
(a) This diagram shows the transmissive type LCD in case of "without" the light-shielding film.
(b) This diagram shows the transmissive type LCD in case of "with" light-shielding film.

(FIG. 11)
This cross section diagram shows the manufacturing process for a reflective type LCD with the porous Si layer method of separation.
(a) This diagram shows the display area.
(b) This diagram shows the peripheral circuit area.

(FIG. 12)
This cross section diagram shows the manufacturing process for a reflective type LCD with the porous Si layer method of separation.

(FIG. 13)
This cross section diagram shows a reflective type LCD which is produced by the porous Si layer method of separation.
(a) This diagram shows the display area.
(b) This diagram shows the peripheral circuit area.

(FIG. 14)
This cross section diagram shows a semi-transmissive type LCD which is produced by the porous Si layer method of separation.
(a) This diagram shows a semi-transmissive type LCD where the reflective electrode with an optimal roughness was formed on the transparent electrode.
(b) This diagram shows a semi-transparent type LCD where the transparent electrode was formed on the reflective electrode of optimal roughness.

(FIG. 15)
This cross section diagram shows an underside emitter type organic EL which is produced by the porous Si layer method of separation.

(FIG. 16)
This cross section diagram shows a surface emitter type organic EL which is produced by the porous Si layer method of separation.

(FIG. 17)
This cross section diagram shows a transmissive type LCD formed by the double porous Si layer method of separation.

(FIG. 18)
This cross section diagram shows a transmissive type LCD formed by the double porous Si layer method of separation.

(FIG. 19)
This cross section diagram shows a transmissive type LCD formed by the double porous Si layer method of separation.

(FIG. 20)
This cross section diagram shows a transmissive type LCD formed by the double porous Si layer method of separation.
(a) This diagram shows an example of forming $SiO_2$ as an insulating layer.
(b) This diagram shows an example of forming $SiO_2Si_3N_4$ and $SiO_2$ as an insulating layer.

Figure 21A:
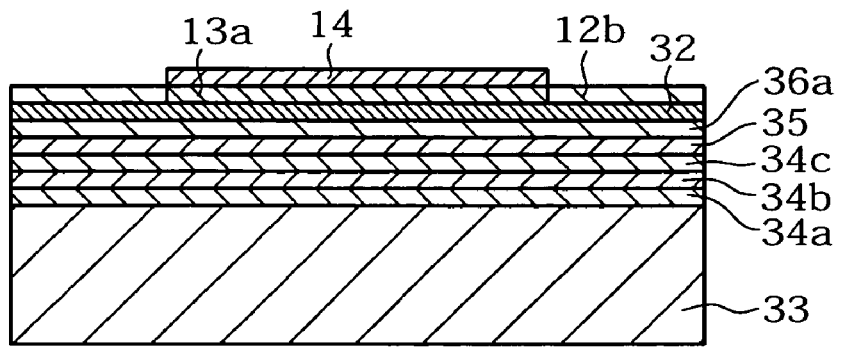

(FIG. 21)
This cross section diagram shows a transmissive type LCD formed by the double porous Si layer method of separation.

(FIG. 22)
This cross section diagram shows a transmissive type LCD formed by the double porous Si layer method of separation.
(a) This diagram shows the display area.
(b) This diagram shows the peripheral circuit area.

(FIG. 23)
This cross section diagram shows a transmissive type LCD formed by the double porous Si layer method of separation.
(a) This diagram shows the display area.
(b) This diagram shows the peripheral circuit area.

(FIG. 24)
This cross section diagram shows a transmissive type LCD formed by the double porous Si layer method of separation.
(a) This diagram shows the display area.
(b) This diagram shows the peripheral circuit area.

(FIG. 25)
This cross section diagram of a display area shows a transmissive type LCD by the double porous Si layer method of separation.

Figure 26A:
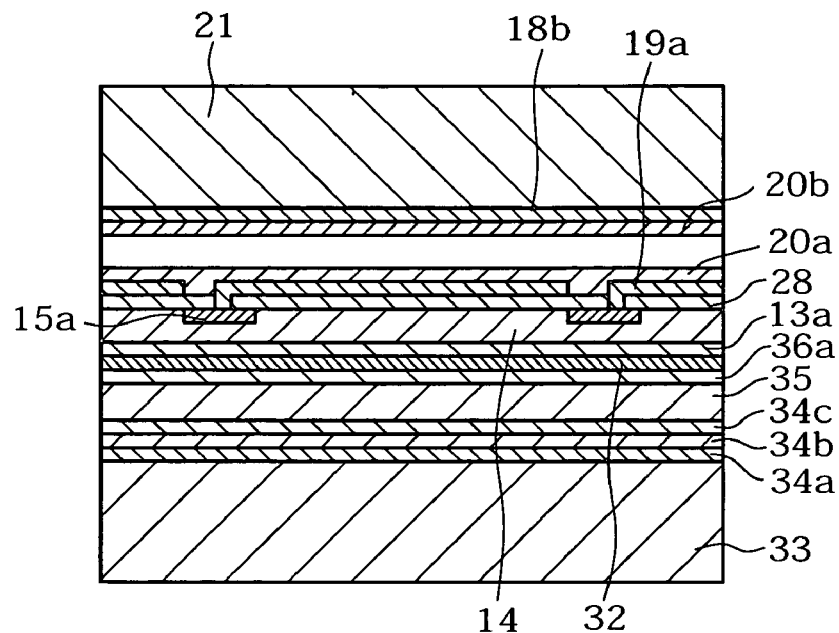
Figure 26B:
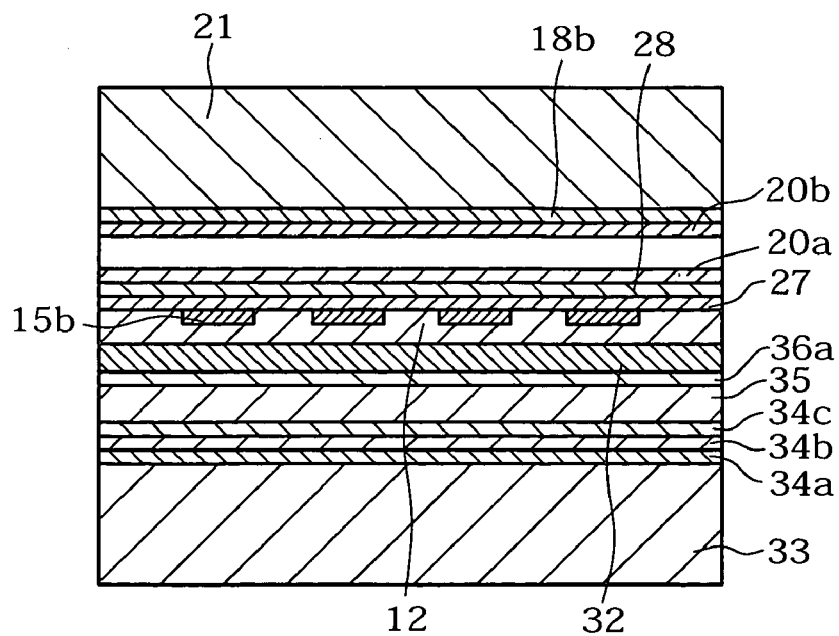

(FIG. 26)
This cross section diagram shows a reflective type LCD formed by the double porous Si layer method of separation.

Figure 27:
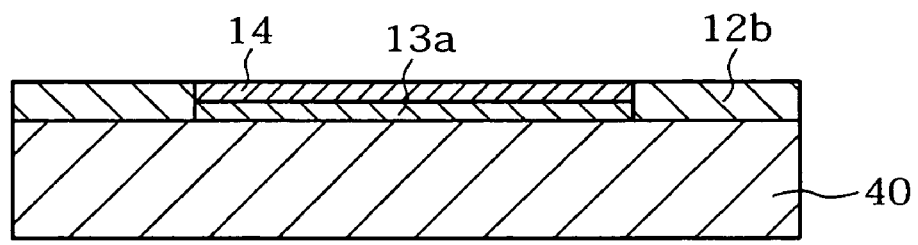

(FIG. 27)
This cross section diagram shows a transmissive type LCD formed by the hydrogen ion implantation method of separation.

(FIG. 28)
This cross section diagram shows a transmissive type LCD formed by the hydrogen ion implantation method of separation.
(a) This diagram shows the display area.
(b) This diagram shows the peripheral circuit area.

Figure 29:
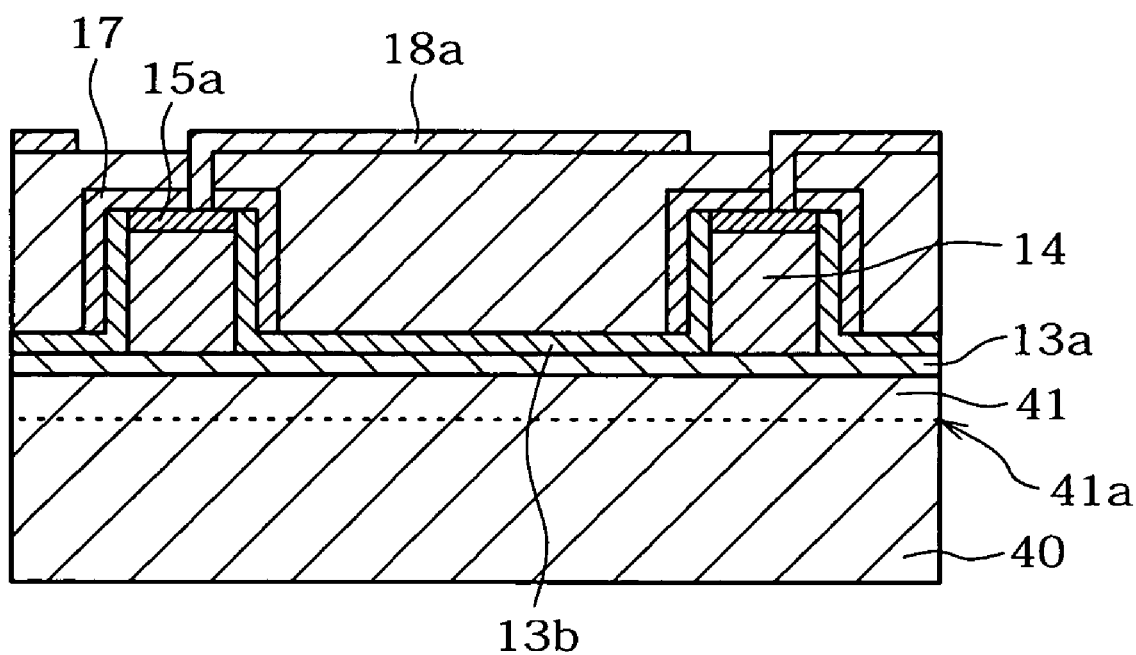

(FIG. 29)
This cross section diagram of a display area shows the transmissive type LCD formed by the hydrogen ion implantation method of separation.

(FIG. 30)
This cross section diagram of a display area shows the transmissive type LCD formed by the hydrogen ion implantation method of separation.

Figure 31:
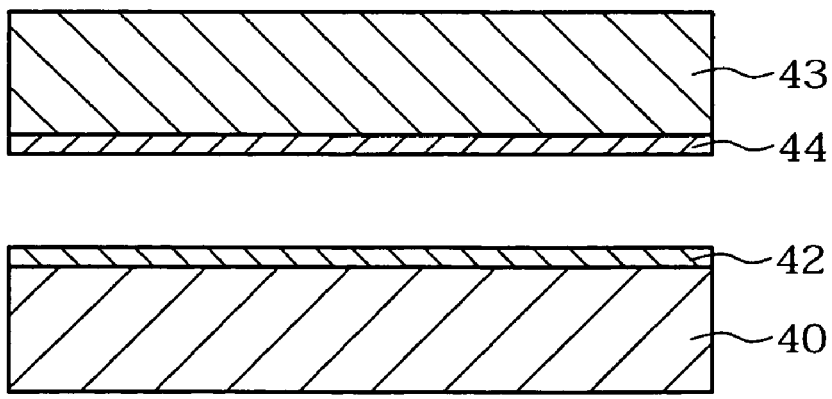

(FIG. 31)
This cross section diagram area shows a transmissive type LCD formed by the double hydrogen ion implantation method of separation.

Figure 32:
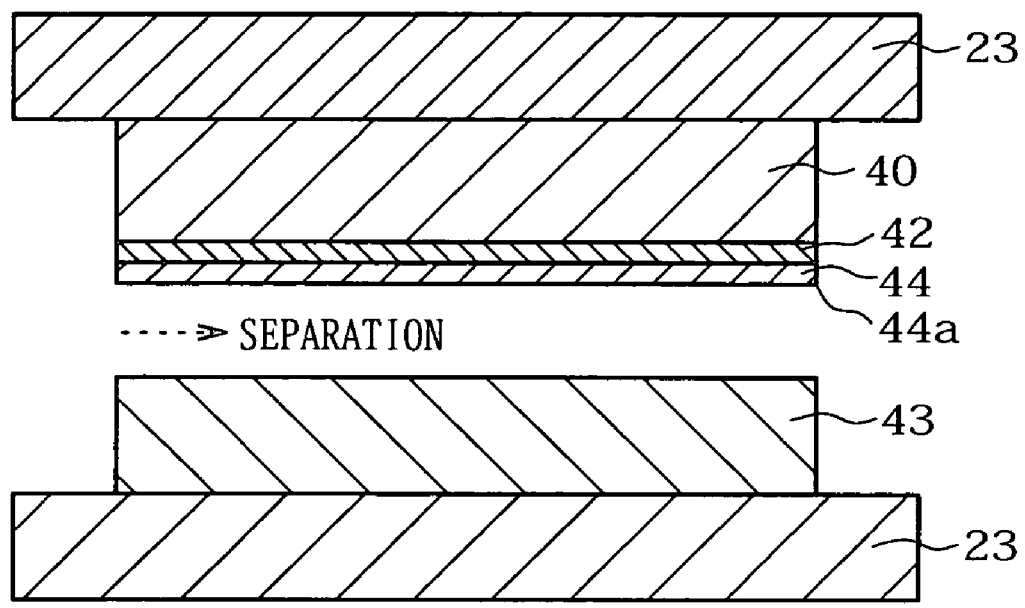

(FIG. 32)
This cross section diagram area shows a transmissive type LCD formed by the double hydrogen ion implantation method of separation.

Figure 33:
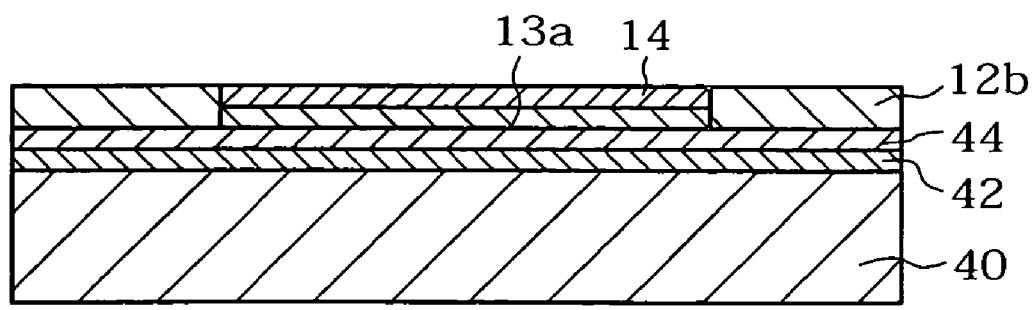

(FIG. 33)
This cross section diagram area shows a transmissive type LCD formed by the double hydrogen ion implantation method of separation.

(FIG. 34)
This cross section diagram area shows a transmissive type LCD formed by the double hydrogen ion implantation method of separation.
(a) This diagram shows the display area.
(b) This diagram shows the peripheral circuit area.

(FIG. 35)
This cross section diagram of the display area shows a transmissive type LCD formed by the double hydrogen ion implantation method of separation.

Figure 36:
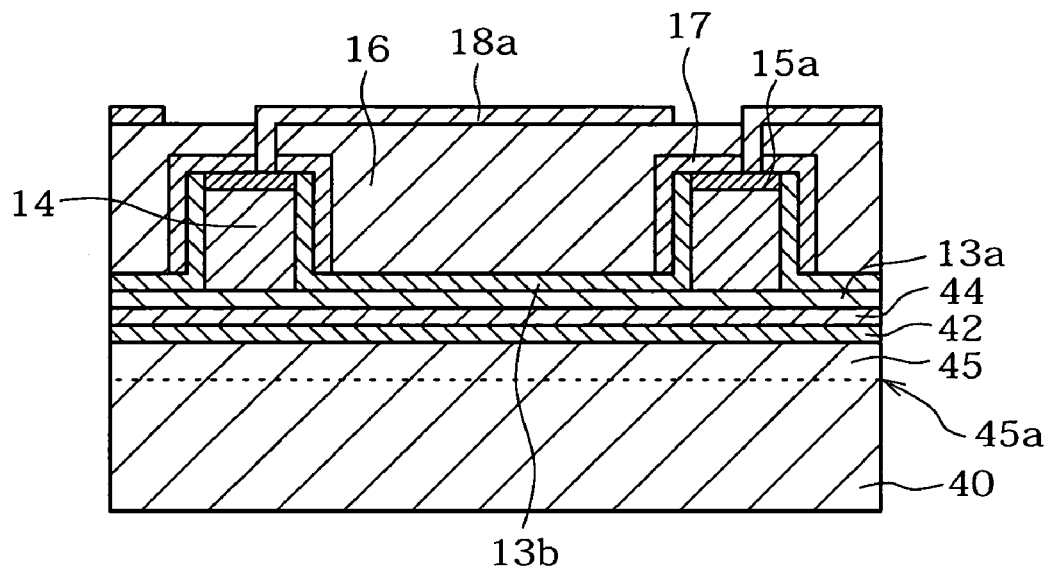

(FIG. 36)
This cross section diagram of the display area shows a transmissive type LCD formed by the double hydrogen ion implantation method of separation.

(FIG. 37)
This cross section diagram of the display area shows a transmissive type LCD formed by the porous Si layer/ hydrogen ion implantation method of separation.

(FIG. 38)
This cross section diagram of the display area shows a transmissive type LCD formed by the porous Si layer/ hydrogen ion implantation method of separation.

(FIG. 39)
This cross section diagram of the display area shows the transmissive type LCD formed by the porous Si layer/ hydrogen ion implantation method of separation.

(FIG. 40)
This outline cross section shows a high pressure fluid jet injection exfoliation unit in the form of execution presented by this invention.

(FIG. 41)
This cross section diagram shows an electrooptic display device unit formed by the double porous Si layer method of separation.

Figure 42A:
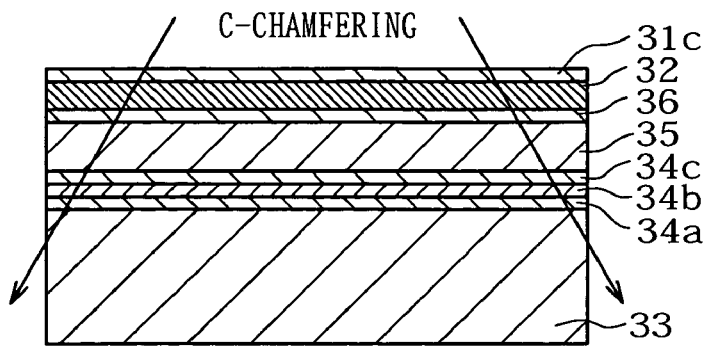

(FIG. 42)
This cross section diagram explains the C chamfering of the support substrate surface peripheral section after the seed substrate separation.

(FIG. 43)
This cross section diagram shows a transmissive type LCD for the projector using the dual micro lens (the double micro lens) structure.

(FIG. 44)
This cross section diagram shows a transmissive type LCD or a reflective type LCD for the projector.

(FIG. 45)
This cross section diagram (1) shows a mounting example which uses the ultra slim electrooptic display device unit in this invention for direct display.

(FIG. 46)
This cross section diagram (2) shows a mounting example which uses the ultra slim electrooptic display device unit of this invention for direct display.

(FIG. 47)

This cross section diagram shows a concrete example of an ultra slim electronics product which uses this invention.

(FIG. 48)

(A) This figure shows the assembly method of an LCD and an organic EL formed with the porous semiconductor layer method of separation.

(FIG. 49)

(B) This figure shows the assembly method of an LCD and an organic EL formed with the double porous semiconductor layer method of separation.

(FIG. 50)

(C) This figure shows the assembly method of an LCD and an organic EL formed with the ion implantation layer method of separation.

(FIG. 51)

(D) This figure shows the assembly method of an LCD and an organic EL formed with the double ion implantation layer method of separation.

(FIG. 52)

(E) This figure shows the assembly method of an LCD and an organic EL formed with the porous semiconductor layer /the ion implantation layer method of separation.

DETAILED DESCRIPTION OF THE PREFERRED EMBODIMENTS

An execution form of the present invention will be described in detail below with reference to the accompanying diagrams for better understanding of the present invention.

(A) A Method of Separating a Porous Semiconductor Layer (A-1) Ultra Slim Transmissive Type LCD In this execution form, a method of producing an ultra slim electrooptic display by separation of a porous semiconductor layer using a porous silicon layer (hereafter referred to as "Si") is described. FIG. 1 through FIG. 16 are process diagrams for manufacturing an ultra slim LCD by separation of a porous Si layer in the preferred execution form of the present invention.

(1) Porous Si layers (11$a$: low porous Si layer, 11$b$: high porous Si layer, 11$c$: low porous Si layer) are formed by anodic oxidation on a monocrystalline Si substrate 10 as a support substrate.

[1] Initially, p-type impurities are added in an approximately boron density of $1\times10^{19}$ atoms/cm$^3$ by a CVD method using monosilane gas or diborane gas to a p-type monocrystalline Si substrate, e.g., 12 inch in diameter and 1.2 mm in thickness (resistivity: 0.01~0.02Ω·cm) (hereafter referred to as "a Si substrate") 10 to form a high density semiconductor epitaxial growth monocrystalline Si layer with a thickness of approximately 10 $\mu$m (corresponding to a low porous Si layer 11$a$ as will be mentioned later).

[2] On a surface of this high density layer, p-type impurities are added in an approximately boron density of $5\times10^{14}$ atoms/cm$^3$ by a CVD method using monosilane gas or diborane gas to form a low density semiconductor epitaxial growth monocrystalline Si layer with a thickness of approximately 20 $\mu$m (corresponding to a high porous Si layer 11$b$ as will be mentioned later).

[3] Furthermore, on a surface of this low density layer, p-type impurities are added in an approximately boron density of $5\times10^{19}$ atoms/cm$^3$ by a CVD method using monosilane gas or diborane gas to form a high density semiconductor epitaxial growth monocrystalline Si layer with a thickness of approximately 10 $\mu$m (corresponding to a low porous Si layer 11$c$ as will be mentioned later).

In the formation of a monocrystalline Si layer by a CVD method, a vapor phase epitaxy, in addition to raw materials for hydrides such as monosilane (SiH$_4$), the following raw material gases can be used: the same raw materials for hydrides such as disilane (Si$_2$H$_6$), trisilane (Si$_3$H$_8$), and tetrasilane (Si$_4$H$_{10}$) and raw material for hydrides such as dichlorosilane (SiH$_2$Cl$_2$), trichlorisilane (SiHCl$_3$), and silicon tetrachloride (SiCl$_4$). A method of forming a monocrystalline Si layer is not limited to a CVD method, and a MBE (Molecular Beam Epitaxy) method or a sputtering method can also be applied.

[4] Subsequently, an anodic formation method is applied using a mixed solution of a 50% hydrogen fluoride solution and ethyl alcohol at a volumetric ratio of 2:1 as an electrolyte, while a current is applied for 5 to 10 minutes at about approximately a current density of 10 mA/cm$^2$ to form low porous Si layers 11$a$ and 11$c$ with a low porosity in the high density layer and a high porous Si layer 11$b$ with a high porosity in the low density layer.

Since the anodic reaction of Si in the hydrogen fluoride solution requires positive holes for the dissolution reaction of Si in the anodic formation, it is desirable to use a p-type Si substrate which easily becomes a porous substrate. However, the application is not limited to this material.

If a porous layer is formed by an anodic formation method, porous layers are comprised of plural numbers of layers with different porosities. For example, as mentioned above, a first low porous Si layer 11$a$ is formed on the monocrystalline Si substrate 10 followed by the formation of a high porous Si layer 11$b$, and a second low porous Si layer 11$c$ in this order to achieve a triple layer structure. In addition, a double layer structure can be obtained by forming a high porous Si layer 11$b$ and a low porous Si layer 11$c$ in this order on the monocrystalline Si substrate 10.

In this case, the porosity ranges from 40 to 80% in the high porous Si layer 11$b$, whereas the porosity in the low porous Si layers 11$a$ and 11$c$ ranges from 10 to 30%. The respective thickness of plural numbers of layers having different porosities can be adjusted arbitrarily by changing the current density and time during the anodic formation, and kinds or concentrations of the chemical solution during the anodic formation.

Besides a monocrystalline Si substrate which is prepared as a Si substrate by the CZ (Czochralski) method, MCZ (Magnetic Field Applied Czochralski) method, or FZ (Floating Zone) method, monocrystalline Si substrate which has been treated by hydrogen annealing on its substrate surface and an epitaxial monocrystalline Si substrate can be used. Of course, instead of monocrystalline Si substrates, monocrystalline compound semiconductor substrates such as monocrystalline SiGe substrate, SiC substrates, GaAs substrates and InP substrates can be used.

(2) A semiconductor epitaxial growth monocrystalline Si layer 12$a$ is 12$a$ is formed on the porous Si layer (a low porous Si layer 11$c$) (See FIG. 1).

[1] Initially, in the CVD semiconductor epitaxial growing equipment, surface pores on the low porous Si layer 11$c$ are sealed for surface flattening by pre-baking at 1000 to 1100° C. under a hydrogen atmosphere. A hydrogen annealing treatment is carried out at an etching rate of 0.0013 nm/min at 1050° C. or 0.0022 nm/min at 1100° C.

[2] Subsequently, the temperature is lowered to 1020° C. to carry out CVD using monosilane gas as a raw material gas to form a semiconductor epitaxial growth monocrystalline layer 12$a$ with a thickness of approximately 5 $\mu$m.

As mentioned above, in the formation of a monocrystalline Si layer by a CVD method, a vapor phase epitaxy, in addition to hydrogenation raw materials such as monosilane ($SiH_4$), the following raw material gases can be used: same hydrogenation raw materials such as disilane ($Si_2H_6$), trisilane ($Si_3H_8$), and tetrasilane ($Si_4H_{10}$) and halogenation raw materials such as dichlorosilane ($SiH_2Cl_2$), trichlorisilane ($SiHCl_3$), and silicon tetrachloride ($SiCl_4$). A method of forming a monocrystalline Si layer is not limited to a CVD method, and a MBE (Molecular Beam Epitaxy) method or a sputtering method can also be applied.

(3) A $SiO_2$ (silicon oxide) layer 13a with a thickness of approximately 100 nm is formed as an insulating layer by thermal oxidation of a surface of a monocrystalline Si layer 12a, and a $SiO_2$ layer 13a in the peripheral circuit area is removed by etching while leaving the $SiO_2$ layer 13a in the display area. A polycrystalline Si layer (hereafter referred to as a poly-Si layer) 14 with a thickness of approximately 10 $\mu m$ in the display area and a monocrystalline Si layer 12b with a thickness of approximately 10 $\mu m$ in the peripheral circuit area are formed respectively (See FIG. 2).

Besides the silicon oxide film $SiO_2$ prepared by thermal oxidation, an insulating film can be provided as a laminated film comprising of a silicon oxide film and a silicon nitride film, or a laminated film comprising of a silicon oxide film, a silicon nitride film, and a silicon oxide film (e.g., $SiO_2$; 200 nm, $Si_3N_4$; 50 nm and $SiO_2$; 200 nm) which is prepared by forming a silicon nitride film ($Si_3N_4$) or a silicon nitride film and a silicon oxide film on the monocrystalline Si layer 12a by vacuum thermal CVD followed by thermal oxidation. Furthermore, a silicon oxy-nitride film (SiON) can be applied.

The aforementioned insulating layer of a single layer film and multiple layer film can be formed by a plasma CVD method, sputtering method, MBE method and vapor deposition method.

Because both the monocrystalline Si layer 12b and the poly-Si layer 14 are formed under the same film formation conditions in the semiconductor epitaxial growth by CVD, the crystallinity (electron and positive hole mobility) of the poly-Si layer 14 in the display area can not be controlled sufficiently if the crystallinity of the monocrystalline Si layer in the peripheral circuit area is emphasized. The peripheral circuit section of the monocrystalline Si layer 12b is covered with a photo resist film and Si ions are injected with a high concentration, e.g., 30 KeV, $1\sim3\times10^{15}$ atoms/cm$^2$ onto the surface of the poly-Si layer 14 with openings to convert the surface layer to an amorphous Si film (hereafter referred to as an amorphous Si film). After exfoliation and cleaning the photo resist film, a surface layer of the poly-Si layer 14 with a controlled crystal grain size is formed by solid phase deposition by carrying out an annealing treatment for 10 to 15 hours under a nitrogen gas atmosphere at 600~650° C.

It is desirable to obtain a surface layer of the poly-Si layer 14 with a thickness of 50~100 nm wherein arbitrary electron and positive hole mobility based on arbitrary crystal grain size are achieved, by adjusting the Si ion injection concentration, depth and annealing conditions.

The poly-Si is defined as an aggregate of micro crystals commonly having a grain size of approximately 10 nm or greater. An amorphous Si film generally contains a grain size of 10 nm or less and is a material that does not show a crystalline orientation in the X-ray diffraction analysis.

A surface layer of the poly-Si layer 14 with a thickness of 50~100 nm with an arbitrarily controlled crystal grain size is formed by selective re-crystallization for of only the poly-Si layer 14 by flash lamp annealing by flash irradiation of a Xe lamp, or pulse or continuous wave laser annealing by irradiation by an XeCl excimer laser, one of or both of an optical harmonic modulated far infrared UV laser and near infrared UV laser of Nd:YAG lasers, visible light lasers, and infrared laser, or condensing lamp annealing, e.g., by irradiation using a UV lamp such as ultra high pressure mercury lamp, and an IR lamp such as halogen lamps, xenon lamps and arc lamps, to proceed with heating and cooling in a melting, semi-melting or non-melting condition. It is desirable to obtain a surface layer of the poly-Si layer 14 with a thickness of 50~100 nm, with arbitrary electron and positive hole mobility using an arbitrary crystal size, by adjusting the intensity of irradiation to flash lamps, lasers or condensing lamps for re-crystallization (depth from the surface of the poly-Si layer and time) in such a state that a Si substrate 10 is heated to an appropriate temperature (e.g., 200~400° C.) in order to reduce film stress.

If at least one of the group IV elements including Ge (germanium), Sn (tin), Pb (lead), is added in an proper quantity (total of $10^{17}\sim10^{22}$ atom/cc, preferably $10^{18}\sim10^{20}$ atom/cc) to the poly-Si layer 14 by ion injection or ion doping and re-crystallized in this state by said solid phase deposition, flash lamp annealing, pulse or continuous wave laser annealing, or condensing lamp annealing, crystallization is accelerated as well as irregularities present in the crystalline grain field (grain boundary) of the poly-Si thin film is reduced so that the film stress is reduced and it becomes easier to obtain high quality poly-Si TFT with a high carrier mobility.

These group IV elements can be added to the amorphous Si film or/and the poly-Si layer by ion injection or ion doping.

The group IV elements such as Ge and tin can be added to the amorphous Si or/and poly-Si layer and the monocrystalline Si film by mixing them as gas components with the raw material gases during the Si epitaxial growth by CVD, or during the film formation by plasma CVD or thermal CVD.

An amorphous Si film containing H is formed by decomposition using raw material gases such as monosilane ($SiH_4$), disilane ($Si_2H_6$), trisilane ($SiH_8$), and $SiH_2F_2$, and the raw materials for hydrogenates, by a high frequency discharge at 13.56 MHz at an ambient temperature ~300° C. by the plasma CVD method.

Since 600° C. is the boundary between the poly-Si and amorphous Si, an amorphous Si film without containing H can be formed by thermal CVD in the hot wall vacuum CVD equipment at 580° C. or less.

As one of the means to increase electron mobility, an application of strains to the channel semiconductor layer is known. If strains are applied to a channel semiconductor layer, its band structure changes and as a result, degeneracy is alleviated to depress electron scattering so that the electron mobility increases. Concretely, a strain-applying semiconductor layer of a mixed crystalline layer made of a material having a greater lattice constant than that of Si is formed on a monocrystalline Si substrate. For example, if a SiGe layer with a Ge concentration ranging from 20 to 30% is formed and a monocrystalline Si layer is formed as a channel semiconductor layer on the SiGe layer, a strained Si layer is formed due to a difference in the lattice constant. If this strained channel layer is used instead of a non-strained channel layer, the electron mobility is reported to be improved significantly by approximately 1.76-fold when compared to the case using a non-strained channel layer (J. Welser, J. L. Hoyt, S. Takagi, and J. F. Gibbons, I E D M 94-373)

For example, if a monocrystalline Si layer 12a is formed as a strain applying semiconductor layer which is a SiGe layer with a Ge concentration ranging from 20 to 30% and a strained Si layer 12b is formed on its top, a MOSTFT peripheral circuit is implemented, in which the electron mobility is significantly improved by approximately 1.76-fold when compared to the monocrystalline Si layer in the conventional non-strained channel layer. Therefore, an ultra slim electrooptic display is implemented with high intensity, high definition and high quality.

As a film deposition method of a SiGe layer, epitaxial growing methods such as the CVD method and MBE method, liquid phase growing methods such as LPE (liquid phase epitaxy), and solid phase growing methods for poly SiGe layer or amorphous SiGe layer are currently known. As long as the composition ratio of Ge can be controlled for the crystalline deposition method, other deposition methods can be used.

As Si raw materials, the following are desirable: hydrogenation raw materials such as monosilane ($SiH_4$), disilane ($Si_2H_6$), trisilane ($Si_3H_8$), and tetrasilane ($Si_4H_{10}$) and halogenation raw material such as dichlorosilane ($SiH_2Cl_2$), trichlorisilane ($SiHCl_3$), and silicon tetrachloride ($SiCl_4$). As Ge raw materials, germanium ($GeH_4$), germanium tetrachloride ($GeCl_4$) and germanium tetrafluoride ($GeF_4$) are desirable.

Mixed crystalline layers made of materials having different lattice constants such as mixed crystalline layers containing both Si and other elements as in SiC and SiN, Group 2 to 6 element mixed crystalline layers as in ZnSe, or Group 3 to 5 element mixed crystalline layers as in GaAs and InP, can be used as a strained semiconductor layer in place of the SiGe layers.

The method of improving the electron mobility by the formation of a strained semiconductor layer on the strain applying semiconductor layer such as aforesaid SiGe layer can be used when producing semiconductor devices such as picture signal processing LSI, memory LSI, CPULSI, DSPLSI, voice signal processing LSI, CCD, CMOS sensor and BiCMOS by separating an ultra slim semiconductor layer or ultra slim SOI semiconductor layer.

Figure 3A:
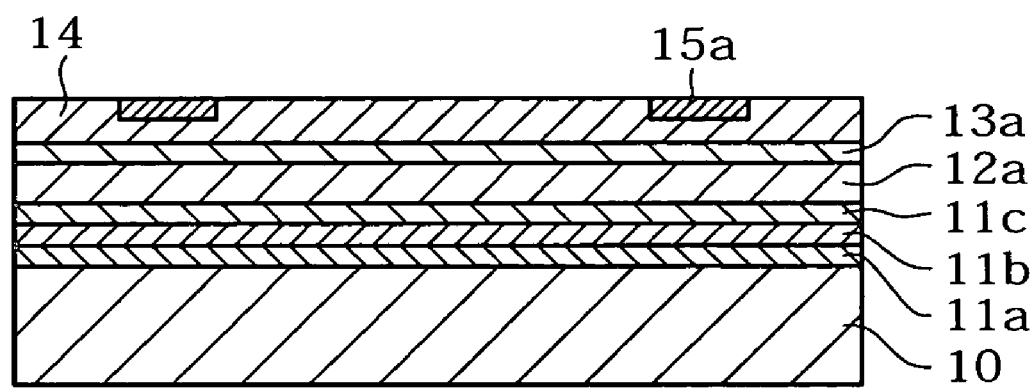
Figure 3B:
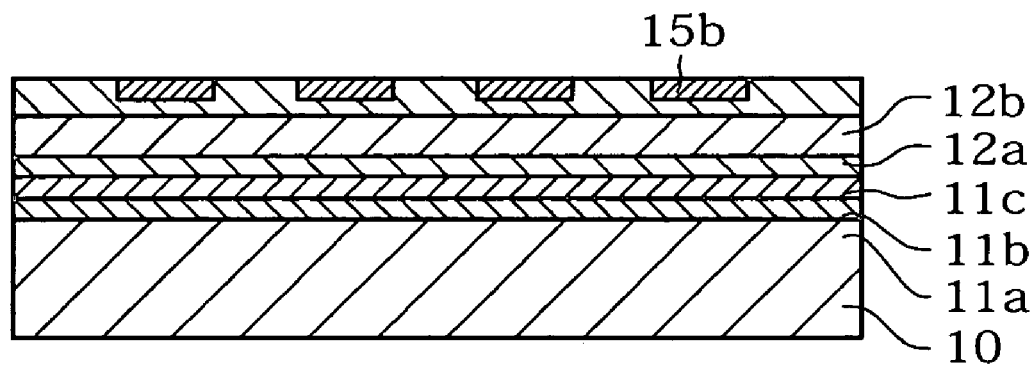

(4) According to the general technology, an ultra slim electrooptic display device substrate layer (hereafter referred to as an ultra slim TFT substrate layer) is formed in by respectively forming one or both of semiconductor devices and semiconductor for integrated circuits such as a poly-Si TFT section 15a (See FIG. 3(a)) and wiring as display device sections in the surface layer with a thickness ranging from 50 to 100 nm wherein crystal grain sizes are controlled arbitrarily, in the poly-Si layer 14, a monocrystalline SiTFT section 15b (See FIG. 3(b)), diodes, resistors, capacitors, coils and wiring as peripheral circuit sections in the monocrystalline Si layer 12b.

Since the monocrystalline Si-layer 12b shows high electron and positive hole mobility as in the Si substrate, picture signal processing circuits, picture quality correction circuits, memory circuits, CPU (central processing unit) circuits and DSP (digital signal processor) circuits can be incorporated as well as peripheral driving circuits.

At the same time, an external output electrode (including a solder bump) 65 is formed to be connected to the peripheral circuits of the ultra slim TFT substrate layer. It is desirable to be connected to a flexible board or be mounted on a PCB (printed circuit board) by connecting an anisometric conductive film, connecting by ultrasonic waves, or soldering after a LCD panel is formed. In this diagram, diodes, resistances, capacitors, coils and wirings are not shown.

When forming a bump using solder as an external output electrode, a desirable height of the bump is the thickness of the facing substrate or less.

If peripheral circuits with a multilayer wiring structure or display sections and peripheral circuits are formed in the monocrystalline semiconductor layer, the degree of integration is increased so that an ultra slim electrooptic display can be implemented inexpensively with high resolution, high functionality and high quality.

Furthermore, if peripheral circuits are formed even in the monocrystalline semiconductor layer in the sealed region, the number of units per wafer increases due to shrinking of the LCD panel sizes and the cost reduction will be implemented.

At this stage, it is desirable to form a groove 62 (See FIG. 7) from the monocrystalline Si layer 12b at least till until the high porous Si layer 11b along the division line, that is a division boundary within the scribe line, when being [the layer] is divided into single panels of various ultra slim electrooptic displays. By forming a groove 62, the ultra slim TFT substrate layer as will be discussed later is divided within the scribe line so that separation from the Si substrate 10 becomes easy and division in the process (12) as will be discussed later can be performed easily.

A groove 62 is preferably formed with an arbitrary width from the monocrystalline Si layer 12b at least till until the high porous Si layer 11b by dry etching (plasma etching using $SF_6$, $CF_4$, $Cl+O_2$, $HBr+O_2$, reverse sputter etching, etc.), wet etching (fluoric acid etchants such as $HF+H_2O_2+H_2O$ mixed solution or $HF+HNO_3+CH_3COOH$ mixed solution, alkaline etchants), or mechanical processing (cutting a groove using a blade dicing, diamond cutter, cemented carbide cutter, and ultrasonic cutter).

A transparent resin 16 which is mounted in the pixel opening section is also mounted in the groove to be able to reduce chipping, cracking and fracturing of the insulating layer and the monocrystalline Si layer 12b when being separated.

(5) The poly-Si layer 14 at the pixel opening section in the display area is removed by etching. Due to the masking with a photo resist other than the pixel opening section, by etching such as plasma etching using $Cl+O_2$, $HBr+O_2$, $SF_6$, $CF_4$, or dry etching such as reactive etching (See FIG. 4). If desirable, a wet etching with fluoric acid can be carried out using a $H_2O_2+H_2O$ solution mixture or $HF+HNO_3+CH_3COOH$) solution mixture.

(6) A transparent insulating film with a thickness of 50~200 nm (e.g., $SiO_2$ layer 13b, SiNx and $SiO_2$ laminated film, $SiO_2$, SiNx and $SiO_2$ laminated film, SiON, etc.) and a light-shielding metallic film with a thickness of 100~300 nm (hereafter referred to as a metallic film) 17 are formed respectively on the entire surface by CVD, sputtering or vapor deposition. Subsequently, connections of the poly-Si TFT section on the poly-Si layer 14 (drains, sources and gates), and the metallic film 17 at the bottom of the pixel opening sections are removed by plasma etching using $CCl_4$, or by wet etching using an acidic etching solution.

Since the transparent insulating film and the metallic film formed on the peripheral circuit sections are not removed by etching, leakage of the strong incident light is shielded to prevent TFT current leakage.

In short, when a strong incident light enters as in the case of LCD projectors, it is desirable to cover the areas with a light shielding film besides the pixel opening sections.

Figure 5:
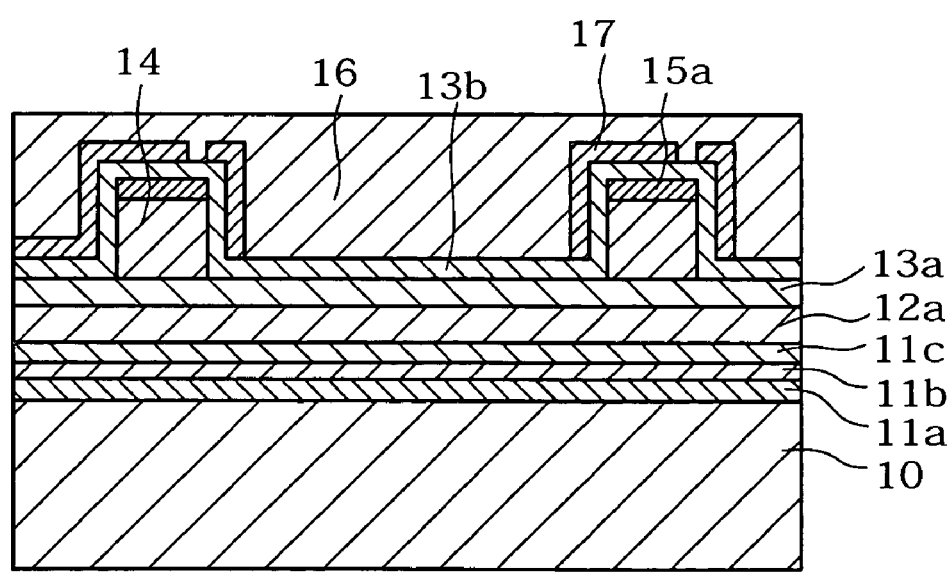

Subsequently, a transparent resins 16 is embedded as a light optically transparent material in the pixel opening sections in the display area and the surface is planarized by CMP (See FIG. 5). Because this metallic film 17 prevents TFT current leakage caused by irregular reflection of a strong incident light, a low reflective metallic film made of WSi, Ti, Cr, Mo, Mo—Ta is desirable. If the metallic film 17 on the side wall of each pixel opening section is grounded, this prevents it from building up a charge by the strong incident light in order to prevent the leak current from TFT.

As measures for reducing TFT current leakage due to light leakage caused by strong incident light and as measures for improving light resistance, windows are preferably opened only at the electrode connections of the poly-Si TFT section, leaving the metallic film 17 on the poly-Si TFT film so that the poly-Si TFT section is entirely covered for shielding the light for the top, side and bottom of the poly-Si TFT section.

A transparent resin 16 is formed on the entire surface with a thickness of 15~20 $\mu$m to be embedded in the pixel opening section. If desirable, the surface is planarized by CMP (chemical mechanical polishing). The transparent resin 16 is embedded by spin coating of a transparent resin such as the silicone series, urethane series and epoxy series and is cured under specific conditions, for example, by a specific heat treatment. In place of the transparent resin 16, it is possible to use a optically transparent material such as glass films or $SiO_2$ films, but it is necessary to have a strong light resistance against incident UV rays.

In the case of glass films, a low temperature micro glass powder which has been dispersed in an organic solvent is coated to fill up the pixel opening section, and fused at an appropriate temperature, such as at 500~600° C., to form a thick glass film. Alternatively, the pixel opening section is filled up with at least one kind of the following materials: $SiO_2$, PSG (phosphosilicate glass), BPSG (borophosphosilicate glass), or BSG (borosilicate glass) by CVD, or sputtering. Subsequently, the surface is planarized by a method such as CMP.

Figure 6:
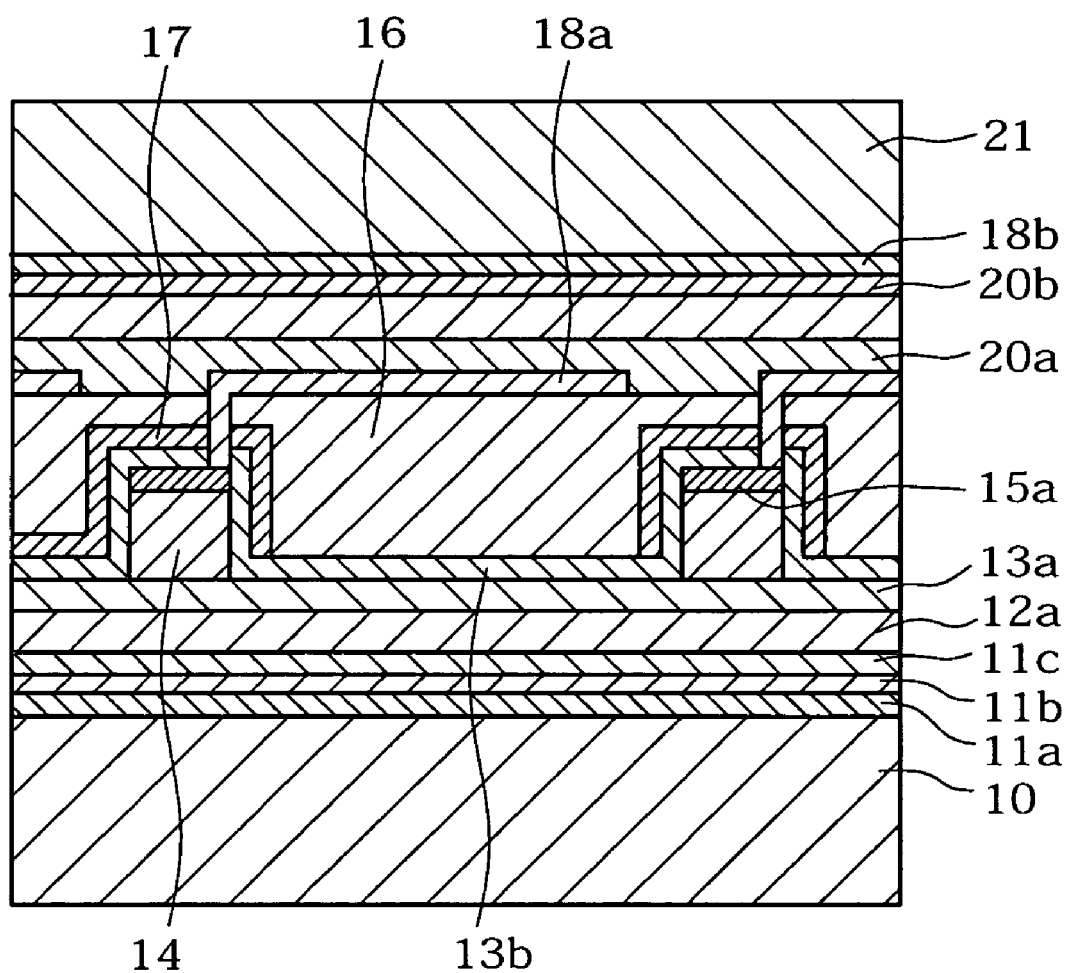

(7) A window is made in the transparent resin 16 on the poly-Si TFT section 15$a$ in the display area and a transparent electrode 18$a$ with a thickness of 130~150 nm is formed as a pixel electrode which is made of ITO (Indium-Tin-Oxide; indium oxide.tin oxide mixed transparent conductive film) and IZO (Indium-Zinc-Oxide; indium oxide.zinc oxide mixed transparent conductive film) to form an ultra slim TFT substrate layer (See FIG. 6).

(8) A facing substrate 21 is laminated on the ultra slim TFT substrate layer on the Si substrate 10 to be sealed (See FIG. 6).

[1] An organic alignment film material such as polyimide or polyamide is coated on the transparent electrodes 18$a$ and 18$b$ on the ultra slim TFT substrate layer on the Si substrate 10 and the facing substrate 21 by spin coating, dip coating or roll coating and an alignment treatment is performed by buff rubbing. If desirable, [the surface] is cleaned by organic cleaning using IPA (isopropyl alcohol), in order to form respective alignment films 20$a$ and 20$b$. Alternatively, the alignment films 20$a$ and 20$b$ can be inorganic alignment films prepared by oblique deposition of SiOx.

A facing substrate is made of quartz glass satisfying optical characteristics with a linear transmittance of 80% or greater without an antireflective film, transparent crystallized glass (Neoceram, CLEARCERAM, and Zerodur, etc.) borosilicate glass, aluminosilicate glass, microsheet glass, high transparent, heat resistant and moisture-proof resin films. If desirable, color filters or micro lens arrays are formed. In addition, a transparent electrode is formed on the entire surface and an aligned organic or inorganic alignment film is formed at least per each chip.

[2] For a single panel of the ultra slim TFT substrate layer of the Si substrate 10, a sealant 22 (See FIG. 7) and a common electrode agent (not shown) are coated. For example, a facing substrate 21 with a 12 inch diameter is laid with a liquid crystal gap of 2 $\mu$m to be sealed. This is a so-called face-to-face liquid crystalline assembly {A facing substrate in a substrate state (face) is laid over a monocrystalline Si substrate 10 in the substrate state (face) to be sealed} (See FIG. 6). In this case, the liquid crystalline injection hole (not shown) is left open.

A sealant and a common agent can be selected from among the following agents: light curable sealants, heat curable and light curable sealants, or UV hardening sealants, heat curable and UV hardening sealants, and heat curable sealants. From the aspects of characteristics and working efficiency, it is desirable that both are selected from the same type.

The actual sealants and common agents are comprised of a modified acrylate oligomer which is the major component of sealants and common agents and which expresses the basic characteristics after curing, an acrylate monomer for controlling viscosity of the liquids, a photo initiator for light curing or curing of the UV hardening portions, an epoxy resin which is the major component of sealants and common agents and which expresses the basic characteristics after curing, a curing agent for curing the epoxy resin, a filler for preventing invasion of moisture content from the atmosphere in the sealant (silica of the pearl), and fibers equivalent to the liquid crystalline gap.

A common agent which is coated on the common pad in the TFT substrate chip contains a micro pearl of a gold-plated resin which is larger than the liquid crystalline gap (e.g., approximately 3 $\mu$m$\Phi$ which is larger by approximately 1 $\mu$m$\Phi$ than the liquid crystalline gap). When a TFT substrate chip is laid over a facing substrate chip, the micro pearl is broken under pressure and both transparent conductive films become electrically connected due to the presence of broken gold plated resin.

If there is a liquid crystal alignment film such as polyimide or polyamide in the sealed area, it is necessary to make such an effort in terms of micro pearl materials and sizes that both transparent conductive films become electrically connected via the gold plated resin after the film is broken.

If an organic liquid crystal alignment film such as polyimide is formed in the sealed area between the TFT substrate chip or/and the facing substrate chip by spin coating, it is important to be packed with a filler in order to prevent the moisture content from entering from the atmosphere into the sealant and optimization of the filler packing ratio is necessary based on the LCD panel sizes. For example, in the case of 1 inch size projector LCD panels, a desirable filler packing ratio ranges from 10 to 30%. It is generally determined by the relationships between ease in dispense coating and the ratio of penetration of the moisture content.

In order to achieve electrical connection between one 1 chip in the ultra slim type electrooptic display device substrate layer (monocrystalline Si layer 12) and the facing substrate 21, a common agent containing a micro pearl of gold plated resin is coated using a dispenser at least at two positions on the common pad within the one chip.

Similarly, a sealant 22 containing fibers equivalent to the liquid crystalline gap (gap agent) is coated in the sealed area for each one chip in the ultra slim type electrooptic display device substrate layer.

In the case of a direct-viewing type, the liquid crystalline gap can be secured by scattering micro spacers on the entire screen.

Bumps formed with the resin (OCS: on chip spacer) which is equivalent to the liquid crystalline gap can be formed in arbitrary numbers around the pixel opening sections between the facing substrate 21 and the ultra slim TFT substrate layer.

The expression of "at least for every one chip" in the ultra slim TFT substrate layer (monocrystalline Si layer 12) and the facing substrate 21 is due to the fact that organic or inorganic alignment films 20a and 20b can be formed on the entire surface. In this specification, we define that one chip of the ultra slim TFT substrate layer (monocrystalline Si layer 12) is laid over one 1 chip of the facing substrate 21 to form one 1 panel of LCD.

In contrast to the aforesaid face-to-face liquid crystal assembly, a non-defective chip of the facing substrate in which organic or inorganic alignment film 20b is formed after an alignment treatment by forming a transparent electrode 18b can be laid selectively on a non-defective chip within the ultra slim TFT substrate layer to be sealed. This is generally called a face-to-face liquid crystal assembly (a monocrystalline Si substrate in the substrate state (face) is laid over a facing substrate in a chip state (single piece) to be sealed).

Since in the face-to-face liquid crystal assembly, a TFT substrate layer containing defective chips may be laid over a facing substrate containing defective chips to be sealed, there is a possibility that defective LCD panels are produced, which may increase production costs. In contrast, in the face-to-single liquid crystal assembly, non-defective facing substrate chips are selectively laid over non-defective chips within the ultra slim TFT substrate layer to be sealed so that the occurrence of defective LCD panels becomes minimal, which can reduce production costs.

(9) The Si substrate 10 and the facing substrate 21 are covered with a UV hardening tape (hereafter referred to as UV tape) 23 and the Si substrate 10 is separated from the high porous Si layer 11b by a high pressure fluid jet injection exfoliation method using a water jet, air jet or water/air jet, or a laser process exfoliation method or a laser water jet process exfoliation method (See FIG. 7). After the separated Si substrate 10 is if desirable treated for surface re-grinding and etching, and thermally treated under the atmosphere containing hydrogen, it can be reused if desirable.

The UV tape 23 consists of a UV tape base such as polyolefin or polyethyleneterephthalate (PET), and an antistatic acrylic UV hardening sealant with a strong bonding strength without leaving any residual glue. The Si substrate 10 can be separated from high porous Si layer 11b while both facing substrate 21 and the Si Substrate 10 are still firmly held and their surfaces are respectively protected by the UV tape 23 due to a strong bonding strength of the UV hardening sealant.

If a groove 62 is formed, the interior of the groove 62 in the face-to-single liquid crystal assembly is filled with a UV hardening sealant of the UV tape 23. This can prevent chipping, cracking and breaking at the peripheral area of the ultra slim TFT substrate due to the stress applied when the layer is separated. It also acts as a protective layer when the unwanted porous Si layer is removed by etching to prevent chipping, cracking and breaking at the peripheral area of the ultra slim TFT substrate. Furthermore, the UV hardening sealant weakens it sealant power due to irradiation of UV-rays so that the UV tape 23 can be removed without leaving any residual glue after separation. For some usages, an antistatic thermal expansion stripping type sealant tape can be used without leaving any residual glue after separation.

In the case of face-to-single liquid crystal assembly, it is desirable to fill the gaps sufficiently by setting the thickness of the sealant of the UV tape to be greater than the thickness of the facing substrate.

In order to prevent cracking, chipping and breaking due to warping while the substrate is held after being separated, the facing substrate 21 is bonded on one side using a two-sided UV tape and a transparent sheet having rigidity such as glass having rigidity can be bonded on the other side.

If desirable, in the case of a face-to-single liquid crystal assembly, a glass sheet having rigidity via wax and a metallic sheet can be bonded at least on the facing substrate 21.

In order to avoid any adverse effects of stripping and cleaning on LCD sealability, organic sealants and water soluble sealants which can be removed by an alcoholic solvent such as ethanol and IPA (isopropyl alcohol) are desirable examples of this wax.

Examples of such water soluble sealants are a hot-melt series of water soluble solid waxes such as Aquawax 20/50/80 (Nikka Seiko K. K.: major component: fatty acid glyceride), Aquawax 553/531/442/SE (major components: polyethylene glycol, vinylpyrrolidone copolymers, glycerin polyethers), PEG Wax 20 (major component: polyethylene glycol), etc., or water soluble waxes such as Aqua Liquid WA-320 (Nikka Seikko K.K., a synthetic resinous liquid sealant: major components: polyethylene glycol, vinyl pyrrolidone derivatives, methanol), WA-20511/QA-20566 (major components: polyethylene glycol, vinyl pyrrolidone derivatives, IPA, water). These sealants can be cleaned after stripping with warm pure water at 50 to 60° C.

The antistatic UV tape 23 includes those having a conductive transparent film of ITO or IZO on the sealant surface of the UV tape base or those with a conductive surface chemical treatment, or those containing conductive transparent oxide micro particles (ITO or IZO) in the UV hardening sealants at such levels that the electrostatic damage can be prevented. If necessary, these can be combined. If an antistatic UV tape 23 is used, the electrostatic damage in the semiconductor devices formed in the TFT substrate layer can be prevented.

Since the electrostatic break-down during the manufacturing process can be prevented by such antistatic functions, defects in the semiconductor characteristics due to electrostatic damage can be prevented. A desirable level of surface resistance of UV hardening sealants before and after curing is such that electrostatic damage at a level of $10^6 \sim 10^{12} \Omega/m$ can be prevented.

Figure 40:
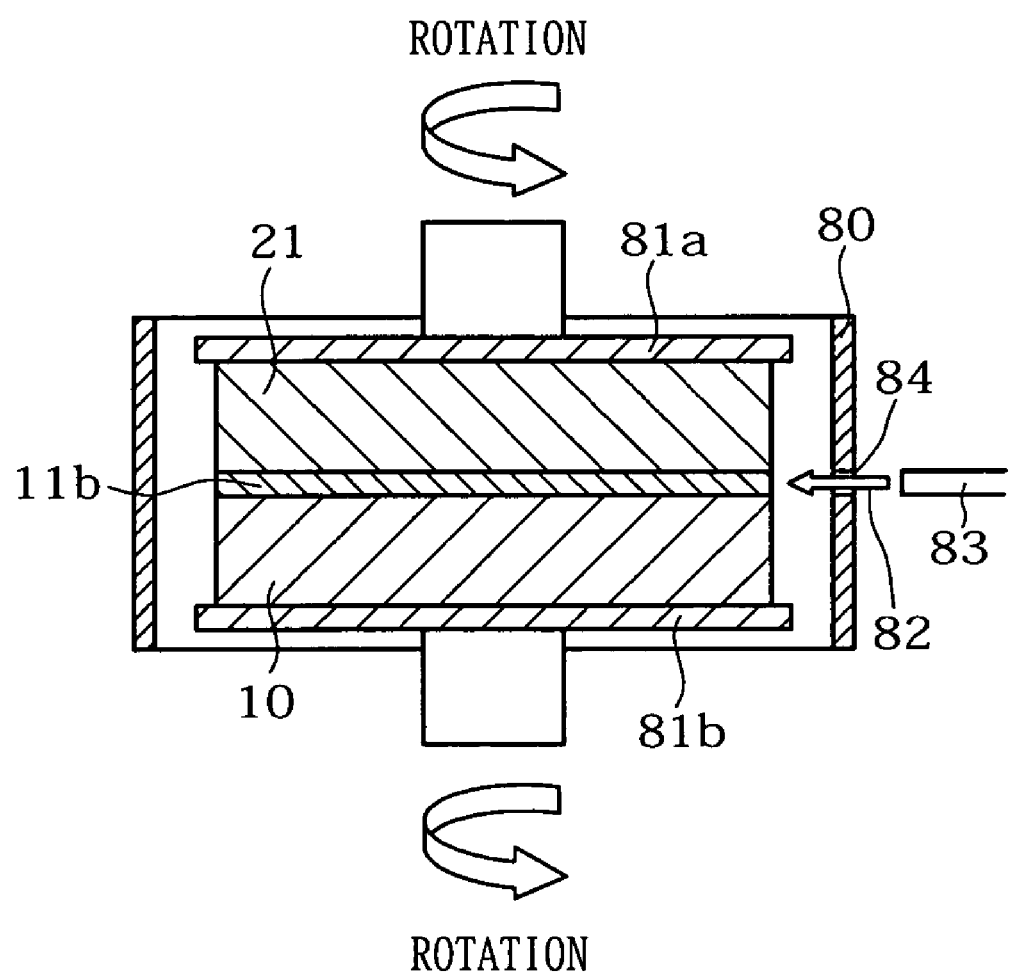

When separated from the high porous Si layer 11b, a high pressure fluid jet injection exfoliation method using water jet, air jet or water/air jet is applied. In this case, a high pressure fluid jet injection stripping equipment used is shown in FIG. 40. FIG. 40 is an overall cross-sectional view of the high pressure fluid jet injection stripping equipment used in the execution form of the present invention.

The high pressure fluid jet injection stripping equipment shown in FIG. 40 is comprised of a pair of holders 81a and 81b which makes a substrate rotate by suction in vacuum in the up and down direction, and a micro nozzle 83 which ejects a high pressure fluid jet 82. A guard ring stopper 80 is a cylindrical tool enclosing the holders 81a and 81b. The guard ring stopper 80 has a slit with a diameter of 10 to 50 μm (84) so that the width of the high pressure fluid jet 82 injected from a fine nozzle 83 is restricted. The diameter of the slit can be determined by the hydraulic pressure of the high pressure fluid jet 82 and the air pressure.

In this high fluid jet injection stripping equipment, for example, a substrate prepared by bonding a Si substrate 10 with a facing substrate 21 as shown in FIG. 6 is supported between the holder 81a and 81b. In this case, a layer to be separated (separation layer) is a high porous Si layer 11b. In FIG. 40, those other than a Si substrate 10, a porous Si layer 11b and a facing substrate 21 are not shown in this figure for simplicity.

The height of the guard ring stopper 80 and the heights of the Si substrate 10 and the facing substrate 21 which are sandwiched with the holders 81a and 81b are adjusted such that [the direction] of a high pressure fluid jet 82 injected from the precision nozzle 83 is precisely adjusted to hit exactly the porous Si layer 11b to be separated. Subsequently, the holders 81a and 81b are rotated so that the pressure from the high pressure fluid 82 injected from the precision nozzle 83 acts at the high porous Si layer 11b in order to separate the Si substrate 10.

Since a width of the high pressure fluid jet 82 injected from the precision nozzle 83 is controlled by the slit hole 84 of the guard ring stopper 80 and its height is precisely adjusted to accurately hit the high porous Si layer 11b to be separated, it does not hit the areas other than the high porous Si layer 11b as strongly enough to be separated.

The high pressure fluid jet 82 can be formed by injecting liquids such as water, etching solutions and alcohols, or gases such as air, nitrogen gas and argon gas, or a [liquid and gas] mixture wherein a liquid and a gas are mixed at an appropriate ratio, besides using a water jet and air jet. In particular, in the case of a so-called water/air jet which is an injection of a jet consisting of a liquid and a gas, gas bubbles are present in the liquid so that separation can be carried out effectively using an impact action when the bubbles are ruptured.

If ultrasonic waves are applied to the fluid when a high pressure fluid jet 82 is blown, vibration of ultrasonic waves acts on the porous layer and separation from the porous layer can be carried out more effectively. Furthermore, powders or ultra fine powders (polishing agents, ice, plastic chips, etc.) can be added as micro solids to the high pressure fluid jet 82. If such a micro solid is added, separation can be carried out more effectively because the micro solid directly collides with the high porous Si layer 11b.

If an ultra fine powder of granules and powders is added to the high pressure fluid jet 82 and ultrasonic waves are also applied at the same time, more efficient separation can be achieved.

Laser process stripping equipment (not shown) can be used in order to separate a separation layer from the rotating substrate by applying laser lights emitted from the laser output unit. A difference in the laser process stripping equipment from said high pressure fluid jet stripping equipment is only the fact that the laser output unit is equivalent to a combination of said micro nozzle 83 with a slit hole 84 and the rest of the structure is almost identical.

In the laser process stripping equipment, it is possible to separate the high porous Si layer 11b by laser processes (abrasion processes, thermal processes, etc.) by irradiation of more than one laser from the horizontal plane of the high porous Si layer 11b of the rotating substrate.

Lasers including visible light, near UV-rays, far UV-rays, near infrared rays and far infrared rays, such as carbon dioxide gas lasers, YAG (Yttrium Aluminum Garnet) lasers, excimer lasers and harmonic modulation lasers are available.

Laser processes can be divided into two categories: a method of separation by thermal processes or ablation processes by irradiation of at least one or more pulsed or continuous wave laser lights that a target subject can absorb; and another method of separation in which at least one or more pulsed or continuous wave near infrared lasers (Nd: YAG lasers, Nd: YVO4 lasers, Nd: YLF lasers, titanium and sapphire lasers, etc.) having a wavelength transmitting through a target subject are emitted to be focused in the inside of the target subject and a phenomenon of optical damaging is generated by multiphoton absorption to create a reformed region (e.g., cracked region, fusion treated region, regions with altered refractive index, etc.) wherein separation occurs using a relatively small force.

In general, in the latter case, if a processing target is irradiated by laser lights under conditions with a peak power density of $1\times10^8$ (W/cm$^2$) or greater (electrical field intensity at the focal point of the pulsed lasers) and a pulse width of 1 $\mu$S or less while focusing at the interior of the processing target which is, the interior of a monocrystalline semiconductor substrate, optical damage is caused by multiphoton absorption in the interior of the processing target and thermal distortion is induced due to such optical damage. As a result, a reformed region, for example, a cracked region, is formed in the interior wherein separation occurs using a relatively small force. When compared to a monocrystalline semiconductor layer, in the cases of a porous semiconductor layer of this invention and a monocrystalline semiconductor layer of the ion injected layer as will be mentioned discussed later, it is possible to form a reformed region when a phenomenon of optical damaging occurs due to multiphoton absorption below the aforesaid peak power density (e.g., cracked region, fusion treated region, regions with an altered refractive index, etc.) and thus, separation from a porous semiconductor layer and an ion injected layer as will be mentioned later can be carried out easily by laser processes.

In the case of laser processes, laser lights is converged through a collective lens at the interior of the processing target (namely the interior of the porous semiconductor layer and ion injected layer as will be discussed later) and the target can be separated by gradually moving the focal point into the interior of the processing target. In particular, in the case of the present invention, a porous Si layer or an ion injected layer is a processing target so that the separation process using laser lights can be performed highly efficiently. If desirable, a Si substrate 10 can be separated from a porous Si layer while cooling the side of the facing substrate 21 via a UV tape using a support device which is cooled with a fluid.

Laser water jet process stripping equipment (not shown) can be used in order to separate a high porous Si layer 11b from the rotating substrate by irradiation of a laser water jet in combination with laser lights and a water jet from the output unit. A difference in the laser water jet process stripping equipment from said laser process stripping equipment and said high pressure fluid jet stripping equipment is only the fact that the laser water output unit is equivalent to a combination of said micro nozzle 83 with a slit hole 84 and the rest of the structure is almost identical.

The method of laser water jet process stripping uses the advantages of both water jet and lasers. Based on the fact that laser lights arise completely reflected on the boundary between water and air, all laser lights is are totally reflected by the water jet as in glass fibers and guided in the parallel direction and separation occurs due to thermal processes and ablation processes caused by absorption of laser lights. Unlike the conventional laser processes in which thermal deformation is the subject of concern, [the equipment] is always cooled with water in the case of a laser water jet so that the thermal effects on the separating surface, for example, thermal deformations, can be reduced.

According to the laser water jet process exfoliation method, one or more laser water jets in which at least one or more pulsed or continuous near infrared lasers (Nd: YAG lasers, Nd: YVO$_4$ lasers, Nd: YLF lasers, titanium and sapphire lasers, etc.) are sealed in the water columns of pure water or ultra pure water under an arbitrary water pressure are injected in the horizontal direction of the porous Si layer 11b in the rotating substrate in order to apply processes (ablation processes, thermal processes, etc.) for separation from the porous Si layer 11b.

Lasers including visible light, near UV-rays, far UV-rays, near infrared rays and far infrared rays, such as carbon dioxide gas lasers, YAG (Yttrium Aluminum Garnet) lasers, excimer lasers and harmonic modulation lasers are available. In addition, water columns for the water jets under an arbitrary water pressure can be provided from tap water. However, for certain types of lasers, it is desirable to use pure water or ultra pure water as water columns for water jets wherein lasers are not attenuated due to the absence of scattering by irregular reflection.

The aforesaid high pressure fluid jet injection exfoliation method, laser process exfoliation method and laser water jet process exfoliation method can also be used for manufacturing semiconductor devices such as picture signal processing, memory LSI, CPULSI, DSPLSI, voice signal processing LSI, CCD, CMOS sensors and BiCMOS by separating an ultra slim semiconductor layer or ultra slim SOI semiconductor layer.

The aforesaid high pressure fluid jet injection exfoliation method, laser process exfoliation method and laser water jet process exfoliation method can also be used for cutting monocrystalline or polycrystalline semiconductor substrates or transparent or opaque support substrates, and also for slicing rotating monocrystalline or polycrystalline semiconductor ingots.

As mentioned previously, if a groove 62 is formed from the monocrystalline Si layer 12b at least until the high porous Si layer 11b along the division line, that is the division boundary within the scribe line, so when [the layer] is divided into single panels of various ultra slim electrooptic displays, the ultra slim TFT substrate layer to be separated from the monocrystalline Si substrate 10 as a support substrate has already been divided so that separation becomes much easier.

Figure 8A:
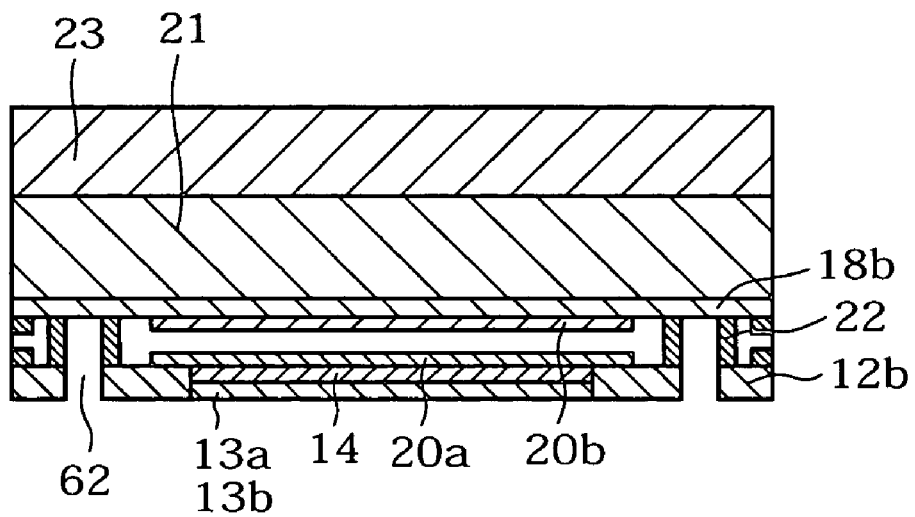
Figure 8B:
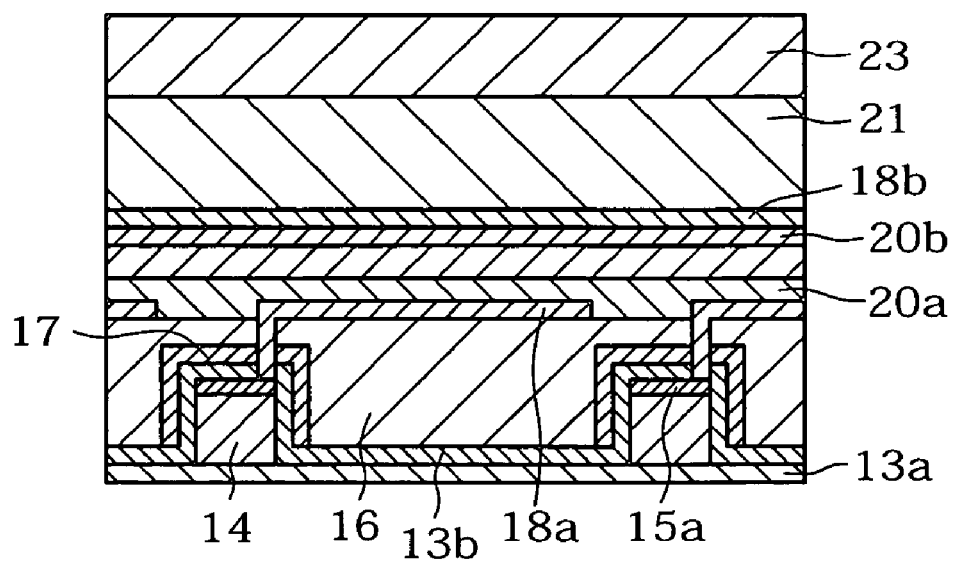

(10) The low porous Si layer 11c and monocrystalline Si layer 12a on the separated surface are etched to expose a transparent resin 16 via transparent insulating layers such as SiO$_2$ layer 13a and SiO$_2$ layer 13b (FIG. 8(a) shows an overview of the board, and FIG. 8(b) shows a display area).

The low porous Si layer 11c and the monocrystalline Si layer 12a are treated by wet etching with a mixed solution of HF+H$_2$O$_2$+H$_2$O or a mixed solution of HF+HNO$_3$+CH$_3$COOH, or by dry etching (plasma etching using SF$_6$, CF$_4$, Cl+O$_2$, HBr+O$_2$, reverse sputter etching, etc.). The light optically transparent material embedded in the pixel opening section can be protected by transparent insulating films such as SiO$_2$ layer 13a and SiO$_2$ layer 13b during the etching process for the low porous Si layer 11c and the monocrystalline Si layer 12a. Therefore, interference with quality such as light transmittance can be prevented. In the case of wet etching with a fluoric acid etching solution, it is desirable to use transparent insulating films containing highly acid resistant silicon nitride films instead of a SiO$_2$ layer, for example, laminated films of silicon oxide and silicon nitride obtained by thermal oxidation of silicon nitride film, laminated films of silicon oxide, silicon nitride and silicon oxide obtained by thermal oxidation of the laminated films of silicon oxide and silicon nitride, or silicon oxy-nitride films.

Figure 9A:
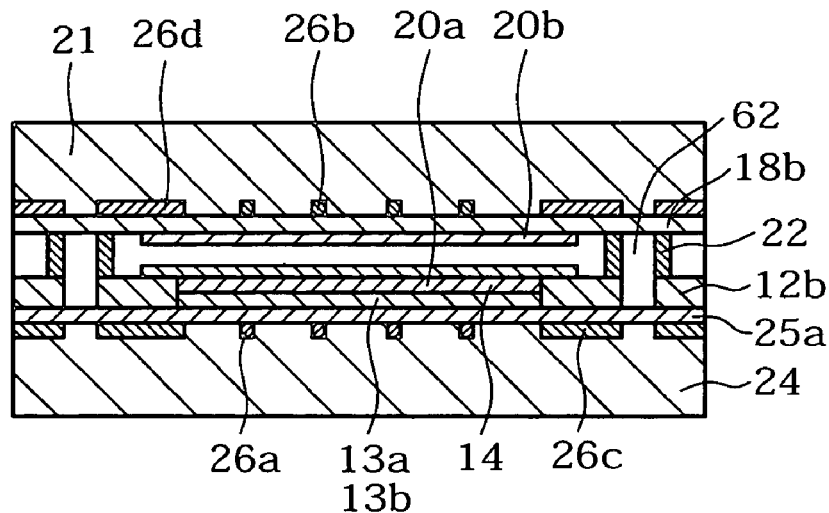
Figure 9B:
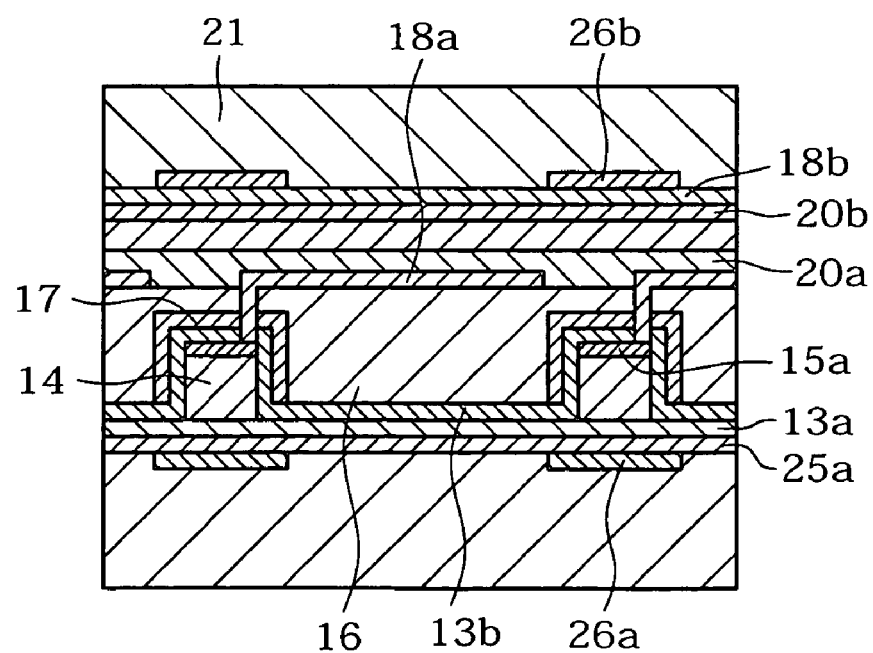

(11) A transparent support substrate 24 as a support is bonded on the exposed surface of the transparent resin 16 via the transparent insulating films such as SiO$_2$ layer 13a and SiO$_2$ layer 13b, using a heat resistant and light resistant transparent sealant 25a of the silicone series, urethane series, epoxy series or acrylic series (FIG. 9(a) shows an overview of the board, and FIG. 9(b) shows a display area).

In the case of transmissive type LCDs for projectors, a light resistant transparent sealant is desirable.

In addition, it is desirable that the transparent sealant 25a does not contain any elements which interfere with the characteristics, such as halogen atoms.

A low reflective and light-shielding film 26a and a reflective film 26b are preferably formed at the portion corresponding to the poly-Si TFT section 15a in the display area of the transparent support substrate 24 and at the portion corresponding to the poly-Si TFT section 15a in the display area of the facing substrate 21, respectively. In addition, it is also desirable to form a low reflective and light-shielding film 26a and a reflective film 26b at the respective portions corresponding to peripheral circuit areas of the transparent support substrate 24 and the facing substrate 21.

As a result, the reflective film 26b reflects undesirable incident light to increase contrast and it reduces the elevation of the liquid crystal temperature, resulting in longer life of the panel. Furthermore, the low reflective and light shielding film 26b reduces the TFT current leakage due to the reflected light from the back side to increase light resistance, in an attempt to increase luminance.

As transparent support substrates, the following materials satisfying optical characteristics with a linear transmittance of 80% or greater without an antireflective film can be used: quartz glass, transparent crystallized glass (Neoceram, CLEARCERAM, and Zerodur, etc.), borosilicate glass, aluminosilicate glass, microsheet glass, and transparent plastics.

If an ultra slim electrooptic display device substrate as separated above is bonded using a light resistant transparent sealant to a transparent support substrate such as transparent substrates including high thermal conductive glass with 10 (W/m·K) satisfying optical characteristics indicated by a linear transmittance of 80% or higher without an antireflective film; high transmissive ceramic polycrystals {electrically fused or sintered oxide crystals such as MgO (magnesia), Y$_2$O$_3$ (yttrium), CaO (calcia), Al$_2$O$_3$ (monocrystalline sapphire), BeO (beryllia), polycrystalline sapphire, or monocrystalline or polycrystalline YAG of polyoxide crystals, monocrystalline or polycrystalline spinels, and 3Al$_2$O$_3$·2SiO$_2$, Al$_2$O$_3$·SiO$_2$}, fluoride monocrystals (calcium fluoride, magnesium fluoride, barium fluoride, etc.), high transmissive ceramic polycrystals or fluoride monocrystals or transparent crystallized glass coated with a diamond film synthesized by vapor phase reaction, and crystals; a high thermal dissipation effect against strong incident light is achieved, resulted in high luminance, high resolution and longer life. As a result, transmissive LCDs for projectors can be implemented with high quality and reliability.

If said high thermal conductive glass is used as a facing substrate (micro lens substrate, black mask substrate, etc.), a dust-proof glass forms an antireflective film at the input side, and a dust-proof glass forms an antireflective film at the output side. For example, a structure from the input side comprising of monocrystalline sapphire dust-proof glass forming an antireflective film, monocrystalline sapphire facing substrate (including micro lens substrate, black mask substrate, etc.), liquid crystal layer, ultra slim electrooptic display device substrate, monocrystalline sapphire support substrate, and a monocrystalline sapphire dust-proof glass forming an anti-reflective film are bonded to each other using a light resistant transparent sealant to achieve a high heat dissipation effect.

(12) The facing substrate 21, electrooptic display device substrate layer (monocrystalline Si layer 12) and transparent support substrate 24 are cut along the division boundary within the scribe line. According to the materials of the facing substrate 21 and the transparent support substance 24, an appropriate cutting method can be selected: blade dicing, laser cutting processes (thermal processes and ablation processes such as carbon dioxide gas lasers, YAG lasers, and excimer lasers; and multiphoton absorption reforming laser processes such as Nd: YAG lasers, Nd: YVO4 lasers, Nd: YLF lasers and titanium/sapphire lasers), diamond cutter, cemented carbide cutter, ultrasonic cutter, high pressure fluid jet injection cutting processes, laser water jet cutting processes.

Subsequently, a liquid crystal 70 selected based on the method of applying the electrical field and alignment films is injected from the injection hole: e.g., nematic liquid crystals (TN mode liquid crystals, VA (vertically aligned) mode liquid crystals, smetic liquid crystals (strongly electroconductive liquid crystals, non-strongly electroconductive liquid crystals), polymer dispersible type liquid crystals, or other liquid crystals. If desirable, a liquid crystal alignment treatment is applied by a heating/quenching treatment to obtain transmissive LCDs.

Figure 10A:
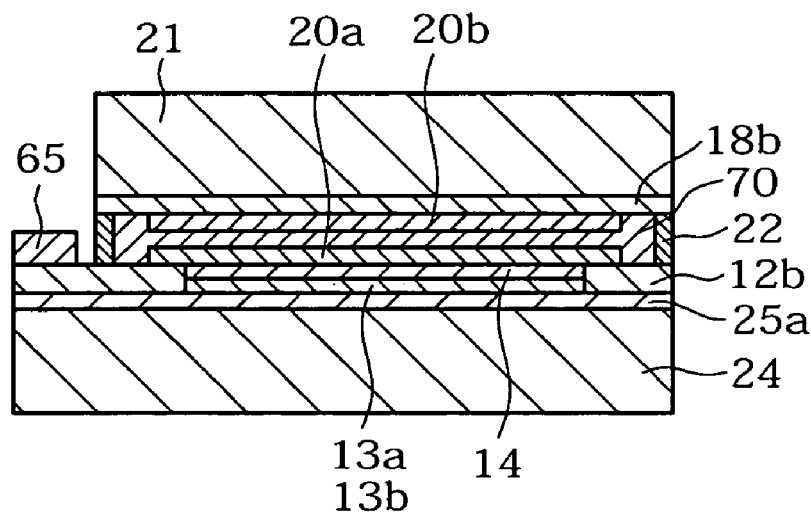
Figure 10B:
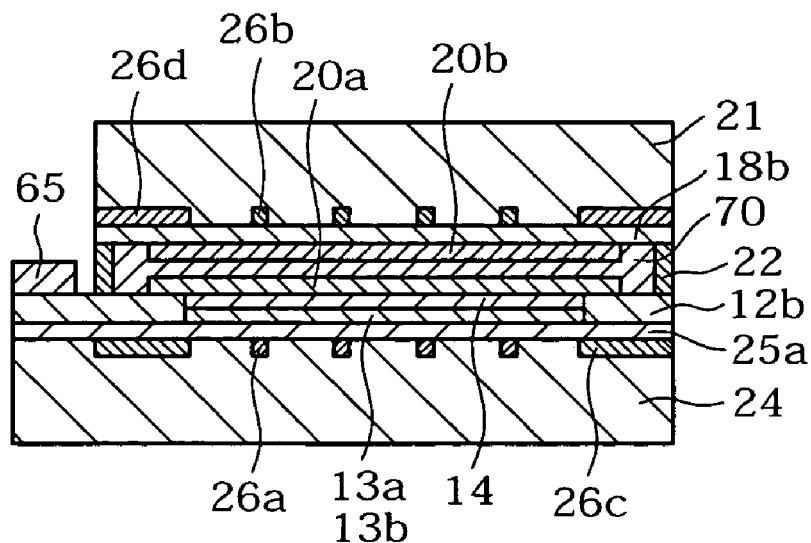

(FIG. 10(a) shows a transmissive LCD without a light-shielding film and FIG. 10(b) shows a transmissive LCD with a reflective film and a light shielding film).

The following combinations are desirable for the relationships among the alignment film, alignment treatment and liquid crystal.

[1] In the case of an organic alignment film such as polyimide and polyamide with a thickness of 5~50 nm, a positive dielectric anisotropic TN mode liquid crystal is used with a rubbing process.

[2] In the case of an organic alignment film containing a vertical alignment agent such as polyamide with a thickness of 5~50 nm, a negative dielectric anisotropic TN mode liquid crystal (VA mode liquid crystal) is used without a rubbing process.

[3] In the case of an organic alignment film such as polyimide and polyamide with a thickness of 5~50 nm, a positive dielectric anisotropic TN mode liquid crystal is used with an ion beam irradiation process by applying an argon ion beam with an angle of 15 to 20° against the substrate under an acceleration voltage ranging from 300 to 400 eV.

[4] In the case of an organic alignment film such as polyimide and polyvinyl cinnamate with a thickness of 5~50 nm, a positive dielectric anisotropic TN mode liquid crystal is used with an optical alignment process by vertical irradiation of UV-rays linearly polarized at 257 nm against the substrate.

[5] In the case of an organic alignment film such as polyimide and polyvinyl cinnamate with a thickness of 5~50 nm, a positive dielectric anisotropic TN mode liquid crystal is used with a laser alignment process by irradiation of a 266 nm YAG laser with an arbitrary angle of 45° against the substrate.

[6] In the case of a silane alignment film in which an alkyl group forming a complex of a silicon atom and an oxygen atom is bound to a silicon atom, a negative dielectric anisotropic TN mode liquid crystal (VA mode liquid crystal) is used without an alignment process.

[7] In the case of an aminosilane alignment film, a positive dielectric anisotropic TN mode liquid crystal is used with a rubbing process.

[8] In the case of an inorganic alignment film of an oblique deposition film of SiOx with a thickness of 10~30 nm, a positive dielectric anisotropic TN mode liquid crystal is used with an alignment process by adjustment of the angle of vapor deposition from the vertical direction of the substrate.

[9] In the case of an inorganic alignment film of SiOx with a thickness of 10~30 nm prepared by vapor deposition of sputtering, a positive dielectric anisotropic TN mode liquid crystal is used with an ion beam irradiation process by applying an argon ion beam with an angle of 15 to 20° against the substrate under acceleration voltage ranging from 300 to 400 eV.

[10] In the case of an inorganic alignment film of SiOx with a thickness of 10~30 nm prepared by mirror tron sputtering (oriented sputtering), a positive dielectric anisotropic TN mode liquid crystal is used with an alignment process by adjusting a sputtering angle against the substrate.

[11] In the case of an inorganic alignment film of DLC (diamond like carbon) with a thickness of 5~20 nm prepared by CVD, a positive dielectric anisotropic TN mode liquid crystal is used with an ion beam irradiation process by applying an argon ion beam with an angle of 45° against the substrate under acceleration voltage ranging from 300 to 400 eV.

[12] A PETF (approximately 50 nm: polytetrafluoroethylene) film is formed as a second alignment film by ion vapor deposition on the first alignment film processed by aforesaid processes 1~11 and a positive dielectric anisotropic TN mode liquid crystal is used.

[13] A PE (approximately 50 nm: polyethylene) film is formed as a second alignment film by ion vapor deposition on the first alignment film processed by aforesaid processes 1~11 and a positive dielectric anisotropic TN mode liquid crystal is used.

[14] A biphenyl-4,4'-dimethacrylate (approximately 50 nm: polyethylene) film is polymerized as a second alignment film by ion vapor deposition on the first alignment film processed by aforesaid processes 1~11 and a positive dielectric anisotropic TN mode liquid crystal is used.

[15] In the case of an organic alignment film of polyimide and polyamide, a ferroelectric (FLC) liquid crystal is used with a rubbing alignment process or an optical alignment by 257 nm directly polarized UV irradiation or an ion beam alignment by argon ion beam irradiation or a laser alignment process by 266 nm YAG laser irradiation.

[16] In the case of an organic alignment film of polyimide and polyamide, an electrically controlled birefringence (ECB) liquid crystal is used with a rubbing alignment process or an optical alignment by 257 nm directly polarized UV irradiation or an ion beam alignment by argon ion beam irradiation or a laser alignment process by 266 nm YAG laser irradiation.

Alternatively, before separating the Si substrate 10, the poly-Si layer 14 in the portion corresponding to the pixel opening section of the display section of the ultra slim TFT substrate layer is removed by etching. If desirable, a light-shielding metallic film is formed via a transparent insulating film on the poly-Si TFT section and on the interior wall of the pixel opening section; a transparent resin 16 is embedded for surface flattening as a light optically transparent material within the pixel opening section where this light shielding metallic film has been removed; a transparent electrode 18a connected to the drain of the display poly-Si TFT 15a is formed on the top; a sealant and a common agent (not shown) are coated on a non-defective chip in the ultra slim TFT substrate obtained after an alignment process by forming an alignment film 20a; and a non-defective chip of the facing substrate 21 after an alignment process by forming a transparent electrode 18b and an alignment film 20b is laid and sealed with a liquid crystal gap of 2 μm. Subsequently, the facing substrate 21 and the Si substrate 10 are covered with an antistatic UV tape 23 with no residual sealant; the Si substrate 10 is separated from the high porous Si layer 11b for the transparent resin 16 to be exposed as a light optically transparent material; if desirable, the residue after separation is removed by etching; and a transparent support substrate 24 is bonded using a transparent sealant.

In this execution form, an ultra slim electrooptic display device substrate layer (monocrystalline Si layer 12) is obtained by separating [the bottom portion] so that an ultra slim electrooptic display device substrate is obtained with high electron and positive hole mobility in a very thin monocrystalline Si film with a thickness of 10 μm. For example, if a facing substrate and a transparent support substrate respectively with a thickness of approximately 100 μm are laminated, a transmissive type LCD (LCOS) with a high luminance, high resolution and high functionality in an ultra slim type with a thickness of about 200 μm can be manufactured inexpensively with a high yield and high productivity.

(A-2) Ultra Slim Reflective Type LCD

Figure 11A:
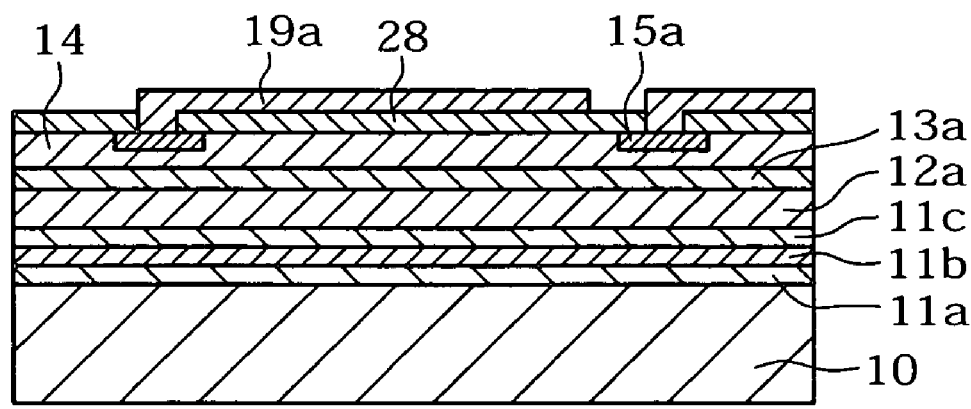
Figure 11B:
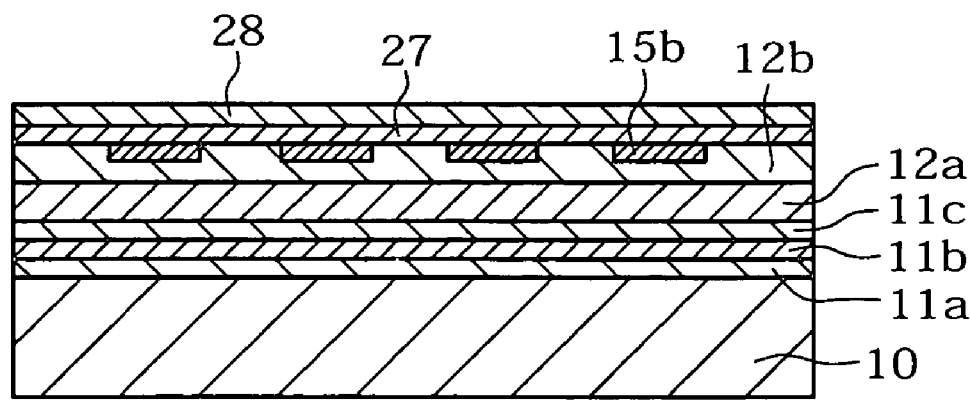

When manufacturing ultra slim reflective type LCDs, the processes (1)~(4) (FIG. 1~FIG. 3) shown in (A-1) are the same. Subsequently, as shown in FIG. 11(a) and 11(b), after a wiring layer 27 is formed and a protective film 28 is formed in the peripheral circuit area, a reflective electrode 19a with a high reflective index which is made of aluminum, aluminum-silicon alloy, silver, silver alloy, nickel, nickel alloy, titanium or titanium alloy, which is connected to the drain of the poly-Si TFT section 15a for pixel display in the display area, is formed in the pixel display section.

As in aforesaid (A-1), an organic liquid crystal alignment film material of polyimide and polyamide is formed at least for each panel, a liquid crystal alignment process such as buff rubbing is carried out, if desirable, and organic cleaning with IPA (isopropyl alcohol) is performed to form an organic liquid crystal alignment film (hereafter referred to as an alignment film). Alternatively, an alignment film 20a can be an inorganic alignment film which is formed as an oblique vapor deposition of SiOx.

By forming a part of peripheral circuits including memory circuits in addition to the display circuits in the monocrystalline semiconductor layer under a reflective electrode in the pixel display device unit in these ultra slim reflective LCDs, an ultra slim electrooptic display with increased degrees of integration can be implemented inexpensively with high resolution, high functionality, and high quality.

Also, by forming peripheral circuits or a display device unit and peripheral circuits having a multilayer wiring structure in the monocrystalline semiconductor layer, an ultra slim electrooptic display with increased degrees of integration can be implemented inexpensively with high resolution, high functionality, and high quality.

Furthermore, by forming peripheral circuits even in the monocrystalline semiconductor layer in the sealed region, the number of units required per wafer increases due to reduced TFT substrate sizes, resulting in reduced cost of production.

Figure 12:
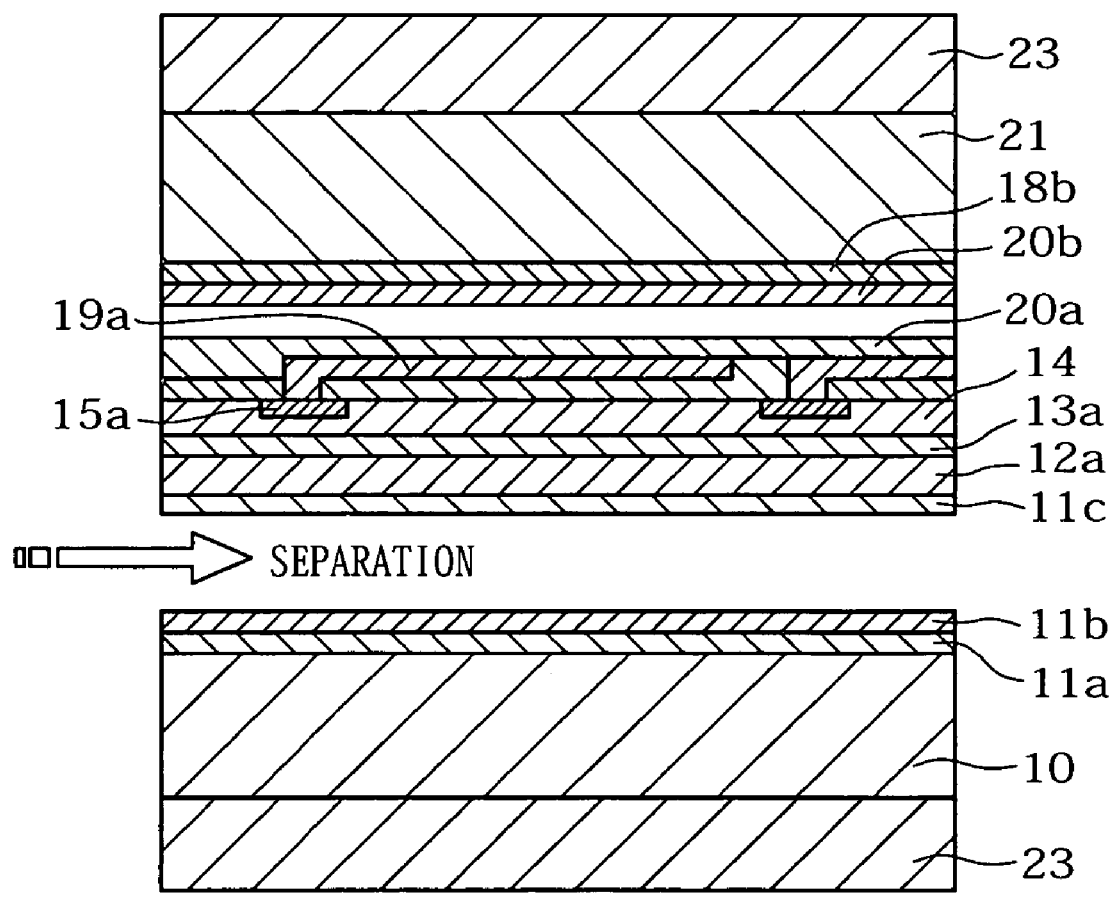

As described in (A-1), a sealant and a common agent (not shown) are coated on the surface; a facing substrate 21, after a liquid crystal alignment process by buff rubbing by forming an organic liquid crystal alignment film 20b of polyimide or polyamide by forming a transparent electrode 18b, is laminated and sealed with a liquid crystal gap of 2 μm (See FIG. 12). In the reflective electrode 19a, an appropriate concave/convex shape is formed on the electrode in order to improve ease in seeing the display by providing appropriate light scattering effect in the case of direct-viewing reflective LCDs.

For example, a photosensitive resin film in an appropriate concave/convex shape is formed by common lithographic technology in the pixel display device unit and reflowed by heating; and an aluminum film with a high reflective index, connected to the drain of the display poly-Si TFT section 15a in order to form a reflective electrode 64 in an appropriate concave/convex shape. In the cases of reflective LCDs for projectors, it is desirable to have a very flat pixel electrode shape.

Subsequently, a Si substrate 10 and a facing substrate 21 are covered with a UV tape 23, and then the Si substrate 10 is separated from the high porous Si layer (FIG. 12).

Figure 13A:
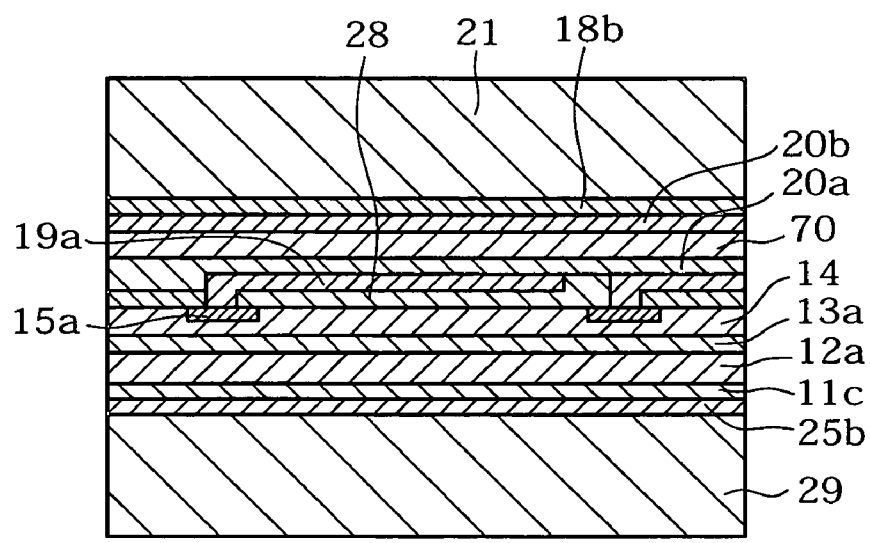
Figure 13B:
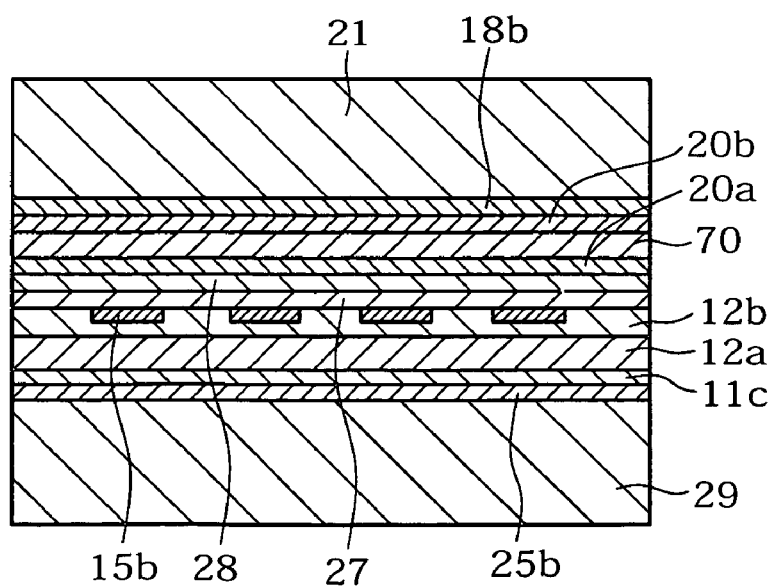

This separation method is the same as described in (A-1). After the separation, a metallic support substrate 29 as an opaque support is bonded using a high thermally conductive and electrically conductive sealant 25b (FIG. 13).

In this execution form, a metal is used as a support, but resin films and glasses can also be used as other backing. In this case, resins and glass materials having high thermal conductivity are desirable. If the support is a resin film or a glass, a low-temperature curable type or UV hardening type sealant below the liquid crystal transition temperature, for example at 80° C., is used for bonding. In the case of projectors, a metal with good heat dissipation is selected as a support. In this case, for accelerating cooling and grounding to earth, it is desirable to use a low-temperature curable type sealant below the liquid crystal transition temperature, for example at 80° C., for bonding, which is highly heat conductive and electrically conductive due to the presence of metallic filler.

The subsequent processes are the same as those in aforesaid (A-1).

Because a low porous Si layer 11c remains on the bonded surface with the metallic support substrate 29 in the ultra slim electrooptic display device substrate layer (monocrystalline Si layer 12), sealing with a sealant 17 is improved and it is held firmly on the metallic support substrate 29. Subsequently, a liquid crystal 70, selected based on the method of electrical application and the alignment film, for example, nematic liquid crystals (TN liquid crystals, vertically oriented liquid crystals, etc.), smetic liquid crystals (ferroelectric liquid crystals, non-ferroelectric liquid crystals, etc.) or other liquid crystals, is injected from the liquid crystalline injection hole for sealing. If desirable, a liquid crystal alignment process is performed by applying a heating or quenching process to obtain a reflective type LCD (LCOS) as shown in FIG. 13.

In this execution form, an ultra slim electrooptic display device substrate layer (monocrystalline Si layer 12) is obtained by separating [the bottom portion] so that an ultra slim electrooptic display device substrate is obtained with high electron and positive hole mobility in a very thin monocrystalline Si film with a thickness of 10 μm. For example, if a facing substrate and a transparent support substrate respectively with a thickness of approximately 100 μm are laminated, a transmissive type LCD (LCOS) with a high luminance, high resolution and high functionality in an ultra slim type with a thickness of about 200 μm can be manufactured inexpensively with a high yield and high productivity.

(A-3) Ultra Slim Semi-Transmissive Type LCD

When manufacturing ultra slim semi-transmissive type LCDs, the processes (1)~(6) (FIG. 1~FIG. 5) shown) shown in (A-1) are the same.

Subsequently, a window is opened in the transparent resin 16 on the poly-Si TFT section 15a in the display area, and a TFT substrate layer is formed by forming a pixel electrode forming two regions consisting of a reflective region and a transmissive region (FIG. 14).

In the case of semi-transmissive type LCDs, a part of the reflective electrode is patterned to form a transparent electrode in order to have two regions consisting of a reflective region and a transmissive region in one pixel.

Figure 14A:
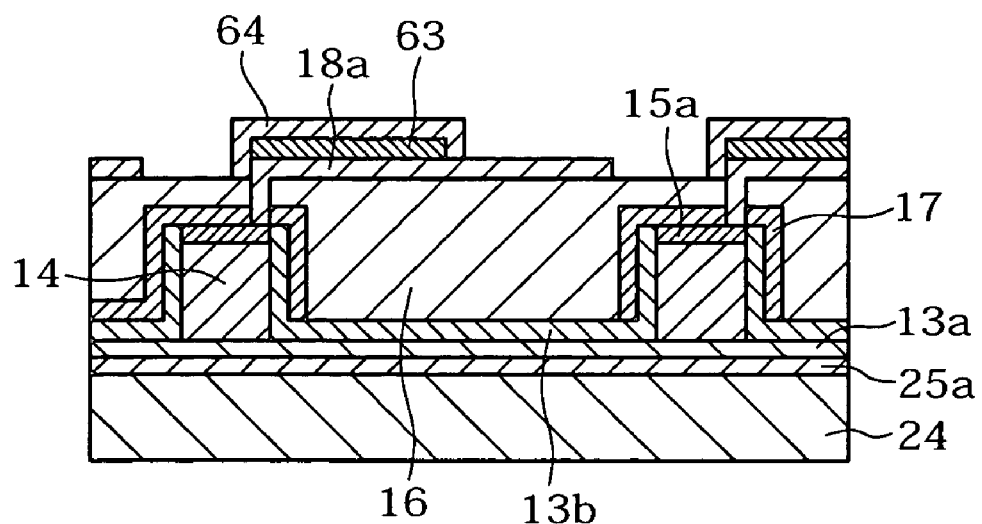

For example, as shown in FIG. 14(a), a transparent electrode 18a of ITO or IZO, connected to the drain of the display polyl-Si TFT section 15a, is formed in the pixel opening section; a photosensitive resin film 63 in an appropriate concave/convex shape is formed in a part of the transparent electrode by a common lithographic technology; after the reflow with heating, a reflective electrode 64 in an appropriate concave/convex shape is formed by forming an aluminum film with a high reflectance, which is connected to the transparent electrode, in order to form a pixel electrode to form two regions consisting of a reflective region and a transmissive region in one pixel.

Figure 14B:
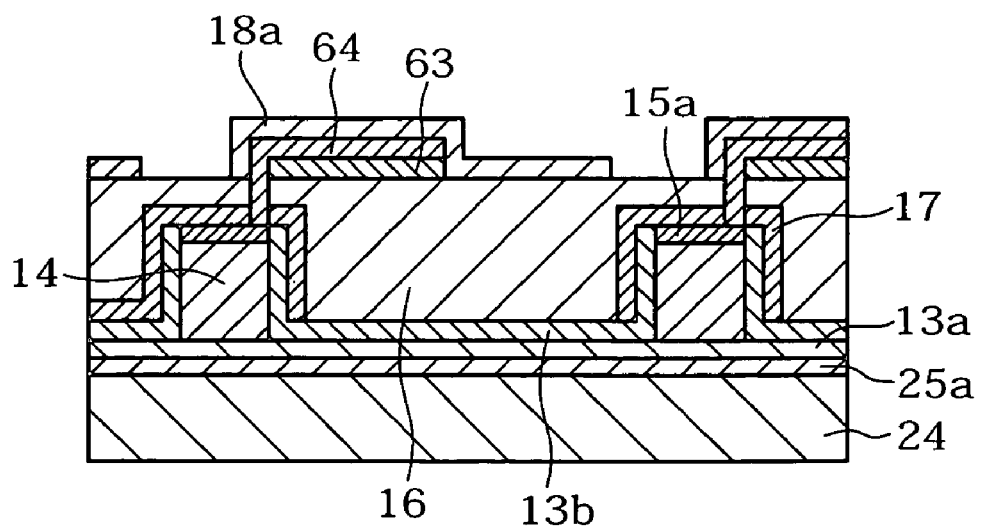

As shown in FIG. 14(b), a photosensitive resin film 63 in an appropriate concave/convex shape is formed in a part of the pixel opening section by a common lithographic technology; after the reflow with heating, a reflective electrode 64 in an appropriate concave/convex shape is formed by forming an aluminum film with a high reflectance, which is connected to the drain of the display poly-Si TFT section 15a, in order to form a pixel electrode to form two regions consisting of a reflective region and a transmissive region in one pixel by forming a transparent electrode 18a in the pixel opening section containing the aluminum film.

The balance of optical characteristics between transmission and reflection can be maintained by controlling the pixel area ratio between transmission and reflection.

As in the case of transmissive type LCDs, backlight sources are used for transmissive displays in the semi-transmissive LCDs and solar lights are used for reflective displays as in the case of reflective type LCDS.

In order to achieve brighter displays using semi-transmissive type LCDS, the reflective electrode is covered even in the opaque region for wiring and TFTs to increase the opening ratio, and a transparent electrode is arranged on the area where there is no opaque wiring in an attempt to increase the overall opening ratio.

In order to implement a paper-white look on the reflective type LCDs and semi-transmissive type LCDs, it is necessary to optimize the distribution shape of the angle by limiting the angle of inclination of the roughness formed on the reflective electrode to a specific range as a function of causing diffusion scattering by reducing the normal reflective component of the reflected light.

If the roughness is oriented regularly, optical interference of rainbow colors occurs in the reflected images under solar light and the visual recognition is reduced. Therefore, the roughness configuration must be randomized by applying the arrays expressed by the Fibonacci Series to a roughness pattern.

The subsequent processes are carried out as described in (A-1). On an ultra slim TFT substrate layer after forming an alignment film and an alignment process, a facing substrate after forming an alignment film and an alignment process by forming a transparent electrode is laminated and sealed with a specified liquid crystal gap of 2 μm.

Both a Si substrate 10 and a facing substrate 21 are covered at least with an antistatic UV tape 23 containing no residual sealant and as in the processes in (A-1); the Si substrate is separated from the high porous Si layer 11b in order to expose the optically transparent material via a transparent insulating film at least in the pixel opening section in the display device unit; a transparent support is bonded using a transparent sealant on an ultra slim TFT substrate after being separated; and a liquid crystal is injected after the division to various ultra slim electrooptic displays.

The combinations in accordance with the transmissive type LCDs described in (A-1) are applicable to the relationships among the alignment film, alignment process and liquid crystal.

A semi-transmissive LCD is produced by the following processes. The pixel opening section in the display device unit of an ultra slim electrooptic display device substrate layer (monocrystalline Si layer 12) is etched and mounted with a optically transparent material for surface flattening; an alignment process is carried out by forming a pixel electrode having two regions consisting of a reflective region and a transmissive region, which is connected to the drain of the pixel display devices and by forming an alignment film; a sealant and a common electrode agent are coated; a facing substrate prepared after the alignment process by forming a transparent electrode and an alignment film is laminated and sealed with a specific liquid crystal gap; subsequently, the monocrystalline substrate 10 is separated; if desirable, the high porous Si layer and the low porous Si layer still remaining on the optically transparent material in the exposed pixel opening section are removed by etching to expose at least the optically transparent material in the pixel opening section in the display device unit via a transparent insulating film; a transparent support substrate is bonded using a transparent sealant; a liquid crystal is injected after being divided into various electrooptic displays; and if desirable, a liquid crystal alignment process is carried out by performing a heating and quenching process to obtain a semi-transmissive type LCD.

The structures of an organic EL and its manufacturing methods will be explained below.

Organic EL layers can be classified under a single layer type, a double layer type, and a triple layer type. The structure of the triple layer type of low molecular compounds is comprised of an anode, hole transport layer, emission layer, electron transport layer and a cathode; or an anode, a hole transporting emission layer, carrier block layer, an electron transporting emission layer and a cathode.

A structure of the display device unit of the TFT substrate of the upper surface luminous type organic EL is comprised of organic EL emission layers of red, blue and green for each pixel, adhered on an anode (metallic electrode) such as Li—Al or Mg/Ag which are connected to drains of TFTs for driving current for each pixel; an anode (transparent electrode) of a ITO film is formed on the top (if desirable, an anode is formed on the entire surface); and the entire surface is covered with a moisture-proof transparent resin.

In the case of an upper surface luminous type organic EL, a cathode of Li—Al or Mg—Ag, connected to the drain of the display TFT, is formed in the pixel display device unit. If the cathode covers the MOSTFT MOSTFET for driving current increases its emission area so that the cathode becomes a light shielding film. Therefore, its auto-emission light does not enter the MOSTFETMOSTFT. For this reason, there is no generation of leak current and the interference with TFT characteristics can be avoided.

In the display device unit of the TFT substrate in the lower surface luminous type organic EL, organic EL emission layers are coated for each pixel such as red, blue and yellow on an anode (transparent electrode) of a ITO film, connected to the sources of the TFT for driving the current for each pixel, a cathode (metallic electrode) of Li—Al or Mg—Ag is formed on the top (if desirable, a cathode is formed on the entire surface), and the entire surface is covered with a moisture-proof resin. This sealing prevents external invasion of moisture, deterioration of the organic EL emission layer which is sensitive to moisture and electrolytic oxidation are prevented, making long life, high quality and high reliability possible.

(A-4) Ultra Slim Lower Surface Luminous Type Organic EL:

In the case of ultra slim lower surface luminous type organic ELs, the processes are almost the same as those of ultra slim transmissive type LCDs as described in (A-1). Before separating the Si substrate 10, the portion corresponding to the pixel opening section in the display area of the ultra slim TFT substrate is removed by etching; if desirable, after forming a transparent insulating film and a light shielding metallic film within the pixel opening section, the light-shielding metallic film at the bottom of the pixel opening is removed and the pixel opening is embedded with a transparent resin (not shown) as a light optically transparent material for surface flattening; an anode of an ITO film (transparent electrode 60c), connected to the source of the poly-Si TFT section 15a for driving the current) for each pixels in the poly-Si layer 14 in the display area, is formed on the planarized film; furthermore, an organic EL emission layer 60b of red, blue and green for each pixel, is coated and a cathode of Li—Al or Mg—Ag (metallic electrode 60a) is formed on the top (if desirable, a cathode is formed on the entire surface); and the entire surface is covered with a moisture-proof transparent resin 61.

Figure 15:
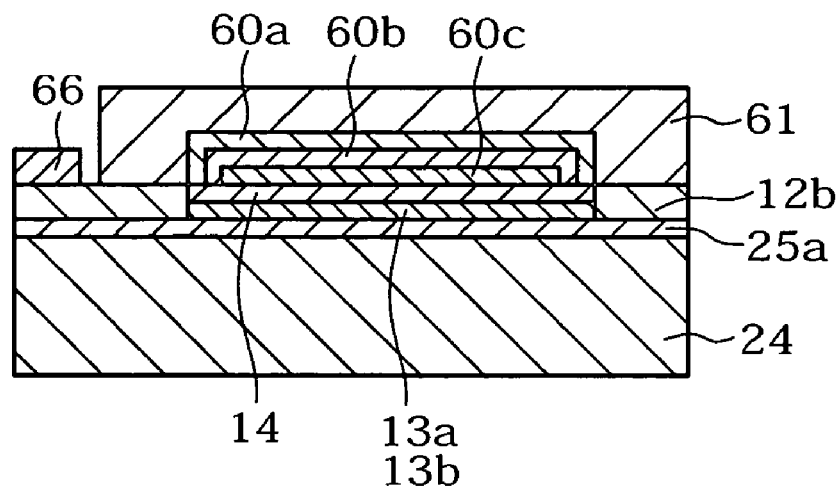

Subsequently, the moisture-proof transparent resin 61 and the Si substrate 10 are covered with at least an antistatic UV tape 23 without residual sealant; the Si substrate 10 is then separated from the high porous Si layer 11b; the low porous Si layer 11c and the monocrystalline Si layer 12a on the surface separated are etched in order to expose the transparent resin embedded in the pixel opening section in the display area via the transparent insulating layers such as SiO2 layer 13a and SiO2 layer 13b; and a transparent support substrate 24 is bonded using a transparent sealant 25a (FIG. 15).

The sealing with the moisture-proof transparent resin 61 prevents external invasion of moisture and also prevents deterioration of the organic EL emission layer which is sensitive to moisture and electrolytic oxidation, making long life, high quality and high reliability possible. In this case, it is desirable that the height of the external output electrode 66 containing bumps is lower than the height of the moisture-proof transparent resin 61.

(A-5) Ultra Slim Upper Surface Luminous Type Organic EL:

In the case of ultra slim upper surface luminous type organic ELs, the processes are almost the same as those of ultra slim reflective type LCDs as described in (A-2);

an organic EL emission layer 60b of red, blue and green for each pixel, is coated on the cathode of Li—Al or Mg—Ag (metallic electrode 60a), connected to the drain of the poly-Si TFT section 15a for driving the current for each pixels in the poly-Si layer 14 in the display area and an anode of ITO film (transparent electrode 60c) is formed on the top (if desirable, a cathode is formed on the entire surface); and the entire surface is covered with a moisture-proof transparent resin 61 as in the case of ultra slim lower surface luminous type organic ELs.

Figure 16:
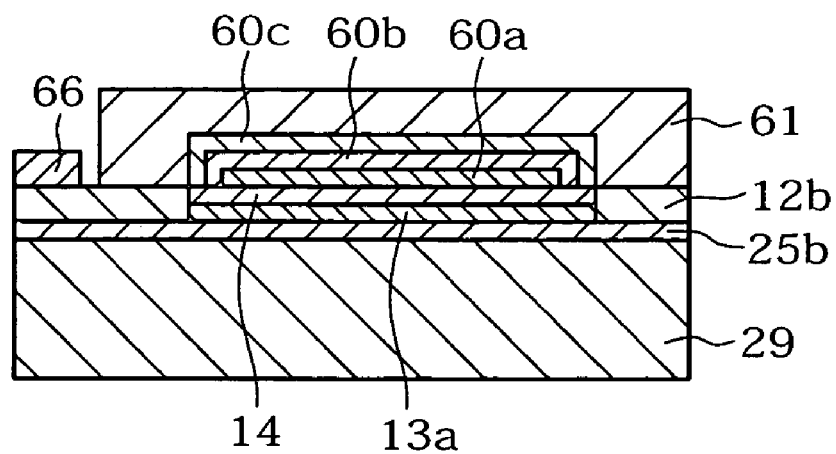

Subsequently, the moisture-proof transparent resin 61 and the Si substrate 10 are covered with at least an antistatic UV tape 23 without residual sealant; the Si substrate 10 is then separated from the high porous Si layer 11b; and a metallic support substrate 29 is bonded using a high thermally conductive and electrically conductive sealant (See FIG. 16).

The sealing with the moisture-proof transparent resin 61 prevents external invasion of moisture and also prevents deterioration of the organic EL emission layer which is sensitive to moisture and electrolytic oxidation, making long life, high quality and high reliability possible.

If a part of the peripheral circuits including memory circuits is also formed in addition to the display circuits in the monocrystalline semiconductor layer under the reflective electrode in the pixel display device unit in the case of ultra slim upper surface luminous type organic ELs, the degree of integration is improved and ultra slim electrooptic displays can be implemented inexpensively with high resolution, high functionality and high quality.

Furthermore, it is desirable that the height of the external output electrode 66 containing bumps is lower than the height of the moisture-proof transparent resin 61.

In this execution form, the monocrystalline Si layer 12a of the Si substrate 10 is thermally oxidized to form a $SiO_2$ layer 13a; the $SiO_2$ layer 13a in the peripheral circuit area is removed while leaving the $SiO_2$ layer 13a in the display area; a poly-Si layer 14 in the display area and a monocrystalline Si layer 12b in the peripheral circuit area are formed, respectively by means of semiconductor epitaxial growth such as CVD in order to form a poly-Si TFT section 15a as a display device unit in the poly-Si layer 14 in the display area and a monocrystalline Si TFT section 15b as a peripheral circuit unit in the monocrystalline Si layer 12b in the peripheral circuit area. As a result, poly-Si TFT display devices with a relatively low electron and positive hole mobility with low current leakage qualities and monocrystalline Si TFT peripheral circuits with a high electron and positive hole mobility with a high drivability can be formed within an ultra slim TFT substrate layer on the same Si substrate 10. Therefore, an ultra slim electrooptic display with a high electron and positive hole mobility and low current leakage qualities can be produced with high luminance, high resolution, and high functionality.

In this case, an amorphous Si layer is formed selectively by ion implantation of elements of Group IV, for example, highly concentrated Si ions on the surface of the poly-Si layer in the display area; and a poly-Si TFT section 15a is formed as a display device unit on the surface layer of the poly-Si layer 14 wherein the crystal grain sizes (electron and positive hole mobility) are arbitrarily controlled by the solid phase deposition. As a result, poly-Si TFT display devices with arbitrarily controlled electron and positive hole mobility with low current leakage qualities and the monocrystalline Si TFT peripheral circuits with a high electron and positive hole mobility with a high drivability can be formed within an ultra slim TFT substrate layer on the same Si substrate 10. Therefore, an ultra slim electrooptic display with a high electron and positive hole mobility and low current leakage qualities can be produced with high luminance, high resolution, and high functionality.

If at least one of the group IV elements including Ge (germanium), Sn (tin), Pb (lead), is added in an proper quantity (for example, $1\times10^{18}$~$1\times10^{20}$ atoms/cc) to the poly-Si layer 14 where in the crystal grain sizes have been controlled by solid phase deposition, the irregularities present in the crystalline grain field of the poly-Si layer are reduced so that its film stress is also reduced. As a result, a high quality poly-Si TFT is obtained with high carrier mobility.

Alternatively, if only the poly-Si layer 14 is selectively irradiated by a flash lamp such as a xenon lamp, or by pulsed or continuous laser irradiation such as irradiation of XeCl excimer lasers, optical harmonic modulated Nd:YAG lasers, visible light lasers, and infrared lasers, or irradiation using condensing lamps such as ultra high pressure mercury lamps, halogen lamps or xenon lamps; a poly-Si TFT section 15a is formed as a display device unit on the surface layer of the poly-Si layer 14 where crystal grain sizes are arbitrarily controlled by re-crystallization. As a result, poly-Si TFT display devices with arbitrarily controlled electron and positive hole mobility with low current leakage qualities and the monocrystalline Si TFT peripheral circuits with a high electron and positive hole mobility with a high drivability can be formed within an ultra slim TFT substrate layer on the same Si substrate 10. Therefore, an ultra slim electrooptic display with a high electron and positive hole mobility and low current leakage qualities can be produced with high luminance, high resolution, and high functionality.

In this case, if at least one of the group IV elements including Ge, tin, or lead is added in an proper quantity (for example, $1\times10^{18}$~$1\times10^{20}$ atoms/cc) to the poly-Si layer where the crystal grain sizes have been controlled by flash lamp annealing, pulsed or continuous wave laser annealing, or condensing lamp annealing, the irregularities present in the crystalline grain field of the poly-Si layer are reduced so that its film stress is also reduced. As a result, a high quality poly-Si TFT display device is obtained with high carrier mobility.

In this case, a SiGe layer 12a is formed as a distortion impressed semiconductor layer on the Si substrate 10; a $SiO_2$ layer 13a is formed by thermal oxidation; the $SiO_2$ layer 13a in the peripheral circuit area is removed while leaving the $SiO_2$ layer 13a in the display area; a poly-Si layer 14 is formed in the display area and a distorted Si layer 12b is formed using the a distortion impressed semiconductor layer of SiGe layer as a seed in the peripheral circuit area, respectively by means of semiconductor epitaxial growth such as CVD. As a result, monocrystalline Si MOSTFT peripheral circuits with a high driving capacity is implemented due to significantly improved electron mobility which is greater by 76-fold when compared to the monocrystalline Si layer of the conventional non-distorted channel layer.

Furthermore, an insulating layer of $SiO_2$ layer 13a, and amorphous Si layer or amorphous/poly-Si mixed layer or poly-Si layer 14 is formed on the monocrystalline Si layer 12a by plasma CVD, thermal CVD, sputtering or vapor deposition; the $SiO_2$ layer 13a and amorphous Si layer or amorphous/poly-Si mixed layer or poly-Si layer 14 in the peripheral circuit area is removed while leaving the $SiO_2$ layer 13a and amorphous Si layer or amorphous/poly-Si mixed layer or poly-Si layer 14 in the display area; amorphous Si TFT or amorphous/poly-Si mixed TFT or poly-Si TFT section 15a is formed as a display device unit in the amorphous Si layer or amorphous/poly-Si mixed layer or poly-Si layer 14 in the display area; a monocrystalline Si TFT section 15b as a peripheral circuit unit in the monocrystalline Si layer 12b in the peripheral circuit area. As a result, amorphous Si TFT or amorphous/poly-Si mixed TFT or poly-Si TFT display devices with a relatively low electron and positive hole mobility with low current leakage qualities and the monocrystalline Si TFT peripheral circuits with a high electron and positive hole mobility with a high drivability can be formed within an ultra slim TFT substrate layer on the same Si substrate 10. Therefore, an ultra slim electrooptic display with a high electron and positive hole mobility and low current leakage qualities can be produced with high luminance, high resolution, and high functionality.

In this case, an element of Group IV, for example, highly concentrated Sn ions is selectively implanted on the surface of an amorphous Si layer or amorphous/poly-Si mixed layer or poly-Si layer 14 in the display area; and a poly-Si TFT section 15a is formed as a display device unit on the surface layer of the poly-Si layer 14 wherein the crystal grain sizes (electron and positive hole mobility) are arbitrarily controlled by the solid phase deposition. As a result, poly-Si TFT display devices with arbitrarily controlled electron and positive hole mobility with low current leakage qualities and the monocrystalline Si TFT peripheral circuits with a high electron and positive hole mobility with a high drivability can be formed within an ultra slim TFT substrate layer on the same Si substrate 10. Therefore, an ultra slim electrooptic display with a high electron and positive hole mobility and low current leakage qualities can be produced with high luminance, high resolution, and high functionality.

If at least one of the group IV elements including Ge (germanium), Sn (tin), Pb (lead), is added in an proper quantity (for example, $1\times10^{18}$~$1\times10^{20}$ atoms/cc) to the poly-Si layer 14 where in the crystal grain sizes have been controlled by solid phase deposition, the irregularities present in the crystalline grain field of the poly-Si layer are reduced so that its film stress is also reduced. As a result, a high quality poly-si TFT is obtained with high carrier mobility.

Alternatively, if only the amorphous Si layer or amorphous/poly-Si mixed layer or poly-Si layer 14 is selectively irradiated by a flash lamp such as a xenon lamp, or by pulsed or continuous laser irradiation such as irradiation of XeCl excimer lasers, optical harmonic modulated Nd:YAG lasers, visible light lasers, and infrared lasers, or irradiation using condensing lamps such as ultra high pressure mercury lamps, halogen lamps or xenon lamps; a poly-Si TFT section 15a is formed as a display device unit in the poly-Si layer 14 where crystal grain sizes are arbitrarily controlled by re-crystallization. As a result, poly-Si TFT display devices with arbitrarily controlled electron and positive hole mobility with low current leakage qualities and the monocrystalline Si TFT peripheral circuits with a high electron and positive hole mobility with a high drivability can be formed within an ultra slim TFT substrate layer on the same Si substrate 10. Therefore, an ultra slim electrooptic display with a high electron and positive hole mobility and low current leakage qualities can be produced with high luminance, high resolution, and high functionality.

In this case, if at least one of the group IV elements including Ge, tin, lead is added in an proper quantity (for example, $1\times10^{18}\sim1\times10^{20}$ atoms/cc) to the poly-Si layer wherein the crystal grain sizes have been controlled by re-crystallization by flash lamp annealing, pulsed or continuous wave laser annealing, or condensing lamp annealing, the irregularities present in the crystalline grain field of the poly-Si layer are reduced so that its film stress is also reduced. As a result, a high quality poly-Si TFT display device is obtained with high carrier mobility.

(B) Method of Separation of a Double Porous Semiconductor Layer

In this execution form, a method of manufacturing an ultra slim electrooptic display by separation of a double porous semiconductor layer using a porous Si layer (a seed semiconductor substrate is separated from the porous semiconductor layer formed on the seed semiconductor substrate, and then a support semiconductor substrate is separated from the porous semiconductor layer formed on the support semiconductor) will be explained below. FIG. 17 through FIG. 25 are process diagrams for manufacturing an ultra slim LCD by separation of a double porous Si layer in the preferred execution form of the present invention.

A porous Si layer is formed by an anodic formation method respectively on a seed substrate 30 and a support substrate 33 (See FIG. 17). In this case, a high porous Si layer 31*b* with a higher porosity and with a greater thickness is formed on the seed substrate 30 when compared to the high porous Si layer 34*b* on the support substrate 33.

[1] Initially, p-type impurities are added in an approximately boron density of $1\times10^{19}$ atoms/cm$^3$ by a CVD method using monosilane gas or diborane gas to a p-type monocrystalline Si substrate (substrate (resistivity: $0.01\sim0.02\Omega\cdot$cm) 30 to form a high density semiconductor epitaxial growth monocrystalline Si layer with a thickness of approximately 10 $\mu$m (corresponding to a low porous Si layer 31*a* as will be mentioned later).

[2] On a surface of this high density layer, p-type impurities are added in an approximately boron density of $5\times10^{14}$ atoms/cm$^3$ by a CVD method using monosilane gas or diborane gas to form a low density semiconductor epitaxial growth monocrystalline Si layer with a thickness of approximately 20 $\mu$m (corresponding to a high porous Si layer 31*b* as will be mentioned later).

[3] Furthermore, on a surface of this low density layer, p-type impurities are added in an approximately boron density of $5\times10^{19}$ atoms/cm$^3$ by a CVD method using monosilane gas or diborane gas to form a high density semiconductor epitaxial growth monocrystalline Si layer with a thickness of approximately 5 $\mu$m (corresponding to a low porous Si layer 31*c* as will be mentioned later).

In the formation of a monocrystalline Si layer by a CVD method in addition to raw materials for hydrides such as monosilane (SiH$_4$), the following raw material gases can be used: the same raw materials for hydrides such as disilane (Si$_2$H$_6$), trisilane (Si$_3$H$_8$), and tetrasilane (Si$_4$H$_{10}$) and raw material for hydrides such as dichlorosilane (SiH$_2$Cl$_2$), trichlorisilane (SiHCl$_3$), and silicon tetrachloride (SiCl$_4$) A method of forming a monocrystalline Si layer is not limited to a CVD method, and a MBE (Molecular Beam Epitaxy) method or a sputtering method can also be applied.

[4] Subsequently, an anodic formation method is applied using a mixed solution of a 50% hydrogen fluoride solution and ethyl alcohol at a volumetric ratio of 2:1 as an electrolyte, while a current is applied for 5 to 10 minutes at about approximately a current density of 10 mA/cm$^2$ to form low porous Si layers 31*a* and 31*c* with a low porosity in the high density layer and a high porous Si layer 31*b* with a high porosity in the low density layer.

[5] As mentioned above, p-type impurities are added in an approximately boron density of $1\times10^{19}$ atoms/cm$^3$ by a CVD method using monosilane gas or diborane gas to a p-type monocrystalline Si substrate (resistivity: $0.01\sim0.02\Omega\cdot$cm) 33 to form a high density semiconductor epitaxial growth monocrystalline Si layer with a thickness of approximately 10 $\mu$m (corresponding to a low porous Si layer 34*a* as will be mentioned later).

[6] On a surface of this high density layer, p-type impurities are added in an approximately boron density of $1\times10^{15}$ atoms/cm$^3$ by a CVD method using monosilane gas or diborane gas to form a low density semiconductor epitaxial growth monocrystalline Si layer with a thickness of approximately 5 $\mu$m (corresponding to a high porous Si layer 34*b* as will be mentioned later).

[7] Furthermore, on a surface of this low density layer, p-type impurities are added in an approximately boron density of $3\times10^{19}$ atoms/cm$^3$ by a CVD method using monosilane gas or diborane gas to form a high density semiconductor epitaxial growth monocrystalline Si layer with a thickness of approximately 10 $\mu$m (corresponding to a low porous Si layer 34*c* as will be mentioned later).

In the formation of a monocrystalline Si layer by a CVD method in addition to raw materials for hydrides such as monosilane (SiH$_4$), the following raw material gases can be used: the same raw materials for hydrides such as disilane (Si$_2$H$_6$), trisilane (Si$_3$H$_8$), and tetrasilane (Si$_4$H$_{10}$) and raw material for hydrides such as dichlorosilane (SiH$_2$Cl$_2$), trichlorisilane (SiHCl$_3$), and silicon tetrachloride (SiCl$_4$). A method of forming a monocrystalline Si layer is not limited to a CVD method, and a MBE (Molecular Beam Epitaxy) method or a sputtering method can also be applied.

[8] Subsequently, an anodic formation method is applied using a mixed solution of a 50% hydrogen fluoride solution and ethyl alcohol at a volumetric ratio of 2:1 as an electrolyte, while a current is applied for 5 to 10 minutes at about approximately a current density of 10 mA/cm$^2$ to form low porous Si layers 34*a* and 34*c* with a low porosity in the high density layer and a high porous Si layer 34*b* with a high porosity in the low density layer.

If a porous layer is formed by an anodic formation method, porous layers are comprised of plural numbers of layers with different porosities. For example, as mentioned above, a first low porous Si layer 31*a* is formed on the seed substrate 30 followed by the formation of a high porous Si layer 31*b*, and a second low porous Si layer 31*c* in this order to achieve a triple layer structure. In addition, a double layer structure can be obtained by forming a high porous Si layer 31*b* and a low porous Si layer 31*c* in this order on the seed substrate 30. As in the case of a support substrate 33, a double layer structure can be obtained by forming a high porous Si layer 34*b* and a low porous Si layer 34*c* in this order on the seed substrate 30.

In this case, the porosity ranges from 40 to 80% in the high porous Si layer, whereas the porosity in the low porous Si layer ranges from 10 to 30%. The respective thickness of plural numbers of layers having different porosities can be adjusted arbitrarily by changing the current density and time during the anodic formation, and kinds or concentrations of the chemical solution during the anodic formation.

After forming a porous layer Si, it is desirable to oxidize the interior wall of the porous Si hole with a thickness of 1 to 3 nm by dry oxidation at about 400° C. This can prevent the structural changes due to the subsequent high temperature process for the porous Si.

For the low porous Si layers 31c and 34c, it is preferable that the impurity concentrations are high (1×1010 atoms/cm3 or greater) and that the porosity is kept as low as possible (10~30%). The reason for this is that monocrystalline Si layers 32 and 35 with excellent crystallinity must be formed on these low porous Si layers 31c and 34c in order to form semiconductor devices as will be discussed later.

In order to reduce distortions in the monocrystalline Si layer 32 (FIG. 18) as will be discussed later, it is desirable to satisfy the following conditions:
Porosity: Low porous Si layer 31c<Low porous Si layer 34c
Film thickness: Low porous Si layer 31c<Low porous Si layer 34c It is desirable to satisfy the following conditions in order to make separation of the seed substrate 30 easier in the subsequent processes and in order to prevent the separation of support substrate 33 when separating the seed substrate 30:
Porosity: High porous Si layer 31b>High porosity Si layer 34b
Film thickness: High porous Si layer 31b>High porosity Si layer 34b Since the anodic reaction of Si in the hydrogen fluoride solution requires positive holes for the dissolution reaction of Si in the anodic formation, it is desirable to use a p-type Si substrate which easily becomes a porous substrate. However, the application is not limited to this material.

Besides the monocrystalline Si substrate which is prepared as a Si substrate by the CZ (Czochralski) method, MCZ (Magnetic Field Applied Czochralski) method, or FZ (Floating Zone) method, a monocrystalline Si substrate which has been treated by hydrogen annealing on its substrate surface and an epitaxial monocrystalline Si substrate can be used as a seed substrate 30 and support substrate 33.

Of course, instead of monocrystalline Si substrates, monocrystalline compound semiconductor substrates such as monocrystalline SiGe substrate, SiC substrates, GaAs substrates and InP substrates can be used.

(2) Monocrystalline Si layers 32 and 35 prepared by semiconductor epitaxial growth are formed respectively as monocrystalline semiconductor layers on the seed substrate 30 or support substrate 33. A $SiO_2$ oxide film as an insulating film 36 or laminates of $SiO_2$, $Si_3N_4$ and $SiO_2$ can be formed on at least one of these monocrystalline layers (FIG. 17). The important point to be considered is to make the thickness of the monocrystalline Si 32 thinner than that of the monocrystalline Si layer 35.

[1] Initially, in the CVD semiconductor epitaxial growth equipment, the low porous Si layers 31c and 34c are pre-baked at 1000 to 1100° C. under a hydrogen atmosphere to seal the surface pores to make the surface flatter. Subsequently, the temperature is lowered to 1020° C. and CVD is applied using silane gas to form monocrystalline Si layers 32 and 35.

As mentioned above, in the formation of a monocrystalline Si layer by a CVD method, a vapor phase epitaxy, in addition to hydrogenation raw materials such as monosilane ($SiH_4$), the following raw material gases can be used: same hydrogenation raw materials such as disilane ($Si_2H_6$), trisilane ($Si_3H_8$), and tetrasilane ($Si_4H_{10}$) and halogenation raw materials such as dichlorosilane ($SiH_2Cl_2$), trichlorisilane ($SiHCl_3$), and silicon tetrachloride ($SiCl_4$). A method of forming a monocrystalline Si layer is not limited to a CVD method, and a MBE (Molecular Beam Epitaxy) method or a sputtering method can also be applied.

If devices are produced from the monocrystalline Si layer 32 prepared by semiconductor epitaxial growth on the seed substrate 30, its film thickness must be equal to or greater than that of the monocrystalline Si layer 35 prepared by epitaxial growth on the other support substrate 33. The reason for this is to reduce or prevent the occurrence of distortions in the monocrystalline Si layer 32 prepared by semiconductor epitaxial growth.

A desirable thickness of the monocrystalline Si layer 32 prepared by semiconductor epitaxial growth for devices ranges from 1 to 3 μm and a desirable thickness of the monocrystalline Si layer 35 would be 5~10 μm since this layer is ultimately removed.

The desirable thickness for the $SiO_2$ oxide film (an insulating layer 36), of the monocrystalline Si layer 35 ranges from 200 to 300 nm. If the film becomes thicker by μm unit by long-term thermal oxidation, distortions occur in the monocrystalline Si layer 35 due to the effects of thermal oxidation of high porous Si layer 34b.

Besides the silicon oxide film $SiO_2$ prepared by thermal oxidation, an insulating film 36 can be provided as a laminated film of a silicon oxide film and a silicon nitride film, or a laminated film of a silicon oxide film, a silicon nitride film, and a silicon oxide film (e.g., $SiO_2$; 200 nm, $Si_3N_4$; 50 nm and $SiO_2$; 200 nm) which is prepared by forming a silicon nitride film ($Si_3N_4$) or a silicon nitride film and a silicon oxide film on the monocrystalline Si layer 35 by vacuum thermal CVD followed by thermal oxidation. Furthermore, a silicon oxy-nitride film (SiON) can be applied.

The aforementioned insulating layer of a single layer film and multiple layer film can be formed by a plasma CVD method, sputtering method, MBE method and vapor deposition method.

The presence of a silicon nitride film with an appropriate film thickness can prevent contamination of the monocrystalline Si layer 32 due to penetration of halogen atoms from the side of the support substrate 33 during the subsequent processes including LCD assembly and semiconductor device processes. Also, it can reduce or prevent the occurrence of distortions in the monocrystalline Si layer 35 formed by epitaxial growth for preparation of semiconductor devices, which are caused by swelling by oxidation of high porous Si layer 34b during the semiconductor device processes. Furthermore, this silicon nitride film functions as an etching stopper during the etching process for the monocrystalline Si layer 32 and low porous silicon layer 31c so that uneven etching can be prevented.

When etching the porous Si layer underneath the insulating layer with an ultra slim SOI structure after the separation, it [the silicon nitride film] also acts as an etching stopper so that an ultra slim electrooptic display device substrate with an ultra slim SOI structure can be obtained without uneven etching.

As countermeasures against electrostatic damage and electromagnetic shielding during LCD assembly or organic EL assembly, assembly of sets and for the general market, n-type or p-type impurities are added in an arbitrary concentration to the monocrystalline Si layer 35 at the time of ion implantation or epitaxial growth and are activated during the formation of oxide films. Therefore, the addition of n-type or p-type impurities in an arbitrary concentration to the monocrystalline Si layer 35 underneath the insulating layer 36 which remains to the last stage can improve quality and reliability of the electrooptic displays.

(3) Bonding the Seed Substrate 30 to the Supporting Substrate (See FIG. 18)

Both surfaces of the monocrystalline Si layer 332 of the seed substrate 30 and the insulating layer 36 of the support substrate 33 are brought into contact with each other and bonded by means of Van der Waals forces at room temperature. Subsequently, [the surfaces] are covalently bonded by a thermal processing at 400° C. for 30 minutes to strengthen the bonding. If desirable, a further thermal processing can be applied at a higher temperature of 1000° C. for 30 to 60 minutes to further strengthen the bonds.

A thermal processing can be carried out under nitrogen gas, inert gas, or mixed gas of nitrogen and inert gases. In this case, the absence of dust and stains on surfaces of both substrates must be checked. If there are any foreign objects, they should be cleaned.

Two sheets of substrates [wafers] are laminated in a vacuum thermal processing furnace where they are set under a specific reduced pressure (e.g., 133 Pa (1 Torr) or less) using a vacuum pump. After a certain period, substrates are exposed under atmospheric pressure so that they are adhered tightly under pressure followed by continuous operation for thermal bonding by continuous heating under nitrogen gas or inert gases, or gas mixture of nitrogen and inert gas.

Prior to the bonding procedure, the contact surfaces can be irradiated with an inert gas ion beam or an inert gas high speed atomic beam for sputtering in vacuum at room temperature. Bonding forces are added on the contact surfaces by removing dust and stains on the surface in order to increase surface smoothness so that the bonding force can be strengthened.

(4) Separating the Seed Substrate 30 from the High Porous Si Layer 31b (See FIG. 19)

The Separation Method is Based on (A).

According to high pressure fluid jet spray exfoliation method using water jets, air jets, or water and air jets, or laser process exfoliation method or laser/water jet process exfoliation method, the seed substrate 30 is separated from the high porous Si layer 31b (See FIG. 19).

The monocrystalline Si substrate of the seed substrate 30 after separation is if desirable, treated by surface polishing, etching or thermal processing under atmosphere containing hydrogen and can be recycled.

Ax shown in FIG. 41(a) and(b), it is desirable to set the diameter of the seed substrate 30 forming a monocrystalline semiconductor layer 32 via porous semiconductor layers 31a, 31b and 31c to be slightly smaller or larger than the diameter of the support substrate 33 forming a monocrystalline semiconductor layer 35 via porous semiconductor layers 34a, 34b, and 34c.

A high pressure fluid jet is injected directly in the horizontal direction in the case when the seed substrate diameter>support substrate diameter as shown in FIG. 41(a) or at an arbitrary angle from the upper direction in the case when the seed substrate diameter<support substrate diameter as shown in FIG. 41(b) against the high porous semiconductor layer 31b of the seed substrate 30 to separate the seed substrate 30 and at the same time, a high pressure fluid jet force towards the high porous semiconductor layer 34b of the support substrate 33 is weakened such that the support substrate is not separated from high porous semiconductor layer 34b of the support substrate 33.

Also, in the double porous semiconductor layer separation method, it is desirable that the porous semiconductor layer formed on the seed substrate has higher porosity than the porous semiconductor layer formed on the support substrate. Furthermore, it is desirable that the porous semiconductor layer formed on the seed substrate is thicker than the porous semiconductor layer formed on the support substrate.

In this manner, separation of the seed substrate is carried out securely. If the adjustment between porosity and thickness of the porous semiconductor layers between the seed substrate 30 and the support substrate 33 can be controlled, it is possible to avoid the effects of distortions, namely the adverse effects of thermal expansion of the monocrystalline semiconductor layer 32 on the porous semiconductor layers 34a, 34b and 34c formed on the support substrate 33 during the processes of forming display devices and peripheral circuits.

If C-chamfering is applied to the peripheral areas on the surface of the support substrate 33 including the monocrystalline semiconductor layer 32 and porous semiconductor layers 31c, 34a, 34b, and 34c after the separation of the seed substrate, it is possible to prevent chipping, cracking and breaking the ultra slim SiO layer in the peripheral areas. As a result, product yields and quality will improve and reduction of costs can be implemented. If desirable, a light etching process such as etching with fluoric acid etchant can be applied in order to remove Si dust and micro cracks.

(5) Residual high porous Si layer 31 and low porous Si layer 31c are removed by wet etching using a fluoric acid etchant or an alkaline etchant such as $HF+H_2O_2+H_2O$ mixture, $HF+HNO_3+CH_3COOH$ mixture.

In the case of high pressure fluid jet spray stripping which requires a physical separation, a residual porous Si layer tends to be present so that said wet etching is necessary. In the case of the laser process exfoliation method or laser/water jet process exfoliation method which is separation by localized thermal fusion, the occurrence of residual porous Si layer tends to be less and wet etching is not needed and only dry etching by a hydrogen annealing process may be sufficient.

Subsequently, monocrystalline Si layer 32 is treated by dry etching in a hydrogen annealing process to obtain a desired thickness and high flatness. For example, an ultra slim SOI structure with monocrystalline Si layer 32 with a thickness of 1 $\mu$m is formed. The hydrogen annealing process is carried out at an etching rate of 0.0013 nm/min at 1050° C. or at 0.0022 nm/min at 1100° C.

If desirable, a monocrystalline Si layer with a higher crystallinity and an optimal thickness can be laminated by Si epitaxial growth using the monocrystalline Si layer 32 as a seed crystal after the hydrogen annealing process.

Figure 20A:
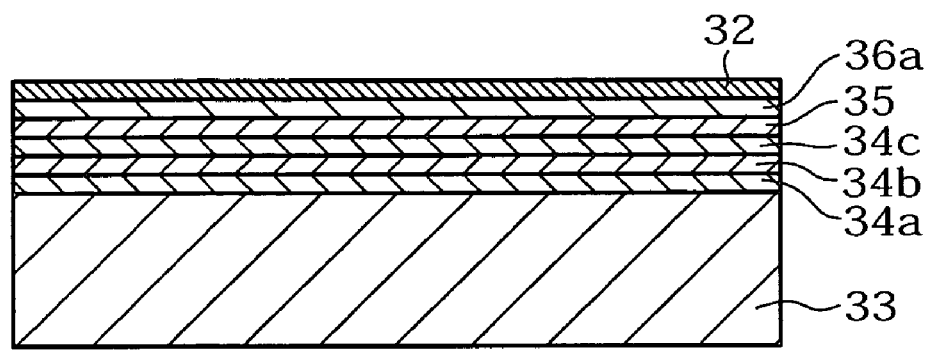
Figure 20B:
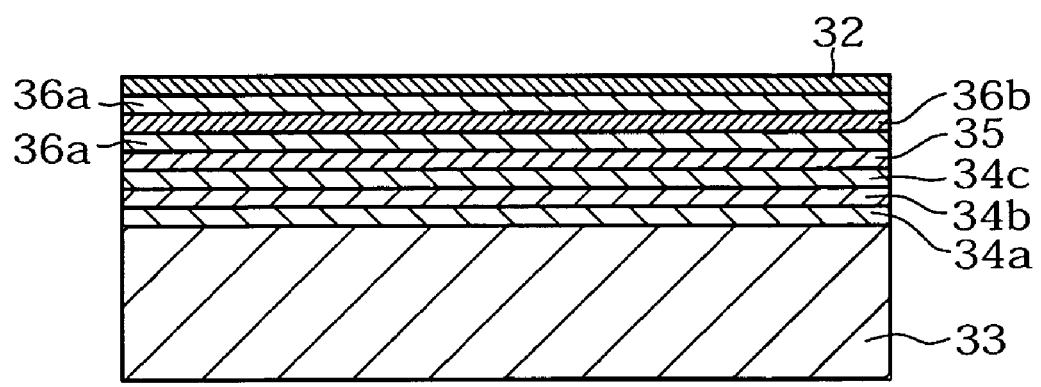

FIG. 20 shows the status after etching. FIG. 20(a) and (b) show a case when forming a $SiO_2$ layer 36a as an insulating layer 36 and a case when forming a $SiO_2$ layer 36a, $Si_3N_4$ layer 36b, and a $SiO_2$ layer 36a as an insulating layer 36, respectively.

(6) A SiO2 layer 13a with a thickness of 100~200 nm is formed by thermal oxidation of the monocrystalline Si layer, and the layer $SiO_2$ in the peripheral circuit area is removed by etching while leaving the $SiO_2$ layer 13a in the display area. A poly-Si layer 14 with a thickness of 50~100 nm is formed in the display area and a monocrystalline Si layer 12b with a thickness of 50~100 nm is formed in the peripheral circuit area, respectively by the semiconductor epitaxial growth such as CVD (See FIG. 21(a)). All the conditions are in compliance with (A).

If desirable, the conditions when the crystal grain size of the poly-Si layer 14 (electron and positive hole mobility) in the display area are arbitrarily controlled by solid phase deposition, laser annealing, or condensing lamp annealing are those described in (A).

In this case, the display area of the monocrystalline Si layer 32 with a film thickness of the liquid crystal gap width or less is etched in order to expose an insulating layer of $SiO_2$ layer 36a, while leaving the monocrystalline Si layer 32 in the peripheral circuit area.

A poly-Si layer 14 with a thickness of 50~100 nm can be formed on the insulating layer in the display area and a monocrystalline Si layer 12b with a thickness of 50~100 nm can be formed in the monocrystalline Si layer on the peripheral circuit area, respectively by the semiconductor epitaxial growth such as CVD (See FIG. 21(*b*)).

If desirable, the conditions when the crystal grain size of the poly-Si layer 14 (electron and positive hole mobility) in the display area is arbitrarily controlled by solid phase deposition or flash lamp annealing, laser annealing, or condensing lamp annealing are those described in (A).

Alternatively, the conditions are those described in (A) when if desirable, a light shielding film 37 is formed under the TFT section of the poly-Si layer 14 in the display area and the crystal grain size of the poly-Si layer 14 (electron and positive hole mobility) in the display area is arbitrarily controlled by solid phase deposition or flash lamp annealing, laser annealing, or condensing lamp annealing.

In this case, the display area of the monocrystalline Si layer 32 with a film thickness of the liquid crystal gap width or less is etched in order to expose an insulating layer of $SiO_2$ layer 36a, and a light shielding metallic layer 37 such as transition metal silicides including $WSi_2$ (tungsten silicide), $TiSi_2$ (titanium silicide), $MoSi_2$ (molybdenum silicide) is formed in the pixel display poly-Si TFT region in the display area and subsequently covered with an insulating layer, and the insulating layer on the monocrystalline Si layer 32 in the peripheral circuit area is removed.

Subsequently, a poly-Si layer 14 with a thickness of 50~100 nm can be formed on the insulating layer of $SiO_2$ layer 36 in the display area and a monocrystalline Si layer 12b with a thickness of 50~100 nm can be formed in the monocrystalline Si layer 32 on the peripheral circuit area, respectively by the semiconductor epitaxial growth such as CVD (See FIG. 21(*c*)).

If desirable, the conditions when the crystal grain size of the poly-Si layer 14 (electron and positive hole mobility) in the display area is arbitrarily controlled by solid phase deposition or flash lamp annealing, laser annealing, or condensing lamp annealing are those described in (A).

In this case, a distortion impressed semiconductor layer, for example, a SiGe layer 32 with a Ge concentration of 20~30%, is formed via the porous Si layer on the seed substrate, a $SiO_2$ layer 13a is formed by thermal oxidation after bonding and separation of the seed substrate, the $SiO_2$ layer 13a in the peripheral circuit area is removed while leaving the $SiO_2$ layer 13a in the display area, a poly-Si layer 14 is formed in the display area by Si epitaxial growth by CVD, and a distorted Si layer 12b is formed as a distorted channel layer using the SiGe layer as a seed crystal in the peripheral circuit area.

In this case, a distortion impressed semiconductor layer, for example, a SiGe layer 32 with a Ge concentration of 20~30%, is formed via the porous Si layer on the seed substrate, the SiGe layer 32 in the display area is etched after bonding and separation of the seed substrate in order to expose the $SiO_2$ layer 36a of the insulating layer, a poly-Si layer 14 in the display area is formed by Si epitaxial growth by CVD, and a distorted Si layer 12b is formed as a distorted channel layer using the SiGe layer 32 as a seed crystal in the peripheral circuit area.

Furthermore, a distortion impressed semiconductor layer, for example, a SiGe layer 32 with a Ge concentration of 20~30%, is formed via the porous Si layer on the seed substrate, the SiGe layer 32 in the display area is etched after bonding and separation of the seed substrate in order to expose the $SiO_2$ layer 36a of the insulating layer, a light shielding metallic layer is formed in the display device forming region, an insulating layer is formed on it, a poly-Si layer 14 is formed in the display area by CVD, and a distorted Si layer 12b is formed as a distorted channel layer using the SiGe layer 32 as a seed crystal in the peripheral circuit area.

In this case, it is desirable that the composition ratio of Ge is greater: 0.3: desirable ratio, 0.2 or lower: there is no significant improvement in the mobility of MOSTFT, 0.5 or greater: there are problems with increased surface roughness of the SiGe layer and reduced film quality.

A gradation composition is applied wherein the Ge concentration slowly increases in the SiGe layer and a desirable concentration is achieved on the surface. It is desirable to form a distorted Si layer 12b as a distorted channel layer on the SiGe layer with a gradation composition.

In the execution form mentioned above, a poly-Si layer is formed in the display area to form a poly-Si TFT section. However, an amorphous Si layer or amorphous/poly mixed Si layer or a poly-Si layer can be formed by plasma CVD, thermal CVD, sputtering or vapor deposition to form an amorphous Si TFT or an amorphous/poly mixed Si TFT or a poly-Si TFT section.

Also, as in (A), it is possible that at least one of the group IV elements including Ge, Sn, Pb, is added in an proper quantity (a total of $1\times10^{17}$~$1\times10^{22}$ atoms/cc, preferably $1\times10^{18}$~$1\times10^{20}$ atoms/cc ) to the amorphous Si layer or an amorphous/poly mixed Si layer or a poly-Si layer 14, and a poly-Si film is re-crystallized by said solid phase deposition or flash lamp annealing, pulsed or continuous wave laser annealing, or condensing lamp annealing to form a poly-Si TFT section.

As a result, the irregularities present in the crystalline grain field of the poly-Si film (Grain boundary) are reduced and the film stress is reduced to achieve a poly-Si TFT with a high carrier mobility and high quality.

These group IV elements can be implanted in the amorphous Si film or amorphous and poly mixed Si layer or poly-Si layer by ion implantation or ion doping.

Alternatively, the group IV elements including Ge, Sn, etc. in arbitrary concentrations can be mixed as a gaseous component in the raw material gas when performing a CVD process such as Si epitaxial growth, plasma CVD or thermal CVD to be implanted in the amorphous Si or amorphous and poly mixed Si layer or poly-Si layer.

An amorphous Si or amorphous and poly mixed Si layer or poly-Si layer containing the group IV elements including Ge, Sn, etc in arbitrary concentrations can be formed by sputtering Si target layers containing the group IV elements including Ge, Sn, etc.

Figure 22A:
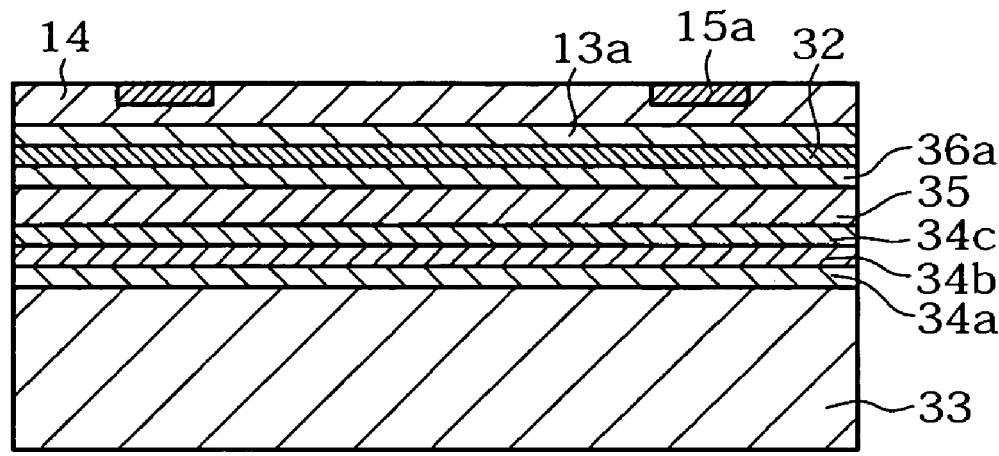
Figure 22B:
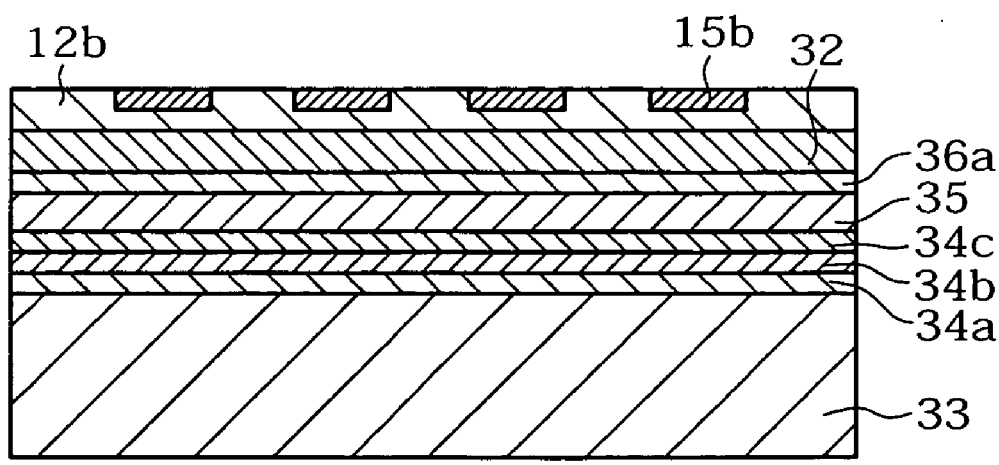

(7) An ultra slim TFT substrate layer is prepared by a general technology by forming a poly-Si TFT section 15a as a display device unit (See FIG. 22(*a*)) and wirings on the surface layer of a poly-Si layer 14 with a thickness of 50~100 nm and with a controlled crystal grain size, by forming a monocrystalline Si TFT section 15b (See FIG. 22(*b*)) and any of or both of semiconductor devices and semiconductor for integrated circuits such as diodes, resistors, capacitors and coils, as a peripheral circuit unit on the monocrystalline Si layer 12b. Since monocrystalline Si layer 12b has high electron and positive hole mobility as well as a monocrystalline Si substrate, picture signal processing circuits, picture quality correction circuits, memory circuits, CPU (central processing unit) circuits and DSP (digital signal processor) circuits can be incorporated as well as peripheral driving circuits.

The conditions are in compliance with (A).

At the same time, an external output electrode (including solder bumps), connected to peripheral circuits in the ultra slim TFT substrate layer is formed. In this case, it is desirable to make connections to a flexible board and mount on a PCB by means of anisotropic conductive film welding, ultrasonic welding or soldering after forming LCD panels. Diodes, resistors, capacitors, coils and wirings are not shown in the diagrams.

Figure 23A:
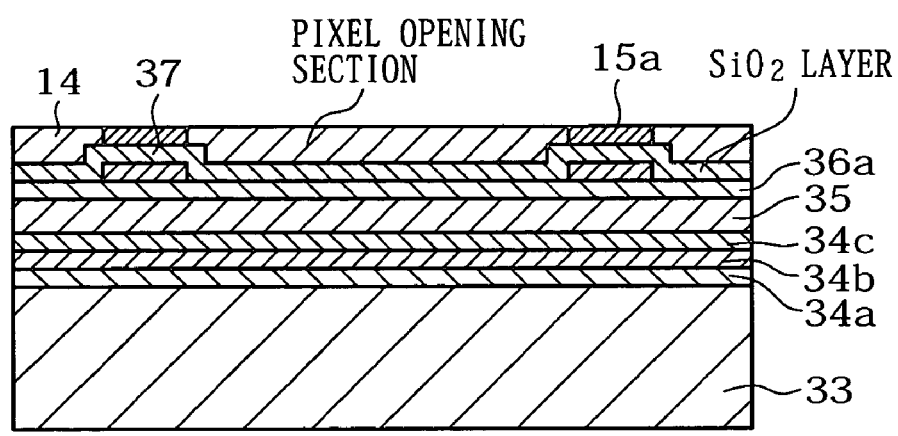
Figure 23B:
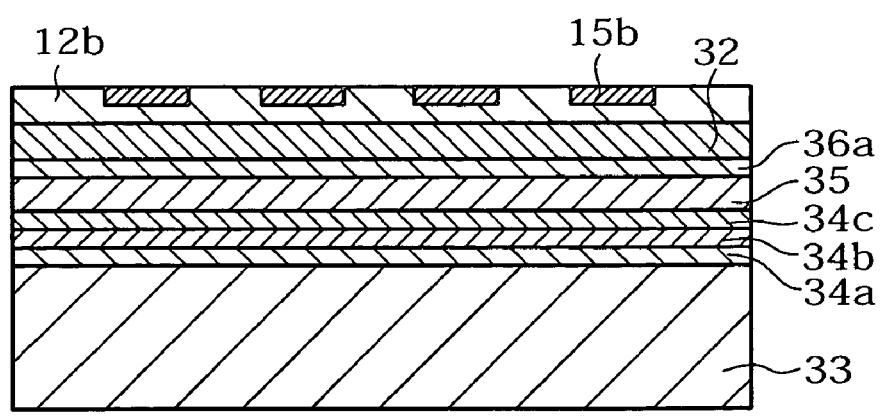

As a countermeasure against TFT leakage current by back reflection due to strong incident light as in projectors, a light shielding metallic layer 37 of transition metal silicides such as WSi2 (Tungsten silicide), TiSi2 (Titanium silicide), MoSi2 (molybdenum silicide) with a thickness of 200~300 nm is patterned by CVD below the poly-Si TFT section or amorphous Si TFT section 15a. The pattern in the display area is shown in FIG. 23($a$) and the pattern in the peripheral circuit area is shown in FIG. 23($b$).

At this stage, it is desirable to form a groove 62 from the monocrystalline Si layer 12b at least up to the high porous Si layer 34b along the division line that is a division boundary within the scribe line, when [the layer] is divided into single panels of various ultra slim electrooptic displays. By forming a groove 62, the ultra slim TFT substrate layer which will be discussed later is divided within the scribe line so that separation from the Si substrate 10 becomes easy and division in the subsequent processes can be performed easily.

A groove 62 is preferably formed with an arbitrary width from the monocrystalline Si layer 12b at least till until the high porous Si layer 34b by dry etching (plasma etching using $SF_6$, $CF_4$, $Cl+O_2$, $HBr+O_2$, reverse sputter etching, etc.), wet etching (fluoric acid etchants such as $HF+H_2O_2+H_2O$ mixed solution or $HF+HNO_3+CH_3COOH$ mixed solution, alkaline etchants), or mechanical processing (cutting a groove using a blade dicing diamond cutter, cemented carbide cutter, and ultrasonic cutter).

A transparent resin 16 which is mounted in the pixel opening section is also mounted in the groove to be able to reduce chipping, cracking and fracturing of the insulating layer and the monocrystalline Si layer 12b when being separated.

(8) The poly-Si layer 14 at the pixel opening section in the display area is removed by etching. The conditions are in compliance with (A).

(9) A transparent insulating film with a thickness of 50~200 nm (e.g., $SiO_2$ layer 13b, SiNx and $SiO_2$ laminated film, $SiO_2$, SiNx and $SiO_2$ laminated film, SiON, etc.) and a light-shielding metallic film with a thickness of 100~300 nm (hereafter referred to as a metallic film) 17 are formed respectively by CVD, sputtering or vapor deposition. Subsequently, connections of the poly-Si TFT section 15a on the poly-Si layer 14 (drains, sources and gates), and the metallic film 17 at the bottom of the pixel opening sections are removed by etching, a transparent resin 16 is embedded in the pixel opening followed by surface flattening by CMP (See FIG. 24). The conditions are in compliance with (A).

Figure 24A:
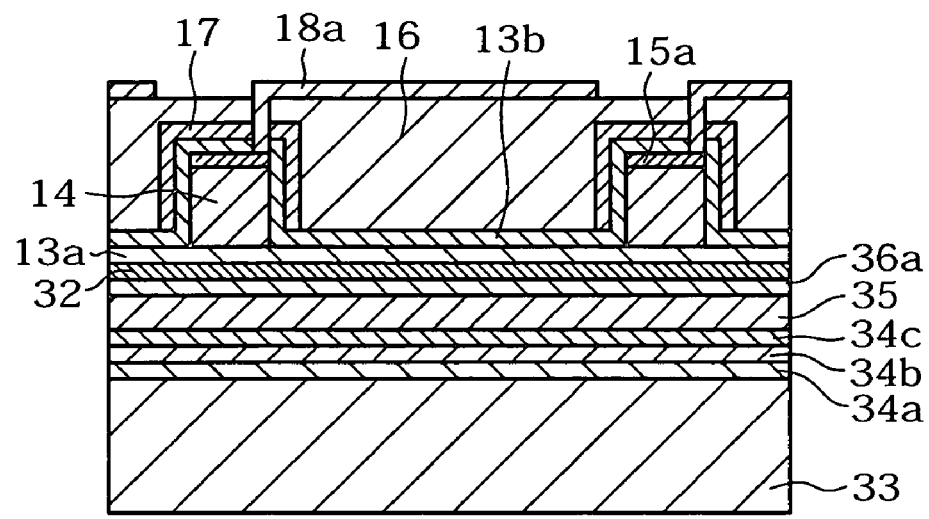
Figure 24B:
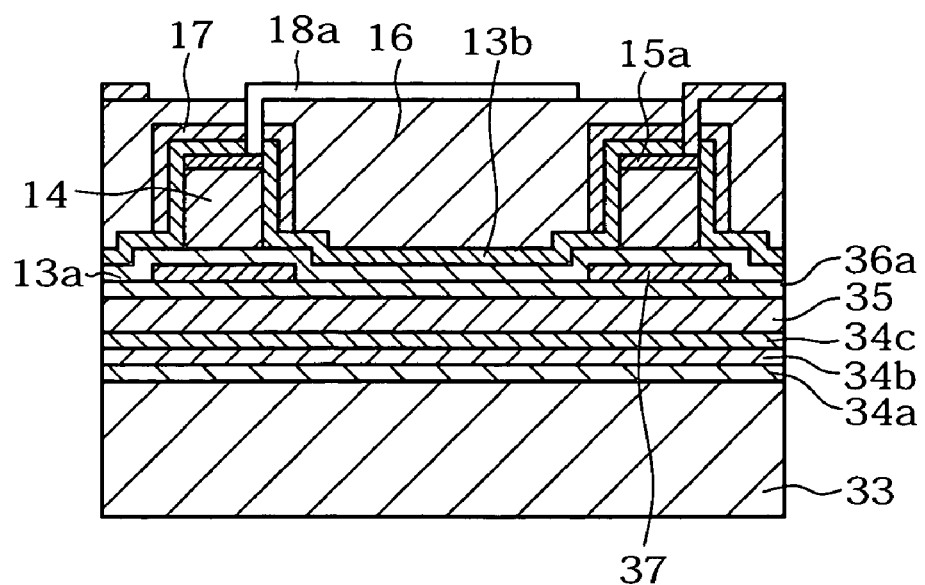

(10) A window is made in the transparent resin on the poly-Si TFT section 15a in the display area and a transparent electrode 18a is formed as a pixel electrode which is made of ITO and IZO to form an ultra slim TFT substrate layer (See FIG. 24). The conditions are in compliance with (A).

As a countermeasure against TFT leakage current by strong incident light as in projectors, a light shielding metallic layer 37 of transition metal layer is formed below the poly-Si TFT section or amorphous Si TFT section 15a in the display area as shown in FIG. 24.($b$). The leakage light can be completely shield by covering the upper section and lower section of the poly-Si TFT section or amorphous Si TFT section 15a in the display area with a light shielding metallic layer 37, and a metallic film 17.

(11) An alignment process is applied by forming alignment films 20a and 20b respectively for the support substrate 33 and the facing substrate 21. A sealant and common [electrode] agents (not shown) are coated on one of [surfaces] and both substrates are laminated and sealed with a specified liquid crystal gap of 2 $\mu$m. The conditions are in compliance with (A).

Figure 25:
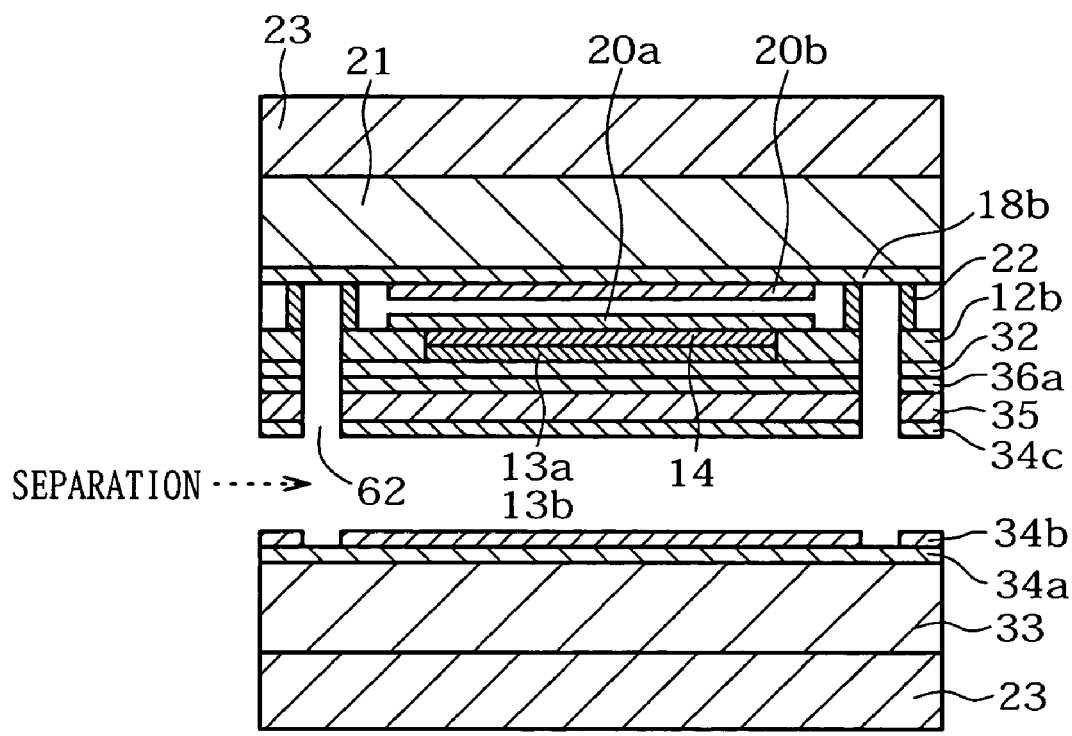

(12) While the support substrate 33 and the facing substrate 21 are covered at least with a antistatic UV tape 23, the support substrate 33 is separated from the high porous Si layer 34b by a high pressure fluid jet injection exfoliation method using a water jet, air jet or water/air jet, or laser process exfoliation method, or laser/water jet process exfoliation method (See FIG. 25). The conditions are in compliance with (A).

(13) The low porous Si layer 34c, monocrystalline Si layer 35, $SiO_2$ layer 36a, and monocrystalline Si layer 32 at the side separated are etched to expose the transparent resin 16 in the display area via $SiO_2$ layer 13a and $SiO_2$ layer 13b. The conditions are in compliance with (A). In the cases shown in FIG. 21($b$) and($c$), there is no need of etching the $SiO_2$ layer 36a, and the monocrystalline Si layer 32.

The subsequent processes are all in compliance with descriptions in (A).

When producing ultra slim reflective type LCDs, said processes (1)~(7) (FIGS. 17~23) are the same. Subsequently, as in the processes described in (A-2), a wiring layer 27 is formed in the peripheral circuit area and a protective film 28 is formed, and a reflective electrode 19a with a high reflectance is prepared from aluminum, aluminum alloys, silver, silver alloys, nickel, nickel alloys, titanium and titanium alloys to be connected at the drain of the TFT in the display area (See FIG. 26).

In the reflective electrode 19a, an appropriate concave/convex shape is formed on the electrode in order to improve ease in seeing the display by providing an appropriate light scattering effect in the case of direct-viewing reflective LCDs. In the case of reflective LCDs for projectors, a flat electrode shape is desirable.

Subsequently, an alignment film 20a is formed, sealant and common [electrode] agents (not shown) are coated, a facing substrate 21 on which a transparent electrode 18b and an alignment film 20b are formed is laid and sealed with a specified liquid crystal gap of 2 $\mu$m. The subsequent processes are same as those described in (A-2).

When producing ultra slim semi-transmissive type LCDs, said processes (1)~(7) (FIGS. 17~23) are the same as those described for transmissive type LCDS. The subsequent processes are same as those described in (A-3).

When producing ultra slim lower luminous type organic EL and ultra slim upper luminous type organic EL, said processes (1)~(7) (FIGS. 17~23) are the same as those described for transmissive type LCDs. The subsequent processes are same as those described in (A-4) and (A-5).

According to the double porous Si layer separation method described in this execution form, a $SiO_2$ layer 13a is formed by thermal oxidation of the monocrystalline Si layer 32 of the support substrate 33; a $SiO_2$ layer 13a in the peripheral circuit area is removed while leaving the $SiO_2$ layer 13a in the display area; a poly-Si layer 14 in the display area and a monocrystalline Si layer 12b in the peripheral circuit area are formed respectively by Si epitaxial growth such as CVD; if desirable, a poly-Si TFT section 15a as a display device unit is formed in the poly-Si layer 14 in the display area wherein crystal grain sizes (electron and positive hole mobility) are controlled by flash lamp annealing or solid phase deposition or laser annealing or condensing lamp annealing, and one or both of semiconductor devices and semiconductor for integrated circuits such as monocrystalline Si TFT section 15b are formed as a peripheral circuit unit in the monocrystalline Si layer 12b in the peripheral circuit area.

As a result, poly-Si TFT display devices with arbitrarily controlled electron and positive hole mobility with low current leakage qualities and the monocrystalline Si TFT peripheral circuits with a high electron and positive hole mobility with a high drivability can be formed within an ultra slim TFT substrate layer on the same Si substrate 33. Therefore, an ultra slim electrooptic display with a high electron and positive hole mobility and low current leakage qualities can be produced with high luminance, high resolution, and high functionality.

(26) Or with the separation method for another double porous Si layer in the execution figure, the insulating layer of $SiO_2$ layer 36a is exposed after the display area of monocrystalline Si layer 32 of the support substrate 33 is etched. The poly Si layer 14 in the display area and the monocrystalline Si layer 12b in the peripheral circuit area are each formed with semiconductor epitaxial growth. Because the poly SiTFT 15a as the display area in the poly Si layer 14 of the display area, where crystal grain size (high electron and positive hole mobility) is arbitrarily controlled with such methods as flash lamp annealing method or solid phase deposition method or laser annealing method or condensing lamp annealing method, etc., as required, and either the semiconductor device or the semiconductor for integrated circuits of the monocrystalline SiTFT area 15b, etc., as the peripheral circuit in the monocrystalline Si layer 12b or both are formed, the poly SiTFT display element, which has arbitrarily controlled relatively low high electron and positive hole mobility and low electric current leakage qualities, and the monocrystalline SiTFT peripheral circuit which has high electron and positive hole mobility and high drivability, are formed inside the ultra slim TFT substrate layer of the same support substrate 33. With this process, you can achieve an ultra slim electrooptic display device unit which has high electron and positive hole mobility and low electronic current leakage qualities, and which has high intensity, high definition and is sophisticated.

Or, with this separation method of even another double porous Si layer in this execution figure, the insulating layer of $SiO_2$ layer 36a is exposed after the display area of monocrystalline Si layer 32 of the support substrate 33 is etched. The light shielding metallic layer is formed on the poly SiTFT forming area of $SiO_2$ layer 36 of the display area by CVD and etching. The insulating layer is formed on top of it. The poly Si layer 14 is formed through the insulating layer in the display area and the monocrystalline Si layer 12b is formed in the peripheral circuit area with semiconductor epitaxial growth. Because the poly SiTFT part 15a as the display area in the poly Si layer 14 of the display area, where crystal grain size (high electron and positive hole mobility) has been arbitrarily controlled with such as flash lamp annealing method or solid phase deposition method or laser annealing method or condensing lamp annealing method, etc., as required, and either the semiconductor device or the semiconductor for integrated circuits of monocrystalline SiTFT area 15b, etc., as the peripheral circuit in the monoc-rystalline Si layer 12b, or both are formed, the poly SiTFT display element, which has arbitrarily controlled relatively low high electron and positive hole mobility and low electric current leakage qualities, and the monocrystalline SiTFT peripheral circuit, which has high electron and positive hole mobility and high drivability, are formed inside the ultra slim TFT substrate layer of the same support substrate 33. With this process, an ultra slim electrooptic display device unit which has high electron and positive hole mobility and low electronic current leakage qualities, and which is high intensity, high definition and sophisticated can be obtained.

If the poly Si layer 14 of the display area mentioned above contains a proper quantity (for example, a total of 1017–1022 atom/cc, preferably 1018–1020 atom/cc) from ion implantation or ion doping, etc. of least one kind of group IV elements of Ge, Sn, Pb, etc. selectively, and the poly SiTFT display element of the poly Si film, which arbitrarily controlled the crystal grain size selectively with solid phase deposition method, flash lamp annealing method, pulse condition or Continuous wave laser annealing method, or condensing lamp annealing method, etc. with this circumstance, is made, the irregularities which exists in the crystal grain boundary (grain boundary) of that poly Si film decrease and the film stress is decreased and the poly SiTFT with high carrier mobility and high quality can be easily obtained. And the poly SiTFT display element, which arbitrarily controlled relatively low high electron and positive hole mobility and low electric current leakage qualities, can be obtained.

Furthermore, the poly Si layer which contains at least one kind of group IV elements Sn, Ge, Pb, etc., is formed in the aforementioned display area with semiconductor epitaxial growth. If we have a poly SiTFT display element of the poly Si layer which selectively controlled the crystal grain size with solid phase deposition method, flash lamp annealing method, pulse condition or Continuous wave laser annealing method, condensing lamp annealing method, etc., the irregularity which exists in the grain boundary of the poly Si film is decreased and poly SiTFT with high carrier mobility and high quality is likely to be obtained due to a decrease in the film stress. And you can obtain the poly SiTFT display element which has relatively low high electron and positive hole mobility that is arbitrarily controlled, and low electric current leakage qualities.

Or, the separation method for the double porous Si layer in this execution figure, $SiO_2$Layer 13a is formed by thermal oxidizing the monocrystalline Si layer 32 of the support substrate 33. The amorphous Si film or the amorphous and the poly mixture Si film or the poly Si film 14 are formed with Plasma CVD, heat CVD, sputtering, evaporation, etc., the monocrystalline Si film is exposed by etching the amorphous Si film or the amorphous and the poly mixture Si film or poly Si film 14 and $SiO_2$ layer 13a. Because the amorphous Si film of the display area which controlled the crystal grain size arbitrarily with flash lamp annealing or solid phase deposition method or laser annealing method or condensing lamp annealing method, etc. according to the needs, or the amorphous and the poly mixture Si film or the amorphous SiTFT part 15a as display element part in the poly Si layer 14 or the amorphous and the poly mixture SiTFT or poly SiTFT part 15a, either the semiconductor device or the semiconductor for integrated circuits of monocrystalline SiTFT area 15b, etc. as the peripheral circuit in the monocrystalline Si layer 12b of the peripheral circuit are, or both are formed, an ultra slim electrooptic display device unit which has high electron and positive hole mobility and low electric current leakage qualities, and which is high intensity, high definition and is sophisticated can be obtained by forming the amorphous SiTFT or the amorphous and the poly mixture SiTFT or the poly SiTFT display element which has relatively low high electron and positive hole mobility and low electric current leakage qualities which is controlled optionally, and the monocrystalline SiTFT peripheral circuit which has high electron and positive hole mobility and high drivability are formed inside the ultra slim TFT substrate layer of the same support substrate 33.

Or, with the separation method for another double porous Si layer in this execution figure, the display area of monocrystalline Si layer 32 of the support substrate 33 is etched and the insulating layer of SiO$_2$Layer 36a is exposed. The insulating layer, the amorphous Si film or the amorphous and the poly mixture Si film or the poly Si film 14 are formed with Plasma CVD, heat CVD, sputtering, evaporation, etc. Because the poly Si layer in the display area or the amorphous Si film or the amorphous and the poly mixture Si film 14, which controlled the crystal grain size arbitrarily with flash lamp annealing or solid phase deposition method or laser annealing method or condensing lamp annealing method, etc. according to the need, as the display element the poly Si layer of the display area or the amorphous Si film or the amorphous and the poly mixture Si film 14 or the amorphous and the poly mixture SiTFT or poly SiTFT part 15a, either the semiconductor device and the semiconductor for integrated circuits of monocrystalline SiTFT area 15b, etc. as the peripheral circuit in the monocrystalline Si layer 12b of the peripheral circuit area, or both are formed, an ultra slim electrooptic display device unit, which has high electron and positive hole mobility and low electric current leakage qualities, and which is high intensity, high definition and sophisticated, can be obtained after forming the amorphous SiTFT or the amorphous and the poly mixture SiTFT or the poly SiTFT display element, which has relatively low high electron and positive hole mobility and low electric current leakage qualities which is controlled optionally, and the monocrystalline SiTFT peripheral circuit which has high electron and positive hole mobility and high drivability, inside the ultra slim TFT substrate layer of the same support substrate 33.

Or, with the separation method for even another double porous Si layer in this execution figure, the display area of monocrystalline Si layer 32 of the support substrate is etched and the insulating layer of SiO$_2$ layer 36a is exposed. The light shielding metallic layer is formed by etching and CVD in the pixel display element forming area of SiO$_2$ layer 36a of the display area. The insulating layer and the amorphous Si film or the amorphous and the poly mixture Si film or the poly Si layer 14 are formed extensively with plasma CVD, heat CVD, sputtering and evaporation, etc. The poly Si layer of the display area, which the crystal grain size (high electron and positive hole mobility) is arbitrarily controlled with flash lamp annealing method or solid phase deposition method or laser annealing method or condensing lamp annealing method, etc., or the amorphous Si layer or the amorphous and the poly mixture Si layer 14, the amorphous SiTFT as the display element or the amorphous and the poly mixture SiTFT or the poly SiTFT 15a, and either semiconductor element such as monocrystalline SiTFT 15b as the peripheral circuit in the monocrystalline Si layer 12b which has etched the insulating layer and the amorphous Si layer or the amorphous or the poly mixture Si layer or the poly Si layer 14 or semiconductor integrating circuit or both are formed. Because of this process, the reflected light is blocked from the back by the light shielding metallic layer and the amorphous SiTFT or the amorphous and the poly mixture SiTFT or the poly SiTFT display element, which has relatively low high electron and positive hole mobility and low electric current leakage qualities that is controlled optionally, and the monocrystalline SiTFT peripheral circuit, which has high high electron and positive hole mobility and high drivability, are formed inside the ultra slim TFT substrate layer of the same support substrate 33. A high intensity, high definition and sophisticated ultra slim electrooptic display device unit which has high electron and positive hole mobility and low electric current leakage qualities can be obtained.

The amorphous Si layer or the amorphous and the poly mixture Si layer or the poly Si layer 14 in the display area mentioned above, contains the proper quantity (for example, total of $10^{17}$~$10^{22}$ Atom/cc, preferably $10^{18}$~$10^{20}$ Atom/cc) at least one kind of group IV elements such as Ge (germanium), tin, lead, etc., from ion implantation or selective ion doping, if we selectively make the poly SiTFT display element of the poly Si film which is controlled the crystal grain size arbitrarily by the aforementioned process, using the solid phase deposition method, the flash lamp annealing method, the pulse condition or the Continuous wave laser annealing method and the condensing lamp annealing method with this circumstance, the irregularity which exists in the grain boundary of the poly Si film is decreased, and the poly SiTFT of high carrier mobility of high quality is likely to be obtained. And the poly SiTFT display element with high electron and positive hole mobility which is arbitrarily controlled and with low electric current leakage qualities and the monocrystalline semiconductor TFT peripheral circuit with high electron and positive hole mobility and with high drivability are formed on the same support substrate.

Furthermore, the amorphous Si layer or the amorphous and the poly mixture Si layer or the poly Si layer 14 which contains at least one kind of group IV elements such as tin, germanium, lead, etc., are formed in the aforementioned display area with plasma CVD, heat CVD, sputtering, and evaporation. If we have the poly SiTFT display element of the poly Si layer which controlled the crystal grain size arbitrarily with solid phase deposition method, flash lamp annealing method, laser annealing method and condensing lamp annealing method, the poly SiTFT with high carrier mobility and high quality can be obtained easily because the irregularity which exists in the crystal grain boundary of the poly Si film, and the stress of the film are decreased. And the poly SiTFT display element with high electron and positive hole mobility which is arbitrarily controlled and with low electric current leakage qualities and the monocrystalline semiconductor TFT peripheral circuit with high electron and positive hole mobility and with high drivability are formed on the same support substrate.

By the way, with the separation method for the double porous Si layer in this execution figure, SiGe layer 32 with a Ge density of 20~30% is formed on the seed substrate as a distortion impression semiconductor layer through the porous Si layer, the SiO$_2$Layer 13a is formed with thermal oxidizing after attaching and the separating the seed substrate. The SiO$_2$Layer 13a in the peripheral circuit area is removed while leaving the SiO$_2$Layer 13a in the display area. The poly Si layer 14 may be formed in the display area with the epitaxial growth such as CVD, etc., the SiGe layer 32 as distortion impression semiconductor layer may be formed in the peripheral circuit area, and distortion Si layer 12b as distortion channel layer in the seed substrate.

In addition, the SiGe layer 32 with a Ge density of 20% is formed as the distortion impression semiconductor layer through the porous Si layer, SiO$_2$ layer 36a in the insulating layer is exposed by etching SiGe layer 32 in the display area and after attaching and separating the seed substrate. The poly Si layer 14 in the display area may be formed with semiconductor epitaxial growth such as CVD, SiGe layer 32 may be formed as distortion impression semiconductor layer in the peripheral circuit area in the seed, distortion Si layer 12b as distortion channel layer may be formed.

Furthermore, SiGe layer 32 with a Ge density of 20% is formed as the distortion impression semiconductor layer through the porous Si layer on the seed substrate. The light shielding metallic layer in the display forming element area is formed by etching the SiGe layer 32 in the display area and the SiO$_2$ layer 36a in the insulating layer is exposed after attaching and separating seed substrate. The insulating layer is formed on top of it, and the poly Si layer 14 may be formed in the display area with semiconductor epitaxial growth such as CVD, the SiGe layer 32 may be formed in the seed substrate as a distortion impression semiconductor layer in the peripheral circuit area, distortion Si layer 12b as distortion channel layer may be formed.

Because of this, the monocrystalline SiMOSTFT peripheral circuit is achieved by accomplishing the improvement of greater electronic mobility with approximately 1.76 times higher drivability compared to the monocrystalline Si layer of non-distortion channel layer in the past and you can obtain the ultra slim electrooptic display device unit with the high performance, high definition and high quality compared to the past.

(C) Separation Method for Ion Implantation Layer

I will explain the manufacturing method for the ultra slim electrooptic display device unit with the ion implantation layer method for chemical separation the uses an ion implantation layer with these execution figures. FIG. 27 to FIG. 30 shows a manufacturing process for the ultra slim type LCD of the separation method with the hydrogen ion implantation layer in the implementation of this invention.

The support substrate 40 which consists of the monocrystalline Si is made with thermal oxidizing and the SiO$_2$ layer 13a is formed. The SiO$_2$ layer in the peripheral circuit area is removed by etching, leaving the SiO$_2$ layer 13a in the display area. The poly Si layer 14 in the display area is formed, and the monocrystalline Si layer 12b Si formed in the peripheral area are each formed with semiconductor epitaxial growth such as CVD. Each condition at this time corresponds to (A). A SiGe layer with a Ge density of 20~30% is formed on the surface of the support substrate 40 as a distortion impression semiconductor layer with semiconductor epitaxial growth such as CVD, the SiO$_2$ layer 13a is formed by thermal oxidizing. The SiO$_2$ layer 13a in the peripheral circuit area is removed by etching, leaving the SiO$_2$ layer 13a in the display area. The poly Si layer 14 in the display area may be formed with semiconductor epitaxial growth such as CVD, distortion impression semiconductor layer of the SiGe layer may be formed in the peripheral circuit area, the distortion Si layer 12b of the distortion channel layer may be formed in the seed substrate.

(A) Corresponds to the conditions to arbitrarily control the crystal grain size in the poly Si layer 14 in the display area with flash lamp annealing or solid phase deposition method or laser annealing method or condensing lamp annealing method, etc. as required.

In the mean time, the support substrate 40 uses not only the monocrystalline Si substrate formed with CZ (Czochralski) law, MCZ (Magnetic field Applied Czochralski) law, FZ (Floating Zone) low, etc., but also uses the monocrystalline Si substrate on which the surface of the substrate has had hydrogen anneal processing or the epitaxial monocrystalline Si substrate, etc. Of course, instead of the monocrystalline Si substrate, the monocrystalline SiGe substrate, or furthermore a monocrystalline compound semiconductor substrate such as SiC substrate, GaAs substrate and Inp substrate, etc. can be used.

Figure 28A:
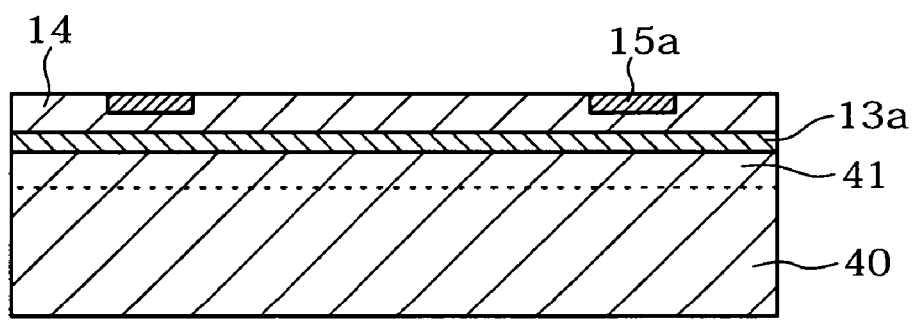
Figure 28B:
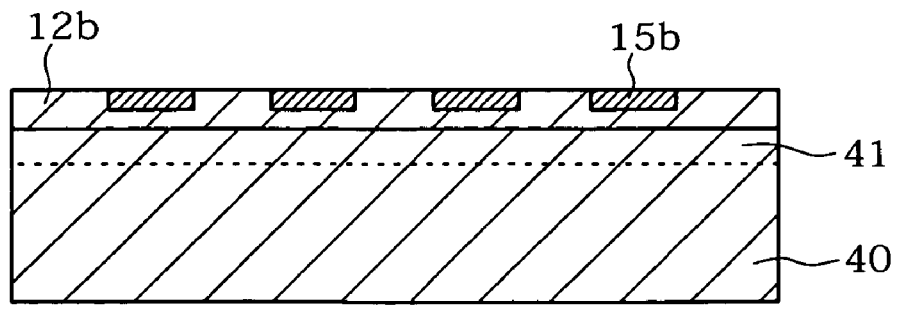

(2) You can achieve whether or both the poly SiTFT area 15a (please refer the FIG. 28(a)) as the display element area in the poly Si layer 14 with general purpose technology, wiring, etc., or the semiconductor element such as the monocrystalline SiTFT area 15b (please refer the FIG. 28(a)) etc. as the peripheral circuit area in the monocrystalline Si layer 12b or the semiconductor for integrated circuits. This corresponds to conditions (A).

Furthermore, because the monocrystalline Si layer 12b has high electron and positive hole mobility the same as the Si substrate, not only peripheral driver circuitry but also the image signal processing circuit, the picture quality compensation circuit, the memory circuit, the CPU (Central Processing Unit) circuit, the DSP (digital Signal Processor) circuit, etc. can be included. This condition corresponds to (A). Meanwhile, the illustration is abbreviated for the diode, resistance, capacitor, coil, wiring, etc.

(3) The hydrogen ion implantation layer 41 is formed extensively. Meanwhile, the hydrogen ion dose quantity is approximately 1000 keV, $5 \times 10^{16} \sim 1 \times 10^{17}$ atoms/cm$^2$ and a of depth 10 $\mu$m is filled.

At this time, in order to equalize the high density hydrogen ion fill layer 41 inside the monocrystalline Si substrate, and in order to prevent the high density hydrogen ion separation, the high density hydrogen ion implantation layer 41 is formed after the process at more than 500 ° C.

However, because the electrode, wiring, etc. can become the cause of the hydrogen ion fill depth dispersion, it is desirable to form these before or after the exfoliation annealing and after the hydrogen ion implantation process.

(6) Process for the Anneal Processing for Exfoliation

The annealing for exfoliation with heat treatment at 400~600° C., for 10~20 minutes, or the rapid heating rapid cooling of RTA (Rapid Thermal Anneal), for example halogen lamp with 800° C. for several seconds, or Xe flash lamp annealing at 1000° C. for several seconds, with heat treatment such as laser ablation of the carbonic dioxide, etc.

Because of this, the hydrogen ion implantation which was filled expands in the distortion layer 41a (please refer FIG. 29) in the hydrogen ion implantation layer 41 because of pressure action and the crystal re-arranges inside the micro bubbles. However, the device structure layers, such as silicon oxide film, silicon nitride film exist on the support substrate 40, and it penetrates these, and the hydrogen ion implantation layer under the insulating film is formed and it generates the distortion due to heat treatment.

But, in case where the electrode and the wiring formation is done before the exfoliation annealing, it is even more desirable to do the exfoliation annealing with the TRA of rapid heating rapid cooling with cooling of the ultra slim TFT substrate layer side of the back of the support substrate (monocrystalline Si substrate 40 through the UV tape with support jig which is liquid cooled).

Or, it is desirable to do the laser processing exfoliation method which is done with the hydrogen ion implantation layer 41 without the exfoliation annealing, or the laser water jet process exfoliation method and cooling the ultra slim TFT substrate layer side through the UV tape by the support jig with liquid cooling.

At this stage, it is desirable to form the groove 62 from the monocrystalline Si layer 14 to at least the distortion area 41a of the hydrogen ion implantation layer along with the dividing lines to divide the assembly into one panel each of ultra slim electrooptic display device units afterwards, in other words along with the dividing boundary line inside the scribe line. By forming the groove 62, it is possible to separate from the support (Si) substrate 40 easily, and at the same time to divide the process which will be mentioned later, because the ultra slim TFT substrate layer which will be mentioned later is divided inside the scribe line beforehand.

It is better to form the groove 62 at least to the distortion layer 41a of the hydrogen ion implantation layer with dry etching (plasma etching and opposite sputter etching, etc. with compounds such as $SF_6$, $CF_4$, $Cl+O_2$, $HBr+O_2$, etc.), wet etching (such as hydrofluoric acid etchant, alkaline etchant with mixed liquid $HF+H_2O_2+H_2O$, mixed liquid $HF+HNO_3+CH_3COOH$, etc.), mechanical processing (cutting the groove by the blade dicing, the diamond cutter, the cemented carbide cutter, the ultrasonic cutter etc.).

(7) The poly Si layer 14 of the pixel opening section in the display area is removed by etching. This corresponds to condition (A).

(8) The transparent insulating film (for example, $SiO_2$ layer 13b, SiNx and $SiO_2$, laminating film, SiON, etc.) with 50~200 nm thickness and the low reflective metallic film with 100~300 nm thickness are formed by CVD, sputtering, vapor deposition method, etc. in order, the metallic film 17 of the connection part of the poly SiTFT area on top of the poly Si layer 14 and the bottom of pixel opening section are etched, and the transparent resin 16 and the like are embedded inside the pixel opening section, and the surface is planarized with CMP, etc. This corresponds to condition (A).

(9) The transparent resin 16 on the poly SiTFT area 15a drain in the display area is done by opening the window, the ultra slim TFT substrate layer is formed (please refer the FIG. 29) by forming the transparent electrode 18a, etc. as the pixel electrode such as ITO, IZO, etc. This corresponds to condition (A). However, when the wiring and the external output electrode (includes solder bump) inside the peripheral circuit of the ultra slim electrooptic display element substrate layer is formed at the same time, it is desirable to connect with the flexible substrate and mount to a PCB with such as an anisotropic electric conduction film connection, an ultrasonic connection and solder.

Figure 30:
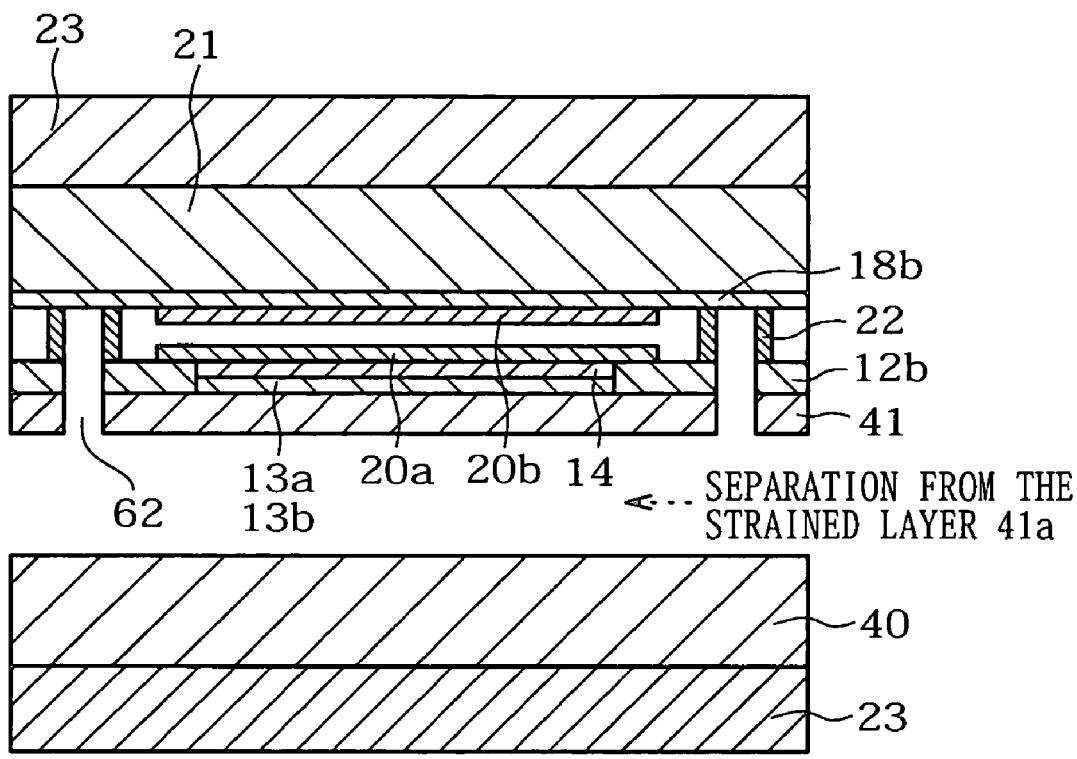

(10) The alignment layer 20a and 20b are each formed on the support substrate 40 and the facing substrate 21, and the orientation treatment is also done, and with the sealing medicine and the common agents (not in the figure) on either one, it seals with the specified liquid crystal gap, for example 2 μm by laminating (please refer the FIG. 30). This corresponds to condition (A).

(11) The tops of the support substrate 40 and the facing substrate 21 are covered with the UV tape 23, etc. with at minimum electrostatic prevention which has the least sealant transfer, the support substrate 40 is separated from the distortion layer 41a of the hydrogen ion implantation layer 41 (please refer FIG. 30). This corresponds to condition (A).

Although the pulling exfoliation is done after the exfoliation annealing discussed above, it is OK to do the high pressure fluid jet injection exfoliation after sealing the support substrate 40 and the facing substrate 21 by laminating.

Furthermore, the hydrogen ion implantation layer 41 is heated partially with the laser processing exfoliation method or the laser water jet process exfoliation method and then, it is acceptable to do the distortion and exfoliate. This corresponds to condition (A).

In other words, the high density hydrogen, which was filled with ions by local heating due to the laser processing exfoliation method, is expanded by the heat as the facing substrate 21 side is cooled through the UV tape by the supporting jig which is liquid cooled as required. The support substrate is separated by producing the distortion layer 41a in the hydrogen ion implantation layer 41 by pressure action inside the micro bubbles and the crystal re-arranging action.

Meantime, cooling the side of the facing substrate 21 via a UV tape using a support jig which is liquid cooled is not always necessary because the in the laser water jet process exfoliation method, the water that is irradiated with the laser provides cooling action at the same time.

(12) The hydrogen ion implantation layer (monocrystalline Si layer) 41 of the separated surface is etched, the transparent resin 16 which was embedded to the pixel opening section of the display area through the $SiO_2$ layer 13a and the $SiO_2$ layer 13b is exposed. This corresponds to condition (A).

The process described in the following corresponds to (A).

In the mean time, when the reflective type LCD, the semi-transmissive type LCD, the underside luminous type organic EL and the surface luminous type organic EL are manufactured, the process for (1)~(4) is done with the same process as a transmissive type LCD, the process for each is the same process described in the following (A~2), (A~3), (A~4) and (A~5).

Although, for this execution figure, hydrogen ions are used for separation, it is possible to use a noble gas such as nitrogen and helium, etc. in the place of the hydrogen ions.

For example, in case of hydrogen ion implantation, rather than using the ion implantation unit (same as the traditional ion implantation device which fills an impurity such as boron or phosphorus to the Si substrate) which does the mass separation of the hydrogen ion beam and scans, you can use the hydrogen negative ion beam fill device which creates the plasma includes hydrogen by plasma production method in which the hydrogen negative ion beam is pulled out from this plasma, and which fills with hydrogen negative ions to the specified depth.

Like mentioned above, with the separation method for the ion implantation layer in the execution form, the surface of support substrate 40 which consists of the monocrystalline Si is thermal oxidized and the $SiO_2$ layer 13a is formed. The $SiO_2$ layer 13a in the peripheral circuit area is removed leaving the $SiO_2$ layer 13a in the display area. The poly Si layer 14 in the display area and the monocrystalline Si layer 12b in the peripheral circuit area are each formed with Si epitaxial growth. The poly SiTFT area 15a as the display element in the poly Si layer 14 in the display area, which arbitrarily controlled the crystal grain size (electronic positive hole mobility), and the monocrystalline SiTFT area 15b as the peripheral circuit area in the monocrystalline Si layer 13a of the peripheral circuit area are each formed with methods such as solid phase deposition method, flash lamp annealing method, laser annealing method and condensing lamp annealing method as required. The poly SiTFT display element, which has low high electron and positive hole mobility that was arbitrarily controlled, and low electric current leakage qualities, and the monocrystalline SiTFT peripheral circuit, which has high electron and positive hole mobility and high drivability, are formed inside the ultra slim TFT substrate layer on the same support substrate 40. A high intensity, high definition and sophisticated ultra slim electrooptic display device unit which has high electron and positive hole mobility and low electric current leakage qualities can be obtained.

Furthermore, the poly Si layer 14 in the display area contains the proper quantity (for example, a total of $10^{17}$~$10^{22}$ Atom/cc, preferably $10^{18}$~$10^{20}$ Atom/cc) of a minimum of one kind of group IV elements of Ge, Sn, Pb, etc. as required with ion implantation or ion doping or CVD, etc. in the deposition layer. And by maintaining this condition, if we have the poly SiTFT display element of the poly Si film which has arbitrarily controlled crystal grain size with solid phase deposition method, flash lamp annealing method, pulse condition or Continuous wave laser annealing method or condensing lamp annealing method, etc., the irregularity which exists in the crystal grain boundary of the poly Si film is decreased, and the film stress is decreased, it is easy to obtain the display area of the poly SiTFT with high carrier mobility and high quality. The poly SiTFT display element, which has high electron and positive hole mobility that was arbitrarily controlled and low electric current leakage qualities, and the monocrystalline SiTFT peripheral circuit which has high electron and positive hole mobility and high drivability are formed inside the ultra slim TFT substrate layer on the same support substrate 40. A high intensity, high definition and sophisticated ultra slim electrooptic display device unit which has high electron and positive hole mobility and low electric current leakage qualities can be obtained.

Furthermore, the insulating layer $SiO_2$ layer 13a and the amorphous Si layer or the amorphous and the poly mixture Si layer or the poly Si layer 14 are formed on the monocrystalline Si layer 12a of the Si substrate 10 with plasma CVD, heat CVD, sputtering, evaporation, etc. A minimum of the amorphous Si layer of the peripheral circuit area or the amorphous and the poly mixture Si layer or the poly Si layer 14 are removed while leaving the $SiO_2$ layer 13a of the display area and the amorphous Si layer or the amorphous and the poly mixture Si layer and the poly mixture Si layer and the poly Si layer 14. Because the amorphous SiTFT or the amorphous and the poly mixture SiTFT or the poly SiTFT area 15a as the display element in the display area, and the monocrystalline SiTFT 15b as peripheral circuit in the monocrystalline Si layer 12b of the peripheral circuit area are each formed, the amorphous SiTFT which has relatively low high electron and positive hole mobility and low electric current leakage qualities, or the amorphous and the poly mixture SiTFT or the poly SiTFT display element, and the monocrystalline SiTFT peripheral circuit which has high electron and positive hole mobility and high drivability, are formed inside the ultra slim TFT substrate layer on the same Si substrate 40. A high intensity, high definition and sophisticated ultra slim electrooptic display device unit which has high electron and positive hole mobility and low electric current leakage qualities can be obtained.

The amorphous Si layer or the amorphous and the poly mixture Si layer or the poly Si layer 14 in the display area mentioned above contain the proper quantity (for example, a total of $10^{17}$~$10^{22}$ Atom/cc, preferably $10^{18}$~$10^{20}$ Atom/cc) of at least one kind of group IV elements of Ge, Sn, Pb, etc. as required, with ion implantation or ion doping or CVD, etc. forming a film. Maintaining this condition, if we have the poly SiTFT display element of poly Si film which has re-crystallized the crystal grain size with solid phase deposition method, flash lamp annealing method, pulse condition or Continuous wave laser annealing method, condensing lamp annealing method, etc., for example the irregularity which exists in the crystal grain boundary of the poly Si film is decreased, and the film stress is decreased, it is easy to obtain the display area of the poly SiTFT with high carrier mobility and high quality.

And the poly SiTFT display element which has relatively low high electron and positive hole mobility and low electric current leakage qualities, and the monocrystalline SiTFT peripheral circuit which has high electron and positive hole mobility and high drivability, are formed inside the ultra slim TFT substrate layer on the same support substrate 40. A high intensity, high definition and sophisticated ultra slim electrooptic display device unit which has high electron and positive hole mobility and low electric current leakage qualities can be obtained.

Also, with this separation method for the ion implantation layer in this execution form mentioned above, the SiGe layer with a Ge density of 20~30% as distortion impression semiconductor layer is formed on the surface of the support substrate which consists of the monocrystalline Si layer, the $SiO_2$ layer 13a is formed by thermal oxidizing, the $SiO_2$ layer 13a in the peripheral circuit area is removed while leaving the $SiO_2$ layer 13a in the display area. The poly Si layer 14 in the display area, the distortion impression semiconductor layer of the SiGe layer in the peripheral circuit area, and the distortion Si layer 12b as the distortion channel layer in the seed may be formed with Si epitaxial growth such as CVD.

Because of this, if the distortion channel semiconductor layer is distorted, the band structure is changed. As a result, the degeneracy is alleviated. Because the electron hole mobility can be increased, for example when compared to the monocrystalline Si layer in the non-distortion channel layer, approximately 1.76 times higher electron mobility can be actualized. A high performance, high definition and sophisticated ultra slim electrooptic display device unit, which consists of the display area, and the peripheral circuit of MOSTFT, which has high electron and positive hole mobility and high drivability, is possible.

(D) The Separation Method for Double Ion Implantation Layer

With this execution form, I will explain about the manufacturing method for the ultra slim electrooptic display device unit by the separation method for the double ion implantation layer (the semiconductor seed substrate is separated from the ion implantation layer which forms in the semiconductor seed substrate, the semiconductor support substrate is separated form the ion implantation layer which forms in the semiconductor support substrate) which used the ion implantation layer. From FIG. 31 to FIG. 36 explains the process for the manufacturing of ultra slim LCD by the exfoliation method for double hydrogen ion implantation exfoliation with the execution form of this invention.

(1) The hydrogen ion implantation layer 44 is formed by filling the high density hydrogen ion to the seed substrate 43, for example 12 inch Φ . . . with 1.2 mm thickness, which consists of monocrystalline Si. In the mean time, the hydrogen ion can be filled with the doze quantity approximately 300 Kev, $5 \times 10^{16}$~$1 \times 10^{17}$ Atoms/cm$^2$ and approximately 3 μm depth (please refer the FIG. 31).

At this time, the monocrystalline Si layer 44 of SiGe layer with a Ge density of 20~30% as the distortion impression semiconductor layer may be formed with Si epitaxial growth such as CVD on the surface of the monocrystalline Si substrate 43, so that exfoliated hydrogen ion implantation layer (monocrystalline Si layer) 44 can become a distortion impression semiconductor layer. And by filling with high density hydrogen ion, as mentioned before, to this thickness (depth), the hydrogen ion implantation layer can be created.

At this time, the surface of the monocrystalline Si layer 44, which after the seed substrate separation is a distortion impression semiconductor layer, is set to become the desired density by making the angle structure where the Ge density becomes the desired density at distortion layer 44a of the hydrogen ion implantation layer in SiGe layer. It is desirable to form the monocrystalline Si layer 44, which is the distortion impression semiconductor layer of the SiGe layer in this angle structure, in the seed, and the distortion Si layer 12b as a distortion channel layer by Si epitaxial growth.

In other words, it is desirable to make the surface density of the monocrystalline SiGe layer 44 which is a distortion impression semiconductor layer and is formed after the seed substrate separation, become a desired density by gradient constituting which makes the Ge density a desired density in the distortion layer 44 of the hydrogen ion implantation layer in the SiGe layer, and the monocrystalline Si layer 44, which is a distortion impression semiconductor layer of the SiGe layer in this gradient constituting is formed in the seed and the distortion Si layer 12b as a distortion channel layer by the Si epitaxial growth.

Or, the monocrystalline Si substrate itself may make the monocrystalline Si substrate 43 which consists of SiGe with a Ge density 20~30%.

(2) The support substrate 40 with for example, 12 inch Φ. 1.2 mm thickness, which consists of the monocrystalline Si, is oxidized with heat. The insulating layer which consists of the $SiO_2$ layer or $Si_3N_4$ and $SiO_2$ laminating film is formed (please refer FIG. 31).

By forming and thermal oxidizing the silicon nitride film or the silicon nitride film and the silicon oxide film on the monocrystalline Si layer 40 other than the silicon oxide film $SiO_2$ with thermal oxidation, the insulating film 42 may become a silicon oxide film and the laminating film of silicon nitride film, or silicon oxide film, silicon nitride film and laminating film of silicon oxide film (for example $SiO_2$; 200 nm, $Si_3N_4$; 50 nm and $SiO_2$; 200 nm) by the vacuum heat CVD.

Furthermore, it may become the silicon oxy-nitride film (SiON). The monolayer film which is mentioned above and the insulating film of multilayer film may be formed with plasma CVD method, sputtering method, MBE method, vapor deposition method, etc.

(3) Attaching the Seed Substrate 43 and the Support Substrate 40.

After washing the support substrate 40 and the seed substrate 43, the hydrogen ion implantation layer 44 is joined to the surface of insulating layer 42 of the support substrate 40 at room temperature, and is connected with Van Del Waals power. After this process, heat treatment for 30 minutes with 400° C. for covalent bonding makes the attachment stronger. It is necessary to set the heat processing at this time with a processing temperature and a processing time below the hydrogen ion separation temperature. The heat processing is same process explained as (B) except for the processing temperature and the processing time.

Or, prior to this the, connecting surface is irradiated with an inert gas ion beam or an inert gas high-speed atomic beam such as argon in the vacuum at room temperature. The dust and soiling adhesion, etc. on the surface is removed by sputter etching. You can make the bonding stronger by increasing the adhesion and increasing the surface unevenness in order to join the surfaces.

(4) The high density hydrogen which is filled with ions is made to expand with heat from the annealing for exfoliation.

The distortion layer 44a is generated in the hydrogen ion implantation layer 44 by the pressure inside the micro bubbles and by crystal re-arrangement action. UV tape 23 is attached on both of the seed substrate 43 and the support substrate 40 and are exfoliated by pulling exfoliation or high pressure fluid jet injection (please refer FIG. 32). Annealing for exfoliation corresponds to (C).

After that, the UV tape 23 is exfoliated from the support substrate 40 and the seed substrate 43 by UV irradiation hardening. Or it is possible to separate the hydrogen ion implantation layer 44 by the laser processing exfoliation or the laser water jet processing exfoliation without the annealing for exfoliation.

Figure 42B:
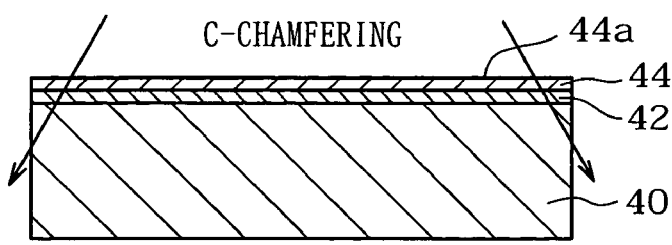
Figure 42C:
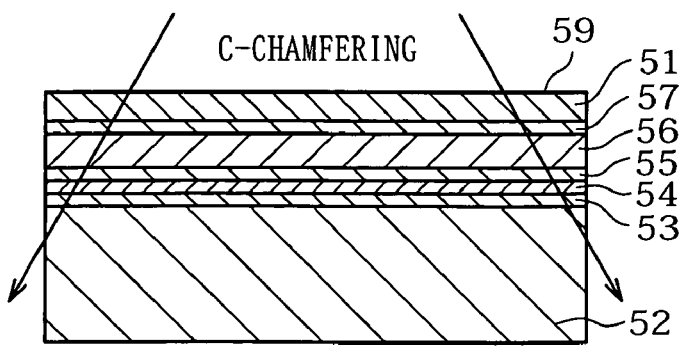

After separating the seed substrate shown in FIG. 42(b), by C chamfering the monocrystalline Si layer (hydrogen ion implantation) 44, thermal oxidation film $SiO_2$ 42 and the peripheral area of support substrate surface, lowering of cost is achieved by improving yield and quality because the etching unevenness, the crack and the breaking of ultra slim SOI layer, etc. is reduced in the peripheral area. It is fine to do light etching with hydrofluoric acid to remove the Si dust and the micro cracks as required.

Meanwhile, the monocrystalline Si substrate of the seed substrate 42 which is separated undergoes heat treatment, etc. under the conditions which include surface re-grinding, etching and hydrogen as required, and it becomes possible to reuse the monocrystalline Si substrate.

(5) Meantime, the surface of the exfoliated hydrogen ion implantation layer (monocrystalline Si layer) 44 and a part of the surface of the monocrystalline Si layer 44 are etched with hydrofluoric acid enchant as required, and furthermore etched with the hydrogen anneal processing. The ultra slim SOI structure of the monocrystalline Si layer 44, for example 1 μm, which has desired thickness and high even characteristics, is formed. The hydrogen annealing process can be done at 1050° C. for 0.0013 nm/min and etching speed at 1100° C. for 0.0022 nm/min.

(6) The monocrystalline Si layer 44 is oxidized with heat and the $SiO_2$ Layer 13a with 100~200 nm thickness is formed. The $SiO_2$ layer 13a of the peripheral circuit area is removed by etching while leaving the $SiO_2$ layer 13a in the display area. The poly Si layer of 14 of 50~100 nm is formed in the display area and the monocrystalline Si layer of 12b of 50~100 nm is formed in the peripheral circuit area with Si epitaxial growth such as CVD (please refer FIG. 33). Each condition at this time corresponds to (A).

At this time, the monocrystalline Si layer 44 is formed as a SiGe layer of the distortion impression semiconductor layer. If the SiGe layer of this distortion impression semiconductor layer is formed in the seed, with the distortion Si layer 12b as the distortion channel layer with Si epitaxial growth such as CVD, the monocrystalline SiTFT peripheral circuit can achieve a substantial improvement of approximately 1.76 times electron mobility in comparison with the monocrystalline Si layer 12b of the former non-distortion channel layer.

In case of controlling the crystal grain size of the poly Si layer 14 in the display area with solid phase deposition method, flash lamp annealing method, laser annealing method or condensing lamp annealing method, etc. as required, the conditions correspond to(A).

Figure 21B:
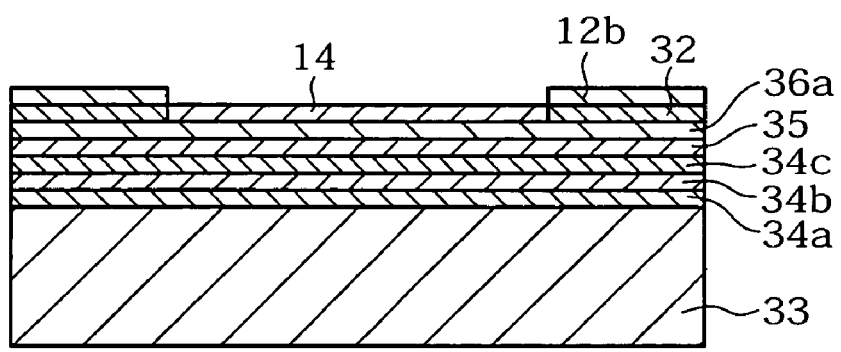

At this time, the display area in the monocrystalline Si layer 44 with film thickness below the liquid crystal gap width is etched, the $SiO_2$ Layer 13a in the insulating layer is exposed, but is left in the monocrystalline Si layer 44 in the peripheral circuit the same as with FIG. 21(b) in (B). The poly Si layer 14 may be formed to 50~100 nm on the insulating layer of the display area with Si epitaxial growth such as CVD and the monocrystalline Si layer 12b may be formed to 50~100 nm on the monocrystalline Si layer 44 on the peripheral circuit area.

At this time, the monocrystalline Si layer 44 as the SiGe layer of the distortion impression semiconductor layer is formed. If the SiGe layer of this distortion impression semiconductor layer and the distortion Si layer 12b as the distortion channel layer with Si epitaxial growth such as CVD are formed, the monocrystalline SiTFT peripheral circuit can be formed which achieves the substantial improvement of approximately 1.76 times the electron mobility in comparison with the monocrystalline Si layer 12b of the former non-distortion channel layer.

And in case of controlling the crystal grain size of the poly Si layer 14 in the display area with solid phase deposition method, flash lamp annealing method, laser annealing method or condensing lamp annealing method, etc. as required, optionally, each conditions corresponds to (A).

Figure 21C:
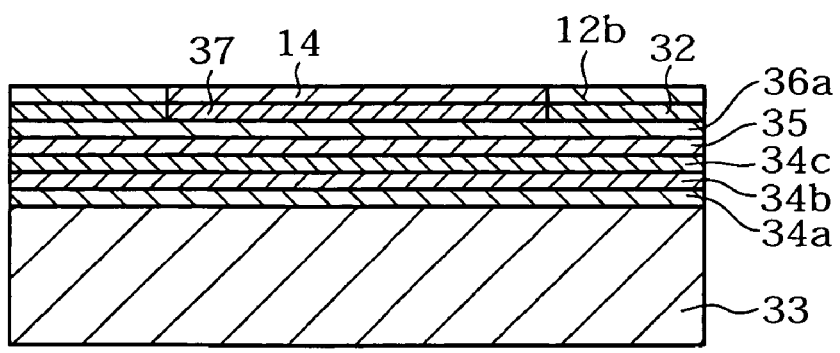

Or, the same as with FIG. 21(c) in (B), the display area of the monocrystalline Si layer 44 with the film thickness which is below the liquid crystal gap width is etched as required and the $SiO_2$ layer 13a in the insulating layer is exposed. The light-shielding metallic film 37 of as transitional metallic silicide such as $WSi_2$ (Tungsten silicide), $TiSi_2$ (Titanium silicide), $MoSi_2$ (Molybdenum silicide), is formed in the poly SiTFT area of the pixel display inside the display area and covered with the insulating layer on top of it. The insulating layer of the surface of the monocrystalline Si layer 444 in the peripheral circuit area is removed.

The poly Si layer 14 is formed with thickness of 50~100 nm on the $SiO_2$ layer 13a in the display area with Si epitaxial growth such as CVD and the monocrystalline Si layer 12b is formed with a thickness of 50~100 nm in the monocrystalline Si layer 44 on the peripheral circuit area. And in the case of controlling the crystal grain size of the poly Si layer 14 in the display area with solid phase deposition method, flash lamp annealing method, laser annealing method or condensing lamp annealing method, etc. as required, the circumstances correspond to (A).

At this time, the monocrystalline Si layer 44 is formed as a SiGe layer of the distortion impression semiconductor layer.

If the SiGe layer of this distortion impression semiconductor layer and the distortion Si layer 12b are formed as distortion channel layer with Si epitaxial growth such as CVD, the monocrystalline SiTFT peripheral circuit can achieve the improvement, approximately 1.76 times the electron mobility in comparison with the monocrystalline Si layer 12b of the former non-distortion channel layer.

Figure 34A:
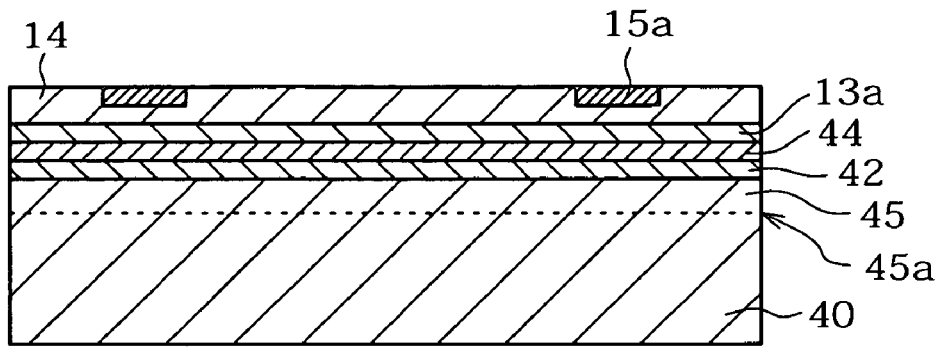
Figure 34B:
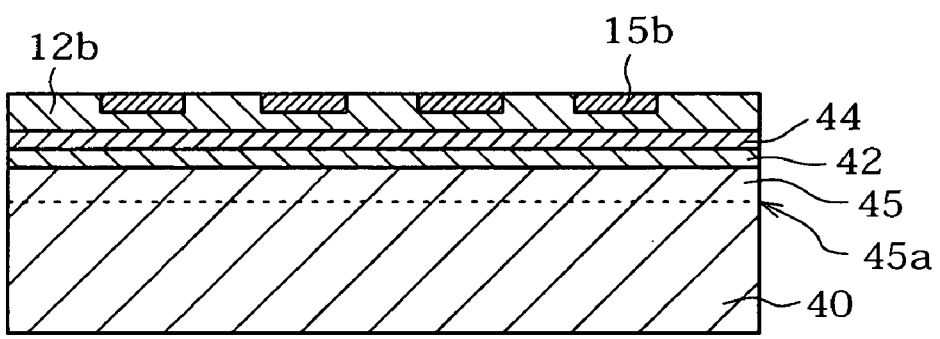

The wiring, etc. is formed in the poly SiTFT area 15a (please refer the FIG. 34(a)) as the display element area of the poly Si layer 14 along with general purpose technology, the diode, resistance, the capacitor, coil and wiring, etc. of either the semiconductor device or the semiconductor for integrated circuits in the monocrystalline SiTFT area 15b (please refer the FIG. 34(a)) as the peripheral circuit area of the monocrystalline Si layer 12b or both. The circumstance corresponds to (A).

In the mean time, because the monocrystalline Si layer 12b has high electron and positive hole mobility the same as the monocrystalline Si substrate, not only the peripheral drive circuit but also the image signal processing circuit, the picture quality compensation circuit, the memory circuit, CPU (Central Processing Unit) circuit, DSP (Digital Signal Processor) circuit, etc. can be used. The circumstance corresponds to (A).

The hydrogen ion implantation layer 45 is formed by filling with high density hydrogen ions to the depth of 3~5 $\mu$m from the surface. The distortion layer 45 (please refer FIG. 34(a) and(b)) is produced by the anneal processing for exfoliation. The hydrogen ion implantation is done at 300 Kev, $5 \times 10^{16} \sim 1 \times 10 \times^{17}$ atoms/$cm^2$. The annealing for exfoliation corresponds to the aforementioned (4).

At this time, the hydrogen ion implantation layer 45 is formed after processing at more than 500° C., to equalize the hydrogen ion implantation layer 45 which has high density inside the monocrystalline Si substrate the same as mentioned above (C), and to prevent the hydrogen ion separation which has high density.

It is desirable to form this either after or before the exfoliation annealing after the hydrogen ion implantation. The electrode and wiring, etc. may become a cause of the hydrogen ion implantation depth dispersion.

However, in the case of the electrode and wiring formation before the exfoliation annealing, the exfoliation annealing with RTA of rapid heating rapid cooling from the back of the support substrate (monocrystalline Si substrate 40) is desirable with cooling for the ultra slim TFT substrate layer side through the UV by the support jig which is liquid cooled.

At this time, although the Si device structure layer of $SiO_2$ layer 13a and the poly Si layer 14, etc. exist on the support substrate 40, the hydrogen ion implantation layer 45 under the insulating layer 42 is formed by penetrating these and distortion layer 45a is generated by heat treatment. The annealing for exfoliation is desirable with RTA of rapid heating rapid cooling, however it is possible to generate the distortion without having adverse effects to the device quality by doing for example the Xe flash lamp annealing method for a very brief time (for example 700° C. for 10 millisecond).

Meantime, it is possible to separate the hydrogen ion implantation layer 45 by laser processing exfoliation or laser water jet processing exfoliation without annealing for exfoliation, as cooling for the ultra slim TFT substrate layer side comes through the UV tape by the support jig which is liquid cooled.

At this stage, it is desirable to form the groove 62 from the monocrystalline Si layer 12b to at least the distortion area 45a of the hydrogen ion implantation layer along with the divided line to divide the assembly into one panel of each ultra slim electrooptic display device unit afterwards, in other words along the divided boundary line inside the scribe line. By forming the groove 62, it is possible to separate easily from the support (Si) substrate 40, at the same time, the process to divide will mentioned later because the ultra slim TFT substrate layer which will be mentioned later is divided beforehand inside the scribe line.

It is better to form the groove 62 at least to the distortion 41a of the hydrogen ion implantation layer with dry etching (plasma etching and opposite spatter etching, etc. with such as $SF_6$, $CF_4$, $Cl+O_2$, $HBr+O_2$, etc.), wet etching (such as hydrofluoric acid etchant, alkaline etchant with mixed liquid $HF+H_2O_2+H_2O$, mixed liquid $HF+HNO_3+CH_3$ COOH, etc.), mechanical processing (cutting groove by blade dicing, the diamond cutter, the cemented carbide cutter, the ultrasonic cutter etc.).

Figure 35:
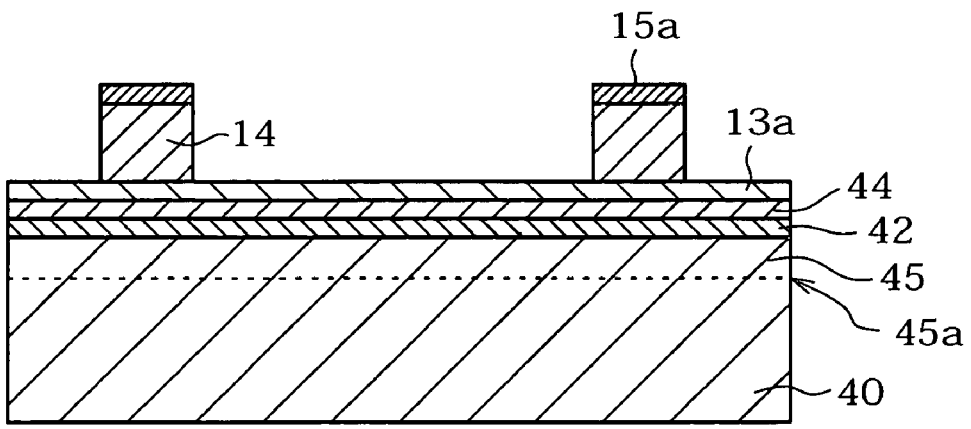

The poly Si layer 14 of the pixel opening section of the display area is removed by etching (please refer FIG. 35). The circumstance corresponds to (A).

The 50~200 nm thick transparent insulating layer (for example $SiO_2$ layer 13b, SiNx and $SiO_2$ laminating film, $SiO_2$, SiNx and $SiO_2$ laminating film, SiON, etc.) and the 100~300 nm low reflection metallic film 17 are each formed, the connection area (drain, source, gate, etc.) of the poly SiTFT area 15a on the poly Si layer 14 and the metallic film 17 on the bottom of the pixel opening section is etched, the transparent resin 16, etc. is filled in, and the surface is planarized with CMP, etc. The circumstance corresponds to (A).

(13) The transparent resin, etc. on the poly SiTFT area 15a drain of the display area is done with the window opening, the ultra slim TFT substrate layer is formed (please refer FIG. 36) by forming the transparent electrode 18a as the pixel electrode such as ITO, IZO, etc. The circumstance corresponds to (A). At the same time, the wiring inside the peripheral circuit of the electrooptic display element substrate layer and the external output electrode (includes solder bump) are formed, but it is desirable to connect with the flexible substrate such as an anisotropism conductive film connection, an ultrasonic connection, a solder bump, etc. and to mount to the PCB after forming the LCD panel.

The following process corresponds to (C).

In the meantime, in case of manufacturing the ultra slim reflective type LCD, the ultra slim semi-transmissive type LCD, the ultra slim underside luminous type organic EL and the ultra slim surface luminous type organic EL; the process (1)~(4) (FIG. 31~FIG. 34) is the same as for the ultra slim transmissive type LCD, the process after that is the same as (A-2), (A-3), (A-4) and (A-5).

In the meantime, it has been explained with this execution figure, regarding the example using the hydrogen ion as an ion which fills to a high density, but it is not limited to this, but any ion which fills can be used. It is possible to use the ions of an inert gas such as nitrogen or helium.

For example as for the hydrogen ion implantation is same as (C), the hydrogen negative ion beam implantation device which makes the plasma includes the hydrogen with the plasma production, which pulled out the hydrogen negative ion beam from this plasma, which fills this hydrogen negative ion to the specified depth, can be used other than the ion implantation device (same as the ion implantation device which fills impurity such as former boron, phosphorus to the Si substrate) which does the mass separation and scanning the hydrogen ion beam.

Like mentioned above, with the separation method for double ion impanation in this execution figure, the $SiO_2$ layer 13a is formed by heat oxidizing the monocrystalline Si layer 44 of the support substrate, the $SiO_2$ layer 13a in the peripheral circuit area is removed while leaving the $SiO_2$ layer 13a in the display area. The poly Si layer 14 in the display area and the monocrystalline Si layer 12b in the peripheral circuit area are each formed with Si epitaxial growth such as CVD.

Because the poly SiTFT part 15a as the display area in the poly Si layer 14 of the display area which has controlled crystal grain size (high electron and positive hole mobility) with such as flash lamp annealing method or solid phase deposition method or laser annealing method or condensing lamp annealing method, etc., as required, either the semiconductor device or the semiconductor for integrated circuits of monocrystalline SiTFT area 15b, etc., as the peripheral circuit in the monocrystalline Si layer 12b of the peripheral circuit area, or both are formed. Because of this process, the poly SiTFT display element which has arbitrarily controlled relatively low high electron and positive hole mobility and low electric current leakage qualities, and the monocrystalline SiTFT peripheral circuit which has high electron and positive hole mobility and high drivability are formed inside the ultra slim TFT substrate layer on the same support substrate 40. With this process, an ultra slim electrooptic display device unit which has high electron and positive hole mobility and low electronic current leakage qualities, and which is high intensity, high definition and sophisticated can be obtained.

Or, with the separation method for another double ion implantation layer in this execution figure, the display area of the monocrystalline Si layer 44 of the support substrate 40 is etched, the insulating layer of $SiO_2$ layer 42 is exposed, the poly Si layer 14 is formed in the display area with Si epitaxial growth such as CVD and the monocrystalline Si layer 12b is formed in the peripheral circuit area. Because the poly SiTFT part 15a as the display area in the poly Si layer 14 of the display area where arbitrarily controlled crystal grain size (high electron and positive hole mobility) with such as flash lamp annealing method or solid phase deposition method or laser annealing method or condensing lamp annealing method, etc., as required, either the semiconductor device or the semiconductor for integrated circuits of monocrystalline SiTFT area 15b, etc., is formed as the peripheral circuit in the monocrystalline Si layer 12b, or both. As a result of this process, the poly SiTFT display element which has arbitrarily controlled relatively low high electron and positive hole mobility and low electric current leakage qualities, and the monocrystalline SiTFT peripheral circuit which has high electron and positive hole mobility and high drivability, are formed inside the ultra slim TFT substrate layer on the same support substrate 40. With this process, an ultra slim electrooptic display device unit which has high electron and positive hole mobility and low electronic current leakage qualities, and which is high intensity, high definition and sophisticated can be obtained.

Or, with the separation method for another double ion implantation layer in this execution figure, the display area of the monocrystalline Si layer 44 of the support substrate 40 is etched, the insulating layer of $SiO_2$ layer 42 is exposed, the light shielding metallic layer is etched with CVD in the poly SiTFT forming area of the $SiO_2$ layer 42 of the display area, the insulating layer is formed on top of this, the poly Si layer 14 is formed through the insulating layer in the display area with Si epitaxial growth such as CVD and the monocrystalline Si layer 12b is formed in the peripheral circuit area. Because the poly SiTFT part 15a as the display element part in the poly Si layer 14 of the display area where arbitrarily controlled crystal grain size (high electron and positive hole mobility) with such as flash lamp annealing method or solid phase deposition method or laser annealing method or condensing lamp annealing method, etc., as required, either the semiconductor device or the semiconductor for integrated circuits of monocrystalline SiTFT area 15b, etc., is formed as the peripheral circuit in the monocrystalline Si layer 12b, or both. As a result of this process, the reflection of light of the is blocked by the light shielding metallic layer, the poly SiTFT display element which has arbitrarily controlled relatively low high electron and positive hole mobility and low electric current leakage qualities, and the monocrystalline SiTFT peripheral circuit which has high electron and positive hole mobility and high drivability are formed inside the ultra slim TFT substrate layer on the same support substrate 40. With this process, an ultra slim electrooptic display device unit which has high electron and positive hole mobility and low electronic current leakage qualities, and which is high intensity, high definition and sophisticated can be obtained.

The poly Si layer 14 in the display area mentioned above contains a proper quantity (for example, a total of $10^{17}$~$10^{22}$ Atom/cc, preferably $10^{18}$~$10^{20}$ Atom/cc) in the formation film of a minimum of one kind of group IV elements of Ge, Sn, Pb, etc. by ion implantation or ion doping or CVD, etc. And by maintaining this condition, if we have a poly SiTFT display element of the poly Si film which has re-crystallized the crystal grain size with solid phase deposition method, flash lamp annealing method, pulse condition or Continuous wave laser annealing method, condensing lamp annealing method, etc., for example the irregularity which exists in the crystal grain boundary of the poly Si film is decreased, and the film stress is decreased and it is easy to obtain the display part of the poly SiTFT with high carrier mobility and high quality.

And the poly SiTFT display element, which has relatively low high electron and positive hole mobility and low electric current leakage qualities, and the monocrystalline SiTFT peripheral circuit, which has high electron and positive hole mobility and high drivability, are both formed inside the ultra slim TFT substrate layer on the same support substrate 40. A high intensity, high definition and sophisticated ultra slim electrooptic display device unit which has high electron and positive hole mobility and low electric current leakage qualities can be obtained.

Or, with the separation method for even another double ion impanation layer in this execution layer, the monocrystalline Si layer 44 of the support substrate 40 is oxidized with heat and the $SiO_2$ layer 13$a$ is formed. The amorphous Si layer or the amorphous and the poly mixture Si layer or the poly Si layer are formed with plasma CVD, heat CVD, sputtering, evaporation, etc. The amorphous Si layer in the peripheral circuit area or the amorphous and the poly mixture Si layer or the poly Si layer and $SiO_2$ layer 13$a$ are etched and the monocrystalline Si film 12$b$ is exposed. The amorphous SiTFT or the amorphous and the poly mixture SiTFT or the poly SiTFT area 15$a$ is formed as the display element in the amorphous Si layer or the amorphous and the poly mixture Si layer or the poly Si layer 14 of the display area, and either the semiconductor element of the monocrystalline SiTFT part 15$b$, etc. is formed in the peripheral circuit area in the monocrystalline Si layer 12$b$ of the peripheral circuit area or the semiconductor integrating circuit, or the both. Because of this process, the amorphous SiTFT or the amorphous Si and the poly mixture SiTFT or the poly SiTFT display element which has arbitrarily controlled relatively low high electron and positive hole mobility and low electric current leakage qualities, and the monocrystalline SiTFT peripheral circuit which has high electron and positive hole mobility and high drivability are formed inside the ultra slim TFT substrate layer on the same support substrate 40. With this process, an ultra slim electrooptic display device unit which has high electron and positive hole mobility and low electronic current leakage qualities, and which is high intensity, high definition and sophisticated can be obtained.

Or, with the separation method for even another double ion impanation layer in this execution layer, the display area of the monocrystalline Si layer 44 of the support substrate 40 is etched and the insulating layer of the $SiO_2$ layer 42 is exposed. The $SiO_2$ layer 13$a$ and the amorphous Si layer 14 of the insulating layer are formed with plasma CVD, heat CVD, sputtering, evaporation, etc. The amorphous SiTFT or the amorphous Si and the poly mixture SiTFT or the poly SiTFT area 15$a$ as the display element in the display area and the poly mixture Si layer or the poly Si layer 14 of the display, and either the semiconductor element of the monocrystalline SiTFT part 15$b$, etc. as the peripheral circuit area in the monocrystalline Si layer 12$b$ which the amorphous Si layer or the amorphous Si and the poly mixture Si layer or the poly Si layer 14 and the $SiO_2$ layer 13$a$ of the insulating layer is etched or the semiconductor integrating circuit, or both are each formed. Because of this process, the amorphous SiTFT or the amorphous Si and the poly mixture SiTFT or the poly SiTFT display element which has arbitrarily controlled relatively low high electron and positive hole mobility and low electric current leakage qualities, and the monocrystalline SiTFT peripheral circuit which has high electron and positive hole mobility and high drivability are formed inside the ultra slim TFT substrate layer on same support substrate 40. With this process, an ultra slim electrooptic display device unit which has high electron and positive hole mobility and low electronic current leakage qualities, and which is high intensity, high definition and sophisticated can be obtained.

Or, with the separation method for even another double ion impanation layer in this execution layer, the display area of the monocrystalline Si layer 44 of the support substrate 40 is etched and the insulating layer of the $SiO_2$ layer 42 is exposed. The light shielding metallic layer 37 is formed by etching such as CVD in the display element formation area of the $SiO_2$ layer 42 of the display area. The $SiO_2$ layer 13$a$ and the amorphous Si layer 14 of the insulating layer are formed with plasma CVD, heat CVD, sputtering, evaporation, etc. The amorphous SiTFT or the amorphous Si and the poly mixture SiTFT or the poly SiTFT area 15$a$ as the display element in the display area and the poly mixture Si layer or the poly Si layer 14 of the display, and either the semiconductor element of the monocrystalline SiTFT part 15$b$, etc. is formed as the peripheral circuit area in the monocrystalline Si layer 12$b$ which is the amorphous Si layer or the amorphous Si and the poly mixture Si layer or the poly Si layer 14 and the $SiO_2$ layer 13$a$ of the insulating layer are etched or the semiconductor integrating circuit, or both. Because of this process, the reflected light form the back side is blocked with light shielding metallic layer 37, the amorphous SiTFT or the amorphous Si and the poly mixture SiTFT or the poly SiTFT display element which has arbitrarily controlled relatively low high electron and positive hole mobility and low electric current leakage qualities, and the monocrystalline SiTFT peripheral circuit which has high electron and positive hole mobility and high drivability are formed inside the ultra slim TFT substrate layer on the same support substrate 40. With this process, an ultra slim electrooptic display device unit which has high electron and positive hole mobility and low electronic current leakage qualities, and which is high intensity, high definition and sophisticated can be obtained.

The amorphous Si layer or the amorphous and the poly mixture Si layer or the poly Si layer 14 in the display area mentioned above contains the proper quantity (for example, a total of $10^{17} \sim 10^{22}$ Atom/cc, preferably $10^{18} \sim 10^{20}$ Atom/cc) in the formation film of a minimum of one kind of group IV elements of Ge, Sn, Pb, etc. with ion implantation or ion doping or CVD, etc as required. And maintaining this condition, if we have the poly SiTFT display element of the poly Si film on which the crystal grain size is re-crystallized the with solid phase deposition method, flash lamp annealing method, pulse condition or Continuous wave laser annealing method, condensing lamp annealing method, etc., for example, the irregularity which exists in the crystal grain boundary of the poly Si film is decreased, the film stress is decreased, and it is easy to obtain the display part of the poly SiTFT with high carrier mobility and high quality.

And the poly SiTFT display element which has relatively low high electron and positive hole mobility and low electric current leakage qualities and the monocrystalline SiTFT peripheral circuit which has high electron and positive hole mobility and high drivability are formed inside the ultra slim TFT substrate layer on the same support substrate 40. a high intensity, high definition and sophisticated ultra slim electrooptic display device unit which has high electron and positive hole mobility and low electric current leakage qualities can be obtained.

By the way, with the separation method for the double ion implantation layer in this execution figure mentioned above, the SiGe layer 44 with a Ge density of 20~30% as the distortion impression semiconductor layer is formed through the insulating layer 42 on the support substrate 40, the $SiO_2$ layer 13a is formed by heat oxidizing, the $SiO_2$ layer 13a in the peripheral circuit area is removed while leaving the $SiO_2$ layer 13a in the display area, the poly Si layer 14 in the display area may be formed with Si epitaxial growth such as CVD, the SiGe layer 44 of the distortion impression semiconductor layer may be formed in the peripheral circuit area and the distortion Si layer 12b as the distortion channel layer in the seed.

And, the SiGe layer 44 with a Ge density of 20~30% as the distortion impression semiconductor layer is formed through the insulating layer 42 on the support substrate 40, the SiGe layer 44 in the display area is etched and the $SiO_2$ layer 42 of the insulating layer is exposed, the poly Si layer 14 in the display area may be formed with Si epitaxial growth such as CVD, the SiGe layer 44 of the distortion impression semiconductor layer may be formed in the peripheral circuit area and the distortion Si layer 12b as the distortion channel layer in the seed.

And, the SiGe layer 44 with a Ge density of 20~30% as the distortion impression semiconductor layer is formed through the insulating layer 42 on the support substrate 40, the SiGe layer 44 in the display area is etched and the $SiO_2$ layer 42 of the insulating layer is exposed, the SiGe layer 44 in the display area is etched and the $SiO_2$ layer 42 in the insulating layer is exposed, the poly Si layer 14 in the display area may be formed with Si epitaxial growth such as CVD, the SiGe layer 44 of the distortion impression semiconductor layer may be formed in the peripheral circuit area and the distortion Si layer 12b as the distortion channel layer in the seed.

With this process, the monocrystalline SiTFT peripheral circuit which achieves the substantial improvement of electron mobility of approximately 1.76 times in comparison with the monocrystalline Si layer of former non distortion channel layer, and which has high drivability is achieved, and the ultra slim electrooptic display device unit which is high performance, high resolution, high function and high quality can be obtained.

Figure 38:
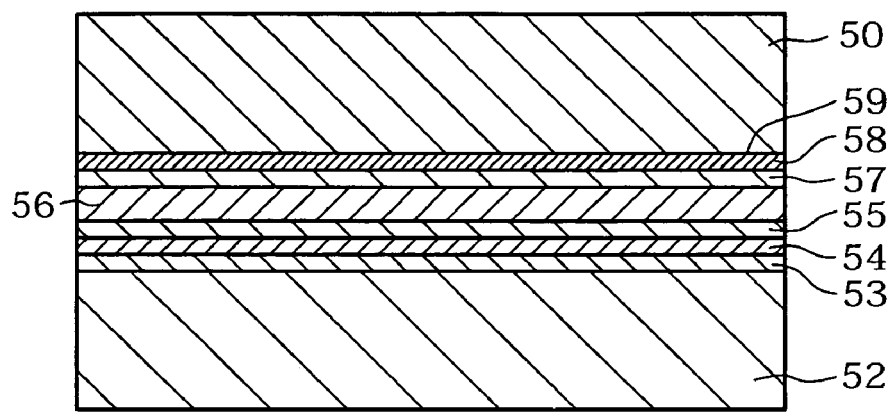
Figure 39:
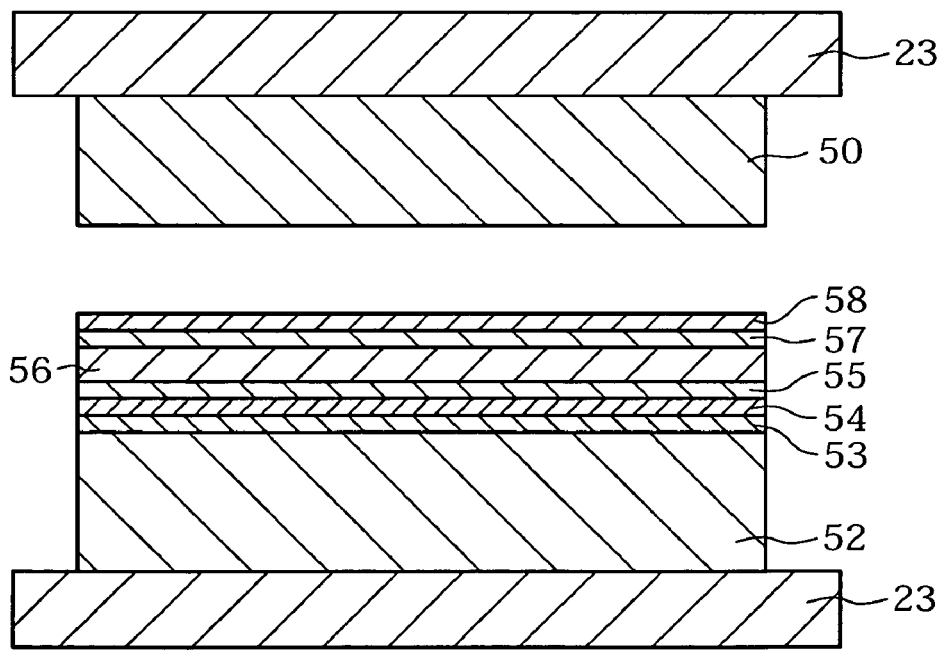

(E) The Separation Method for the Porous Semiconductor Layer and the Ion Implantation Layer Regarding this execution figure, I will explain about the manufacturing method of the ultra slim liquid crystal display device unit by the separation method for the porous semiconductor layer and the ion implantation layer (the semiconductor seed substrate is separated from the ion implantation layer which formed on the semiconductor seed substrate and the semiconductor support substrate is separated from the porous semiconductor layer which formed on the semiconductor support substrate) which combined the porous semiconductor layer and the ion implantation layer. From FIG. 37 to FIG. 39 are the manufacturing process figures for an ultra slim LCD with the separation method for the porous Si layer and the hydrogen ion implantation in the execution figure of this invention.

Figure 37:
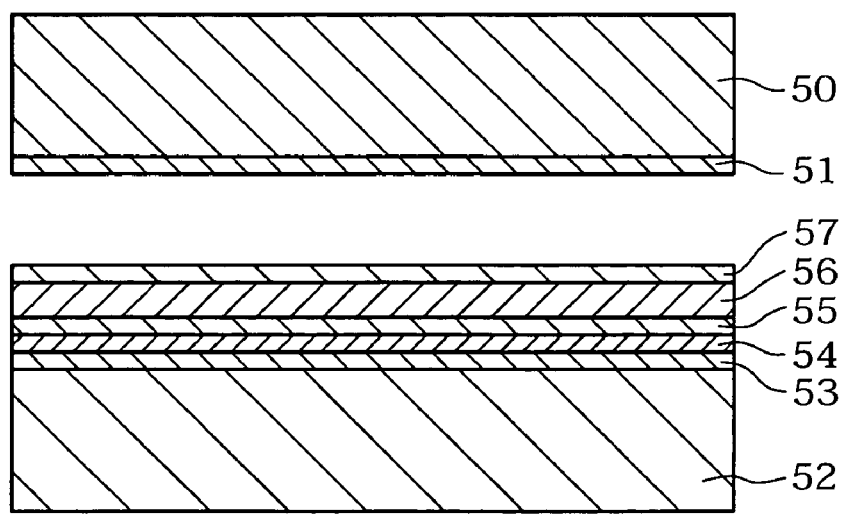

(1) The hydrogen ion implantation layer 51 is formed by filling the high density hydrogen ion to the seed substrate 50, for example 12 inch Φ . . . with 1.2 mm thickness, which consists of the monocrystalline Si (please refer FIG. 37). In the mean time, the hydrogen ion can be filled with the dose quantity of approximately 100 Kev, $5 \times 10^{16} \sim \times 10^{17}$ atoms/$cm^2$ and approximately 1 μm depth (please refer the FIG. 31).

At this time, the same as with (D), the SiGe layer 51 with a Ge density of 20~30% as the distortion impression semiconductor layer is formed by the Si epitaxial growth such as CVD on the surface of the monocrystalline Si substrate 50 to become a distortion impression semiconductor layer for the exfoliated hydrogen ion implantation layer 51. The SiGe layer 51 may be formed with Si epitaxial growth after the separation of the seed substrate, in the seed and the distortion Si layer of the distortion channel.

The aforementioned hydrogen ion is filled with high density beforehand to become this thickness (depth), and may make a hydrogen ion implantation layer (SiGe layer) 51.

At this time, the Ge density of the surface of the SiGe layer 58 which is a distortion impression semiconductor layer is set to become desired density by making the gradient structure where Ge density becomes desired density at distortion layer of the hydrogen ion implantation layer in the SiGe layer after separation of the seed substrate, it is desirable to form the SiGe layer 58 which is a distortion impression semiconductor layer of this gradient structure to the seed substrate and the distortion Si layer as a distortion channel layer with the Si epitaxial growth.

In other words, it is desirable to have the surface density of the SiGe layer 51 of the distortion impression semiconductor layer be at 20~30% Ge density for example by increasing the Ge density gradually, after gradient structure from the part connects to the insulating layer 57.

Or, it is fine for the monocrystalline Si substrate 50 itself to be the monocrystalline substrate which consists of SiGe of a Ge density of 20~30%.

(2) The low porous Si layer 53, the high porous Si layer 54 and the low porous Si layer 55 are formed on the support substrate 52 which is for example 12 inch Φ . . . and 1.2 mm thickness and which consists of the monocrystalline Si with the anode transformation method, the monocrystalline Si layer 56 is formed by semiconductor epitaxial growth, the insulating layer which consists of $SiO_2$ layer or $SiO_2$, $Si_3N_4$ and $SiO_2$ lamination film is formed (please refer FIG. 37). The formation method corresponds to (A).

(2) Attach the Seed Substrate 50 and the Support Substrate 52 (please refer FIG. 38).

Both of the surfaces of the hydrogen ion implantation 51 of the seed substrate 50 and the insulating layer 57 of the support substrate 52 are joined at room temperature, and made them to connect with Van Del Waals power. After this process, heat treatment for 30 minutes with 400° C. for covalent bonding makes the attachment stronger. It is necessary to set the heat processing at this time with a processing temperature and a processing time below the hydrogen ion separation temperature. The heat processing is same process explained as (B) except for the processing temperature and the processing time.

Or, prior to this the, connecting surface is irradiated with an inert gas ion beam or an inert gas high-speed atomic beam such as argon in the vacuum at room temperature. The dust and soiling adhesion, etc. on the surface is removed by sputter etching. By increasing the binding power in order to connect to the surface and raising the optimal roughness can make the bonding stronger.

(3) High density hydrogen which is filled by anneal processing for exfoliation is expanded by heat and the distortion is made to occur in the hydrogen ion implantation layer 51 by pressure action and crystal re-arrangement action inside the micro bubbles, the UV tape 23 is attached on both the seed substrate 50 and the support substrate 52, then pulled to exfoliate them (please refer FIG. 39).

Although the annealing for exfoliation process corresponds to (C), it is important to adjust the porosity rate and the thickness of the porous Si layer 54 so as to not exfoliate from the high porous Si layer 54, at this time.

Furthermore, it is possible to ease the porosity rate and thickness conditions of the high porous Si layer 54 which is formed on the support substrate, by injecting and exfoliating the high pressure fluid jet to the hydrogen ion implantation layer 51 which is repeated as required, or by exfoliating with laser processing or laser water jet processing the hydrogen ion implantation layer 51 which does not anneal for exfoliation.

The peripheral area of the surface of the monocrystalline Si layer (hydrogen ion implantation layer), the insulating layer 57, the monocrystalline Si layer 56, the low porous Si layer 55, the high porous Si layer 54, the low porous Si layer 53 and the support substrate 52 are C-chamfered. This prevents etching unevenness, cracking and breaking of the ultra slim SOI layer of the peripheral area, and a cost decrease is achieved by improving the yield and quality. The light etching may be done by the hydrofluoric acid etchant to remove the Si dust and micro cracks as required.

The high density hydrogen, which is filled with ions by local heating of the laser processing exfoliation method, is expanded by heat as the facing substrate side 21 is cooled through the UV tape and the support jig which is liquid cooled as required. The support substrate (monocrystalline Si substrate) 52 is separated by creating the distortion layer 51 in the hydrogen ion implantation layer 51 by pressure action of the micro bubbles and crystal re-arrangement action.

In the meantime, the support jig which is cooled with liquid is not always necessary because of the cooling action of the water that is irradiated with the laser for the exfoliation method of laser water jet processing.

(5) A part of the surface of the monocrystalline Si layer 58 which is exfoliated by the hydrofluoric acid etchant as required, furthermore it is etched with etchant by the hydrogen annealing process and the monocrystalline Si layer 58 is formed with desired thickness and even characteristics, for example 1 $\mu$m.

The etching speed of the hydrogen annealing is done with 1050° C. for 0.0013 nm/min, 1100° C. for 0.0022 nm/min.

The process listed hereafter this corresponds to (B).

The $SiO_2$ layer 13a is formed by heat oxidizing the monocrystalline Si layer 58, and the $SiO_2$ layer 13a of the peripheral circuit area is removed by etching while leaving the $SiO_2$ layer 13a of the display area. The poly Si layer 14 is formed with 50~100 nm in the display area with Si epitaxial growth of the CVD method and the monocrystalline Si layer 12b is formed with 50~100 nm in the peripheral circuit area.

At this time, in the case of forming the SiGe layer 51 with the a Ge density of 20~30% by the Si epitaxial growth such as CVD on the surface of the monocrystalline Si substrate 50 to become the distortion impression semiconductor layer for the hydrogen ion implantation layer (monocrystalline Si layer) 58 which is exfoliated as mentioned in (D), the SiGe layer 58 as the distortion impression semiconductor layer in the seed and the distortion Si layer 12b with Si epitaxial growth may be completed with a laminated layer.

With this process, because the peripheral circuit of MOSTFT achieves the substantial improvement of electron mobility of approximately 1.76 times in comparison with the monocrystalline Si layer of former non distortion channel layer, and which has high drivability is achieved, and the ultra slim electrooptic display device unit which is high performance, high resolution, high function and high quality can be obtained.

And in case of arbitrarily controlling the crystal grain size (high electron and positive hole mobility) of the poly Si layer 14 in the display area with solid phase deposition method, flash lamp annealing method, laser annealing method or condensing lamp annealing method, etc., each circumstance corresponds to (A).

Or, the display area of the monocrystalline Si layer 58 whose film thickness is below the liquid crystal gap width is etched, and the insulating layer is exposed. The poly Si layer with 50~100 nm may be formed on the insulating layer of the display area with semiconductor epitaxial growth of CVD method and the monocrystalline Si layer 12b may be formed in the monocrystalline Si layer 58 with 50~100 nm on the peripheral circuit area while leaving the monocrystalline Si layer 58 in the peripheral circuit area.

And in case of arbitrarily controlling the crystal grain size (high electron and positive hole mobility) of the poly Si layer 14 in the display area with flash lamp annealing method, solid phase deposition method, laser annealing method or condensing lamp annealing method, etc., each circumstance corresponds to (A).

Or, the light-shielding metallic film 37 is formed under the TFT area of the poly Si layer 14 in the display area as required, and in case of arbitrarily controlling the crystal grain size (high electron and positive hole mobility) of the poly Si layer 14 in the display area with flash lamp annealing method, solid phase deposition method, laser annealing method or condensing lamp annealing method, etc., each circumstance corresponds to (A).

At this time, the display area of the monocrystalline Si layer 58 whose film thickness is below the liquid crystal gap width is etched and the insulating layer 57 is exposed. The light shielding metallic layer 37 such as transitional metallic silicide such as $WSi_2$ (Tungsten silicide), $TiSi_2$(Titanium silicide), $MoSi_2$(Molybdenum silicide) etc., is formed on top of it in the poly SiTFT area for pixel display inside the display area and it is covered with the insulating layer. The insulating layer of the surface of the monocrystalline Si layer 58 in the peripheral circuit area is removed.

The poly Si layer 14 which is 50~100 nm thickness may be formed on the insulating layer of the display area with semiconductor epitaxial growth of the CVD method and the monocrystalline Si layer 12b which is 50~100 nm thickness may be formed in the monocrystalline Si layer 58 on the peripheral circuit area.

Furthermore, although the external output electrode such as the solder bump which connects the peripheral circuit in the ultra slim TFT substrate layer is formed, it is desirable to connect the flexible substrate with such as an anisotropic electric conduction film connection, ultrasonic connecting, solder attachment, etc. and to mount to the PCB after forming the LCD panel.

In this way, the poly Si layer or the amorphous Si layer of the pixel opening section in the display area of the ultra slim TFT substrate layer on this support substrate is removed and filled with a optically transparent material and the surface planarized, the pixel electrode which connects to the pixel display element is formed on top of it. After laminating and sealing the ultra slim TFT substrate layer (ultra slim SOI layer) and the facing substrate on the support substrate, the support substrate is separated form the porous Si layer. The porous Si layer, etc. which is left after the exfoliation is etched as required, the optically transparent material of the surface which is separated is exposed and attached to the transparent support substrate with transparent sealant. With this process, an ultra slim transmissive type LCD which has high electron and positive hole mobility and low electric current leakage qualities, and which is high intensity, high definition and sophisticated can be obtained.

In the meantime, in case of manufacturing the ultra slim reflective type LCD, the ultra slim semi-transmissive type LCD, the ultra slim underside luminous type organic EL and the ultra slim surface luminous type organic EL, the process concerning (1)~(4) (FIG. 37~FIG. 39) is the same as the ultra slim transmissive type LCD, the process from that point is the same as (A-2), (A-3), (A-4) and (A-5).

In the meantime, this execution figure has explanation which shows an example which uses the hydrogen ion as the ion which is filled to high density, but the ion which is used to fill is not limited to hydrogen. It is possible to use ions from inert gases such as nitrogen and helium.

For example as for hydrogen ion implantation is same as (C), the hydrogen negative ion beam implantation device which makes the plasma includes the hydrogen with the expedient plasma production, which pulls out the negative hydrogen ion beam from this plasma, which fills this hydrogen negative ion to the specified depth, can be used other than the ion implantation device (the same as the ion implantation device which fills impurity such as former boron, phosphorus to the Si substrate) which does the mass separation and scanning of the hydrogen ion beam.

In other words, with the separation method for the porous Si layer and the hydrogen ion implantation layer in this execution figure, the $SiO_2$ layer is formed by heat oxidizing the monocrystalline Si layer 58 on the support substrate 52 after its separation, the $SiO_2$ layer in the peripheral circuit area is removed while leaving the $SiO_2$ layer in the display area. The poly Si layer 14 in the display area and the monocrystalline Si layer 12b in the peripheral circuit area are each formed with Si epitaxial growth such as CVD.

Because the display area of the poly SiTFT part 14 in the display area where the crystal grain size (high electron and positive hole mobility) is arbitrarily controlled and the peripheral circuit area of the monocrystalline Si layer 12b in the peripheral circuit area are each formed with a method such as flash lamp annealing method or solid phase deposition method or laser annealing method or condensing lamp annealing method, etc., as required, the poly SiTFT display element which has relatively low high electron and positive hole mobility which is arbitrarily controlled, and which has low electric current leakage qualities, and the monocrystalline SiTFT peripheral circuit which has high electron and positive hole mobility and high drivability are formed inside the ultra slim TFT substrate layer of the ultra slim SOI layer on the same support substrate 52. With this process, an ultra slim electrooptic display device unit which has high electron and positive hole mobility and low electronic current leakage qualities, and which is high intensity, high definition and sophisticated can be obtained.

Or, with the separation method for another porous Si layer and hydrogen ion impanation in this execution figure, the display area of the monocrystalline Si layer 58 of the support substrate 52 after is etched its separation and the insulating layer 57 is exposed while leaving the peripheral circuit area. The poly Si layer 14 in the display area and the monocrystalline Si layer 12b in the peripheral circuit area are each formed with Si epitaxial growth such as CVD.

Because the display area in the poly SiTFT part 14 of the display area where the crystal grain size (high electron and positive hole mobility) is arbitrarily controlled and the peripheral circuit area of the monocrystalline Si layer 12b in the peripheral circuit area are each formed with a method such as flash lamp annealing method or solid phase deposition method or laser annealing method or condensing lamp annealing method, etc., as required, the poly SiTFT display element which has relatively low high electron and positive hole mobility which is arbitrarily controlled, and which has low electric current leakage qualities, and the monocrystalline SiTFT peripheral circuit which has high electron and positive hole mobility and high drivability are formed inside the ultra slim TFT substrate layer of the ultra slim SOI layer on the same support substrate 52. With this process, an ultra slim electrooptic display device unit which has high electron and positive hole mobility and low electronic current leakage qualities, and which is high intensity, high definition and sophisticated can be obtained.

Or, with the separation method for yet another porous Si layer and the hydrogen ion implantation in this execution figure, the display area of the monocrystalline Si layer 58 of the support substrate 52 is etched after its separation and the insulating layer 57 is exposed. The light shielding metallic layer 37 such as transitional metallic silicide in the poly SiTFT area for the pixel display inside the display area is formed and the top of it is covered with the insulating. Then, the insulating layer of the surface of the monocrystalline Si layer 58 in the peripheral circuit area is removed. The poly Si layer 14 on the insulating layer in the display area and the monocrystalline Si layer 12b in the peripheral circuit area are each formed with Si epitaxial growth such as CVD. Because the display area in the poly SiTFT part 14 of the display area where the crystal grain size (high electron and positive hole mobility) is arbitrarily controlled and the peripheral circuit area of the monocrystalline Si layer 12b in the peripheral circuit area are each formed with a method such as flash lamp annealing method or solid phase deposition method or laser annealing method or condensing lamp annealing method, etc., as required, the poly SiTFT display element which has relatively low high electron and positive hole mobility which is arbitrarily controlled, and which has low electric current leakage qualities, and the monocrystalline SiTFT peripheral circuit which has high electron and positive hole mobility and high drivability are formed inside the ultra slim TFT substrate layer of the ultra slim SOI layer on the same support substrate 52. With this process, an ultra slim electrooptic display device unit which has high electron and positive hole mobility and low electronic current leakage qualities, and which is high intensity, high definition and sophisticated can be obtained.

And, with the separation method for the porous Si layer and the hydrogen ion implantation layer in this execution figure, the monocrystalline Si layer 58 on the support substrate after its separation is formed on the $SiO_2$ layer with heat oxidizing, for example, the amorphous Si layer or the amorphous and the poly mixture Si layer or the poly Si layer 14 are formed extensively with plasma CVD, heat CVD, sputtering, evaporation, etc. The amorphous Si layer or the amorphous and the poly mixture Si layer or the poly Si layer 14 and the $SiO_2$ layer in the peripheral area are etched and the monocrystalline Si layer 58 is exposed. Because the amorphous SiTFT or the amorphous and the poly mixture SiTFT or the poly SiTFT area is formed as the display element part in the amorphous Si layer or the amorphous and the poly mixture Si layer or the poly Si layer 14 of the display area, either the semiconductor device or the semiconductor for integrated circuits of monocrystalline SiTFT area, etc., is formed as the peripheral circuit in the monocrystalline Si layer 58 of the peripheral circuit area, or both. Because of this process, the amorphous SiTFT or the amorphous and the poly mixture SiTFT or the poly SiTFT display element which has arbitrarily controlled relatively low high electron and positive hole mobility and low electric current leakage qualities, and the monocrystalline SiTFT peripheral circuit which has high electron and positive hole mobility and high drivability are formed inside the ultra slim TFT substrate layer of the ultra slim SOI layer on the same support substrate. With this process, an ultra slim electrooptic display device unit which has high electron and positive hole mobility and low electronic current leakage qualities, and which is high intensity, high definition and sophisticated can be obtained.

Or, with the separation method for another porous Si layer and the hydrogen ion implantation layer in this execution figure, the display area of the monocrystalline Si layer 58 of the support substrate is etched after its separation and the insulating layer is exposed. The insulating layer of the $SiO_2$ layer and the amorphous Si layer or the amorphous and the poly mixture Si layer or the poly Si layer 14 are formed extensively with plasma CVD, heat CVD, sputtering, evaporation, etc. The amorphous Si layer or the amorphous and the poly mixture Si layer or the poly Si layer 14 and the $SiO_2$ layer in the peripheral area are etched and the monocrystalline Si layer 58 is exposed. Because the amorphous SiTFT or the amorphous and the poly mixture SiTFT or the poly SiTFT area as the display element part is formed in the amorphous Si layer or the amorphous and the poly mixture Si layer or the poly Si layer 14 of the display area, either the semiconductor device or the semiconductor for integrated circuits of monocrystalline SiTFT area, etc., is formed as the peripheral circuit in the monocrystalline Si layer 58 of the peripheral circuit area, or both. Because of this process, the amorphous SiTFT or the amorphous and the poly mixture SiTFT or the poly SiTFT display element which has arbitrarily controlled relatively low high electron and positive hole mobility and low electric current leakage qualities, and the monocrystalline SiTFT peripheral circuit which has high electron and positive hole mobility and high drivability are formed inside the ultra slim TFT substrate layer of the ultra slim SOI layer on the same support substrate. With this process, an ultra slim electrooptic display device unit which has high electron and positive hole mobility and low electronic current leakage qualities, and which is high intensity, high definition and sophisticated can be obtained.

Or, with the separation method for yet another porous Si layer and the hydrogen ion implantation layer in this execution figure, the display area of the monocrystalline Si layer 58 of the support substrate is etched after its separation and the insulating layer 57 is exposed. The light shielding metallic layer is formed by etching and CVD in the pixel display element formation area on the insulating layer of the display area. The insulating layer of the $SiO_2$ layer and the amorphous Si layer or the amorphous and the poly mixture Si layer or the poly Si layer 14 are formed extensively with plasma CVD, heat CVD, sputtering, evaporation, etc. The amorphous Si layer or the amorphous and the poly mixture Si layer or the poly Si layer 14 and the $SiO_2$ layer in the peripheral area are etched and the monocrystalline Si layer 58 is exposed. Because the amorphous SiTFT or the amorphous and the poly mixture SiTFT or the poly SiTFT area is formed as the display element area in the amorphous Si layer or the amorphous and the poly mixture Si layer or the poly Si layer 14 of the display area either the semiconductor element or the semiconductor for integrated circuits of monocrystalline SiTFT area, etc., is formed as the peripheral circuit in the monocrystalline Si layer 58 of the peripheral circuit area, or both are. Because of this process, the amorphous SiTFT or the amorphous and the poly mixture SiTFT or the poly SiTFT display element whose reflected light on the back is blocked by the metallic layer for shielding, which has arbitrarily controlled relatively low high electron and positive hole mobility and low electric current leakage qualities, and the monocrystalline SiTFT peripheral circuit which has high electron and positive hole mobility and high drivability are formed inside the ultra slim TFT substrate layer of the ultra slim SOI layer on the same support substrate. With this process, an ultra slim electrooptic display device unit which has high electron and positive hole mobility and low electronic current leakage qualities, and which is high intensity, high definition and sophisticated can be obtained.

The amorphous Si layer or the amorphous and the poly mixture Si layer or the poly Si layer 14 mentioned above contains the proper quantity (for example, a total of $10^{17}$~$10^{22}$ atom/cc, preferably $10^{18}$~$10^{20}$ atom/cc) in the formation film of a minimum of one kind of group IV elements of Ge, Sn, Pb, etc. as required, with ion implantation or ion doping or CVD, etc. After this, if we have the poly SiTFT display element of the poly Si film which is re-crystallized selectively for crystal grain size with solid phase deposition method, flash lamp annealing method, pulse condition or Continuous wave laser annealing method, condensing lamp annealing method, etc., for example, the irregularity which exists in the crystal grain boundary of the poly Si film is decreased, and the film stress is decreased, it is easy to obtain the display area of the poly SiTFT with high carrier mobility and high quality.

And the poly SiTFT display element which has relatively low high electron and positive hole mobility and low electric current leakage qualities and the monocrystalline SiTFT peripheral circuit which has high electron and positive hole mobility and high drivability are formed inside the ultra slim TFT substrate layer on the same support substrate 40. A high intensity, high definition and sophisticated ultra slim electrooptic display device unit which has high electron and positive hole mobility and low electric current leakage qualities can be easy to obtain.

By the way, with the separation method for the porous layer and the ion implantation layer in this execution figure mentioned above, the SiGe layer 51 (hydrogen ion implantation layer) with a Ge density of 20~30% as the distortion impression semiconductor layer on the surface of the seed substrate 50 is formed on the support substrate 40, the $SiO_2$ layer 13*a* is formed by heat oxidizing the monocrystalline Si layer 58 (distortion impression semiconductor layer of the SiGe layer) on the support substrate after the seed substrate separation, the $SiO_2$ layer 13*a* in the peripheral circuit area is removed while leaving the $SiO_2$ layer 13*a* in the display area, the poly Si layer 14 in the display area may be formed with Si epitaxial growth such as CVD, the SiGe layer 58 of the distortion impression semiconductor layer may be formed in the peripheral circuit area and the distortion Si layer 12*b* may be formed as the distortion channel layer in the seed.

Or, the SiGe layer 51 (hydrogen ion implantation layer) with a Ge density of 20~30% as the distortion impression semiconductor layer on the surface of the seed substrate 50 is formed, the display area of the monocrystalline Si layer 58 (distortion impression semiconductor layer of the SiGe layer) on the support substrate is etched after the seed substrate separation and the $SiO_2$ layer 42 of insulating layer is exposed, the poly Si layer 14 may be formed in the display area with Si epitaxial growth such as CVD, the SiGe layer 58 of the distortion impression semiconductor layer may be formed in the peripheral circuit area and the distortion Si layer 12b may be formed as the distortion channel layer in the seed.

Furthermore, the SiGe layer 51 (hydrogen ion implantation layer) with the a Ge density of 20~30% is formed as the distortion impression semiconductor layer on the surface of the seed substrate 50, the display area of the monocrystalline Si layer 58 (distortion impression semiconductor layer of the SiGe layer) on the support substrate is etched after the seed substrate separation, the $SiO_2$ layer 42 of the insulating layer is exposed, the light shielding metallic layer is formed on the display element formation area, the insulating layer is formed on top of that, the poly Si layer 14 may be formed in the display area with Si epitaxial growth such as CVD, the SiGe layer 58 of the distortion impression semiconductor layer may be formed in the peripheral circuit area and the distortion Si layer 12b may be formed as the distortion channel layer in the seed may be formed.

Because of this, the monocrystalline SiTFT peripheral circuit of the distortion channel layer whose drivability is high and which achieved the improvement of substantial electron mobility of approximately 1.76 times in comparison with the monocrystalline Si layer of former non distortion channel layer is achieved, the ultra slim electrooptic display device unit which has high function, high resolution and high quality can be obtained.

On (A)~(E), (F) mentioned above, although I have explained mainly concerning the example of processes that are generally known such as the double surface assembly which is done with the condition of laminating each substrate with the other substrate (surface), it is possible to do this using the generally known process of surface single assembly which is done by laminating these substrates as a preliminary chip condition (single). Below, I will explain each of the common methods of assembly for each of the reflective type LCD, the transmissive type LCD, the semi-transmissive type LCD, the surface luminous type organic EL and the underside luminous type organic EL types are formed from electrooptic display element substrate with-each method (A)~(E) mentioned above.

(Reflective Type LCD)

With (A)~(E) mentioned above, the display part of the poly SiTFT or the amorphous SiTFT and the peripheral circuit of the monocrystalline SiTFT are formed, the ultra slim electrooptic display element substrate layer which has completes the alignment layer formation and alignment process, and the facing substrate which has completed the alignment layer formation and alignment process through the transparent electrode formation are sealed by laminating through the specified liquid crystal gap. The support substrate is separated from the separation layer such as the distortion area of the porous layer or the ion implantation layer, and then the ultra slim electrooptic display element substrate is formed. After that, it is attached to the backing with the sealant, and each ultra slim electrooptic display device unit is injected with liquid crystal after cutting and dividing. Or, the non-deformative chip of the backing is attached with the sealant together with the non-deformative chip inside the ultra slim electrooptic display element substrate after its separation, and the liquid crystal is injected after cutting and dividing.

At this time, after injecting the liquid crystal and laminating and sealing together, the support substrate may be separated from the separation layer at such as the distortion area of the porous layer or the ion implantation layer.

Or, with (A)~(E) mentioned above, the display part of the poly SiTFT or the amorphous SiTFT and the ultra slim electrooptic display element substrate element of the peripheral circuit part of the monocrystalline SiTFT are formed, the surface is protected by the UV tape, the electrooptic display element substrate is formed by attaching the backing with the sealant after separating the support substrate from the separation layer. After that, in the case of the surface assembly system, this electrooptic display element substrate that has completed the alignment layer forming and alignment process, the facing substrate which is formed with the transparent electrode and which has completed the alignment layer forming and alignment process, are sealed by laminating the specified liquid crystal gap, then the liquid crystal is injected after cutting and dividing.

Or, in case of the surface single assembly system, the non-deformative chip of the facing substrate which is formed with the transparent electrode which has completed the alignment layer forming and alignment process and then been cut, and the non-deformative chip inside the ultra slim electrooptic display element substrate which has completed the alignment layer forming and alignment process, are sealed by laminating with the specified liquid crystal gap. After injecting the liquid crystal, the support substrate is separated from the separation layer, and the electrooptic display element substrate is formed by attaching the backing with the sealant after separating the support substrate from the separation layer.

(Transmissive Type LCD)

With (A)~(E) mentioned above, after the display area of the poly SiTFT or the amorphous SiTFT and the ultra slim electrooptic display element substrate layer of the peripheral circuit of the monocrystalline SiTFT are formed, the pixel opening section of the display area is etched and planarized with the transparent material. The transparent electrode which is connected to the drain of the TFT is formed there it has completed the alignment layer forming and alignment process. After sealing with the facing substrate, which has completed the alignment film forming, which forms the transparent electrode, and alignment process, by laminating at the specified liquid crystal gap, the support substrate is separated from the separation layer and the ultra slim electrooptic display element substrate is formed. The transparent backing is attached with the transparent sealant and it is injected with the liquid crystal after cutting and dividing. Or the non-deformative chip inside the ultra slim electrooptic display element substrate is attached after the separation to the non-deformative chip of the transparent backing with the transparent sealant and it is injected with liquid crystal after cutting and dividing.

Or, with (A)~(E) mentioned above, the display area of the poly SiTFT or the amorphous SiTFT and the ultra slim electrooptic display element substrate element of the peripheral circuit section of the monocrystalline SiTFT are formed, the surface is protected by UV tape, the support substrate is separated from the separation layer, the ultra slim electrooptic display element substrate is formed, the electrooptic display element substrate is formed by attaching the backing with the sealant. After that, in the case of the surface assembly system, the pixel opening section of the display area of this electrooptic display element substrate is etched and its surface is planarized with the transparent material. After forming the transparent electrode which connects to the drain of TFT, and the alignment layer formation and alignment process has completed, the facing substrate which is formed with the transparent electrode and which has completed the alignment layer formation and alignment process, is sealed by laminating with the specified liquid crystal gap, then the liquid crystal is injected after the cutting and dividing.

Or, in case of the single face assembly system, the non-deformative chip of the facing substrate which has completed the alignment film formation, the alignment process and has been cut after forming the transparent electrode, the pixel opening section of the display area is etched and then it is embedded and planarized with the transparent material, after forming the transparent electrode which connects to the drain of the TFT, it is sealed with the non-deformative chip inside the electrooptic display element substrate which has completed the alignment film formation and alignment process to the specified liquid crystal gap, the liquid crystal is injected then it is cut and divided.

Furthermore, the non-deformative chip of the facing substrate which has completed the alignment film formation, alignment process and been cut after forming the transparent electrode, the pixel opening section of the display area is etched and then it is embedded and planarized with the transparent material, the transparent electrode which connects to the drain of the TFT is formed, then it is sealed with the non-deformative chip of the electrooptic display element substrate which has completed the alignment film formation and alignment process and been cut, at the specified liquid crystal gap, it is injected with liquid crystal.

(Semi-Transmissive LCD)

Or, with (A)~(E) mentioned above, after the display area of the poly SiTFT or the amorphous SiTFT and the ultra slim electrooptic display element substrate layer of the peripheral circuit of the monocrystalline SiTFT are formed, the pixel opening section of the display area is etched and it is embedded and planarized with the transparent material. The reflective electrode which connects to the drain of TFT and the transparent electrode are formed there, and it completes the alignment film formation and alignment process. After sealing by laminating with the specified liquid crystal gap with the facing substrate which is formed with a transparent electrode and which has completed the alignment film formation and alignment process, the support substrate is separated from the separation layer, and the ultra slim electrooptic display element substrate is formed. After attaching the transparent backing with the transparent sealant, it is injected with liquid crystal after cutting and dividing. Or the non-deformative chip inside the electrooptic display element substrate is attached after the separation to the transparent backing with the transparent sealant, and then it is injected with the liquid crystal after cutting and dividing.

Or, with (A)~(E) mentioned above, the display area of the poly SiTFT or the amorphous SiTFT and the ultra slim electrooptic display element substrate element of the peripheral circuit of the monocrystalline SiTFT section are formed, the surface is protected by the UV tape, the support substrate is separated from the separation layer, the ultra slim electrooptic display element substrate is formed, the electrooptic display element substrate is formed by attaching the backing with the sealant. After that, in case of the face assembly system, the pixel opening section of the display area of this electrooptic display element substrate is etched and it is embedded and planarized with the transparent material. After forming the reflection and the transparent electrode which connect to the drain of TFT, it has completed the alignment film formation and alignment process. The facing substrate which has completed the alignment film formation and alignment process, is sealed with the specified liquid crystal gap by laminating, it is injected with liquid crystal after cutting and dividing.

Or, in case of the single face assembly system, the non-deformative chip of the facing substrate which has completed the alignment film formation, alignment process and been cut after forming the transparent electrode, the pixel opening section of the display area is etched and then it is embedded and planarized with the transparent material, after forming the reflection and the transparent electrode which connect to the drain of the TFT there, it is sealed with the non-deformative chip inside the electrooptic display element substrate which has completed the alignment film formation and alignment process to the specified liquid crystal gap, it is injected with liquid crystal then it is cut and divided.

Furthermore, the non-deformative chip of the facing substrate which has completed the alignment film formation, alignment process and cut after forming the transparent electrode, the pixel opening section of the display area is etched and then it is embedded and planarized with the transparent material, the reflection and the transparent electrode which connect to the drain of the TFT there is formed, then it is sealed with the non-deformative chip of the electrooptic display element substrate which has completed the alignment film formation and alignment process and cut, to the specified liquid crystal gap, it is injected with liquid crystal.

(Surface Emitter Type Organic EL)

With (A)~(E) mentioned above, the display area of the poly SiTFT or the amorphous SiTFT and the ultra slim electrooptic display element substrate layer of the peripheral circuit of the monocrystalline SiTFT are formed. Here, the display area is attached to the organic EL emission layer such as red, blue and green to every pixel on the cathode (Li—AL, Mg—Ag, etc.) which is connected to the drain of the MOSTFT for drive current for each pixel, the anode (the ITO film, etc.) is formed on the top of the area, the anode is formed extensively as required, the structure, which is covered with the moisture proof transparent resin, is formed on the whole surface. And the support substrate is separated from the separation layer, the ultra slim electrooptic display element substrate is formed. After that, the support substrate is attached to this ultra slim electrooptic display element substrate with the sealant, and then it is cuts and divided. Or the non-deformative chip inside the ultra slim electrooptic display element substrate is attached to the non-deformative chip of the support substrate with the sealant, and it is cut and divided.

Or, with (A)~(E) mentioned above, the display section of the poly SiTFT or the amorphous SiTFT and the ultra slim electrooptic display element substrate element of the peripheral circuit of the monocrystalline SiTFT are formed, the surface is protected by the UV tape, the support substrate is separated from the separation layer, the ultra slim electrooptic display element substrate is formed, the electrooptic display element substrate is formed by attaching the backing with the sealant.

Here, the display section is deposited on the organic EL emission layer such as red, blue and green to every pixel on the cathode (Li—AL, Mg—Ag, etc.) which is connected to the drain of the MOSTFT for drive current to each pixel, the anode (the ITO film, etc.) is formed on the top of the section, the anode is formed extensively as required, the structure which is covered with the moisture proof transparent resin is formed on the whole surface. After that, it is cut and divided.

With (A)~(E) mentioned above, after forming the display section of the poly SiTFT or the amorphous SiTFT and the ultra slim electrooptic display element substrate layer of the peripheral circuit of the monocrystalline SiTFT is formed, the pixel opening section of the display section is etched and it is embedded and planarized with the transparent material. The anode (ITO film, etc.) which is connected to the source of MOSTFT for electronic driving of each pixel are formed on top of it. Furthermore, the organic EL emission layer such as red, blue and green in each pixel is deposited, the cathode (Li—AL, Mg—Ag) is formed on the top section, the cathode is formed extensively as required, furthermore the structure which is covered with the moisture proof transparent resin is formed. And the support substrate is separated from the separation layer, and the ultra slim electrooptic display element substrate is formed. After that, the transparent support substrate is attached with the transparent sealant and it is cut and divided.

Or the non-deformative chip inside the electrooptic display element substrate and the non-deformative chip of the transparent backing are attached with the transparent sealant and it is cut and divided.

Or, with (A)~(E) mentioned above, the display section of the poly SiTFT or the amorphous SiTFT and the ultra slim electrooptic display element substrate element of the peripheral circuit of the monocrystalline SiTFT are formed, the surface is protected by the UV tape, the support substrate is separated from the separation layer, the ultra slim electrooptic display element substrate is formed, and the electrooptic display element substrate is formed by attaching the transparent backing with the transparent sealant.

The pixel opening section of the display part of this electrooptic display element substrate is etched, and it is embedded and planarized with the transparent material. The anode which is connected to the source of TFT for electronic driving in each pixel is formed on top of it, furthermore the organic EL emission layer such as red, blue and green in every pixel is deposited on top of the area, the cathode is formed extensively as required, furthermore, the structure which is covered with the moisture proof transparent resin is formed on the whole surface. After that, it is cut and divided.

The assembly method mentioned above (A)~(E) is shown from FIG. 48 to FIG. 52, classifying by the method of separation. FIG. 48 shows an LCD with the separation method for the porous semiconductor layer of (A) and the assembly method of organic EL, FIG. 49 shows an LCD with the separation method for the double porous semiconductor layer of (B) and the assembly method of organic EL, FIG. 50 shows an LCD with the separation method for the ion implantation layer of (C) and the assembly method of organic EL, FIG. 51 shows an LCD with the separation method for the double ion implantation layer of (D) and the assembly method of organic EL, FIG. 52 shows an LCD with the separation method for the porous semiconductor layer and ion implantation layer of (E) and the assembly method of organic EL. Meanwhile, the term TFT substrate layer means electrooptic display element layer in here. The following words are written down with abbreviations such as the surface liquid crystal assembly is abbreviated as the surface assembly, the surface single liquid crystal assembly is abbreviated as the surface single assembly. Furthermore, it goes without saying that various other assembly methods can be executed by applying and developing the assembly methods mentioned above.

The LCD assembly execution example mentioned above is basically as follows. After sealing the electrooptic display element substrate layer of the monocrystalline semiconductor substrate layer and the facing substrate together, the support substrate is separated from the separation layer, the electrooptic display element substrate and the backing or the backing chip are attached together, the liquid crystal is injected after cutting and dividing. However, in the case of the single surface assembly, as required, the electrooptic display element substrate layer of the monocrystalline semiconductor substrate layer and the facing substrate are sealed together, the support substrate is separated from the separation layer after injecting with liquid crystal, this execution example shows it is possible to have a method that is cut and divided after attaching the electrooptic display element substrate and the backing or the backing chip.

Figure 43:
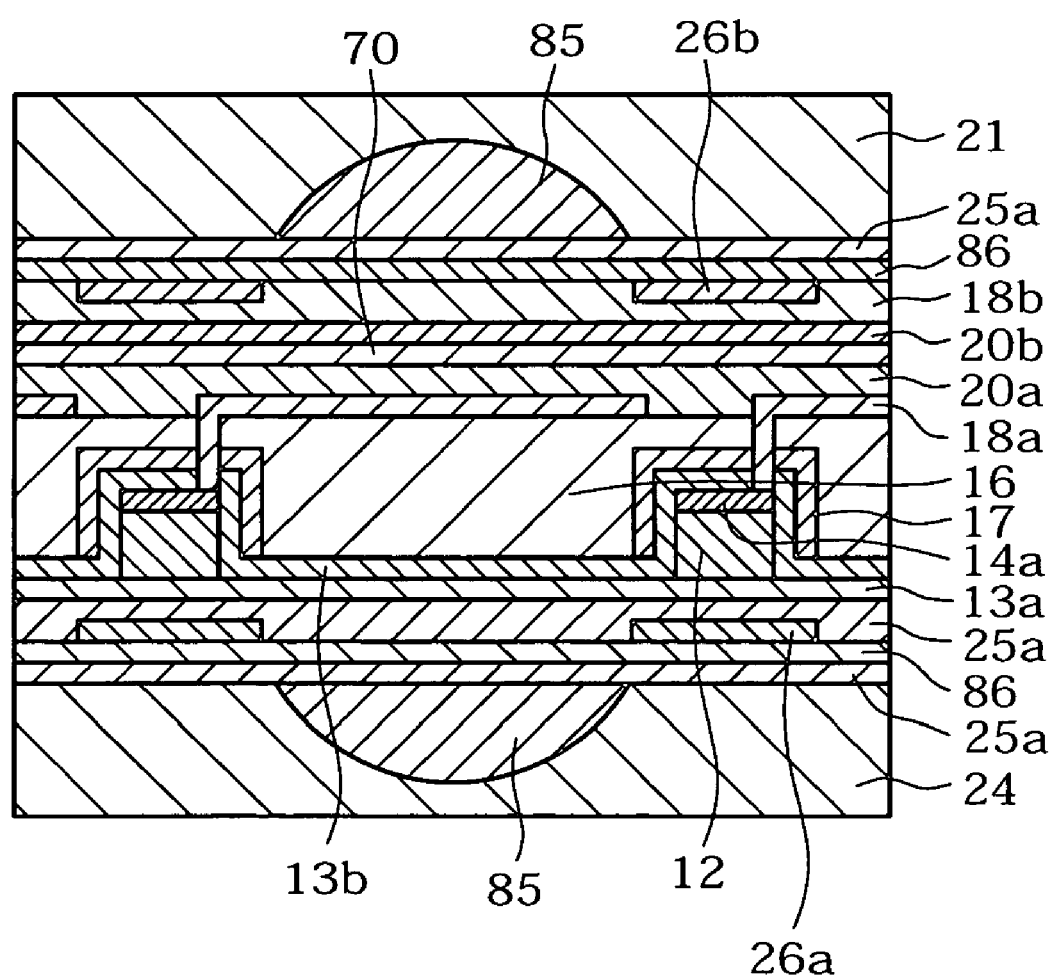

The FIG. 43 shows that the micro lens array is formed on the facing substrate and the transparent support substrate with high index of refraction material, for example the high index of refraction transparent resin, a structure to interleave the facing substrate equipped with the micro lens which functions as the condensing lens on incident side and the transparent support substrate equipped with the micro lens which functions as the field lens of radiation side, the transmissive type LCD for the projector with the structure generally known as the dual micro lens (also known as double micro lens) is shown as a execution example. However, there is no need to mention that the micro lens array can be formed with an inorganic type high index of refraction transparent film.

The concrete example of this execution with the example FIG. 43 is shown below.

[1] With the general-purpose lithography & etching method, the micro lens section of specified concave form is produced multiple times in the quartz glass of the facing substrate 21, neoceram substrate, etc.

[2] The transparent glass substrate 86 of the quartz glass, neoceram substrate, etc. is attached with the transparent sealant 25*a* after filling with the high index of refraction transparent resin 85 in the multiple micro lenses section. At this time, the transparent glass substrate 86 is attached to the facing substrate 21 with the high index of refraction transparent resin 85, you many not need to use the transparent sealant 25*a*.

[3] The facing substrate is equipped with the micro lens array which is covered with the transparent glass substrate 86 (the stacked substrate) of approximately 20 μm is produced by the single sided grinding or both side grinding.

At this time, in case of etching method, the reflective film forming surface side of the transparent glass substrate 86 which is formed with reflective film for the black mask type such as aluminum, etc. in the region where it is appropriate surrounding each micro lens, and the facing substrate which is filled with high index of refraction transparent resin inside the micro lens of specified concave form are attached together with the transparent sealant. Each micro lens surrounding which is covered with the transparent glass substrate 86 (the stacked substrate) with approximately 20 μm by single sided grinding or both side grinding may be produced on the facing substrate of the micro lens array formation which is shaded with the reflective film of black mask action.

After producing the micro lens array in the facing substrate which is covered with the transparent glass substrate

86 (the stacked substrate) of approximately 20 μm, the reflective film formation with a black mask action such as aluminum, etc. can be done in the suitable region to each micro lens surrounding on the surface of the transparent glass substrate 86 (the stacked substrate).

In other words, either the surface or the back of the transparent glass substrate 86 (the stacked substrate) which is suitable for the surrounding of each micro lens can be formed with reflective film of black mask action.

At this time, the micro lens of the specified unevenness form may be formed multiple times on the facing substrate 21 of quartz glass, neoceram, etc. with the stamp method.

With this, the micro lens pattern of the photo resist is formed multiple times with general purpose lithography technology, and the micro lens of desired convex form is formed multiple times with heating reflow.

Next, the stamper of concave form is produced by copying the type with the resin and support stand by depositing the metallic film such as nickel with electrolysis coating on this convex form.

And, the stamper is copied to the high index of refraction transparent resin which was applied on the facing substrate, and the micro lens with convex form is formed multiple times. A low index of refraction transparent resin is filled in the concave section between the micro lens, the transparent glass substrate such as the quartz glass or neoceram with a specified thickness, the facing substrate of the micro lens array formation which is covered with the transparent glass substrate 86 (the stacked substrate) of approximately 20 μm may be produced by the single sided grinding or both side grinding.

Furthermore, in the case of stamp method, the reflective film of the black mask action of aluminum, etc. is formed on the surface of the facing substrate which is suitable to each micro lens surrounding, the low index of refraction transparent resin is filled in the concave section between each micro lens, the transparent glass substrate such as the quartz glass, neoceram, etc. with specified thickness is attached, the micro lens array formation which forms a reflective film around the micro lens which is covered with the transparent glass substrate 86 to approximately 20 μm may be produced by the single sided grinding or both side grinding.

In the meantime, in case of precision of the transparent glass film thickness becomes a problem using single sided grinding or both side grinding, after filling the high index of refraction transparent resin inside the micro lens of specified concave form, the transparent resin film with specified film thickness is formed with spin coating, etc., the low reflective shielding film such as the reflective film or the chrome or chromium oxide such as aluminum with a black mask action may be formed in the region where it is suitable around the micro lens of the surface of this transparent resin film.

In this way, the reflective film such as aluminum for the black mask action is formed around the micro lens which corresponds to the display element region and the pixel opening section of the ultra slim electrooptic display element substrate, at the same time, it increases the contrast, improves the picture quality and decreases the liquid crystal temperature by shielding the light to the liquid crystal and by reflecting the unnecessary part of strong incident light, it is desirable in order to have the high intensity, long life for the LCD.

[4] A transparent electrode and alignment film 20 is formed, the micro lens array which was equipped during the alignment process, a facing substrate and the pixel opening section of the display area are etched, embedded and the surface is planarized with an optically transparent material 16, the transparent electrode 18a which is connected to the display element and the alignment film 20a are formed and sealed by laminating together with the ultra slim electrooptic display element substrate layer which has completed the alignment process, after that the transmissive type LCD with single micro lens structure, which is injected with liquid crystal, is produced.

[5] The support substrate is separated from the distortion section of the porous layer or ion implantation layer under the ultra slim electrooptic display element substrate layer, the remainder of exfoliation is removed by chemical etching as required, and an optically transparent material 16 is exposed through the $SiO_2$ layer 13b and the $SiO_2$ layer 13a.

[6] Low reflective shielding film which is covered with transparent glass substrate 86 (stacked substrate) of approximately 20 μm on which is formed a low reflective light shielding film with a black mask action with the chrome or chromium oxide, etc. and either surface of the transparent glass substrate 86 for example which is suitable around each micro lens or back, and which is manufactured the same as mentioned in 3, and this ultra slim electrooptic display element substrate layer are attached together with a transparent sealant, then a transmissive type LCD with dual micro lens structure is obtained.

At this time, by not only forming the light shielding film of the top and the side of the poly Si layer, etc. of the display element section, but also forming the black mask of the low reflective light shielding film on radiation side and the reflective film on incident side of the transparent glass substrate which is suitable around each micro lens where it corresponds to this display element section, you can prevent the TFT electric current leak due to strong incident light leakage of the projector, etc., and it is possible to achieve increased contrast, higher intensity, better picture quality and a longer life.

Until recently, the back of electrooptic display element substrate which is laminated with the micro lens array equipped facing substrate is finished by optical grinding and chemical etching, for example the ultra slim electrooptic display element substrate of approximately 20 μm is produced, and the micro lens array equipped on the transparent support substrate are attached with the transparent sealant, and a transmissive type LCD with dual micro lens structure is obtained. However, it was difficult to obtain the precision in the optical grinding and also it was difficult to obtain the level of high intensity of the design that we planed and desired.

But, with each separation method of this invention, by attaching an ultra slim electrooptic display element substrate layer with highly accurate thick film which is laminated on a facing substrate where the micro lens array formed which functions as a condensing lens, and a transparent support substrate where the micro lens array formed which functions as a field lens, the transmissive type LCD for the projector with the dual micro lens structure which further high intensity, high definition and long life can be obtained because the utilization efficiency of the emitter light can be raised by condensing the illuminant light with the double micro lens function when compared to the former dual micro lens structure.

Furthermore, by attaching an ultra slim electrooptic display element substrate layer with highly accurate thick film which is laminated on a facing substrate which forms a reflective film with black mask action in the region where it is suitable around each micro lens which functions as condensing lens, and a transparent support substrate of low reflective shielding film formation with a black mask action in the region where it is suitable around each micro lens which functions as field lens, the transmissive type LCD for the projector of the dual micro lens structure which has high intensity, high contrast, high definition and long life can be obtained because the emitter light utilization efficiency can be raised by condensing the illuminant light with the double micro lens function and at the same time, unnecessary incident light and reflective light can be removed.

Figure 44A:
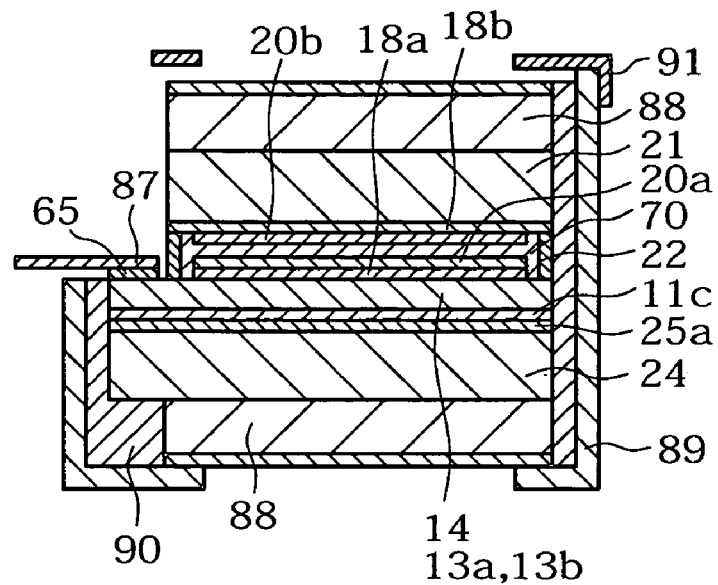

FIG. 44 shows the mounted example of a transmissive type LCD for the projector and a reflective type LCD. FIG. 44(a) is mounted example of a transmissive LCD for the projector. The ultra slim electrooptic display element substrate layer and the facing substrate are laminated and then the liquid crystal is injected and sealed. After separating the support substrate, the flexible 87 substrate is attached to the external output electrode 65 of the LCD panel which consists of the ultra slim electrooptic display element substrate which is attached to the transparent support substrate with transparent sealant. And the dustproof glass 88 which is equipped with the low reflective film on the incident side of the facing substrate is attached with the transparent sealant. After that, the dustproof glass 88 which is equipped with low reflective film on the output side of the transparent support substrate with the transparent sealant. Then, it is fixed to the aluminum metallic frame 89 which is processed with an alumite blackening and with thermally conductive molding resin 90.

Figure 44B:
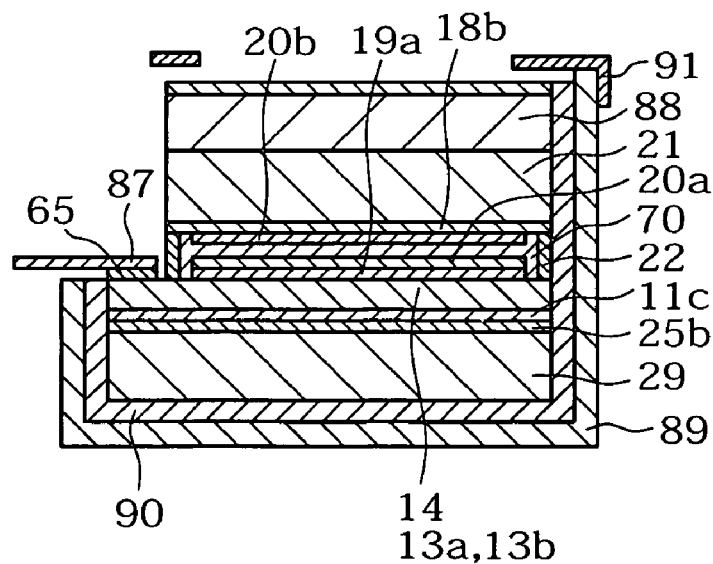

FIG. 44(b) is a mounted example of a reflective type LCD for the projector. The ultra slim electrooptic display element substrate layer and the facing substrate are attached and then sealed and filled with liquid crystal. It is attached to a flexible substrate 87, to an external removal electrode 65 of the LCD panel which consists of the ultra slim electrooptic display element substrate which attaches to the metallic support substrate with a thermally conductive and electrically conductive sealant. And, the dustproof glass 88 which equipped low reflective film to the facing substrate of incident side is attached. It attaches to the aluminum metallic frame 89 which was processed with alumite and darkened, with thermally conductive mold resin 90.

In the meanwhile, at least as a dustproof glass for the incident side for the super slim transmissive type LCD, by attaching with a transparent sealant to the separated super thin electrooptical display element substrate and the transparent substrate, for example, glass without an antireflective film with an optical quality of rectilinear transmissivity of 80% or more and with at least 1 (W/m*K) of thermal conductivity, for instance, quartz glass and transparent crystallized glass (neoceram, CLEARCERAM, Zerodur, etc.) etc., furthermore, glass without an antireflective film, and with an optical quality of rectilinear transmissivity of 80% or more and with at least 10 (W/m*K) of thermal conductivity, for example highly transmissive ceramic polycrystalline substances {crystalline oxides created by electromelting or sintering of MgO (magnesia), $Y_2O_3$ (yttrium), CaO (Calcium Oxide), $AL_2O_3$ (Monocrystalline sapphire), BeO (beryllia), polycrystalline sapphires, etc., monocrystalline or polycrystalline of double oxide crystalline YAG (Yttrium Aluminum Garnet), monocrystalline or polycrystalline $MgAl_2O_4$ (Spinel), $3Al_2O_3 2SiO_2 Al_2O_3 SiO_2$ and so on}, a fluoride monocrystalline body (calcium fluoride, magnesium fluoride and barium fluoride etc.), vapor phase synthetic diamond film coated highly transmissive ceramic polycrystalline substances, or a fluoride monocrystalline body or transparent crystallized glass, or the crystal etc., this transmissive type LCD for projectors and the reflective type LCD can achieve high intensity by promoting thermal cooling.

As an example, if the facing substrate of the thermally conductive glass (including the micro lens substrate, and the black mask substrate which is formed on the reflective film in areas other than the pixel opening section, etc.) which has the antireflective film formed on the incident side, the liquid crystal, material constitution of the transparent support substrate of the thermally conductive glass on which was formed the antireflective film in the ultra slim electrooptic display element substrate and radiation side, or the dustproof glass of the thermally conductive glass on which was formed the antireflective film, the facing substrate of thermally conductive glass (including the micro lens substrate, the black mask substrate on which is formed a reflective film in areas other than the pixel opening section, etc.), the liquid crystal, the ultra slim display element substrate, the transparent support substrate of thermally conductive glass and the dustproof thermally conductive glass on which is formed an antireflective film on the radiation side, materially constitute the transmissive type LCD for the projector in which high intensity and high definition are attained by promoting thermal cooling.

Furthermore, for example, if the facing substrate (including the black mask substrate) of the thermally conductive glass on which is formed an antireflective film on the incident side, the liquid crystal, the ultra slim electrooptic display element substrate, material constitution of the metallic support substrate, or the dustproof thermally conductive glass on which is formed an antireflective film, the facing substrate which is thermally conductive (including the black mask substrate) and liquid crystal materially constitute the ultra slim electrooptic display element substrate or metallic support substrate, and materially constitute the transmissive type LCD for the projector in which high intensity and high definition is attained by promoting thermal cooling.

Figure 45A:
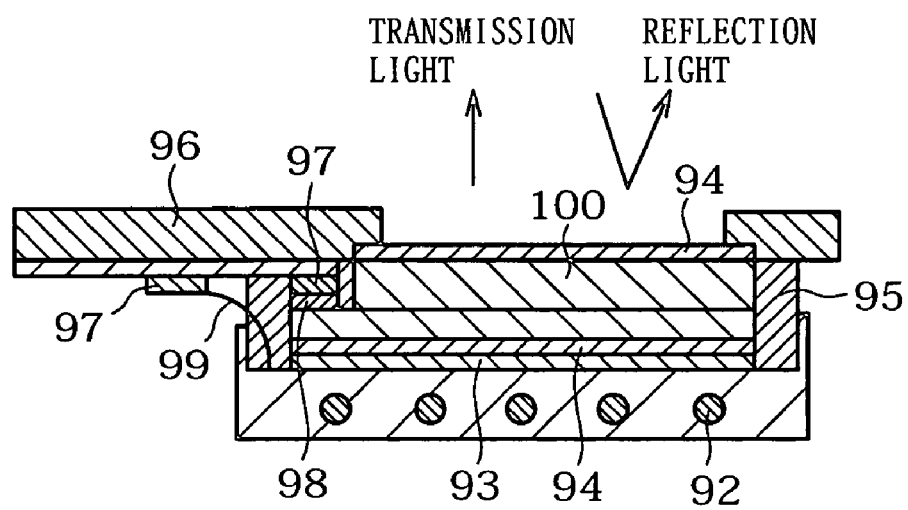
Figure 45B:
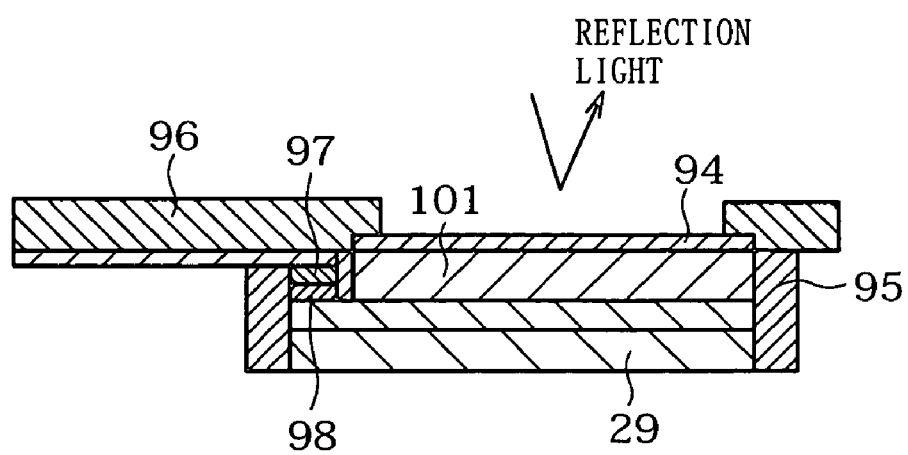
Figure 46A:
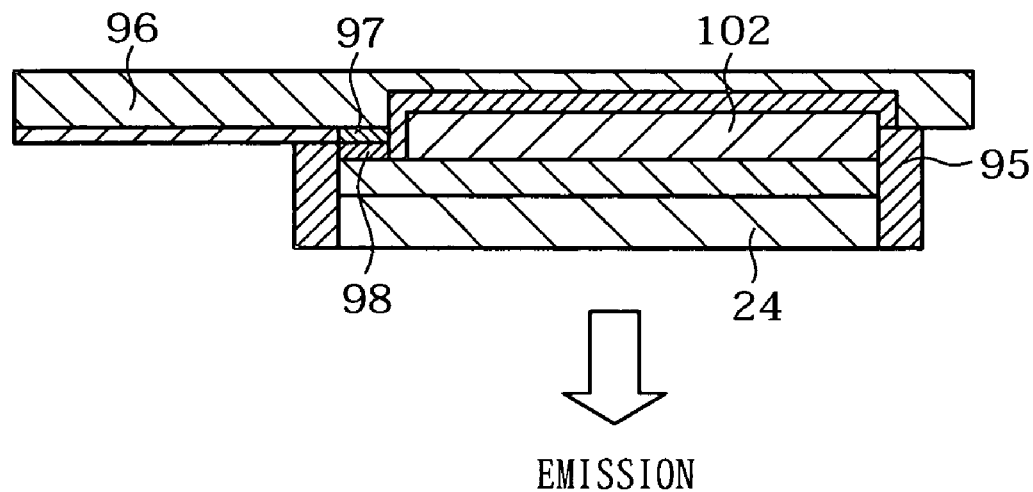
Figure 46B:
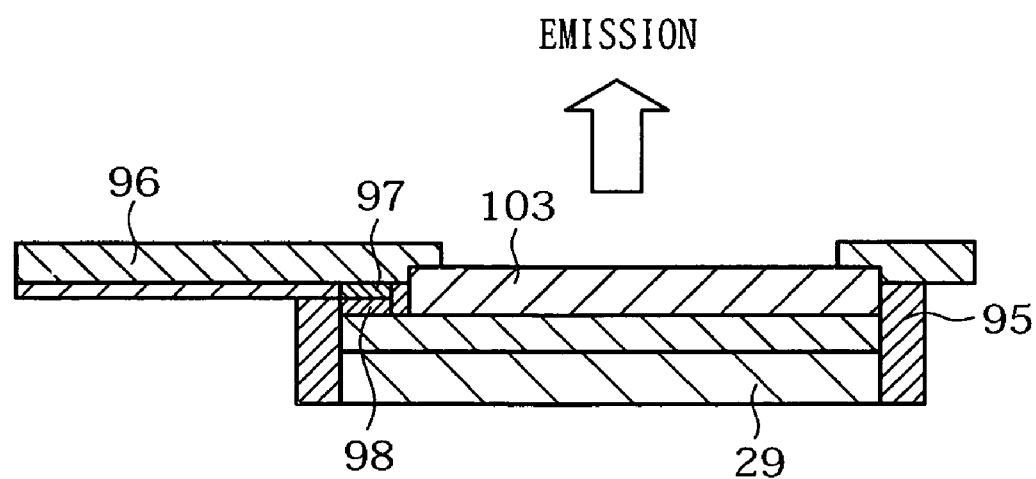

FIGS. 45 and 46 show examples where an ultra slim electrooptic display device unit of this invention is mounted to provide a direct display.

(a) The case of an ultra slim transmissive type or semi-transmissive type LCD for direct display.

The light diffusion plate 93 is attached to the surface of the built-in back light module 92 with transparent sealant to prevent uneven lighting.

By attaching the polarizing plate 94 to the facing substrate with the transparent sealant directly, and attaching the ultra slim transmissive or semi-transmissive type LCD 100 on which the polarizing plate 94 is attached to the back of transmissive backing with the transparent sealant and to the optical diffusion board. Then a transmissive or semi-transmissive type LCD module is attached, sealing with molding resin 95. This is connected by the bump electrode for PCB (Printed Circuit Board) wiring 97 and the bump electrode for external outputs 98 of the ultra slim typed transmissive or semi-transmissive type to the specified position on PCB 96. After connecting the wiring 99 for back light to the bump electrode for the wiring of PCB it is sealed with molding resin.

(b) The case of an ultra slim reflective type LCD for direct display.

By setting the Ultra slim reflective type LCD 101 to which the direct polarization board 94 is attached to the facing substrate to the specified position of PCB 96 with transparent sealant, it is fixed using the molding resin after connecting the bump electrode for external outputs 98 and the bump electrode for PCB wiring 97 to the PCB.

(c) The case of an ultra slim underside emitter type organic EL for direct display.

By setting the moisture proof resin side of the ultra slim underside emitter type organic EL 102 to the specified position of PCB, it is fixed using the molding resin after connecting the bump electrode for PCB wiring 97 and the bump electrode 98 for external outputs.

(d) The case of an ultra slim surface emitter type organic EL for direct display.

By setting the transmissive resin side of ultra slim surface emitter type organic EL 103 to the specified position of the PCB, it is fixed using the molding resin after connecting the bump electrode for external outputs 98 and the bump electrode 97 for PCB wiring.

Furthermore, a concrete example of the ultra slim electronics product which uses this invention is shown in FIG. 47.

For example, in the case of a business card or a cash card type ultra slim portable telephone (audio input type), the ultra slim electrooptic display device unit of this invention 105, uses a reflective type LCD for direct display, an ultra slim MOSLSi which contains the electronics for this invention (the DSP circuit, the CPU circuit, the image or audio memory circuit, the image signal processing circuit, the picture quality compensation circuit, the audio signal processing circuit and the audio compensation circuit, etc.) 106, the ultra slim CCD 107 and the other components of this invention such as ultra slim microphone 108, the ultra slim speaker 109, the antenna 110, etc. on the surface of a multiple layer PCB 104. An electric circuit with a built-in lithium ion polymer electric battery pack 111 is mounted on the back of it. Then, connections are made between the multilayer PCB with suitable wiring and through the hole.

What is claimed is:

1. A method of manufacturing an ultra-slim electrooptic display comprising:
   a process of forming a porous semiconductor layer on a support substrate made of a mono crystalline semiconductor,
   a process of forming a mono crystalline semiconductor layer on said support substrate via said porous semiconductor layer,
   a process of forming an insulating layer on a surface of said mono crystalline semiconductor layer and subsequently removing the insulating layer in the peripheral circuit region while leaving the insulating layer in the display region in order to form a polycrystalline semiconductor layer in said display region and a mono crystalline semiconductor layer in said peripheral circuit region, respectively by semiconductor epitaxial growth, growth,
   a process of forming a display device unit in the polycrystalline semiconductor layer of said display region and a peripheral circuit unit in the mono crystalline semiconductor layer of said peripheral circuit region, respectively,
   a process of separating said support substrate from said porous semiconductor layer,
   a process of bonding a support on the ultra-slim electrooptic display device substrate after said separation, and
   a process of being divided into various ultra-slim electrooptic displays after bonding said support.

2. A method of manufacturing an ultra-slim electrooptic display comprising:
   a process of forming a porous semiconductor layer both on a seed substrate and support substrate, each made of a mono crystalline semiconductor,
   a process of forming a mono crystalline semiconductor layer both on said seed substrate and support substrate, respectively via said porous semiconductor layer,
   a process of forming an insulating layer via said mono crystalline semiconductor layer on at least one of said seed substrate or support substrate,
   a process of bonding said seed substrate and support substrate at the surface forming said insulating layer,
   a process of separating said seed substrate from the porous semiconductor layer of the same seed substrate,
   a process of flattening the surface of said mono crystalline semiconductor layer which has been exposed by separating said seed substrate, by etching at least with a hydrogen annealing treatment,
   a process of forming an insulating layer on the etched surface of the mono crystalline semiconductor layer and removing the insulating layer in the peripheral circuit region while leaving the insulating layer in the display region in order to form a polycrystalline semiconductor layer in said display region and a mono crystalline semiconductor layer in said peripheral circuit region, respectively by semiconductor epitaxial crystallization,
   a process of forming a display device unit in the polycrystalline semiconductor layer of said display region and a peripheral circuit unit in the mono crystalline semiconductor layer of said peripheral circuit region, respectively,
   a process of separating said support substrate from said porous semiconductor layer on the same support substrate,
   a process of bonding a support on the ultra-slim electrooptic display device substrate after said separation, and
   a process of being divided into various ultra-slim electrooptic displays after bonding said support.

3. A method of manufacturing an ultra-slim electrooptic display comprising:
   a process of forming an insulating layer on the surface of a support substrate made of a mono crystalline semiconductor and subsequently removing the insulating layer in the peripheral circuit region while leaving the insulating layer in the display region in order to form a polycrystalline semiconductor layer in said display region and a mono crystalline semiconductor layer in said peripheral circuit region, respectively by semiconductor epitaxial crystallization,
   a process of forming a display device unit in the polycrystalline semiconductor layer of said display region and a peripheral circuit unit in the mono crystalline semiconductor layer of said peripheral circuit region, respectively,
   a process of forming an ion injection layer at a specified depth in said support substrate,
   a process of performing a separation type annealing treatment,
   a process of separating said support substrate from the strained section of said ion injection layer,
   a process of bonding a support on the ultra-slim electrooptic display device substrate after said separation, and a process of being divided into various ultra-slim electrooptic displays after bonding said support.

4. A method of manufacturing an ultra-slim electrooptic display comprising:

a process of forming an ion injection layer on a seed substrate made of a mono crystalline semiconductor, a process of forming an insulating layer on a support substrate made of a mono crystalline semiconductor, a process of forming a mono crystalline semiconductor layer by bonding an ion injection layer of said seed substrate on the insulating layer of said support substrate, and subsequently by forming a covalent bonding between said ion injection layer and the insulating layer with a heat treatment, a process of separating said seed substrate from the strained section of the ion injection layer of the same seed substrate by performing a separation type annealing treatment, a process of flattening by etching the surface of said mono crystalline semiconductor layer at least with a hydrogen annealing treatment, a process of forming an insulating layer on the etched surface of the mono crystalline semiconductor layer and subsequently removing the insulating layer in the peripheral circuit region while leaving the insulating layer in the display region in order to form a polycrystalline semiconductor layer in said display region and a mono crystalline semiconductor layer in said peripheral circuit region, respectively by semiconductor epitaxial crystallization, a process of forming a display device unit in the polycrystalline semiconductor layer of said display region and a peripheral circuit unit in the mono crystalline semiconductor layer of said peripheral circuit region, respectively, a process of forming an ion injection layer at a specified depth in said support substrate, a process of performing a separation type annealing treatment, a process of separating said support substrate at the strained section of said ion injection layer, a process of bonding a support on the ultra-slim electrooptic display device substrate after said separation, and a process of being divided into various ultra-slim electrooptic displays after bonding said support.

5. A method of manufacturing an ultra-slim electrooptic display comprising:

a process of forming an ion injection layer on a seed substrate made of a mono crystalline semiconductor, a process of forming a porous semiconductor layer on a support substrate made of a mono crystalline semiconductor, a process of forming a mono crystalline semiconductor layer via said porous semiconductor layer on said support substrate, a process of forming an insulating layer on said mono crystalline semiconductor layer, a process of forming a mono crystalline semiconductor layer by bonding the ion injection layer of said seed substrate with the insulating layer of said support substrate, and subsequently by forming a covalent bonding between said ion injection layer and the insulating layer using a heat treatment, a process of separating said seed substrate at the strained section of the ion injection layer of the same seed substrate by performing a separation type annealing treatment, a process of flattening by etching the surface of said mono crystalline semiconductor layer at least using a hydrogen annealing treatment, a process of forming an insulating layer on the etched surface of the mono crystalline semiconductor layer and subsequently removing the insulating layer in the peripheral circuit region while leaving the insulating layer in the display region in order to form a polycrystalline semiconductor layer of said display region and a mono crystalline semiconductor layer in said peripheral circuit region, respectively by semiconductor epitaxial crystallization, a process of forming a display device unit in the polycrystalline semiconductor layer of said display region and a peripheral circuit unit in the mono crystalline semiconductor layer of said peripheral circuit region, respectively, a process of separating said support substrate from said porous semiconductor layer, a process of bonding a support on the ultra-slim electrooptic display device substrate after said separation, and a process of being divided into various ultra-slim electrooptic displays after bonding said support.

6. A method of manufacturing an ultra-slim electrooptic display comprising:

a process of forming a porous semiconductor layer both on a seed substrate and support substrate, each made of a mono crystalline semiconductor, a process of forming a mono crystalline semiconductor layer both on said seed substrate and support substrate, respectively via said porous semiconductor layer, a process of forming an insulating layer via said mono crystalline semiconductor layer on at least one of said seed substrate or support substrate, a process of bonding said seed substrate and support substrate at the surface forming said insulating layer, a process of separating said seed substrate from the porous semiconductor layer of the same seed substrate, a process of flattening the surface of said mono crystalline semiconductor layer which has been exposed by separating said seed substrate, by etching at least with a hydrogen annealing treatment, a process of exposing the insulating layer by etching the display region of said mono crystalline semiconductor layer, a process of forming a polycrystalline semiconductor layer in said display region and a mono crystalline semiconductor layer in said peripheral circuit region by semiconductor epitaxial crystallization, a process of forming a display device unit in the polycrystalline semiconductor layer of said display region and a peripheral circuit unit in the mono crystalline semiconductor layer of said peripheral circuit region, a process of separating said support substrate from said porous semiconductor layer on the same support substrate, a process of bonding a support on the ultra-slim electrooptic display device substrate after said separation, and a process of being divided into various ultra-slim electrooptic displays after bonding said support.

7. A method of manufacturing an ultra-slim electrooptic display comprising:
- a process of forming an ion injection layer on a seed substrate made of a mono crystalline semiconductor,
- a process of forming an insulating layer on a support substrate made of a mono crystalline semiconductor,
- a process of forming a mono crystalline semiconductor layer by bonding an ion injection layer of said seed substrate on the insulating layer of said support substrate, and subsequently by forming a covalent bonding between said ion injection layer and the insulating layer with a heat treatment,
- a process of separating said seed substrate from the strained section of the ion injection layer of the same seed substrate by performing a separation type annealing treatment,
- a process of flattening by etching the surface of said mono crystalline semiconductor layer at least with a hydrogen annealing treatment,
- a process of exposing the insulating layer by etching the display region of said mono crystalline semiconductor layer,
- a process of forming a polycrystalline semiconductor layer in said display region and a mono crystalline semiconductor layer in said peripheral circuit region by semiconductor epitaxial crystallization,
- a process of forming a display device unit in the polycrystalline semiconductor layer of said display region and a peripheral circuit unit in the mono crystalline semiconductor layer of said peripheral circuit region,
- a process of forming an ion injection layer at a specified depth in said support substrate,
- a process of performing a separation type annealing treatment,
- a process of separating said support substrate from the strained section of said ion injection layer,
- a process of bonding a support on the ultra-slim electrooptic display device substrate after said separation, and
- a process of being divided into various ultra-slim electrooptic displays after bonding said support.

8. A method of manufacturing an ultra-slim electrooptic display comprising:
- a process of forming an ion injection layer on a seed substrate made of a mono crystalline semiconductor,
- a process of forming a porous semiconductor layer on a support substrate made of a mono crystalline semiconductor,
- a process of forming a mono crystalline semiconductor layer via said porous semiconductor layer on said support substrate,
- a process of forming an insulating layer on said mono crystalline semiconductor layer,
- a process of forming a mono crystalline semiconductor layer by bonding the ion injection layer of said seed substrate with the insulating layer of said support substrate, and subsequently by forming a covalent bonding between said ion injection layer and the insulating layer using a heat treatment,
- a process of separating said seed substrate at the strained section of the ion injection layer of the same seed substrate by performing a separation type annealing treatment,
- a process of flattening by etching the surface of said mono crystalline semiconductor layer at least using a hydrogen annealing treatment,
- a process of exposing the insulating layer by etching the display region of said mono crystalline semiconductor layer,
- a process of forming a polycrystalline semiconductor layer in said display region and a mono crystalline semiconductor layer in said peripheral circuit region by semiconductor epitaxial crystallization,
- a process of forming a display device unit in the polycrystalline semiconductor layer of said display region and a peripheral circuit unit in the mono crystalline semiconductor layer of said peripheral circuit region,
- a process of separating said support substrate from said porous semiconductor layer on the same support substrate,
- a process of bonding a support on the ultra-slim electrooptic display device substrate after said separation, and
- a process of being divided into various ultra-slim electrooptic displays after bonding said support.

9. A method of manufacturing an ultra-slim electrooptic display comprising:
- a process of forming a porous semiconductor layer both on a seed substrate and support substrate, each made of a mono crystalline semiconductor,
- a process of forming a mono crystalline semiconductor layer both on said seed substrate and support substrate, respectively via said porous semiconductor layer,
- a process of forming an insulating layer via said mono crystalline semiconductor layer on at least one of said seed substrate or support substrate,
- a process of bonding said seed substrate and support substrate at the surface forming said insulating layer,
- a process of separating said seed substrate from the porous semiconductor layer of the same seed substrate,
- a process of flattening the surface of said mono crystalline semiconductor layer which has been exposed by separating said seed substrate, by etching at least with a hydrogen annealing treatment,
- a process of exposing the insulating layer by etching the display region of said mono crystalline semiconductor layer,
- a process of forming a light-shielding metallic layer in the polycrystalline semiconductor display device forming region of the display region,
- a process of coating the surface with an insulating layer,
- a process of forming a polycrystalline semiconductor layer in said display region and a mono crystalline semiconductor layer in said peripheral circuit region, respectively by semiconductor epitaxial crystallization,
- a process of forming a display device unit in the polycrystalline semiconductor layer of said display region and a peripheral circuit unit in the mono crystalline semiconductor layer of said peripheral circuit region,
- a process of separating said support substrate from said porous semiconductor layer on the same support substrate,
- a process of bonding a support on the ultra-slim electrooptic display device substrate after said separation, and
- a process of being divided into various ultra-slim electrooptic displays after bonding said support.

10. A method of manufacturing an ultra-slim electrooptic display comprising:
- a process of forming an ion injection layer on a seed substrate made of a mono crystalline semiconductor,
- a process of forming an insulating layer on a support substrate made of a mono crystalline semiconductor, a process of forming a mono crystalline semiconductor layer by bonding an ion injection layer of said seed substrate on the insulating layer of said support substrate, and subsequently by forming a covalent bonding between said ion injection layer and the insulating layer with a heat treatment, a process of separating said seed substrate from the strained section of the ion injection layer of the same seed substrate by performing a separation type annealing treatment, a process of flattening by etching the surface of said mono crystalline semiconductor layer at least with a hydrogen annealing treatment, a process of exposing the insulating layer by etching the display region of said mono crystalline semiconductor layer, a process of forming a light-shielding metallic layer in the polycrystalline semiconductor display device forming region of the display region, a process of coating the surface with an insulating layer, a process of forming a polycrystalline semiconductor layer in said display region and a mono crystalline semiconductor layer in said peripheral circuit region, respectively by semiconductor epitaxial crystallization, a process of forming a display device unit in the polycrystalline semiconductor layer of said display region and a peripheral circuit unit in the mono crystalline semiconductor layer of said peripheral circuit region, a process of forming an ion injection layer at a specified depth in said support substrate, a process of performing a separation type annealing treatment, a process of separating said support substrate from the strained section of said ion injection layer, a process of bonding a support on the ultra-slim electrooptic display device substrate after said separation, and a process of being divided into various ultra-slim electrooptic displays after bonding said support.

11. A method of manufacturing an ultra-slim electrooptic display comprising:

a process of forming an ion injection layer on a seed substrate made of a mono crystalline semiconductor, a process of forming a porous semiconductor layer on a support substrate made of a mono crystalline semiconductor, a process of forming a mono crystalline semiconductor layer via said porous semiconductor layer on said support substrate, a process of forming an insulating layer on said mono crystalline semiconductor layer, a process of forming a mono crystalline semiconductor layer by bonding the ion injection layer of said seed substrate with the insulating layer of said support substrate, and subsequently by forming a covalent bonding between said ion injection layer and the insulating layer using a heat treatment, a process of separating said seed substrate at the strained section of the ion injection layer of the same seed substrate by performing a separation type annealing treatment, a process of flattening by etching the surface of said mono crystalline semiconductor layer at least using a hydrogen annealing treatment, a process of exposing the insulating layer by etching the display region of said mono crystalline semiconductor layer, a process of forming a light-shielding metallic layer in the polycrystalline semiconductor display device forming region of the display region, a process of coating the surface with an insulating layer, a process of forming a polycrystalline semiconductor layer in said display region and a mono crystalline semiconductor layer in said peripheral circuit region, respectively by semiconductor epitaxial crystallization, a process of forming a display device unit in the polycrystalline semiconductor layer of said display region and a peripheral circuit unit in the mono crystalline semiconductor layer of said peripheral circuit region, a process of separating said support substrate from said porous semiconductor layer, a process of bonding a support on the ultra-slim electrooptic display device substrate after said separation, and a process of being divided into various ultra-slim electrooptic displays after bonding said support.

12. The method of manufacturing an ultra-slim electrooptic display as claimed in claim 1, including a process of forming a polycrystalline semiconductor layer with controlled crystal grain size by solid phase crystallization after forming an amorphous semiconductor layer selectively by ion injecting or ion doping using at least one kind of Group IV elements for the polycrystalline semiconductor layer in said display region, and a process of forming a display device unit in the polycrystalline semiconductor layer having the controlled crystal grain size in said display region and a peripheral circuit unit in the mono crystalline semiconductor layer of said peripheral circuit region.

13. The method of manufacturing an ultra-slim electrooptic display as claimed in claim 1, including a process of forming a polycrystalline semiconductor layer with controlled crystal grain size by recrystallization of the polycrystalline semiconductor layer in said display region, and a process of forming a display device unit in the polycrystalline semiconductor layer having the controlled crystal grain size in said display region and a peripheral circuit unit in the mono crystalline semiconductor layer of said peripheral circuit region.

14. The method of manufacturing an ultra-slim electrooptic display as claimed in claim 1, including a process of forming a polycrystalline semiconductor layer with controlled crystal grain size by recrystallization of said display region after selective ion injection or ion doping using at least one kind of Group IV elements for the polycrystalline semiconductor layer in said display region, and a process of forming a display device unit in the polycrystalline semiconductor layer having the controlled crystal grain size in said display region and a peripheral circuit unit in the mono crystalline semiconductor layer of said peripheral circuit region.

15. The method of manufacturing an ultra-slim electrooptic display as claimed in claim 1, including a process of forming a polycrystalline semiconductor layer containing at least one kind of Group IV elements in said display region and a mono crystalline semiconductor layer in said peripheral circuit region by said semiconductor epitaxial crystallization, a process of forming a polycrystalline semiconductor layer with controlled crystal grain size by solid phase crystallization of the polycrystalline semiconductor layer in said display region, and a process of forming a display device unit in the polycrystalline semiconductor layer having the controlled crystal grain size in said display region and a peripheral circuit unit in the mono crystalline semiconductor layer of said peripheral circuit region.

16. The method of manufacturing an ultra-slim electrooptic display as claimed in claim 1, including a process of forming a polycrystalline semiconductor layer containing at least one kind of Group IV elements in said display region and a mono crystalline semiconductor layer in said peripheral circuit region by said semiconductor epitaxial growth, a process of forming a polycrystalline semiconductor layer with controlled crystal grain size by recrystallization of the polycrystalline semiconductor layer in said display region, and a process of forming a display device unit in the polycrystalline semiconductor layer having the controlled crystal grain size in said display region and a peripheral circuit unit in the mono crystalline semiconductor layer of said peripheral circuit region.

17. The method of manufacturing an ultra-slim electrooptic display as claimed in claim 1, wherein said support substrate is separated after forming a groove from said mono crystalline semiconductor layer at least up to said porous semiconductor layer along the division line in the division region when being divided into said various ultra-slim electrooptic displays.

18. The method of manufacturing an ultra-slim electrooptic display as claimed in claim 3, wherein said support substrate is separated after forming a groove from said mono crystalline semiconductor layer at least up to said strained section of the ion injection layer of said support substrate along the division line in the division region when being divided into said various ultra-slim electrooptic displays.

19. The method of manufacturing an ultra-slim electrooptic display as claimed in claim 1, wherein a cathode, an organic electroluminescence (EL) emitting layer and an anode, connected to pixel display devices of the support substrate forming said display device unit and the peripheral circuit unit are formed, after being sealed with a moisture resistant resin, said support substrate is separated, a transparent support is bonded using a transparent sealant on the ultra-slim electrooptic display device substrate after said separation, and said various ultra-slim electrooptic displays are produced by dividing.

20. The method of manufacturing an ultra-slim electrooptic display as claimed in claim 1, wherein a white reflective film is formed in the sections other than the pixel opening section in the display region of the ultra-slim electrooptic display device substrate and at the liquid crystal side of the facing substrate corresponding to the entire areas of the peripheral circuits, and a black low reflective light shielding film is formed in the sections other than the pixel opening section in the display region of the ultra-slim electrooptic display device substrate and on the transparent support substrate surface corresponding to the entire areas of the peripheral circuits.

21. The method of manufacturing an ultra-slim electrooptic display as claimed in claim 1, wherein a facing substrate forming microlens arrays to function as a collective lens after performing an alignment processing by forming transparent electrodes and an alignment film and the pixel opening section in the display region are etched and are mounted with a transmissive material for surface flattening, an electrooptic display device substrate after performing an alignment processing by forming transparent electrodes, connected to the display devices, and an alignment film, is laminated and sealed, subsequently a liquid crystal is injected for sealing, the support substrate is separated from the porous semiconductor layer or the strained section of the ion injection layer, the ultra-slim electrooptic display device substrate after removing the separation residue by etching, is bonded using a sealant with a transparent support substrate forming microlens arrays to function as a field lens.

* * * * *